(12) United States Patent
Krishnan et al.

(10) Patent No.: US 12,436,156 B2
(45) Date of Patent: Oct. 7, 2025

(54) METHODS OF DETERMINING pH AND CALCIUM OR CHLORIDE CONCENTRATION IN SAMPLES

(71) Applicant: The University of Chicago, Chicago, IL (US)

(72) Inventors: Yamuna Krishnan, Chicago, IL (US); Kasturi Chakraborty, Chicago, IL (US); Ka Ho Leung, Chicago, IL (US); Anand Saminathan, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 1084 days.

(21) Appl. No.: 17/295,704

(22) PCT Filed: Dec. 2, 2019

(86) PCT No.: PCT/US2019/064053
§ 371 (c)(1),
(2) Date: May 20, 2021

(87) PCT Pub. No.: WO2020/117701
PCT Pub. Date: Jun. 11, 2020

(65) Prior Publication Data
US 2022/0011325 A1 Jan. 13, 2022

Related U.S. Application Data

(60) Provisional application No. 62/774,314, filed on Dec. 2, 2018.

(51) Int. Cl.
| G01N 33/84 | (2006.01) |
| C12Q 1/6825 | (2018.01) |
| G01N 33/58 | (2006.01) |
| C07H 21/04 | (2006.01) |

(52) U.S. Cl.
CPC .......... *G01N 33/84* (2013.01); *C12Q 1/6825* (2013.01); *G01N 33/582* (2013.01)

(58) Field of Classification Search
None
See application file for complete search history.

(56) References Cited

U.S. PATENT DOCUMENTS

| 4,582,789 A | 4/1986 | Sheldon, III et al. |
| 8,153,437 B2 | 4/2012 | Krishnan et al. |
| 8,216,850 B2 | 7/2012 | Krishnan et al. |
| 9,250,252 B2 | 2/2016 | Krishnan et al. |
| 9,404,123 B2 | 8/2016 | Krishnan et al. |
| 9,772,336 B2 | 9/2017 | Krishnan et al. |
| 10,175,232 B2 | 1/2019 | Krishnan et al. |
| 10,443,089 B2 | 10/2019 | Krishnan et al. |
| 11,136,618 B2 | 10/2021 | Krishnan et al. |
| 11,898,195 B2 | 2/2024 | Krishnan et al. |
| 2009/0081679 A1 | 3/2009 | Keefe et al. |
| 2010/0290992 A1 | 11/2010 | Seela et al. |
| 2010/0304370 A1 | 12/2010 | Krishnan et al. |
| 2011/0033706 A1 | 2/2011 | Krishnan |
| 2011/0223676 A1 | 9/2011 | Krishnan et al. |
| 2012/0082975 A1 | 4/2012 | Krishnan et al. |
| 2012/0258452 A1 | 10/2012 | Krishnan et al. |
| 2014/0056818 A1 | 2/2014 | Krishnan et al. |
| 2014/0335568 A1 | 11/2014 | Krishnan et al. |
| 2016/0002713 A1 | 1/2016 | Krishnan et al. |
| 2016/0069912 A1 | 3/2016 | Krishnan et al. |
| 2016/0370355 A1 | 12/2016 | Krishnan et al. |
| 2016/0376441 A1 | 12/2016 | Mallet et al. |
| 2017/0101669 A1 | 4/2017 | Krishnan et al. |
| 2018/0245137 A1 | 8/2018 | Krishnan et al. |
| 2021/0096129 A1 | 4/2021 | Krishnan et al. |
| 2023/0055931 A1 | 2/2023 | Krishnan et al. |
| 2023/0324370 A1 | 10/2023 | Krishnan et al. |
| 2024/0000949 A1 | 1/2024 | Becker et al. |

FOREIGN PATENT DOCUMENTS

| IN | 1471/CHE/2011 | 6/2013 |
| IN | 3252/CHE/2011 | 6/2013 |
| WO | 2013/054286 A1 | 4/2013 |
| WO | 2014/132191 A2 | 9/2014 |
| WO | 2015/159122 A1 | 10/2015 |
| WO | 2016157937 A | 10/2016 |
| WO | 2016/187284 A1 | 11/2016 |
| WO | 2018/191561 A1 | 10/2018 |
| WO | 2021/119448 A1 | 6/2021 |
| WO | 2021/194613 A1 | 9/2021 |

(Continued)

OTHER PUBLICATIONS

Pacello, F., et al., "An ERp57-Mediated Disulphide Exchange Promotes the Interaction Between Burkholderia cenocepacia and Epithelial Respiratory Cells", Sci. Rep., 2016, vol. 6, 21140, pp. 1-11.

Pires, M.M., et al., "Fluorescence Imaging of Cellular Glutathione Using a Latent Rhodamine", Org. Lett., 2008, vol. 10(5), pp. 837-840.

Presolski, S.I., et al., "Copper-Catalyzed Azide-Alkyne Click Chemistry for Bioconjugation", Curr. Protoc. Chem. Biol., 2011, vol. 3, pp. 153-162.

Prifti, E., et al., A Fluorogenic Probe for SNAP-Tagged Plasma Membrane Proteins Based on the Solvatochromic Molecule Nile Red, ACS Chem. Biol., 2014, vol. 9, pp. 606-612.

Rual, J.-F., et al., "Toward Improving Caenorhabditis elegans Phenome Mapping with an ORFeome-Based RNAi Library", Genome Res., 2004, vol. 14, pp. 2162-2168.

(Continued)

*Primary Examiner* — Sean Mcgarry
(74) *Attorney, Agent, or Firm* — McDonnell Boehnen Hulbert & Berghoff LLP

(57) ABSTRACT

This disclosure relates to methods for determining pH and also calcium ($Ca^{2+}$) concentration or chloride ($Cl^-$) concentration in biological samples. More particularly, this disclosure relates to methods capable of simultaneously determining pH and $Ca^{2+}$ concentration, or pH and $Cl^-$ concentration using nucleic acid complexes.

18 Claims, 53 Drawing Sheets

Specification includes a Sequence Listing.

(56) References Cited

FOREIGN PATENT DOCUMENTS

WO 2022/051724 A1 3/2022

OTHER PUBLICATIONS

Rubartelli, A., et al., "Secretion of Thioredoxin by Normal and Neoplastic Cells Through a Leaderless Secretory Pathway", J. Biol. Chem., 1992, vol. 267(34), pp. 24161-24164.
Saha, S., et al., "A pH-Independent DNA Nanodevice for Quantifying Chloride Transport in Organelles of Living Cells", Nat. Nanotechnol., Jul. 2015, vol. 10, pp. 645-651.
Santana, A.Y., et al. "Implication of Hsc70, PDI and Integrin αvβ3 Involvement During Entry of the Murine Rotavirus ECwt into Small-Intestinal Villi of Suckling Mice", Arch Virol., 2013, vol. 158, pp. 1323-1336.
Shen, W.C., et al., "The intracellular Release of Methotrexate from a Synthetic Drug Carrier System Targeted to Fc Receptor-Bearing Cells", Journal of Controlled Release, 1989, vol. 10, pp. 89-96.
Short, S., et al., "Defective Antigen Processing Correlates with a Low Level of Intracellular Glutathione", Eur. J. Immunol., 1996, vol. 26, pp. 3015-3020.
Smith, C.V., et al., "Compartmentation of Glutathione: Implications for the Study of Toxicity and Disease", Toxicol. Appl. Pharmacol., 1996, vol. 140, Article 0191, pp. 1-12.
Stolf, B.S., et al., "Protein Disulfide Isomerase and Host-Pathogen Interaction", The Scientific World Journal, 2011, vol. 11, pp. 1749-1761.
Turk, V. et al., "Cysteine Cathepsins: From Structure, Function and Regulation to New Frontiers", Biochim. Biophys. Acta., 2012, vol. 1824, pp. 68-88.
Van Diggelen, O.P., et al., "A Rapid Fluorogenic Palmitoyl-Protein Thioesterase Assay: Pre- and Postnatal Diagnosis of INCL", Mol. Genet. Metab., Apr. 1999, vol. 66(4), pp. 240-244.
Wang, M.-Y., et al., A Redox Switch in C-Reactive Protein Modulates Activation of Endothelial Cells, FASEB J., 2011, vol. 25, pp. 3186-3196.
Wang, Y., et al., "Lysosome-Targeting Fluorogenic Probe for Cathepsin B Imaging in Living Cells", Anal. Chem., 2016, vol. 88, pp. 12403-12410.
Wong, T-K., et al., "Appearance of β-lactamase Activity in Animal Cells Upon Liposome-Mediated Gene Transfer", Gene, 1980, vol. 10, pp. 87-94.
Wu, C., et al., "Thioredoxin 1-Mediated Post-Translational Modifications: Reduction, Transnitrosylation, Denitrosylation, and Related Proteomics Methodologies", Antioxid. Redox. Signal., 2011, vol. 15(9), pp. 2565-2604.
Wu, Z., et al., "Visualizing Hydrogen Sulfide in Mitochondria and Lysosome of Living Cells and in Tumors of Living Mice with Positively Charged Fluorescent Chemosensors", Anal. Chem., 2016, vol. 88, pp. 9213-9218.
Xu, H., et al., "Lysosomal Physiology", Annu. Rev. Physiol., Jan. 1, 2015, vol. 77, pp. 57-80.
Yang, J., et al., "Evaluation of Disulfide Reduction During Receptor-Mediated Endocytosis by Using FRET Imaging", Proc. Natl. Acad. Sci. USA., Sep. 12, 2006, vol. 103(37), pp. 13872-13877.
Yi, M.C., et al., "Thiol-Disulfide Exchange Reactions in the Mammalian Extracellular Environment", Annu. Rev. Chem. Biomol. Eng., Jun. 7, 2016, vol. 7, pp. 197-222.
Zhang, Z., et al., "Palmitoyl-Protein Thioesterase-1 Deficiency Mediates the Activation of the Unfolded Protein Response and Neuronal Apoptosis in INCL", Hum. Mol. Genet., Dec. 20, 2005, vol. 15(2), pp. 337-346.
Brenner, S., "The Genetics of Caenorhabditis Elegans", Genetics, May 1974, vol. 77, pp. 71-94.
Chakraborty, et al., "Nucleic Acid-Based Nanodevices in Biological Imaging," Annu. Rev. Biochem., Jun. 2, 2016, vol. 85, pp. 349-373.
Collot, M., et al., "CaRuby-Nano: A Novel High Affinity Calcium Probe for Dual Color Imaging", eLife, 2015, vol. 4, e05808, pp. 1-18.
Grynkiewicz, et al., "A New Generation of Ca2+ Indicators with Greatly Improved Fluorescence Properties", J. Biol. Chem., 1985, vol. 260(6), pp. 3440-3450.
Kamath, R.S. and Ahringer, J., "Genome-Wide RNAi Screening in Caenorhabditis elegans", Methods, Aug. 2003, vol. 30(4), pp. 313-321.
Shen, W-C., et al., "Disulfide Spacer Between Methotrexate and Poly(D-lysine)", The Journal of Biological Chemistry, 1985, vol. 260(20), pp. 10905-10908.
Yang, J., et al., "Evaluation of Disulfide Reduction During Receptor-Mediated Endocytosis by Using FRET Imaging", PNAS, Sep. 12, 2006, vol. 103(37), pp. 13872-13877.
Altschul, S.F., et al., "Basic Local Alignment Search Tool", J. Mol. Biol., 1990, vol. 215, pp. 403-410.
Anfinsen, C.B., "Principles that Govern the Folding of Protein Chains", Science, Jul. 20, 1973, vol. 181(4096), pp. 223-230.
Appelqvist, H., et al., "The Lysosome: From Waste Bag to Potential Therapeutic Target", J. Mol. Cell. Biol., 2013, vol. 5, pp. 214-226.
Berg, T.O., et, al., "Use of Glycyl-L-phenylalanine 2-naphthylamide, a Lysosome-Disrupting Cathepsin C Substrate, to Distinguish Between Lysosomes and Prelysosomal Endocytic Vacuoles", Biochem. J., 1994, vol. 300(Pt.1), pp. 229-236.
Bhatia, D., et al., "Icosahedral DNA Nanocapsules by Modular Assembly", Angew. Chem. Int. Ed. Engl. 2009, vol. 48, pp. 4134-4137.
Bhatia, D., et al., "A Synthetic Icosahedral DNA-Based Host-Cargo Complex for Functional In Vivo Imaging", Nat. Commun., 2011, vol. 2(339), pp. 1-8.
Bhatia, D., et al., "Quantum Dot-Loaded Monofunctionalized DNA Icosahedra for Single-Particle Tracking of Endocytic Pathways", Nat. Nanotechnol., 2016, vol. 11(12), pp. 1112-1119.
Bhuniya, S., et al., "An Activatable Theranostic for Targeted Cancer Therapy and Imaging", Angew. Chem. Int. Ed. Engl., 2014, vol. 53, pp. 4469-4474.
Blum, G., et, al., "Noninvasive Optical Imaging of Cysteine Protease Activity Using Fluorescently Quenched Activity-Based Probes", Nat. Chem. Biol., Oct. 2007, vol. 3(10), pp. 668-677.
Burgdorf, S., et al., "Spatial and Mechanistic Separation of Cross-Presentation and Endogenous Antigen Presentation". Nat. Immunol., May 2008, vol. 9(5), pp. 558-566.
Burgoyne, J.R., et al., "Cysteine Redox Sensor in PKGIa Enables Oxidant-Induced Activation", Science, Sep. 7, 2007, vol. 317(5843), pp. 1393-1397.
Chakraborty, K., et al., "High Lumenal Chloride in the Lysosome is Critical for Lysosome Function", elife, 2017, vol. 6, e28862, pp. 1-21.
Chan, P., et al., "Autopalmitoylation of TEAD Proteins Regulates Transcriptional Output of the Hippo Pathway", Nat. Chem. Biol., Apr. 2016, vol. 12(4), pp. 282-289.
Collins, D.S., et al., "Reduction of Disulfide Bonds Within Lysosomes is a Key Step in Antigen Processing", J. Immunol., 1991, vol. 147, pp. 4054-4059.
Crivat, G., et al., "Imaging Proteins Inside Cells with Fluorescent Tags", Trends Biotechnol., Jan. 2012, vol. 30(1), pp. 8-16.
Dihazi, H., et al., "Secretion of ERP57 is Important for Extracellular Matrix Accumulation and Progression of Renal Fibrosis, and is an Early Sign of Disease Onset", J. Cell Sci., 2018, vol. 126(16), pp. 3649-3663.
Dubikovskaya, E.A., et al., "Overcoming Multidrug Resistance of Small-Molecule Therapeutics through Conjugation with Releasable Octaarginine Transporters", Proc. Natl. Acad. Sci., Aug. 26, 2008, vol. 105(34), pp. 12128-12133.
Eschenlauer, S.C.P., et al., "The Caenorhabditis elegans ERp60 Homolog Protein Disulfide Isomerase-3 has Disulfide Isomerase and Transglutaminase-like Cross-Linking Activity and is Involved in the Maintenance of Body Morphology", J. Biol. Chem., 2003, vol. 278(6), pp. 4227-4237.
Famulok, M., et al., "Functional Aptamers and Aptazymes in Biotechnology, Diagnostics, and Therapy", Chem Rev., 2007, vol. 107(9), pp. 3715-3743.
Feener, E., et al., "Cleavage of Disulfide Bonds in Endocytosed Macromolecules", J. Biol.Chem., 1990, vol. 265(31), pp. 18780-18785.

(56) References Cited

OTHER PUBLICATIONS

Forman-Kay, J.D., et al., "Relationship Between Electrostatics and Redox Function in Human Thioredoxin: Characterization of pH Titration Shifts Using Two-Dimensional Homo- and Heteronuclear NMR", Biochemistry, 1992, vol. 31(13), pp. 3442-3452.
Gething, M.J., et al., "Protein Folding in the Cell", Nature, Jan. 2, 1992, vol. 355, pp. 33-45.
Guermonprez, P., et al., "ER-Phagosome Fusion Defines an MHC Class I Cross-Presentation Compartment in Dendritic Cells", Nature, Sep. 25, 2003, vol. 425, pp. 397-402.
Hawkins, H.C., et al., "Comparison of the Activities of Protein Disulphide-Isomerase and Thioredoxin in Catalysing Disulphide Isomerization in a Protein Substrate", Biochem. J., 1991, vol. 275(Pt. 2), pp. 349-353.
Hogg, P.J., "Disulfide Bonds as Switches for Protein Function", Trends Biochem. Sci., Apr. 2003, vol. 28(4), pp. 210-214.
Jansens, A., et al., "Coordinated Nonvectorial Folding in a Newly Synthesized Multidomain Protein", Science, Dec. 20, 2002, vol. 298, pp. 2401-2403.
Karala, A.-R., et al., "Modulation of an Active-Site Cysteine pKa Allows PDI to Act as a Catalyst of both Disulfide Bond Formation and Isomerization", J. Mol. Biol., 2010, vol. 396, pp. 883-892.
Kathayat, R.S., et al., "A Fluorescent Probe for Cysteine Depalmitoylation Reveals Dynamic APT Signaling", Nat. Chem. Biol., Feb. 2017, vol. 13(2), pp. 150-152.
Lasecka, L., et al., "The Nairovirus Nairobi Sheep Disease Virus/Ganjam Virus Induces the Translocation of Protein Disulphide Isomerase-Like Oxidoreductases from the Endoplasmic Reticulum to the Cell Surface and the Extracellular Space", PLoS ONE, Apr. 2014, vol. 9(4), e94656, pp. 1-15.
Lee, H., et al., "Molecularly Self-Assembled Nucleic Acid Nanoparticles for Targeted In Vivo siRNA Delivery", Nat. Nanotechnol., 2012, vol. 7(6), pp. 389-393.
Lee, M.H., et al., "Hepatocyte-Targeting Single Galactose-Appended Naphthalimide: A Tool for Intracellular Thiol Imaging in Vivo", J. Am. Chem. Soc., 2012, vol. 134, pp. 1316-1322.
Li, J., et al., "Substrate Optimization for Monitoring Cathepsin C Activity in Live Cells", Bioorg. Med. Chem., 2009, vol. 17, pp. 1064-1070.
Linder, M.E., et al., "Palmitoylation: Policing Protein Stability and Traffic", Nat. Rev. Mol. Cell. Biol., Jan. 2007, vol. 8(1), pp. 74-84.
Liu, C., et al., "Eradication of Large Colon Tumor Xenografts by Targeted Delivery of Maytansinoids", Proc. Natl. Acad. Sci., USA, Aug. 1996, vol. 93, pp. 8618-8623.
Liu, J., et al., "Functional Nucleic Acid Sensors", Chem. Rev., 2009, vol. 109, pp. 1948-1998.
Lloyd, J.B., "Disulphide Reduction in Lysosomes. The Role of Cysteine", Biochem. J., 1986, vol. 237, pp. 271-272.
Los, G.V., et al., "HaloTag: A Novel Protein Labeling Technology for Cell Imaging and Protein Analysis", ACS Chem. Biol., 2008, vol. 3(6), pp. 373-382.
Maiti, S., et al., "Gemcitabine-Coumarin-Biotin Conjugates: A Target Specific Theranostic Anticancer Prodrug", J. Am. Chem. Soc., 2013, vol. 135, pp. 4567-4572.
Mills, J.E., et al., "A Novel Disulfide Bond in the SH2 Domain of the C-Terminal Src Kinase Controls Catalytic Activity", J. Mol. Biol., Feb. 2, 2007, vol. 365(5), pp. 1460-1468.
Mok, H., et al., "Multimeric Small Interfering Ribonucleic Acid for Highly Efficient Sequence-Specific Gene Silencing", Nat. Mater., Jan. 24, 2010, vol. 9, pp. 272-278.
Molla, M.R., et al., "Exploring Versatile Sulfhydryl Chemistry in the Chain End of a Synthetic Polylactide", Macromolecules, Oct. 2012, vol. 45, pp. 8561-8570.
Mugherli, L., et al., "Fluorogenic Ester Substrates to Assess Proteolytic Activity", Bioorg. Med. Chem. Lett., 2006, vol. 16, pp. 4488-4491.
Nicolau, C., et al., "Liposome-Mediated Dna Transfer in Eukaryotic Cells. Dependence of the Transfer Efficiency Upon the Type of Liposomes Used and the Host Cell Cycle Stage", Biochem. Biophys. Acta, 1982, vol. 721, pp. 185-190.

PCT International Search Report and Written Opinion, Application No. PCT/US2019/064053, mailed Apr. 22, 2020, 15 pages.
Saha, Sonali, Ved Prakash, Saheli Halder, Kasturi Chakraborty, and Yamuna Krishnan. "A pH-independent DNA nanodevice for quantifying chloride transport in organelles of living cells." Nature nanotechnology 10, No. 7 (2015): 645-651.
U.S. Appl. No. 18/433,029, filed Feb. 5, 2024.
Amit, I., et al., "Voices of Biotech", 25th anniversary issue, Nature Biotechnology, Mar. 2016, vol. 34(3), pp. 270-275.
Banerjee, A., et al., "A Novel Type of Quantum Dot-Transferrin Conjugate using DNA Hybridization Mimics Intracellular Recycling of Endogenous Transferrin", Nanoscale, 2017, vol. 9(40), pp. 15453-15460.
Banerjee, A., et al., "Fast, Efficient and Stable Conjugation of Multiple DNA Strands on Colloidal Quantum Dots", Bioconjugate Chem., May 20, 2015, vol. 26(8), pp. 1582-1589.
Banerjee, A., et al., "Controlled Release of Encapsulated Cargo from a DNA Icosahedron using a Chemical Trigger", Angew. Chem. Int. Ed., May 28, 2013, vol. 52(27), pp. 6854-6857.
Bhatia, D., et al., "A Method to Encapsulate Molecular Cargo within DNA Icosahedra", Methods Mol. Biol., 2013, vol. 991, Chapter 8, pp. 65-80.
Bhatia, D., et al., "Gene Delivery: Designer DNA Give RNAi More Spine", Nature Nanotechnology, Jun. 3, 2012, vol. 7(6), pp. 344-346.
Bhatia, D., et al., "Synthetic, Biofunctional Nucleic Acid Based Molecular Devices", Curr. Opin. Biotechnol., Jun. 11, 2011, vol. 22(4), pp. 475-484.
Bhattacharya, S., et al., "2-Halooxyethylene Ethers of Cholesterol as Novel Single Component, Room Temperature Cholesteric LC Materials", Mol. Cryst. Liq. Cryst., 2002, vol. 381, pp. 33-41.
Bhattacharya, S., et al., "Vesicle Formation from Oligo(Oxyethylene)-Bearing Cholesteryl Amphiphiles: Site-Selective Effects of Oxyethylene Units on the Membrane Order and Thickness", Langmuir, Mar. 9, 2001, vol. 17, pp. 2067-2075.
Bhattacharya, S., et al., "First Report of Phase Selective Gelation of Oil from Oil/Water Mixtures. Possible Implications Toward Containing Oil Spills", Chem. Commun., Jan. 8, 2001, pp. 185-186.
Chakraborty, S., et al., "The Predictive Power of Synthetic Nucleic Acid Technologies in RNA Biology", Accounts of Chemical Research, Apr. 8, 2014, vol. 47(6), pp. 1710-1719.
Chakraborty, S., et al., "Kinetic Hybrid I-Motifs: Intercepting DNA with RNA to Form a DNA(2)-RNA(2) Hybrid I-Motif", Biochimie, Mar. 2, 2008, vol. 90(7), pp. 1088-1095.
Chakraborty, S., et al., "The RNA2-PNA2 Hybrid I-Motif—A Novel RNA-Based Building Block", Chem. Commun., Oct. 17, 2007, Issue 1, pp. 70-72.
Devany, J., et al., "Sub-Cellular Nanorheology Reveals Lysosomal Viscosity as a Reporter of Lysosomal Storage Diseases", Nano Letters, Jan. 9, 2018, vol. 18, pp. 1351-1359.
Ganesh, K.N., et al., "Nucleic Acids—Chemistry and Applications", J. Org. Chem., Dec. 20, 2013, vol. 78(24), pp. 12283-12287.
Ghodke, H.B., et al., "The I-Tetraplex Building Block: Rational Design and Controlled Fabrication of Robust 1D DNA Scaffolds via Non-Watson Crick Self Assembly", Angew. Chem. Int. Ed., Mar. 2, 2007, vol. 46, pp. 2646-2649.
Ghosh, A., et al., "At a Long Awaited Turning Point", Nature Nanotechnology, Jul. 2014, vol. 9(7), pp. 491-494.
Krishnan-Ghosh, Y., et al., "Advantage of the Ether Linkage between the Positive Charge and the Cholesteryl Skeleton in Cholesterol-Based Amphiphiles as Vectors for Gene Delivery", Bioconjugate Chem., Mar.-Apr. 2002, vol. 13(2), pp. 378-384.
Horsey, I., et al., "Enhanced Cooperative Binding of Oligonucleotides to Form DNA Duplexes Mediated by Metal Ion Chelation", Chem. Commun., Aug. 5, 2002, vol. 17, pp. 1950-1951.
Jani, M.S., et al., "A DNA-Based Fluorescent Probe Maps NOS3 Activity with Sub-Cellular Spatial Resolution", Nature Chem. Biol., 2020, https://doi.org/10.1038/s41589-020-0491-3, pp. 1-13.
Jani, M.S., et al., "Precision Immunomodulation with Synthetic Nucleic Acid Technologies", Nature Reviews Materials, Jun. 2019, vol. 4, pp. 451-458.

(56) References Cited

OTHER PUBLICATIONS

Joshi, H., et al., "Probing the Structure and in Silico Stability of Cargo Loaded DNA Icosahedron using MD Simulations", Nanoscale, 2017, vol. 9(13), pp. 4467-4477.
Krishnan, Y., et al., "Introduction: Nucleic Acid Nanotechnology", Chem. Rev., May 22, 2019, vol. 119(10), pp. 6271-6272.
Krishnan, Y., "Nano on Reflection", 10th anniversary issue, Nature Nanotechnology, Oct. 11, 2016, vol. 11, pp. 831-832.
Krishnan, Y., "Crack the Cliques, Enable Visionaries", Nature, May 14, 2015, vol. 521(7551), p. 152.
Krishnan-Ghosh, Y., et al., "PNA Forms an I-Motif", Chem. Commun., Sep. 23, 2005, vol. 42, pp. 5278-5280.
Krishnan-Ghosh, Y., et al., "Dynamic Covalent Chemistry on Self-Templating PNA Oligomers: Formation of a Bimolecular PNA Quadruplex", Chem. Commun., May 11, 2005, vol. 24, pp. 3068-3070.
Krishnan-Ghosh, Y., et al., "A PNA4 Quadruplex", J. Am. Chem. Soc., Apr. 23, 2004, vol. 126(19), pp. 5944-5945.
Krishnan-Ghosh, Y., et al., "Formation of an Interlocked Quadruplex Dimer by d(GGGT)", J. Am. Chem. Soc., 2004, vol. 126(35), pp. 11009-11016.
Krishnan-Ghosh, Y., et al., "Thermal Lipid Order-Disorder Transitions in Mixtures of Cationic Cholesteryl Lipid Analogues and Dipalmitoyl Phosphatidylcholine Membranes", J. Phys. Chem. B, Oct. 3, 2001, vol. 105(42), pp. 10257-10265.
Krishnan-Ghosh, Y., et al., "Structure of Cholest-5-en-3 beta-oxy-5-bromopentane by Single-Crystal X-ray Diffraction at 130 K", J. Mol. Structure, 2001, vol. 560(1-3), pp. 345-355.
Lannes, L., et. al., "Tuning the pH-Response of I-Motif DNA Oligonucleotides", ChemBioChem, Jun. 30, 2015, vol. 16(11), pp. 1647-1656.
Modi, S., et al., "A Method to Map Spatiotemporal pH Changes Inside Living Cells using a pH Triggered DNA Nanoswitch", Methods Mol. Biol., 2011, vol. 749, Chapter 5, pp. 61-77.
Modi, S., et al., "Structural DNA Nanotechnology: From Bases to Bricks, from Structure to Function", J. Phys. Chem. Lett., Jun. 14, 2010, vol. 1(13), pp. 1994-2005.
Modi, S., et al., "A DNA Nanomachine that Maps Spatial and Temporal pH Changes in Living Cells", Nature Nanotechnology, Apr. 6, 2009, vol. 4(5), pp. 325-330.
Pal, A., et al., "Molecular Mechanism of Physical Gelation of Hydrocardons by Fatty Acid Amides of Natural Amino Acids", Tetrahedron, May 22, 2007, vol. 63(31), pp. 7334-7348.
Patel, A., et al., "ATP is a Biological Hydrotrope", Science, May 19, 2017, vol. 356(6339), pp. 753-756.
Pitchiaya, S., et al., "First Blueprint, Now Bricks: DNA as Construction Material on the Nanoscale", Chem. Soc. Rev., Sep. 12, 2006, vol. 35(11), pp. 1111-1121.
Prakash, V., et al., "Quantitative Maps of Endosomal DNA Processing by Single Molecule Counting", Angew. Chem. Int. Ed., 2019, vol. 58(10), pp. 3073-3076.
Saha, S., et al., "Tunable, Colorimetric DNA Based pH Sensors Mediated by A-Motif Formation", Chem. Commun., 2012, vol. 48(19), pp. 2513-2515.
Saha, S., et al., "pH Toggled DNA Architectures: Reversible Assembly of 3WJs into Extended 1D Architectures through A-Motif Formation", Small, May 19, 2010, vol. 6(12), pp. 1288-1292.
Saminathan, A., et al., "Chemically Resolving Lysosome Populations in Live Cells," Trends in Biochem. Sci., Apr. 2020, vol. 45(4), pp. 365-366.
Sayresmith, N., et al., "Photostable Voltage Sensitive Dyes Based on Simple, Solvatofluorochromic, Asymmetric Thiazolothiazoles", J. Am. Chem. Soc., Nov. 27, 2019, vol. 141(47), pp. 18780-18790.
Sharma, S., et al., "A Dna Aptamer for Cyclic Adenosine Monophosphate that Shows Adaptive Recognition", ChemBioChem, Jan. 15, 2020, vol. 21(1-2), pp. 157-162.
Sharma, S., et al., "A Fluorescent Nucleic Acid Nanodevice Quantitatively Images Elevated Cyclic AMP in Membrane-Bound Compartments", Small, Jul. 14, 2014, vol. 10(21), pp. 4276-4280.
Surana, S., et al., "A Method to Map Spatiotemporal pH Changes in a Multicellular Living Organism using a DNA Nanosensor", Methods Mol. Biol., 2013, vol. 991, Chapter 2, pp. 9-23.
Veetil, A., et al., "Cell-Targetable DNA Nanocapsules for Spatiotemporal Release of Caged Bioactive Small Molecules", Nature Nanotechnology, Dec. 2017, vol. 12(12), pp. 1183-1189.
Wills, A.J., et al., "Synthesis of a Polymer-Supported Oxazolidine Aldehyde for Asymmetric Chemistry", J. Org. Chem., Aug. 15, 2002, vol. 67(19), pp. 6646-6652.
Zajac, M., et al., "What Biologists Want from their Chloride Reporters: A Conversation between Chemists and Biologists", J. Cell Sci., Jan. 23, 2020, vol. 133(2), pp. 1-13.
Chakraborty, S., et al., "A Structural Map of OncomiR-1 at Single-Nucleotide Resolution", Nucleic Acids Res., published online Jul. 17, 2017, vol. 45(16), pp. 9694-9705.
Chakraborty, S., et al., "Pri-miR-17-92a Transcript Folds into a Tertiary Structure and Autoregulates its Processing", RNA, May 2012, vol. 18(5), pp. 1014-1028.
Chakraborty, S., et al., "The Poly dA Helix: A New Structural Motif for High-Performance DNA-Based Molecular Switches", Nucleic Acids Res., published online Mar. 11, 2009, vol. 37(9), pp. 2810-2817.
Dan, K., et al., "DNA Nanodevices Map Enzymatic Activity in Organelles", Nature Nanotechnology, Mar. 14, 2019, vol. 14(3), pp. 252-259.
Gavory, G, et al., "Structural Analysis of the Catalytic Core of Human Telomerase RNA by FRET and Molecular Modeling", Biochemistry, Nov. 7, 2006, vol. 45(44), pp. 13304-13311.
Ghosh, Y.K., et al., "Nature of Linkage between the Cationic Headgroup and Cholesteryl Skeleton Controls Gene Transfection Efficiency", FEBS Lett., May 19, 2000, vol. 473(3), pp. 341-344.
Bhattacharya, S., et al., "Membrane Formation from Oxyethylene Bearing Cationic Cholesterol Derivatives", Ind. J. Chem. B, Oct. 2001, vol. 40B, pp. 891-894.
Krishnan-Ghosh, Y., et al., "Dynamic Covalent Chemistry on Self-Templating Peptides: Formation of a Disulfide-Linked Beta-Hairpin Mimic", Angew. Chem. Int. Ed., May 16, 2003, vol. 42(19), pp. 2171-2173.
Leung, K.H., et al., "Dynamic RNA Nanotechnology Enters the CRISPR Toolbox", ACS Cent. Sci., Jun. 18, 2019, vol. 5(7), pp. 1111-1113.
Leung, K.H., et al., "A DNA Nanomachine Chemically Resolves Lysosomes in Live Cells", Nature Nanotechnology, Feb. 1, 2019, vol. 14(2), pp. 176-183.
Modi, S., et al., "The PNA-DNA Hybrid I-Motif: Implications for Sugar-Sugar Contacts in I-Motif Tetramerization", Nucleic Acids Res., published online Aug. 26, 2006, vol. 34(16), pp. 4354-4363.
Narayanaswamy, N. et al., "A pH-Correctable, DNA-Based Fluorescent Reporter for Organellar Calcium", Nature Methods, Jan. 2019, vol. 16(1), pp. 95-102.
Paul, A., et al., "Combining G-Quadruplex Targeting Motifs on a Single PNA Scaffold: A Hybrid (3+1) PNA-DNA Bimolecular Quadruplex", Chem. Eur. J., 2008, vol. 14(28), pp. 8682-8689.
Prakash, V., et al., "Rational Design of a Quantitative, pH-Insensitive, Nucleic Acid Based Fluorescent Chloride Reporter", Chemical Science, published online Dec. 1, 2015, vol. 7(3), pp. 1946-1953.
Salgado, E., et al., "Visualization of Ca2+ Loss from Rotavirus During Cell Entry", J. Virol., published online Sep. 26, 2018, vol. 92(24), e01327-18, pp. 1-19.
Surana, S., et al., "Designing DNA Nanodevices for Compatibility with the Immune System of Higher Organisms", Nature Nanotechnology, Sep. 2015, vol. 10(9), pp. 741-747.
Surana, S., et al., "A Method to Study In Vivo Stability of DNA Nanostructures", Methods, Nov. 2013, vol. 64 (1), pp. 94-100.
Thekkan, S., et al., "A DNA-Based Fluorescent Reporter Maps HOCl Production in the Maturing Phagosome", Nature Chem. Biol., Dec. 2019, vol. 15(12), pp. 1165-1172.
Veetil, A., et al., "Chemical Control Over Membrane-Initiated Steroid Signaling with a DNA Nanocapsule", Proc. Natl. Acad. Sci. U.S.A., Sep. 18, 2018, vol. 115(38), pp. 9432-9437.

(56) References Cited

OTHER PUBLICATIONS

Calcraft, p. J., et al., "NAADP Mobilizes Calcium from Acidic Organelles through Two-Pore Channels", Nature, May 28, 2009, vol. 459(7246), pp. 596-600.
Ezaki, J., et al., "Purification and Characterization of (Ca2+-Mg2+)-ATPase in Rat Liver Lysosomal Membranes", J. Biochem., Jul. 1992, vol. 112(1), pp. 33-39.
Klemper, M.S.J., "An Adenosine Triphosphate-Dependent Calcium Uptake Pump in Human Neutrophil Lysosomes", Clin. Invest., Jul. 1985, vol. 76(1), pp. 303-310.
Kong, S.M.Y., et al., "Parkinson's Disease-Linked Human PARK9/ATP13A2 Maintains Zinc Homeostasis and Promotes α-Synuclein Externalization via Exosomes", Hum. Mol. Genet., Jun. 1, 2014, vol. 23(11), pp. 2816-2833.
Lemons, R.M., et al., "Mediated Calcium Transport by Isolated Human Fibroblast Lysosomes", The Journal of Biological Chemistry, vol. 266(22), Issue of Aug. 5, 1991, pp. 14378-14382.
Ramonet, D., et al., "PARK9-Associated ATP13A2 Localizes to Intracellular Acidic Vesicles and Regulates Cation Homeostasis and Neuronal Integrity", Hum. Mol. Genet., Apr. 15, 2012, vol. 21(8), pp. 1725-1743.
Sakurai, Y., et al., "Two Pore Channels Control Ebolavirus Host Cell Entry and are Drug Targets for Disease Treatment", Science, Feb. 27, 2015, vol. 347(6225), pp. 995-998.
Schmidt, K., et al., "Cd2+, Mn2+, Ni2+ and Se2+ Toxicity to *Saccharomyces cerevisiae* Lacking YPK9p the Orthologue of Human ATP13A2", Biochem. Biophys. Res. Commun., May 29, 2009, vol. 383(2), pp. 198-202.
Tan, J., et al., "Regulation of Intracellular Manganese Homeostasis by Kufor-Rakeb Syndrome-associated ATP13A2 Protein", J. Biol. Chem., Aug. 26, 2011, vol. 286(34), pp. 29654-29662.
Currie, E., et al., "Role of the Caenorhabditis elegans Multidrug Resistance Gene, mrp-4, in Gut Granule Differentiation", Genetics, Nov. 2007, vol. 177, pp. 1569-1582.
Dehay, B., et al., "Loss of P-type ATPase ATP13A2/PARK9 Function Induces General Lysosomal Deficiency and Leads to Parkinson Disease Neurodegeneration", Proc. Natl. Acad. Sci. Jun. 12, 2012, vol. 109(24), pp. 9611-9616.
Dode, L., et al., "Dissection of the Functional Differences between Sarco(endo)plasmic Reticulum Ca2+-ATPase (SERCA) 1 and 2 Isoforms and Characterization of Darier Disease (SERCA2) Mutants by Steady-state and Transient Kinetic Analyses" J. Biol. Chem., 2003, vol. 278(48), pp. 47877-47889.
Estrada-Cuzano, A., "Loss-of-Function Mutations in the ATP13A2/PARK9 Gene Cause Complicated Hereditary Spastic Paraplegia (SPG78)", Brain, 2017, vol. 140, pp. 287-305.
Schröder, B.A., et al., "The Proteome of Lysosomes", Proteomics, Nov. 2010, vol. 10(22), pp. 4053-4076, (Abstract only).
Shankaran, H., et al., "Rapid and Sustained Nuclear-Cytoplasmic ERK Oscillations Induced by Epidermal Growth Factor", Mol. Syst. Biol., 2009, vol. 5, Article 332, pp. 1-13.
Styrt, B., et al., "An Abnormal Calcium Uptake Pump in Chediak-Higashi Neutrophil Lysosomes", Journal of Leukocyte Biology, Aug. 1, 1988, vol. 44(2), pp. 130-135.
Extended European Search Report issued in European Patent Application No. 19893431.7 dated Jul. 21, 2022.
Fisher, L.D., et al., Biostatistics: A Methodology for the Health Sciences (Wiley-Interscience, NY), 1993, (2nd Edition, 2014—Abstract only).
Kamath, R.S., et al., "Genome-Wide RNAi Screening in Caenorhabditis elegans", Methods, 2003, vol. 30, pp. 313-321.
Levitt, et al., "Fluorescence Lifetime and Polarization-Resolved Imaging in Cell Biology", Current Opinion in Biotechnology, Feb. 2009, vol. 20(1), pp. 28-36, (Abstract only).
Makhija, E., et al., "Probing Chromatin Structure and Dynamics Using Fluorescence Anisotropy Imaging", CRC Handbook, Imaging Biological Mechanics, 2014, (Abstract only).
Modi, S., et al., "A Dna Nanomachine that Maps Spatial and Temporal pH Changes Inside Living Cells", Nat. Nanotechol., May 2009, vol. 4(5), pp. 325-330.
Surana, S., et al., "An Autonomous DNA Nanomachine Maps Spatiotemporal pH Changes in a Multicellular Living Organism", Nature Communications, 2011, vol. 2, pp. 1-7.
Halder, Saheli, et al., "Design of Ultrasensitive DNA-Based Fluorescent pH Sensitive Nanodevices", Nanoscale, May 20, 2015, vol. 7(22), pp. 10008-10012, doi:10.1039/C5NR01158B.
Halder, Saheli, et al., "Design of Ultrasensitive DNA-Based Fluorescent pH Sensitive Nanodevices", Electronic Supplementary Information (ESI) available: Materials and Methods, ESI Fig. 1-6, May 11, 2015, pp. 1-5, doi: 10.1039/C5NR01158B.
Holzhüter, Katharina, "Spectroscopic Study of Natural and Unnatural Derivatives of the pH-Responsive Cytosine-Rich Human Telomeric DNA for Nanodevice Insight", Bachelor Thesis—Submitted to Department 14 (Chemistry, Biochemistry, Pharmacy) of the Johann-Wolfgang-von-Goethe University, Jun. 1, 2013, pp. 1-88.
Modi, Souvik, et al., "Two DNA Nanomachines Map pH Changes Along Intersecting Endocytic Pathways Inside the Same Cell", Nature Nanotechnology, May 26, 2013, vol. 8(6), pp. 459-467, doi:10.1038/nnano.2013.92.
Supplementary European Search Report, from The Hague, for European Application No. EP16797204, dated Nov. 9, 2018, pp. 1-10.
Nicolau, Claude, et al., "Liposomes as Carriers for In Vivo Gene Transfer and Expression", Methods in Enzymology, Gene, 1987, vol. 149, pp. 157-176.
Wong, Tai-Kin, et al., "Appearance of β-lactamase Activity in Animal Cells Upon Liposome-Mediated Gene Transfer", Gene, 1980, vol. 10, pp. 87-94.
English translation of Office action issued Jul. 5, 2022 for Japanese Patent Application No. 2021-53148.
Ausubel, et al., "Current Protocols in Molecular Biology", John Wiley & Sons, New York, 1997 (Dec. 4, 2003 edition), pp. 1-25.
Brooks, T.A., et al., "Making Sense of G-quadruplex and i-Motif Functions in Oncogene Promoters", FEBS Journal, Sep. 2010, vol. 277(17), pp. 3459-3469, doi:10.1111/j.1742-4658.2010.07759.x.
Bucek, P., et al., "Spectrometric Study of the Folding Process of i-Motif-Forming DNA Sequences Upstream of the c-kit Transcription Initiation Site", Analytica Chimica Acta, 2010, vol. 683, pp. 69-77, doi:10.1016/j.aca.2010.10.008.
Chen, Y., et al., "A Dna Nanomachine Based on a Duplex-Triplex Transition", Angew. Chem. Int. Ed., 2004, vol. 43, pp. 5335-5338, doi:10.1002/anie.200460789.
Choi, J., et al., "pH-Induced Intramolecular Folding Dynamics of i-Motif DNA", J. Amer. Chem. Soc., 2011, vol. 133, pp. 16146-16153, doi:10.1021/ja2061984.
Dailey, M.M., et al., "Resolution and Characterization of the Structural Polymorphism of a Single Quadruplex-Forming Sequence", Nucleic Acids Research, 2010, vol. 38(14), pp. 4877-4888, doi:10.1093/nar/gkq166.
Datta, B., et al., "Quadruplex Formation by a Guanine-Rich PNA Oligomer", J. Am. Chem. Soc., 2005, vol. 127, pp. 4199-4207.
Edwards, E.L., et al., "A•T and C•C+ Base Pairs Can Form Simultaneously in a Novel Multistranded DNA Complex", Biochemistry, 1990, vol. 29, pp. 828-836.
Gehring, K., et al., "A Tetrameric DNA Structure with Protonated Cytosine·Cytosine Base Pairs", Nature, 1993, vol. 363, pp. 561-565.
Idili, A., et al., "Programmable pH-Triggered DNA Nanoswitches", J. Am. Chem. Soc., 2014, vol. 136, pp. 5836-5839, doi:10.1021/ja500619w.
Jin, R., et al., "Tetraplex Formation of a Guanine-Containing Nonameric DNA Fragment", Science, Oct. 26, 1990, vol. 250(4980), pp. 543-546.
Kanehara, H., et al., "Spectroscopic Evidence for the Formation of Four-Stranded Solution Structure of Oligodeoxycytidine Phosphorothioate", Biochemistry, 1997, vol. 36(7), pp. 1790-1797.
Kaushik, M. et al., "Calorimetric Unfolding of the Bimolecular and i-Motif Complexes of the Human Telomere Complementary Strand, d(C3TA2)4", Biophysical Chemistry, 2007, vol. 126, pp. 154-164, doi:10.1016/j.bpc.2006.05.031.
Krishnan, Y, et al., "Designer Nucleic Acids to Probe and Program the Cell", Trends in Cell Biol., Dec. 2012, vol. 22(12), pp. 624-633, doi:10.1016/j.tcb.2012.10.001.

(56) References Cited

OTHER PUBLICATIONS

Krishnan, Y., et al., "Nucleic Acid Based Molecular Devices", Angew. Chem. Int. Ed., 2011, vol. 50, pp. 3124-3156.

Kulikowski, T., et al., "Methylation and Tautomerism of 1-Substituted 5-Fluorocytosines", Acta Biochem. Polonica, 1979, vol. 26(1/2), pp. 145-160.

Kumar, N., et al., "Tunable c-MYC LNA i-motif", Chem. Commun., 2009, pp. 1532-1534.

Leroy, J.L., et al., "Intramolecular Folding of a Fragment of the Cytosine-Rich Strand of Telomeric DNA into an i-Motif", Nucleic Acids Res., 1994, vol. 22(9), pp. 1600-1606.

Levitt, et al., "Fluorescence Lifetime and Polarization-Resolved Imaging in Cell Biology", Current Opinion in Biotechnology, Feb. 2009, vol. 20(1), pp. 28-36, doi:10.1016/j.copbio.2009.01.004, Epub Mar. 4, 2009. (Abstract only).

Lieblein, A.L., et al., "Optimizing the Kinetics and Thermodynamics of DNA i-Motif Folding", Chembiochem., 2013, vol. 14, pp. 1226-1230, doi:10.1002/cbic.201300284.

Liu, D., et al., "A Proton-Fuelled DNA Nanomachine", Angew. Chem. Int. Ed., 2003, vol. 42, pp. 5734-5736.

Liu, D., et al., "A Reversible pH-Driven DNA Nanoswitch Array", J. Am. Chem. Soc., 2006, vol. 128, pp. 2067-2071.

Liu, Z., et al., "Reporting Transient Molecular Events by DNA Strand Displacement", Chem. Commun., 2014, vol. 50, pp. 8239-8241, doi:10.1039/c4cc03291h.

Makhija, E., et al., "Probing Chromatin Structure and Dynamics Using Fluorescence Anisotropy Imaging", CRC Handbook, Imaging Biological Mechanics, 2014. (Abstract not available).

Malliavin, T.E., et al., "Stability of the I-motif Structure is Related to the Interactions between Phosphodiester Backbones", Biophysical Journal, Jun. 2003, vol. 84, pp. 3838-3847.

Meng, H., et al., "Photoelectric Conversion Switch Based on Quantum Dots with i-Motif DNA Scaffolds", Chem. Commun., 2009, pp. 2293-2295, doi:10.1039/b903325d.

Mergny, J.L., et al., "Intramolecular Folding of Pyrimidine Oligodeoxynucleotides into an i-DNA Motif", J. Am. Chem. Soc., 1995, vol. 117(35), pp. 8887-8898.

Modi, S., et al., "Two DNA Nanomachines Map pH Changes Along Intersecting Endocytic Pathways Inside the Same Cell", Nat. Nanotechol., 2013, vol. 8, pp. 459-467, doi:10.1038/nnano.2013.92.

Modi, S., et al., "A DNA Nanomachine that Maps Spatial and Temporal pH Changes Inside Living Cells", Nat. Nanotechol., 2009, vol. 4, pp. 325-330, doi:10.1038/nnano.2009.83.

Modi, S., et al., "Recombinant Antibody Mediated Delivery of Organelle-Specific DNA pH Sensors Along Endocytic Pathways", Nanoscale, 2014, vol. 6, pp. 1144-1152, doi:10.1039/c3nr03769j.

Moody, E.M., et al., "Folding of a Stable DNA Motif Involves a Highly Cooperative Network of Interactions", J. Am. Chem. Soc., 2003, vol. 125, pp. 16285-16293.

Nesterova, I.V., et al., "Rational Design of Highly Responsive pH Sensors Based on DNA i-Motif", J. Am. Chem. Soc., 2014, vol. 136, pp. 8843-8846, doi:10.1021/ja501859w.

Pasternak, A., et al., "Modulation of i-Motif Thermodynamic Stability by the Introduction of UNA (Unlocked Nucleic Acid) Monomers", Bioorg. Med. Chem. Lett., 2011, vol. 21, pp. 752-755, doi:10.1016/j.bmcl.2010.11.106.

Pasternak, A., et al., "Unlocked Nucleic Acid—An RNA Modification with Broad Potential", Org. Biomol. Chem., 2011, vol. 9, pp. 3591-3597, doi:10.1039/c0ob01085e.

Perlikova, P., et al., "Unlocked Nucleic Acids with a Pyrene-Modified Uracil: Synthesis, Hybridization Studies, Fluorescent Properties and i-Motif Stability", Chembiochem., 2014, vol. 15, pp. 146-156, doi:10.1002/cbic.201300567.

Phan, A.T., et al., "Human Telomeric DNA: G-quadruplex, i-Motif and Watson-Crick Double Helix", Nucleic Acids Research, 2002, vol. 30(21), pp. 4618-4625.

Sambrook, et al., Molecular Cloning: A Laboratory Manual, Cold Spring Harbor Laboratory, New York, 2001. (Abstract only).

Scaria, P.V., et al., "Quadruplex Structure of d(G3T4G3) Stabilized by K+ or Na+ is an Asymmetric Hairpin Dimer", Proc. Natl. Acad. Sci., USA, 1992, vol. 89, pp. 10336-10340.

Sharma, N.K., et al., "PNA C—C+ i-Motif: Superior Stability of PNA TC8 Tetraplexes Compared to DNA TC8 Tetraplexes at Low pH", Chem. Commun., 2005, pp. 4330-4332, doi:10.1039/b506870c.

Simonsson, T., et al., "A Nuclease Hypersensitive Element in the Human c-myc Promoter Adopts Several Distinct i-Tetraplex Structures", Biochem. and Biophys. Res. Commun., 2000, vol. 278(1), pp. 158-166, doi:10.1006/bbrc.2000.3783.

Surana, S., et al., "An Autonomous DNA Nanomachine Maps Spatiotemporal pH Changes in a Multicellular Living Organism", Nature Communications, 2011, vol. 2, pp. 1-7, doi:10.1038/ncomms1340.

Zhou, J., et al., "Formation of i-Motif Structure at Neutral and Slightly Alkaline pH", Mol. BioSyst., 2010, vol. 6, pp. 580-586, doi:10.1039/b919600e.

Halder, Saheli, "I-Switch, i-Motif Based DNA pH Sensor: Design, Delivery and pH Mapping in Endocytic Pathway", National Centre for Biological Sciences, Tata Institute of Fundamental Research, Bangalore—560065, India, Jun. 2015, pp. 1-132.

a b

SEQUENCE LISTING

```
<160> NUMBER OF SEQ ID NOS: 24

<210> SEQ ID NO 1
<211> LENGTH: 60
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' Alexa 488
<220> FEATURE:
<221> NAME/KEY: misc_feature
<222> LOCATION: (3)..(3)
<223> OTHER INFORMATION: Bromo cytosine
<220> FEATURE:
<221> NAME/KEY: misc_feature
<222> LOCATION: (9)..(9)
<223> OTHER INFORMATION: Bromo cytosine
<220> FEATURE:
<221> NAME/KEY: misc_feature
```

```
<222> LOCATION: (17)..(17)
<223> OTHER INFORMATION: Bromo cytosine
<220> FEATURE:
<221> NAME/KEY: misc_feature
<222> LOCATION: (23)..(23)
<223> OTHER INFORMATION: Bromo cytosine

<400> SEQUENCE: 1
cccctaaccc ctaaccccta accccatata tatcctagaa cgacagacaa acagtgagtc    60

<210> SEQ ID NO 2
<211> LENGTH: 56
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5'  Dibenzocyclooctyne-amine (DBCO)
<220> FEATURE:
<221> NAME/KEY: misc_feature
<222> LOCATION: (30)..(31)
<223> OTHER INFORMATION: iAlexa 647N

<400> SEQUENCE: 2
gactcactgt ttgtctgtcg ttctaggata atatttttgtt atgtgttatg tgttat    56

<210> SEQ ID NO 3
<211> LENGTH: 32
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' Alexa 488

<400> SEQUENCE: 3
ccccaacccc aatacattttt acgcctggtg cc    32

<210> SEQ ID NO 4
<211> LENGTH: 32
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (32)..(32)
<223> OTHER INFORMATION: 3' Alexa 647

<400> SEQUENCE: 4
ccgaccgcag gatcctataa aaccccaacc cc    32

<210> SEQ ID NO 5
<211> LENGTH: 38
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (20)..(21)
<223> OTHER INFORMATION: iDBCON

<400> SEQUENCE: 5
ttataggatc ctgcggtcgg ggcaccaggc gtaaaatg    38
```

```
<210> SEQ ID NO 6
<211> LENGTH: 57
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' Oregon Green

<400> SEQUENCE: 6
ataacacata acacataaca aaatatatat cctagaacga cagacaaaca gtgagtc         57

<210> SEQ ID NO 7
<211> LENGTH: 56
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' Ca2+ fluorophore
<220> FEATURE:
<221> NAME/KEY: misc_feature
<222> LOCATION: (30)..(31)
<223> OTHER INFORMATION: Second Label

<400> SEQUENCE: 7
gactcactgt ttgtctgtcg ttctaggata atattttgtt atgtgttatg tgttat          56

<210> SEQ ID NO 8
<211> LENGTH: 60
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' First Label

<400> SEQUENCE: 8
cccctaaccc ctaaccccta acccatata tatcctagaa cgacagacaa acagtgagtc       60

<210> SEQ ID NO 9
<211> LENGTH: 40
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (20)..(21)
<223> OTHER INFORMATION: Ca2+ fluorophore

<400> SEQUENCE: 9
ttataggatc ctgcggtcgg ggcaccaggc gtaaaatgta                            40

<210> SEQ ID NO 10
<211> LENGTH: 32
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' First Label
```

-continued

<400> SEQUENCE: 10
ccccaacccc aatacatttt acgcctggtg cc                                    32

<210> SEQ ID NO 11
<211> LENGTH: 32
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (32)..(32)
<223> OTHER INFORMATION: 3' Second Label

<400> SEQUENCE: 11
ccgaccgcag gatcctataa aaccccaacc cc                                    32

<210> SEQ ID NO 12
<211> LENGTH: 57
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' First Label

<400> SEQUENCE: 12
ataacacata acacataaca aaatatatat cctagaacga cagacaaaca gtgagtc         57

<210> SEQ ID NO 13
<211> LENGTH: 7
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: Greater than or equal to 2 cytosine residues
<220> FEATURE:
<221> NAME/KEY: misc_feature
<222> LOCATION: (2)..(2)
<223> OTHER INFORMATION: A, T, or G
<220> FEATURE:
<221> NAME/KEY: misc_feature
<222> LOCATION: (3)..(3)
<223> OTHER INFORMATION: Greater than or equal to 2 cytosine residues
<220> FEATURE:
<221> NAME/KEY: misc_feature
<222> LOCATION: (4)..(4)
<223> OTHER INFORMATION: A, T, or G
<220> FEATURE:
<221> NAME/KEY: misc_feature
<222> LOCATION: (5)..(5)
<223> OTHER INFORMATION: Greater than or equal to 2 cytosine residues
<220> FEATURE:
<221> NAME/KEY: misc_feature
<222> LOCATION: (6)..(6)
<223> OTHER INFORMATION: A, T, or G
<220> FEATURE:
<221> NAME/KEY: misc_feature
<222> LOCATION: (7)..(7)
<223> OTHER INFORMATION: Greater than or equal to 2 cytosine residues

<400> SEQUENCE: 13 cncncnc                                                                 7

<210> SEQ ID NO 14

```
<211> LENGTH: 7
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: Greater than or equal to 3 cytosine residues
<220> FEATURE:
<221> NAME/KEY: misc_feature
<222> LOCATION: (2)..(2)
<223> OTHER INFORMATION: A, T, or G
<220> FEATURE:
<221> NAME/KEY: misc_feature
<222> LOCATION: (3)..(3)
<223> OTHER INFORMATION: Greater than or equal to 3 cytosine residues
<220> FEATURE:
<221> NAME/KEY: misc_feature
<222> LOCATION: (4)..(4)
<223> OTHER INFORMATION: A, T, or G
<220> FEATURE:
<221> NAME/KEY: misc_feature
<222> LOCATION: (5)..(5)
<223> OTHER INFORMATION: Greater than or equal to 3 cytosine residues
<220> FEATURE:
<221> NAME/KEY: misc_feature
<222> LOCATION: (6)..(6)
<223> OTHER INFORMATION: A, T, or G
<220> FEATURE:
<221> NAME/KEY: misc_feature
<222> LOCATION: (7)..(7)
<223> OTHER INFORMATION: Greater than or equal to 3 cytosine residues

<400> SEQUENCE: 14 cncncnc                                                              7

<210> SEQ ID NO 15
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' BAC-NH2-Lysine
<220> FEATURE:
<221> NAME/KEY: misc_feature
<222> LOCATION: (12)..(12)
<223> OTHER INFORMATION: 3' Lysine-COOH

<400> SEQUENCE: 15
atcaacactg ca                                                       12

<210> SEQ ID NO 16
<211> LENGTH: 62
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (29)..(30)
<223> OTHER INFORMATION: iAlexa 647

<400> SEQUENCE: 16
tattgtgtat tgtgtattgt tttatatata taggatcttg ctgtctggtg tgcagtgttg   60
at                                                                  62

<210> SEQ ID NO 17
<211> LENGTH: 53
```

```
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (53)..(53)
<223> OTHER INFORMATION: 3' Alexa 546

<400> SEQUENCE: 17
caccagacag caagatccta tatatatacc ccaatcccca atccccaatc ccc        53

<210> SEQ ID NO 18
<211> LENGTH: 53
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (31)..(31)
<223> OTHER INFORMATION: Bromo cytosine
<220> FEATURE:
<221> NAME/KEY: misc_feature
<222> LOCATION: (37)..(37)
<223> OTHER INFORMATION: Bromo cytosine
<220> FEATURE:
<221> NAME/KEY: misc_feature
<222> LOCATION: (45)..(45)
<223> OTHER INFORMATION: Bromo cytosine
<220> FEATURE:
<221> NAME/KEY: misc_feature
<222> LOCATION: (51)..(51)
<223> OTHER INFORMATION: Bromo cytosine

<400> SEQUENCE: 18
caccagacag caagatccta tatatatacc ccaatcccca atccccaatc ccc        53

<210> SEQ ID NO 19
<211> LENGTH: 62
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (29)..(30)
<223> OTHER INFORMATION: iAlexa 647

<400> SEQUENCE: 19
tattgtgtat tgtgtattgt tttatatata taggatcttg ctgtctggtg tgcagtgttg  60
at                                                                62

<210> SEQ ID NO 20
<211> LENGTH: 53
<212> TYPE: DNA
<213> ORGANISM: Artificial Sequence
<220> FEATURE:
<223> OTHER INFORMATION: Synthetic oligonucleotide

<400> SEQUENCE: 20
caccagacag caagatccta tatatatacc ccaatcccca atccccaatc ccc        53

<210> SEQ ID NO 21
<211> LENGTH: 38
<212> TYPE: DNA
<213> ORGANISM: Artificial Sequence
<220> FEATURE:
<223> OTHER INFORMATION: Synthetic oligonucleotide
```

```
<400> SEQUENCE: 21
atcaacactg cacaccagac agcaagatcc tatatata                               38

<210> SEQ ID NO 22
<211> LENGTH: 12
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: 5' Cl- fluorophore
<220> FEATURE:
<221> NAME/KEY: misc_feature
<222> LOCATION: (12)..(12)
<223> OTHER INFORMATION: 3' Lysine-COOH

<400> SEQUENCE: 22
atcaacactg ca                                                           12

<210> SEQ ID NO 23
<211> LENGTH: 62
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (29)..(30)
<223> OTHER INFORMATION: First Label

<400> SEQUENCE: 23
tattgtgtat tgtgtattgt tttatatata taggatcttg ctgtctggtg tgcagtgttg       60
at                                                                     62

<210> SEQ ID NO 24
<211> LENGTH: 53
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (53)..(53)
<223> OTHER INFORMATION: 3' Second Label

<400> SEQUENCE: 24
caccagacag caagatccta tatataccc ccaatcccca atcccaatc ccc                53
```

METHODS OF DETERMINING pH AND CALCIUM OR CHLORIDE CONCENTRATION IN SAMPLES

CROSS-REFERENCE TO RELATED APPLICATIONS

This application is a section 371 U.S. National Phase application claiming priority from International application no. PCT/US2019/064053, filed Dec. 2, 2019, which claims the benefit of priority of U.S. Provisional Patent Application No. 62/774,314, filed Dec. 2, 2018, all of which is incorporated by reference in its entirety.

STATEMENT REGARDING FEDERALLY SPONSORED RESEARCH OR DEVELOPMENT

This invention was made with United States government support awarded by National Center for Advancing Translational Sciences (NCATS) of the National Institutes of Health (NIH) Grant No. 1UL1TR002389-01. The United States government has certain rights in this invention.

SEQUENCE LISTING STATEMENT

A computer readable form of the Sequence Listing is filed with this application by electronic submission and is incorporated into this application by reference in its entirety. The Sequence Listing is contained in the file created on Jan. 14, 2021 having the file name "18-1897-WO-US_Sequence-Listing_ST25.txt" and is 8809 bytes in size.

BACKGROUND OF DISCLOSURE

Field of Disclosure

This disclosure relates to methods for determining pH and also calcium ($Ca^{2+}$) concentration or chloride ($Cl^-$) concentration in biological samples. More particularly, this disclosure relates to methods capable of simultaneously determining pH and $Ca^{2+}$ concentration, or pH and $Cl^-$ concentration using nucleic acid complexes.

Technical Background

Lysosomes are highly fusogenic organelles that regulate cellular processes such as innate immunity by fusion with the phagosome, cell membrane repair through fusion with the plasma membrane, autophagy by fusion with the autophagosome and nutrient sensing through the mTOR pathway. Lysosome dysfunction is central to the pathology of common neurological disorders such as Alzheimer's disease, Parkinson's disease as well as about 60 rare, largely untreatable genetic diseases called lysosomal storage diseases. It has been challenging to deconvolute how each of its multiple roles are affected in the diverse pathophysiologies associated with lysosome-related diseases.

Lysosomes are, by and large, regarded as a single population while assaying for a specific lysosomal function. However, recent promising studies have considered that sub-populations of lysosomes might perform sub-sets of tasks. Indeed, many cell types have evolved specialized lysosomes that perform distinct functions. For instance in addition to lysosomes, skin cells have melanosomes, neutrophils have azurophil granules, cytotoxic T-cells have secretory lysosomes while every cell has autolysosomes. Functional imaging based on physical parameters such as lysosome movement, morphology or spatial position within cells have revealed sub-populations that exhibit different behaviors and functions. For example, autolysosomes and lysosomes adopt tubulovesicular and vesicular morphologies respectively. Lysosomes have also been sorted into two populations based on how actively they move within the cell. Spatial positioning of lysosomes is emerging as a correlate of lysosome function. Nevertheless, the capacity to chemically discriminate between lysosome populations in live cells would significantly aid the understanding of lysosome biology by providing the ability to quantitatively correlate chemotypes with function. For example, in 1960s electron microscopy and bright field imaging could only distinguish up to three stages in melanosome maturation based on morphology and melanin content respectively. However, when protein markers were used to chemotype melanosomes, it revealed four stages in melanosome maturation. Chemical resolution revealed the colorless, stage I melanosome that had eluded identification till then due to its high physical and morphological similarity with lysosomes. However, there are still no methods to chemically resolve lysosome populations.

Specialized lysosomes have a different protein composition from normal lysosomes to enable the distinct biochemistries within their lumens. This lumenal biochemistry is facilitated by an optimal chemical milieu, of which key components are high concentrations of specific ions homeostatically maintained by the lysosome protein composition.

$H^+$ and $Cl^-$ are two highly abundant ions in the lysosome that are critical to its function. In fact, no other organelle has a greater concentration of either ion. Lysosomal pH is critical to lysosome maturation, cargo degradation and recycling of degraded material. High lumenal in the lysosome is required for the activity of certain lysosome-resident hydrolases. Unlike other organelles, however, lumenal level in the lysosome is independent of lumenal pH.

$Ca^{2+}$ regulates diverse cellular functions upon its controlled release from different intracellular stores that initiates signaling cascades. Lysosomes have recently been recognized as "acidic $Ca^{2+}$ stores", and lumenal $Ca^{2+}$ is central to its diverse functions. For example, risk genes for Parkinson's disease such as LRRK2, ATP6AP2, ATP13A2, and genetic risk associated GBA1 gene, are predicted to act in lysosomal pathways.

Although electrophysiology has enabled the discovery of several channels that release lysosomal $Ca^{2+}$, mediators of lysosomal $Ca^{2+}$ import have not yet been identified. Lysosomal $Ca^{2+}$ release channels are amenable to investigation because $Ca^{2+}$ release can be tracked using cytosolic $Ca^{2+}$ dyes or genetically encoded $Ca^{2+}$ indicators anchored to the cytoplasmic face of the lysosome. Upon $Ca^{2+}$ release, these probes indicate cytosolic $Ca^{2+}$ in the area surrounding lysosomes. In contrast, lumenal $Ca^{2+}$ cannot be quantitated, impeding the study of lysosomal $Ca^{2+}$ importers. Consequently, lysosomal $Ca^{2+}$ importers have not yet been identified in animals, with the closest evidence being that the *Xenopus* CAX gene localizes in lysosomes upon overexpression.

The inability to quantify $Ca^{2+}$ in acidic organelles arises because all $Ca^{2+}$ indicators function by coordinating $Ca^{2+}$ through carboxylate groups that get protonated at acidic pH. This changes probe affinity to $Ca^{2+}$ ions. Further, organellar pH is coupled to lumenal $Ca^{2+}$ entry and exit. Thus, it is non-trivial to deconvolute the contribution of $Ca^{2+}$ to the observed fluorescence changes of any $Ca^{2+}$ indicator. Previous attempts used endocytic tracers bearing either pH or $Ca^{2+}$ sensitive dyes to serially measure population-averaged pH and apparent $Ca^{2+}$ in different batches of cells thus, scrambling information from individual endosomes. Given the broad pH distribution in endocytic organelles, this approach does not provide the resolution needed to study $Ca^{2+}$ import.

SUMMARY OF THE DISCLOSURE

The inventors have determined that the novel nucleic acid complexes of the disclosure can efficiently and accurately determine pH in addition to $Ca^{2+}$ concentration or $Cl^-$ concentration in samples. In certain embodiments, the novel nucleic acid complexes of the disclosure simultaneously determine pH and $Ca^{2+}$ concentration, or pH and $Cl^-$ concentration in samples.

Thus, one aspect of the disclosure provides nucleic acid complexes including:
  a first single-stranded nucleic acid molecule comprising a $Ca^{2+}$ fluorophore or a $Cl^-$ fluorophore crosslinked to the first strand; and
  a second single-stranded nucleic acid molecule that is partially or fully complementary to the first single-stranded molecule,
    wherein the nucleic acid complex further comprises a first label conjugated to the first single-stranded nucleic acid molecule or the second single-stranded nucleic acid molecule and the first label is capable of producing a signal.

Another aspect of the disclosure provides methods of simultaneously determining 1) pH, and 2) $Ca^{2+}$ concentration or $Cl^-$ concentration in samples using the nucleic acid complexes of the disclosure as provided herein. In general, such methods include providing a nucleic acid complex of the disclosure comprising a $Ca^{2+}$ fluorophore or $Cl^-$ fluorophore and a first label capable of producing a signal; measuring the intensity of the signal; and determining the pH, and $Ca^{2+}$ or $Cl^-$ concentration from the measured signal. Thus, in one embodiment, the methods of the disclosure include:
  providing a nucleic acid complex comprising
    a first single-stranded nucleic acid molecule comprising a $Ca^{2+}$ fluorophore or a $Cl^-$ fluorophore crosslinked to the first strand; and
    a second single-stranded nucleic acid molecule that is partially or fully complementary to the first single-stranded molecule,
      wherein the nucleic acid complex further comprises a first label conjugated to the first single-stranded nucleic acid molecule or the second single-stranded nucleic acid molecule and the first label is capable of producing a signal, wherein the intensity of the signal is dependent on change in pH;
  measuring the intensity of the signal; and
  determining the pH, and $Ca^{2+}$ or $Cl^-$ concentration from the measured signal.

Another aspect of the disclosure relates to a cell comprising a nucleic acid complex described herein.

Another aspect of the disclosure relates to a methods for screening a candidate drug in a model cell or organism, the method including delivering the nucleic acid complex of the disclosure to the cell or organism; contacting the cell or organism with the candidate drug, measuring the intensity of the signal; and determining the pH, and $Ca^{2+}$ or $Cl^-$ from the measured signal. In some embodiments, the model cell or organism is a model for a lysosomal storage disease. In some embodiments, the disease is a lysosomal storage disease.

Another aspect of the disclosure relates to a method for detecting the severity of a disease, the progression of the disease, or the presence of a disease, the method including delivering the nucleic acid complex of the disclosure to a sample; measuring the intensity of the signal; and determining the pH, and $Ca^{2+}$ or $Cl^-$ from the measured signal.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings are included to provide a further understanding of the methods and materials of the disclosure, and are incorporated in and constitute a part of this specification. The drawings illustrate one or more embodiment(s) of the disclosure and, together with the description, serve to explain the principles and operation of the disclosure.

FIG. 1A provides a working principle of CalipHluor$_{Ly}$. pH-induced FRET between Alexa488 (donor, D, sphere) and Alexa647 (acceptor, A, star) reports on pH ratiometrically. A $Ca^{2+}$ sensitive dye (Rhod-5F, diamond, $\lambda_{ex}$=560 nm) and Alexa647 ($\lambda_{ex}$=650 nm) report $Ca^{2+}$ ratiometrically by direct excitation. FIG. 1B shows fluorescence emission spectra of CalipHluor$_{Ly}$ corresponding to Rhod-5F (left, O) and Alexa647 (right, R) with increasing [$Ca^{2+}$] at pH=7.2. FIG. 1C illustrates 3D-surface plot of donor to acceptor ratio (D/A) or pH response of CalipHluor$_{Ly}$ as a function of pH and [$Ca^{2+}$]. FIG. 1D illustrates 3D-surface plot of the Rhod-5F to Alexa647 ratio (O/R) or $Ca^{2+}$ response of CalipHluor$_{Ly}$ as a function of pH and [$Ca^{2+}$].

FIG. 2A illustrates representative CalipHluor$_{Ly}$ labelled coelomocytes imaged in the donor (D,i), acceptor (A,ii), Rhod-5F (O, iii) and Alexa647 (R, iv) channels. D/A (v) and O/R (vi) are the corresponding pixel-wise pseudocolor images. FIG. 2B illustrates representative pseudo colored D/A and O/R maps of coelomocytes clamped at indicated pH and free [$Ca^{2+}$]. FIG. 2C shows distribution of D/A ratios of ≥50 endosomes clamped at the indicated pH (n=10 cells). FIG. 2D shows distribution of O/R ratios of ≥50 endosomes clamped at different indicated free [$Ca^{2+}$] (n=10 cells). Comparison of fold change of D/A ratios from pH 4 to 6.5 (FIG. 2E) and pH$_{1/2}$ from pH 4 to 6.5 (FIG. 2F) of CalipHluor$_{Ly}$ at different [$Ca^{2+}$] obtained in vitro (light gray) and in vivo (dark gray). FIG. 2G shows dissociation constant K$_d$ (μM) and FIG. 2H shows fold change of O/R as a function of pH. Comparison of fold change in O/R ratio from 1 μM to 10 mM [$Ca^{2+}$] (FIG. 2I) and dissociation constant K$_d$ (μM) (FIG. 2J) of CalipHluor$_{Ly}$ at the indicated pH obtained in vitro (light gray) and in vivo (dark gray). Scale bars, 5 μm. Data represent mean±S.E.M. *Error is obtained from the non-exponential fit. Experiments were repeated thrice independently with similar results.

FIG. 3A illustrates CalipHluor marks the indicated organelles in coelomocytes time dependently, by scavenger receptor mediated endocytosis. FIG. 3B illustrates colocalization of CalipHluor and GFP-tagged markers of endocytic organelles at indicated time points post-injection in nematodes. FIG. 3C illustrates quantification of colocalization provided in FIG. 3B (n=10 cells, 50 endosomes). FIGS. 3D-3H illustrate pseudo color images of CalipHluor$_{Ly}$ labelled lysosomes where the D/A map (3D) is converted to the corresponding pH map (3E), the pH map is converted into a $K_d$ map (3F) where the value of $K_d$ is encoded pixel-wise according to the pH at that pixel; the $K_d$ map (3F) is multiplied by the O/R map (3G) to yield the Ca$^{2+}$ map (3H). FIG. 3I illustrates representative pseudocolor pH and Ca$^{2+}$ maps of early endosomes (EE), late endosomes (LE) and lysosomes (Ly) labelled with CalipHluor and CalipHluor$_{Ly}$. FIGS. 3J-3K illustrate distributions of D/A and O/R ratios of EE, LE and Ly from n=15 cells, 50 endosomes. FIG. 3L illustrates mean endosomal pH of EE, LE and Ly. FIG. 3M illustrates mean endosomal [Ca$^{2+}$] in EE, LE and Ly. Data represented as the mean±S.E.M. Experiments were repeated thrice independently with similar results.

FIG. 4A illustrates P-type ATPases in human lysosomes obtained from the human Lysosome Gene Database (hLGDB). FIG. 4B illustrates functional connectivity between catp-6 and cup-5. FIG. 4C illustrates number of adult cup-5+/−progeny where the indicated proteins are knocked down by RNAi. Data represents mean±S.E.M. of three independent trials. FIG. 4D illustrates representative fluorescence images of arls37[myo-3p::ssGFP+dpy-20 (+)]I and arls37; cup-5(ar465) upon RNAi knockdown of the indicated proteins. FIG. 4E illustrates percentage area occupied by enlarged lysosomes in the indicated genetic background. (n=15 cells, 100 lysosomes). FIG. 4F illustrates pH and Ca$^{2+}$ maps in CalipHluor$_{Ly}$-labeled lysosomes in coelomocytes in indicated genetic backgrounds. FIG. 4G illustrates mean lysosomal pH in the indicated genetic backgrounds; FIG. 4H illustrates mean lysosomal [Ca$^{2+}$] in the indicated genetic backgrounds. Data represent the mean±S.E.M. Scale bar 5 μm. Experiments were repeated thrice independently with similar results.

FIG. 5A illustrates representative images of lysosomes in fibroblast cells from normal individuals and Kufor Rakeb syndrome patients (L6025S) labelled with TMR dextran (TMR; middle panels) and CallpHluor$^{mLy}$ (Alexa647, left panels). FIG. 5B illustrates Pearson's correlation coefficient (PCC) of colocalization between CallpHluor$^{mLy}$, and lysosomes as a function of time (n=20 cells). FIG. 5C illustrates pseudocolor pH and Ca$^{2+}$ maps of lysosomes in normal and L6025 fibroblasts. FIG. 5D illustrates mean lysosomal pH.

FIG. 7A illustrates gel showing the conjugation of Rhod-5F to D2-DBCO strand. Gels were visualized in EtBr and TMR channels. FIG. 7B illustrates native PAGE showing formation of CalipHluor$_{Ly}$. Gels were visualized in Alexa 488, TMR and Alexa 647 channels. FIG. 7C is a schematic of working principle of CalipHluor. A pH-induced FRET changes between Alexa488 (donor, sphere) and Alexa647 (acceptor, star) is used to report pH ratiometrically. A Ca$^{2+}$ sensitive fluorophore (Rhod-5F, diamond) and Alexa647 report Ca2$^+$ (at a given pH) ratiometrically by direct excitation of each dye. FIG. 7D illustrates gel showing the conjugation of Rhod-5F to O3-DBCO strand. Gels were visualized in EtBr and TMR channels. FIG. 7E illustrates native PAGE showing formation of CalipHluor. Gels were visualized in Alexa 488, TMR and Alexa 647 channels. FIG. 7F shows emission spectra of CalipHluor at pH values ranging from 7.5 to 5.0 upon excitation at 488 nm. FIG. 7G shows normalized ratio of fluorescence intensity of donor to that of acceptor (D/A) of CalipHluor as a function of pH. (D $\lambda_{ex}$=495 nm, $\lambda_{em}$=520 nm; A $\lambda_{ex}$=495 nm, $\lambda_{em}$=665 nm). Error bar represents±S.E.M. of three independent experiments.

FIG. 8A provides representative pseudo color images of coelomocytes labeled with CalipHluor$_{Ly}$ and clamped at the indicated pH. FIG. 8B provides representative pseudo color images of coelomocytes labeled with CalipHluor$_{Ly}$ and clamped at different free [Ca$^{2+}$] at pH 5.5. Scale bar 5 μm. Experiments were repeated thrice independently with similar results.

FIGS. 9A-9D provide D/A ratios of CalipHluor$_{Ly}$ as a function of pH clamped at different amounts of added [Ca$^{2+}$]. FIGS. 9E-9H provide normalized O/R ratios of CalipHluor$_{Ly}$ as a function of free [Ca$^{2+}$] clamped at different pH points. For in vivo n=10 worms; 15 cells and 50 endosomes were considered; in vitro n=2. Error bar represents mean±S.E.M.

FIG. 12A is a schematic of working principle of CalipHluor$^{mLy}$. An Oregon Green based pH sensor (sphere) and ion insensitive Alexa647 (acceptor, star) and a $Ca^{2+}$ sensitive fluorophore (Rhod-5F, diamond). FIGS. 12B and 12C provide calibration curves comparing in vitro (solid gray) and on beads (light gray) calibration at pH 4.6 and pH 5.1, respectively. FIGS. 12D and 12E provide comparison of $K_d$ and fold change (FC), respectively, in O/R of CalipHluor$_{Ly}$ (solid) and CalipHluor$^{mLy}$ (hatched). FIG. 12F provides representative images. FIGS. 12G and 12H provide comparison of fold change (FC) in O/R and $K_d$, respectively, of CalipHluor$^{mLy}$ in vitro (middle gray), on beads (light gray) and in cellulo (dark grey). (n=5 cells; 30 endosomes; n=60 beads). Experiments were performed thrice independently. *Error is obtained from Hill equation fit. Error bars represent mean±S.E.M. Scale bar: 10 µm.

FIG. 14A is a schematic of the working principle: A pH-induced change in FRET between Alexa546 (donor, sphere) and Alexa647 (acceptor, star) reports pH ratiometrically. A $Cl^-$ sensitive fluorophore (BAC, triangle) and Alexa647 report $Cl^-$ ratiometrically. FIG. 14B shows a pH and Cr response profiles of ChloropHore: Normalized fluorescence intensity ratio (D/A) of donor (D) and acceptor (A) upon donor excitation in vitro as a function of pH and 50 mM (bottom, light gray). Normalized fluorescence intensity ratio (R/G) of Alexa 647 (R) and BAC (G) as a function of Cr concentration at pH 7 (top, dark gray). Values were normalized 5 mM $Cl^-$ for R/G or pH 4 for D/A. FIG. 14C shows a performance of the pH sensing module at different $[Cl^-]$ and $Cl^-$ sensing module at different pH. Fold changes in D/A (light gray hatched bars, on the right) or R/G (dark gray hatched bars, in the middle) for the pH and $Cl^-$ sensing modules are shown. Stern Volmer's constant ($K_{sv}$, solid gray bars) for $Cl^-$ sensing at each pH. Calibration surface plot of the fluorescence intensity ratios of (FIG. 14D) D/A and (FIG. 14E) R/G of ChloropHore as a function of $Cl^-$ and pH. Error bars indicate the mean±s.e.m. of three independent measurements.

FIG. 15A shows trafficking of ChloropHore along the scavenger receptor-mediated endocytic pathway. FIGS. 15B and 15C show ChloropHore uptake in primary skin fibroblasts (HDF cells) is competed out by excess maleylated BSA (mBSA, 10 µM). Cells are imaged in Alexa647 channel. AF: autofluorescence. FIGS. 15D and 15G show ChloropHore labels lysosomes in HDF cells. FIG. 15D are representative images of co-localization between lysosomes of HDF cells labeled with FITC Dextran (middle panel) and LAMP-1 RFP (left panel) with the corresponding Pearson's correlation coefficient (FIG. 15E). FIG. 15F are representative images of lysosomes of HDF cells labelled with TMR dextran (TMR; middle panel) and ChloropHore (Alexa647, left panel). FIG. 15G is a Pearson's correlation coefficient of colocalization between ChloropHore and lysosomes as a function of ChloropHore chase times. Experiments were performed in triplicate. Error bars indicate the mean of three independent experiments±s.e.m. (n=20 cells).

FIGS. 16A-16O illustrate intracellular calibration of ChloropHore and ChloropHore$_{Ly}$. FIG. 16A are fluorescence images of primary HDF cells labeled with ChloropHore, clamped at the indicated pH and $[Cl^-]$, imaged in the donor (D), acceptor (A), reference (R), BAC (G) channel and the corresponding pseudocolour D/A (pH) and R/G ($Cl^-$) maps. FIGS. 16B and 16C show in cell calibration surface corresponding to the pH and $Cl^-$ response profiles of the sensing modules in ChloropHore at various $[Cl^-]$ and pH values respectively. FIG. 16D is a representative scatter plot of D/A versus the R/G values of endosomes in primary HDF cells from a normal individual clamped at the indicated pH and $[Cl^-]$. Each data point corresponds to a single endosome. FIG. 16E is the scatter plot in FIG. 16D, represented as a density plot in pseudocolour where red and blue correspond to populations with higher and lower frequencies of occurrence, i.e., a 2-IM profile. FIGS. 16F and 16H show 2-IM profiles of HDF cells clamped in varying pH and fixed $[Cl^-]$. FIGS. 16I and 16K show 2-IM profiles of HDF cells at fixed pH and increasing $[Cl^-]$. In FIG. 16A-16K, experiments were performed in duplicate (n=15 cells, n=150 endosomes). FIG. 16L is a single endosome clamping in HDF cells. ChloropHore labeled cells clamped at indicated pH (i) and $Cl^-$ (ii) were clamped to a different indicated pH and same $Cl^-$ (iv) FIG. 16M shows 2D-scatter plots and their projected histograms on a single axis of each clamping step of the same endosomes are shown. Gray arrow represents the direction of change in D/A (pH) values for each endosome. FIG. 16N is Chlorophore$_{Ly}$ labeled HDF clamped at indicated pH (i) and $Cl^-$ (ii) were clamped to the same pH (iii) but different $[Cl^-]$ (iv) FIG. 16O shows 2D-scatter plots and their projected histograms on a single axis for each clamping step. Gray arrow indicates direction of change in R/G (Cr) values for each endosome. Scale bars, 10 µm. In FIGS. 16L-16O, experiments were performed in duplicate (n=30 endosomes).

FIG. 17A is a respective pseudocolour D/A and R/G map of HDF cells derived from normal individuals 1, NP-A patient 1 and NP-C patient 1 labeled with Chlorophore$_{Ly}$. 2-IM profiles and the histograms of D/A, R/G ratios of (FIGS. 17B, 17I) normal individual (N.I.) and in presence of bafilomycin A1 (FIG. 17C) or NPPB (FIG. 17D). 2-IM profiles of lysosomes of primary HDF cells from the same normal individual showing three replicates (FIG. 17B, ii-vi), two different normal individuals 2-3, (FIG. 17E) NP-A, NP-B, NPC patients. FIG. 17F are scatter plots of lysosome sizes versus their R/G or D/A values in a normal individual and an NP-A patient. FIG. 17G is a 2-IM profile and corresponding histograms of D/A, R/G ratios of HDF cells treated with 65 µM amitriptyline (AH) or 20 µM U18666A (FIG. 17H) 2-IM profiles of NP-A, NP-B patient fibroblasts in the presence of 5 µg of acid sphingomyelinase (ASM) and NP-C patient fibroblasts in the presence of 50 µM of β-CD. Experiments were performed in duplicate (n=550 lysosome, =55 cells). Scale bars 10 µm.

FIG. 21A is a schematic of the working principle of ChloropHore$_{Ly}$ in the "open state" (low FRET) at high pH and in the "closed" state (high FRET) at low pH. Cl$^-$ sensitive fluorophore BAC displays high fluorescence in the absence of ion whereas the fluorescence has been quenched by increasing concentration of ions. Both pH and Cl$^-$ sensing modules are independent of each other. ChloropHore$_{Ly}$, incorporating brominated cytosines that has a more acidic pH sensing range FIG. 21B shows normalized fluorescence intensity ratio (D/A) of donor (D) and acceptor (A) in vitro as a function of pH. In vitro Cl$^-$ calibration profile of ChloropHore$_{Ly}$ showing the normalized fluorescence intensity ratio (R/G) of Alexa 647 (R) and BAC (G) against increasing concentration of chloride ions. R/G values at different chloride concentrations were normalized to the value at 5 mM chloride. FIG. 21C shows the pH sensing module of ChloropHore$_{Ly}$, is insensitive to concentration and sensing module, is insensitive to pH. Performance of the pH and sensing modules are in light gray and dark gray, respectively. Plot of fold change of pH sensing modules in indicated Cl$^-$ concentration (light gray hatched bars, on the right). Fold change (dark gray hatched bars, in the middle) and K$_{SV}$ (solid gray) for sensing module versus pH. Fluorescence intensity ratio (FIG. 21D) D/A and (FIG. 21E) R/G of ChloropHore$_{Ly}$ as a function of and pH. Error bars indicate the mean±s.e.m. of three independent measurements.

DETAILED DESCRIPTION

Figure 1A:
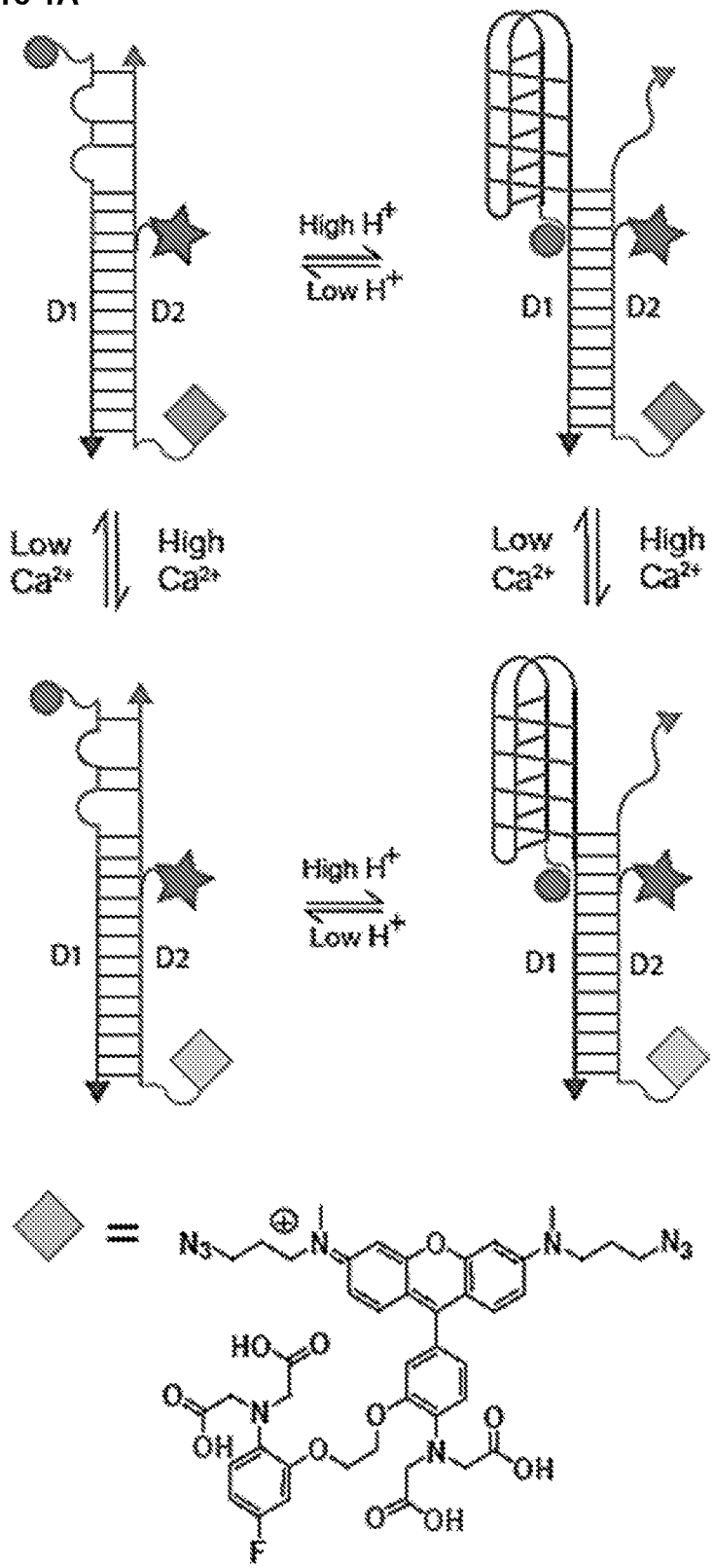
FIGS. 1A-1D illustrate design and characterization of a nucleic acid complex according to one embodiment of the disclosure, CalipHluor$_{Ly}$.

Before the disclosed methods and materials are described, it is to be understood that the aspects described herein are not limited to specific embodiments, and as such can, of course, vary. It is also to be understood that the terminology used herein is for the purpose of describing particular aspects only and, unless specifically defined herein, is not intended to be limiting. In view of the present disclosure, the methods described herein can be configured by the person of ordinary skill in the art to meet the desired need.

Small molecules as well as genetically encodable $Ca^{2+}$ indicators have profoundly impacted biology. However, their pH sensitivity has restricted their use to the cytoplasm or the endoplasmic reticulum, where the pH is neutral and fairly constant. $Ca^{2+}$ mapping of acidic microenvironments has therefore not been previously possible. In general, the disclosed methods provide improvements in measurement of pH and $Ca^{2+}$ concentration. The inventors have found that a combination reporter for pH and $Ca^{2+}$ can map both ions in parallel in the same endosome with single endosome addressability, achieving highly accurate measures of lumenal $Ca^{2+}$. For example, using the pH reporter module of the combination reporter, the pH is determined in individual endosomes. The affinity of the $Ca^{2+}$ sensitive module, for example, dissociation constant ($K_d$) and changes with pH, a $K_d$ correction factor suited to the lumenal pH of each endosome may be applied to compute the true value of lumenal $Ca^{2+}$ with single-endosome resolution. For example, the $K_d$ was computed at every pixel in the pH map to generate a $K_d$ map. From the $K_d$ map and the O/R map, the true $Ca^{2+}$ map of the acidic organelle can be constructed.

DNA nanodevices are versatile chemical reporters that can quantitatively map second messengers in real time, in living systems. The modularity of DNA allows integration of distinct functions in precise stoichiometries into a single assembly. These include, for example, (i) a module to fluorescently sense a given ion (ii) a normalizing module for ratiometric quantitation, and/or (iii) a targeting module to localize the reporter in a specific organelle. In certain embodiments, a nucleic acid complex according to one embodiment of the disclosure, CalipHluor, is used in the methods of the disclosure to map organellar pH and $Ca^{2+}$ simultaneously and with single organelle addressability. For example, by targeting CalipHluor to the scavenger receptor-mediated endocytic pathway, lumenal $Ca^{2+}$ was mapped as a function of endosomal maturation in nematodes. $Ca^{2+}$ is fairly low in early and late endosomes, followed by a about 35 fold surge in lumenal $Ca^{2+}$ in lysosomes—implicating the existence of lysosome-specific $Ca^{2+}$ import mechanisms. The P5 $Ca^{2+}$ATPase ATP13A2 was identified as a potential candidate given its similarity to a well-known $Ca^{2+}$ importer in the endoplasmic reticulum. ATP13A2 (a risk gene for Parkinson's disease) transports divalent ions such as $Mg^{2+}$, $Mn^{2+}$, $Cd^{2+}$, $Zn^{2+}$ yet, has not been tested for its ability to transport $Ca^{2+}$. The C. elegans homolog of ATP13A2, catp-6, was shown to function in opposition to the well-known lysosomal $Ca^{2+}$ release channel, cup-5. It reversed cup-5 phenotypes at three different levels—a whole organism phenotype, a sub-cellular phenotype and an intra-lysosomal phenotype. The human homolog, ATP13A2 was also shown herein to facilitate lysosomal $Ca^{2+}$ entry by measuring lysosomal $Ca^{2+}$ in fibroblasts derived from patients with Kufor Rakeb Syndrome. This constitutes the first example of a lysosomal $Ca^{2+}$ importer in the animal kingdom.

The ability to map pH and $Ca^{2+}$ or with single organelle addressability is important to discriminate between lysosomal hypo-acidification and $Ca^{2+}$ dysregulation. The nucleic acid complexes of the disclosure, in certain embodiments, can be used to map lumenal $Ca^{2+}$ changes in diverse organelles. As a result, the nucleic acid complexes of the disclosure, for example, can provide new insights into organellar $Ca^{2+}$ regulation.

The inventors have also shown that by measuring the pH and $Cl^-$—simultaneously in the same lysosome (referred herein as "2-IM") and retaining this information with single lysosome addressability, one can resolve lysosomal sub-populations quantitatively in live cells. Methods such as 2-IM have proved elusive to realize thus far for several reasons. $Cl^-$—sensitive small molecule probes offer the necessary chemical selectivity, molar brightness and long wavelength excitation, but not the required spatial addressability or organelle targetability. Genetically encoded $Cl^-$ sensors offer stable spatial localization, but the response of these reporters to $Cl^-$ is pH sensitive. This complicates analysis of most organelles as lumenal $Cl^-$ entry is coupled to their acidification. Fluorescent proteins label organelles with lower specificity than endocytic tracers and have lower dynamic range compared to DNA-based nanodevices. DNA nanodevices comprise a range of biologically interfaceable, quantitative imaging probes that unite the photophysical advantages of small molecules, the stable localization provided by proteins along with the precision of organelle targeting that is accessible to endocytic tracers. Using nucleic acid complexes of the disclosure that can ratiometrically image pH and ($Cl^-$) simultaneously with single lysosome addressability, lysosome chemotypes on a two-dimensional map that correlates lumenal pH with lumenal ($Cl^-$) can be discriminated. Lysosome profiles of cells obtained from healthy individuals revealed a high chloride, high acidity population that was absent in cells derived from patients afflicted with Niemann Pick A, B or C diseases. Interestingly, treating these cultured patient cells with the known therapeutic for these diseases led to a reemergence of the high chloride high acidity population.

In certain embodiments, nucleic acid complexes of the disclosure as describe herein comprises the 1:1 stoichiometry of DNA hybridization to integrate four functions with stoichiometric precision onto a single probe: (i) a pH sensing function (ii) a $Cl^-$ sensing function (iii) an internal standard for simultaneous ratiometric quantitation of both $Cl^-$ & pH and (iv) a lysosome targeting function for addressability. For example, 2-IM is a highly sensitive method that chemically resolved a high-chloride, high acidity lysosome population in human fibroblasts isolated from skin biopsies of normal, healthy humans. The significance of this high-chloride, high-acidity population was revealed upon 2-IM investigation of fibroblasts derived from skin biopsies of patients afflicted with three variants of Niemann Pick disease, where this population was lost, resulting in highly monodisperse 2-IM profiles. Replenishing cells with the relevant therapeutic, i.e., the defective enzyme, recovered the high-chloride, high-acidity population. Treatment with a molecule documented to have a limited therapeutic efficacy showed marginal recovery of this population. In certain embodiments, 2-IM profiling of lysosomes can be used to screen for potential lead compounds for Niemann Pick diseases, for example to potentially identify suitable patient cohorts for clinical trials in an unbiased way, monitor therapeutic efficacy, or track disease progression.

Nucleic Acid Complexes of the Disclosure

As provided above, one aspect of the disclosure includes nucleic acid complexes. The nucleic acid complexes of the disclosure as described herein include a $Ca^{2+}$ fluorophore or a fluorophore crosslinked to the first single-stranded nucleic acid molecule.

In certain embodiments, the nucleic acid complexes of the disclosure as describe herein include a $Ca^{2+}$ fluorophore crosslinked to the first single-stranded nucleic acid molecule. Such $Ca^{2+}$ fluorophores may be single wavelength indicators or ratiometric indicators. In one embodiment, the $Ca^{2+}$ fluorophore is a single wavelength indicator. Numerous $Ca^{2+}$ fluorophore known in the art may be used in the complexes and methods of the disclosure. Some examples include, but are not limited to, Rhod-5F, XRhod-5F, Rhod-FF, XRhod-FF, Oregon Green 488 BAPTA-6F, Fluo 5F, Fluo 4FF, Oregon Green BAPTA-5N, Fluo-5 N, and Mag-Fluo-4 indicator. Additional $Ca^{2+}$ fluorophores may be selected from the labels disclosed herein. In certain embodiments of the disclosure, the $Ca^{2+}$ fluorophore includes Rhod-5F, XRhod-5F, or Rhod-FF indicator. In certain embodiments of the disclosure, the $Ca^{2+}$ fluorophore Rhod-5F indicator. Rhod-5F molecule has the following formula:

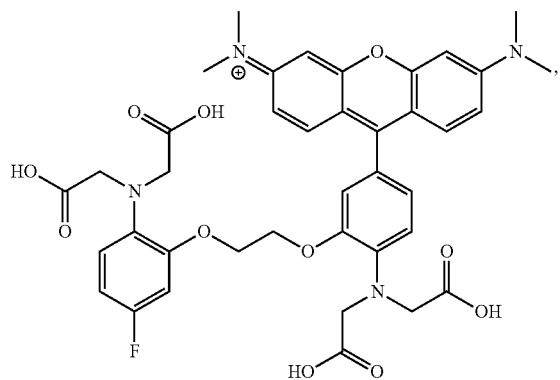 [SMILES: CN(C)c1ccc2c(-c3ccc(N(CC(=O)O)CC(=O)O)c(OCCOc4cc(F)ccc4N(CC(=O)O)CC(=O)O)c3)c3ccc(=[N+](C)C)cc-3oc2c1]

wherein any available position may be functionalized as to allow for crosslinking to the first strand. For example, one of skill in the art recognizes that a hydrogen atom on the Rhod-5F molecule provided above may be replaced by a functional group that is configured to crosslink to the first strand.

The $Ca^{2+}$ fluorophore as described herein can be crosslinked to the first single-stranded nucleic acid molecule using linkers and methods known in the art. For example, the $Ca^{2+}$ fluorophore can be crosslinked using peptide chemistry, click chemistry, by forming ester, ether, thioether, disulfide, amine reactive N-Hydroxysuccinimidyl (NHS) esters, isocyanates, and isothiocyanates bonds, etc. In general, the $Ca^{2+}$ fluorophore is crosslinked to the first strand through a linker moiety stable under physiological conditions.

In certain embodiments, the present inventors have determined that the $Ca^{2+}$ fluorophore can be crosslinked to the first single-stranded nucleic acid molecule using click chemistry. Thus, in certain embodiments, the $Ca^{2+}$ fluorophore is crosslinked to the first strand through a triazole, thioether, or alkenyl sulfide group. For example, the triazole, thioether, or alkenyl sulfide group can be formed from an azide or thiol moiety on the $Ca^{2+}$ fluorophore and a alkyne or alkene moiety on the first strand. In another example, the triazole, thioether, or alkenyl sulfide group can be formed from an azide or thiol moiety on the first strand and a alkyne or alkene moiety on the $Ca^{2+}$ fluorophore.

In certain embodiments, the $Ca^{2+}$ fluorophore of the disclosure as described herein includes the following formula:

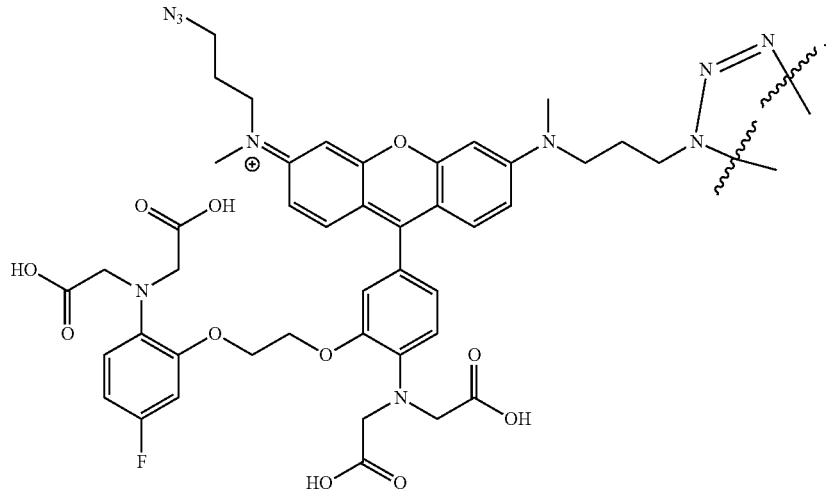 [SMILES: */N=N\N(*)CCCN(C)c1ccc2c(-c3ccc(N(CC(=O)O)CC(=O)O)c(OCCOc4cc(F)ccc4N(CC(=O)O)CC(=O)O)c3)c3cc/c(=[N+](\C)CCCN=[N+]=[N-])cc-3oc2c1]

In certain embodiments of the disclosure, the first single-stranded nucleic acid molecule comprising a $Ca^{2+}$ fluorophore is of formula:

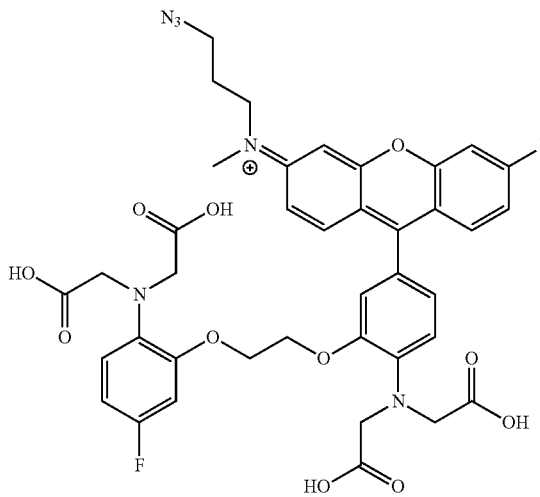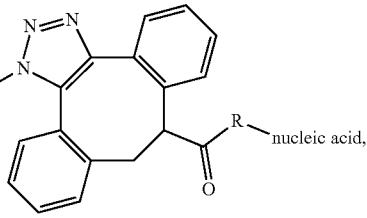

wherein R is a linker.

In certain embodiments, the nucleic acid complexes of the disclosure as describe herein include a $Cl^-$ fluorophore crosslinked to the first single-stranded nucleic acid molecule.

Numerous $Cl^-$ fluorophores known in the art may be used in the complexes and methods of the disclosure. Some examples include, but are not limited to, 6-methoxy-1-(3-sulfonatopropyl) quinolinium (SPQ), 6-methoxy-N-ethylquinolium $Cl^-$ (MEQ), and N-(6-methoxyquinolyl)-acetoethyl ester (MQAE). Additional $Cl^-$ fluorophores may be selected from the labels disclosed herein. In certain embodiments of the disclosure, the $Cl^-$ fluorophore includes 10,10'-bis[3-carboxypropyl]-9,9'-biacridinium dinitrate (BAC) fluorophore. In certain embodiments of the disclosure, the $Cl^-$ fluorophore includes a fluorophore derived from lucigenin.

The oligonucleotides and nucleic acid molecules in the compositions and methods described herein may include one or more labels. Nucleic acid molecules can be labeled by incorporating moieties detectable by one or more means including, but not limited to, spectroscopic, photochemical, biochemical, immunochemical, or chemical assays. The method of linking or conjugating the label to the nucleotide or oligonucleotide depends on the type of label(s) used and the position of the label on the nucleotide or oligonucleotide.

As used herein, "labels" are chemical or biochemical moieties useful for labeling a nucleic acid. "Labels" include, for example, fluorescent agents, chemiluminescent agents, chromogenic agents, quenching agents, radionucleotides, enzymes, substrates, cofactors, inhibitors, nanoparticles, magnetic particles, and other moieties known in the art. Labels are capable of generating a measurable signal and may be covalently or noncovalently joined to an oligonucleotide or nucleotide.

In some embodiments, the nucleic acid molecules may be labeled with a "fluorescent dye" or a "fluorophore." Dyes that may be used in the disclosed methods include, but are not limited to, the following dyes sold under the following trade names: 1,5 IAEDANS; 1,8-ANS; 4-methylumbelliferone; 5-carboxy-2,7-dichlorofluorescein; 5-carboxyfluorescein (5-FAM); 5-carboxytetramethylrhodamine (5-TAMRA); 5-hydroxy tryptamine (HAT); 5-ROX (carboxy-X-rhodamine); 6-carboxyrhodamine 6G; 6-JOE; 7-amino-4-methylcoumarin; 7-aminoactinomycin D (7-AAD); 7-hydroxy-4-methylcoumarin; 9-amino-6-chloro-2-methoxyacridine; ABQ; Acid Fuchsin; ACMA (9-amino-6-chloro-2-methoxyacridine); Acridine Orange; Acridine Red; Acridine Yellow; Acriflavin; Acriflavin Feulgen SITSA; Alexa Fluor 350™; Alexa Fluor 430™; Alexa Fluor 488™; Alexa Fluor 532™; Alexa Fluor 546™; Alexa Fluor 568™; Alexa Fluor 594™; Alexa Fluor 633™; Alexa Fluor 647™; Alexa Fluor 660™; Alexa Fluor 680™; Alizarin Complexon; Alizarin Red; Allophycocyanin (APC); AMC; AMCA-S; AMCA (Aminomethylcoumarin); AMCA-X; Aminoactinomycin D; Aminocoumarin; Aminomethylcoumarin (AMCA); Anilin Blue; Anthrocyl stearate; APC (Allophycocyanin); APC-Cy7; APTS; Astrazon Brilliant Red 4G; Astrazon Orange R; Astrazon Red 6B; Astrazon Yellow 7 GLL; Atabrine; ATTO-TAG™ CBQCA; ATTO-TAG™ FQ; Auramine; Aurophosphine G; Aurophosphine; BAO 9 (Bisaminophenyloxadiazole); Berberine Sulphate; Beta Lactamase; BFP blue shifted GFP (Y66H); Blue Fluorescent Protein; BFP/GFP FRET; Bimane; Bisbenzamide; Bisbenzimide (Hoechst); Blancophor FFG; Blancophor SV; BOBO™-1; BOBO™-3; Bodipy 492/515; Bodipy 493/503; Bodipy 500/510; Bodipy 505/515; Bodipy 530/550; Bodipy 542/563; Bodipy 558/568; Bodipy 564/570; Bodipy 576/589; Bodipy 581/591; Bodipy 630/650-X; Bodipy 650/665-X; Bodipy 665/676; Bodipy FL; Bodipy FL ATP; Bodipy Fl-Ceramide; Bodipy R6G SE; Bodipy TMR; Bodipy TMR-X conjugate; Bodipy TMR-X, SE; Bodipy TR; Bodipy TR ATP; Bodipy TR-X SE; BO-PRO™-1; BO-PRO™-3; Brilliant Sulphoflavin FF; Calcein; Calcein Blue; Calcium Crimson™; Calcium Green; Calcium Orange; Calcofluor White; Cascade Blue™; Cascade Yellow; Catecholamine; CCF2 (GeneBlazer); CFDA; CFPCyan Fluorescent Protein; CFP/YFP FRET; Chlorophyll; Chromomycin A; CL-NERF (Ratio Dye, pH); CMFDA; Coelenterazine f; Coelenterazine fcp; Coelenterazine h; Coelenterazine hcp; Coelenterazine ip; Coelenterazine n; Coelenterazine O; Coumarin Phalloidin; C-phycocyanine; CPM Methylcoumarin; CTC; CTC Formazan; Cy2™; Cy3.18; Cy3.5™; Cy3™; Cy5.18; Cy5.5™; Cy5™; Cy7™; Cyan GFP; cyclic AMP Fluorosensor (FiCRhR); Dabcyl;

Dansyl; Dansyl Amine; Dansyl Cadaverine; Dansyl Chloride; Dansyl DHPE; Dansyl fluoride; DAPI; Dapoxyl; Dapoxyl 2; Dapoxyl 3; DCFDA; DCFH (Dichlorodihydrofluorescein Diacetate); DDAO; DHR (Dihydrorhodamine 123); Di-4-ANEPPS; Di-8-ANEPPS (non-ratio); DiA (4-Di-16-ASP); Dichlorodihydrofluorescein Diacetate (DCFH); DiD—Lipophilic Tracer; DiD (DilC18(5)); DIDS; Dihydrorhodamine 123 (DHR); Dil (DilC18(3)); Dinitrophenol; DiO (DiOC18(3)); DiR; DiR (DilC18(7)); DNP; Dopamine; DsRed; DTAF; DY-630-NHS; DY-635-NHS; EBFP; ECFP; EGFP; ELF 97; Eosin; Erythrosin; Erythrosin ITC; Ethidium Bromide; Ethidium homodimer-1 (EthD-1); Euchrysin; EukoLight; Europium (III) chloride; EYFP; Fast Blue; FDA; Feulgen (Pararosaniline); Flazo Orange; Fluo-3; Fluo-4; Fluorescein (FITC); Fluorescein Diacetate; Fluoro-Emerald; Fluoro-Gold (Hydroxystilbamidine); Fluor-Ruby; FluorX; FM 1-43™; FM 4-46; Fura Red™; Fura RedTm/Fluo-3; Fura-2; Fura-2/BCECF; Genacryl Brilliant Red B; Genacryl Brilliant Yellow 10GF; Genacryl Pink 3G; Genacryl Yellow 5GF; GeneBlazer (CCF2); GFP (S65T); GFP red shifted (rsGFP); GFP wild type, non-UV excitation (wtGFP); GFP wild type, UV excitation (wtGFP); GFPuv; Gloxalic Acid; Granular Blue; Haematoporphyrin; Hoechst 33258; Hoechst 33342; Hoechst 34580; HPTS; Hydroxycoumarin; Hydroxystilbamidine (FluoroGold); Hydroxytryptamine; Indo-1; Indodicarbocyanine (DiD); Indotricarbocyanine (DiR); lntrawhite Cf; JC-1; JO-JO-1; JO-PRO-1; Laurodan; LDS 751 (DNA); LDS 751 (RNA); Leucophor PAF; Leucophor SF; Leucophor WS; Lissamine Rhodamine; Lissamine Rhodamine B; Calcein/Ethidium homodimer; LOLO-1; LO-PRO-1; Lucifer Yellow; Lyso Tracker Blue; Lyso Tracker Blue-White; Lyso Tracker Green; Lyso Tracker Red; Lyso Tracker Yellow; LysoSensor Blue; LysoSensor Green; LysoSensor Yellow/Blue; Mag Green; Magdala Red (Phloxin B); Mag-Fura Red; Mag-Fura-2; Mag-Fura-5; Mag-Indo-1; Magnesium Green; Magnesium Orange; Malachite Green; Marina Blue; Maxilon Brilliant Flavin 10 GFF; Maxilon Brilliant Flavin 8 GFF; Merocyanin; Methoxycoumarin; Mitotracker Green FM; Mitotracker Orange; Mitotracker Red; Mitramycin; Monobromobimane; Monobromobimane (mBBr-GSH); Monochlorobimane; MPS (Methyl Green Pyronine Stilbene); NBD; NBD Amine; Nile Red; NEDTM; Nitrobenzoxadidole; Noradrenaline; Nuclear Fast Red; Nuclear Yellow; Nylosan Brilliant lavin E8G; Oregon Green; Oregon Green 488-X; Oregon Green™; Oregon Green™ 488; Oregon Green™ 500; Oregon Green™ 514; Pacific Blue; Pararosaniline (Feulgen); PBFI; PE-Cy5; PE-Cy7; PerCP; PerCP-Cy5.5; PE-TexasRed [Red 613]; Phloxin B (Magdala Red); Phorwite AR; Phorwite BKL; Phorwite Rev; Phorwite RPA; Phosphine 3R; Phycoerythrin B [PE]; Phycoerythrin R [PE]; PKH26 (Sigma); PKH67; PMIA; Pontochrome Blue Black; POPO-1; POPO-3; PO-PRO-1; PO-PRO-3; Primuline; Procion Yellow; Propidium lodid (PI); PYMPO; Pyrene; Pyronine; Pyronine B; Pyrozal Brilliant Flavin 7GF; QSY 7; Quinacrine Mustard; Red 613 [PE-TexasRed]; Resorufin; RH 414; Rhod-2; Rhodamine; Rhodamine 110; Rhodamine 123; Rhodamine 5 GLD; Rhodamine 6G; Rhodamine B; Rhodamine B 200; Rhodamine B extra; Rhodamine BB; Rhodamine BG; Rhodamine Green; Rhodamine Phallicidine; Rhodamine Phalloidine; Rhodamine Red; Rhodamine WT; Rose Bengal; R-phycocyanine; R-phycoerythrin (PE); RsGFP; S65A; S65C; S65L; S65T; Sapphire GFP; SBFI; Serotonin; Sevron Brilliant Red 2B; Sevron Brilliant Red 4G; Sevron Brilliant Red B; Sevron Orange; Sevron Yellow L; sgBFPTM; sgBFP™ (super glow BFP); sgGFP™; sgGFP™ (super glow GFP); SITS; SITS (Primuline); SITS (Stilbene Isothiosulphonic Acid); SNAFL calcein; SNAFL-1; SNAFL-2; SNARF calcein; SNARF1; Sodium Green; SpectrumAqua; SpectrumGreen; SpectrumOrange; Spectrum Red; SPQ (6-methoxy-N-(3-sulfopropyl)quinolinium); Stilbene; Sulphorhodamine B can C; Sulphorhodamine G Extra; SYTO 11; SYTO 12; SYTO 13; SYTO 14; SYTO 15; SYTO 16; SYTO 17; SYTO 18; SYTO 20; SYTO 21; SYTO 22; SYTO 23; SYTO 24; SYTO 25; SYTO 40; SYTO 41; SYTO 42; SYTO 43; SYTO 44; SYTO 45; SYTO 59; SYTO 60; SYTO 61; SYTO 62; SYTO 63; SYTO 64; SYTO 80; SYTO 81; SYTO 82; SYTO 83; SYTO 84; SYTO 85; SYTOX Blue; SYTOX Green; SYTOX Orange; TET™; Tetracycline; Tetramethylrhodamine (TRITC); Texas Red™; Texas Red-X™ conjugate; Thiadicarbocyanine (DiSC3); Thiazine Red R; Thiazole Orange; Thioflavin 5; Thioflavin S; Thioflavin TCN; Thiolyte; Thiozole Orange; Tinopol CBS (Calcofluor White); TMR; TO-PRO-1; TO-PRO-3; TO-PRO-5; TOTO-1; TOTO-3; TriColor (PE-Cy5); TRITC TetramethylRodaminelsoThioCyanate; True Blue; TruRed; Ultralite; Uranine B; Uvitex SFC; VICO; wt GFP; WW 781; X-Rhodamine; XRITC; Xylene Orange; Y66F; Y66H; Y66W; Yellow GFP; YFP; YO-PRO-1; YO-PRO-3; YOYO-1; YOYO-3; pHrodo™ (available from Thermo Fischer Scientific, Inc. Waltham, MA), and salts thereof.

Fluorescent dyes or fluorophores may include derivatives that have been modified to facilitate conjugation to another reactive molecule. As such, fluorescent dyes or fluorophores may include amine-reactive derivatives such as isothiocyanate derivatives and/or succinimidyl ester derivatives of the fluorophore.

The nucleic acid molecules of the disclosed compositions and methods may be labeled with a quencher. Quenching may include dynamic quenching (e.g., by FRET), static quenching, or both. Illustrative quenchers may include Dabcyl. Illustrative quenchers may also include dark quenchers, which may include black hole quenchers sold under the tradename "BHQ" (e.g., BHQ-0, BHQ-1, BHQ-2, and BHQ-3, Biosearch Technologies, Novato, Calif.). Dark quenchers also may include quenchers sold under the tradename "QXL™" (Anaspec, San Jose, Calif.). Dark quenchers also may include DNP-type non-fluorophores that include a 2,4-dinitrophenyl group.

In some embodiments, it may be useful to include interactive labels on two or more oligonucleotides with due consideration given for maintaining an appropriate spacing of the labels on the nucleic acid molecules to permit the separation of the labels during a conformational change in the nucleic acid complex. One type of interactive label pair is a quencher-dye pair, which may include a fluorophore and a quencher. The ordinarily skilled artisan can select a suitable quencher moiety that will quench the emission of the particular fluorophore. In an illustrative embodiment, the Dabcyl quencher absorbs the emission of fluorescence from the fluorophore moiety.

In some embodiments, the proximity of the two labels can be detected using fluorescence resonance energy transfer (FRET) or fluorescence polarization. FRET is a distance-dependent interaction between the electronic excited states of two dye molecules in which excitation is transferred from a donor molecule to an acceptor molecule without emission of a photon. Examples of donor/acceptor dye pairs for FRET are known in the art and may include fluorophores and quenchers described herein such as Fluorescein/Tetramethyl-rhodamine, IAEDANS/Fluorescein (Molecular Probes, Eugene, Oreg.), EDANS/Dabcyl, Fluorescein/Fluorescein (Molecular Probes, Eugene, Oreg.), BODIPY FLJ- BODIPY FL (Molecular Probes, Eugene, Oreg.), BODIPY TMR/ALEXA 647, ALEXA-488/ALEXA-647, and Fluorescein/QSY7™.

The labels can be conjugated to the nucleic acid molecules directly or indirectly by a variety of techniques. Depending upon the precise type of label used, the label can be located at the 5' or 3' end of the oligonucleotide, located internally in the oligonucleotide's nucleotide sequence, or attached to spacer arms extending from the oligonucleotide and having various sizes and compositions to facilitate signal interactions. Using commercially available phosphoramidite reagents, one can produce nucleic acid molecules containing functional groups (e.g., thiols or primary amines) at either terminus, for example by the coupling of a phosphoramidite dye to the 5' hydroxyl of the 5' base by the formation of a phosphate bond, or internally, via an appropriately protected phosphoramidite.

Nucleic acid molecules may also incorporate functionalizing reagents having one or more sulfhydryl, amino or hydroxyl moieties into the nucleic acid sequence. For example, a 5' phosphate group can be incorporated as a radioisotope by using polynucleotide kinase and [γ32P] ATP to provide a reporter group. Biotin can be added to the 5' end by reacting an aminothymidine residue, introduced during synthesis, with an N-hydroxysuccinimide ester of biotin. Labels at the 3' terminus, for example, can employ polynucleotide terminal transferase to add the desired moiety, such as for example, cordycepin, 35S-dATP, and biotinylated dUTP.

Oligonucleotide derivatives are also available as labels. For example, etheno-dA and etheno-A are known fluorescent adenine nucleotides which can be incorporated into a reporter. Similarly, etheno-dC is another analog that can be used in reporter synthesis. The reporters containing such nucleotide derivatives can be hydrolyzed to release much more strongly fluorescent mononucleotides by the polymerase's 5' to 3' nuclease activity as nucleic acid polymerase extends a primer during PCR.

In some embodiments, a first label is conjugated to the second single-stranded nucleic acid molecule.

In certain embodiments of the disclosure, a second label is conjugated to the first single-stranded nucleic acid molecule or the second single-stranded nucleic acid molecule. In some embodiments, a first label is conjugated to the second single-stranded nucleic acid molecule and the second label is conjugated to the first single-stranded nucleic acid molecule, wherein the first label is capable of producing a signal, and wherein the intensity of the signal varies as a function of the conformation of the nucleic acid complex.

In certain embodiments of the disclosure, a second label is conjugated to the third single-stranded nucleic acid. In some embodiments, the first label is conjugated to the second single-stranded nucleic acid molecule and the second label is conjugated to the third single-stranded nucleic acid, wherein the first label is capable of producing a signal, and wherein the intensity of the signal varies as a function of the conformation of the nucleic acid complex.

In certain embodiments, the intensity of the signal is irrelevant of the distance between the first and second labels and/or the relative orientation of the first and second labels.

In certain embodiments, the intensity of the signal varies as a function of at least one of the distance between the first and second labels and the relative orientation of the first and second labels.

In some embodiments, the first and second labels comprise a donor and acceptor pair. In some embodiments, the signal is measured using a FRET technique. For example, the signal can be measured at 2 different wavelengths. In another example, the signal can be measured at 4 different wavelengths. In some embodiments, at least one label is selected from the group consisting of an Atto dye, an Alexa Flour® dye, a Cy® dye, and a BODIPY dye. In some embodiments, the donor and acceptor pair are FITC and TRITC, Cy3 and Cy5, or Alexa-488 and Alexa-647. In some embodiments, the donor and acceptor pair are labels described herein. In some embodiments, the first and second label comprise a donor fluorophore and an acceptor quencher.

In some embodiments, the signal and label is directionally dependent (anisotropy). Non-limiting examples of such labels include Atto dyes, BODipy dyes, Alexa dyes, TMR/TAMRA dyes, or Cy dyes.

A provided above, the nucleic acid complexes of the disclosure include a first single-stranded molecule and a second single-stranded nucleic acid molecule that is partially or fully complementary to the first single-stranded molecule. In certain embodiments, the nucleic acid complexes of the disclosure include a first single-stranded molecule, a second single-stranded nucleic acid molecule that is partially complementary to the first single-stranded molecule, and a third single-stranded nucleic acid molecule that is partially complementary to the first single-stranded molecule.

In certain embodiments of the methods and nucleic acid molecule and complexes described herein, the second nucleic acid strand and/or the third nucleic acid strand is one that is only partially complementary to the first nucleic acid. A nucleic acid strand is fully complementary when all bases are capable of forming conventional Watson-Crick base-pairing (e.g. G-C and A-T base pairing). A nucleic acid strand is partially complementary when at least one of the base pairs is not complementary to the opposing strand. In some embodiments, the second single nucleic acid strand comprises at least 4 non-complementary nucleic acid bases. In some embodiments, the second single nucleic acid strand comprises at least, at most, or exactly 2, 3, 4, 5, 6, 7, 8, 9, 10, 12, 14, 16, 18, or 20 (or any derivable range therein) non-complementary nucleic acid bases. In some embodiments, the second nucleic acid strand comprises 8 non-complementary nucleic acid bases.

In certain embodiments of the nucleic acid complexes of the disclosure, each of the first single-stranded nucleic acid molecule the second single-stranded nucleic acid molecule, and/or the third single-stranded nucleic acid molecule is independently less than 200 nucleotides. In some embodiments, each of the first single-stranded nucleic acid molecule the second single-stranded nucleic acid molecule, and/or the third single-stranded nucleic acid molecule is independently less than, at least, or exactly 20, 30, 40, 60, 80, 100, 125, 150, 175, 200, 225, 250, 275, 300, 350, 400, 450, 500, 550, 600, 650, 700, 750, 800, 900, or 1000 nucleotides in length, or any derivable range therein.

The nucleic acid complexes described herein are useful as $Ca^{2+}$ concentration sensors, and have high sensitivity without a substantial change in cooperativity. In certain embodiments, the nucleic acid complexes described herein are capable of determining the $Ca^{2+}$ concentration in a range of 10 nM to 10 mM, the range is inclusive of the recited $Ca^{2+}$ concentration. For example, in certain embodiments, the nucleic acid complexes described herein are capable of determining the $Ca^{2+}$ concentration in a range of 10 nM to 1 µM, or 10 nM to 100 nM, or 10 nM to 500 nM, or 100 nM to 500 nM, or 100 nM to 1 µM, or 500 nM to 1 µM, or 500 nM to 50 µM, or 1 µM to 1 mM, or 1 µM to 10 mM, or 10

µM to 10 mM, or 100 µM to 1 mM, or 100 µM to 10 mM. In other embodiments, the recited $Ca^{2+}$ concentration is excluded.

The nucleic acid complexes described herein are useful as concentration sensors, and have high sensitivity without a substantial change in cooperativity. In certain embodiments, the nucleic acid complexes described herein are capable of determining the $Cl^-$ concentration in a range of 1 mM to 100 mM, the range is inclusive of the recited Cr concentration. For example, in certain embodiments, the nucleic acid complexes described herein are capable of determining the $Cl^-$ concentration in a range of 1 mM to 50 mM, 1 mM to 25 mM, or 1 mM to 10 mM, or 5 mM to 100 mM, or 5 mM to 50 mM, 5 mM to 25 mM, or 5 mM to 10 mM, or 10 mM to 25 mM, or 10 mM to 50 mM, or 10 mM to 75 mM, or 20 mM to 80 mM, or 30 mM to 70 mM. In other embodiments, the recited $Cl^-$ concentration is excluded.

The nucleic acid complexes described herein are also useful as pH sensors, and have high sensitivity without a substantial change in cooperativity. In certain embodiments, the nucleic acid complexes described herein are capable of determining the pH of is less than 5.5 or more than 7.0. In certain embodiments, the nucleic acid complexes described herein are capable of determining the pH of less than or exactly pH 5.8, 5.7, 5.6, 5.5, 5.4, 5.3, 5.2, 5.0, 4.8, 4.6, 4.4, 4.2, or 4.0 (or any derivable range therein). In certain embodiments, the nucleic acid complexes described herein are capable of determining the pH of more than or exactly pH 6.8, 6.9, 7.0, 7.1, 7.2, 7.3, 7.4, 7.5, 7.6, 7.7, 7.8, 8.0, 8.2, 8.4, 8.6, 8.8 or 9.0 (or any derivable range therein). In certain embodiments, the nucleic acid complexes described herein are capable of determining the pH in the range of 5.5 to 7. In certain embodiments, the nucleic acid complexes described herein are capable of determining the pH in the range of 5.8 and 6.8, or 5.8 to 7, or 5.6 to 6.8, or 5.4 to 6.8.

Cytosine rich DNA sequences are found in human genomes such as in telomeres and in promoters of several oncogenes, e.g., c-myc. In certain embodiments, the nucleic acid complexes of the disclosure can form a special tetraplex structure under slightly acidic condition where two parallel duplexes paired through C·CH+ pairs intercalated with each other in head to tail orientation called the i-motif. The "i-motif" is a nucleic acid (DNA and/or RNA) containing complex characterized by the presence of cytosine-rich stretches or stretches rich in cytosine derivatives, including two parallel-stranded duplexes in which the cytosines or derivatives thereof form base pairs, and the two duplexes are associated anti-parallel to one another. The pairs of cytosine or derivatives thereof of one duplex are intercalated with those of the other duplex.

The structure of an i-motif differs from that of the usual DNA duplex because the base pairing scheme involves hemiprotonated cytosines which result in the formation of C·C+ base pairs. Specifically, one of the cytosines contained in each pair is protonated. The i-motif may also exist as a tetramer formed by the association of two duplexes as described above.

In certain embodiments, the nucleic acid complexes of the disclosure may be synthesized from oligonucleotide sequences including a stretch of at least two, at least three, or at least four consecutive cytosines. By modifying the number of cytosines, as well as the degree of complementarity between both strands, it is possible to modulate the response time of the nucleic acid complexes of the disclosure and to the pH sensing range. When more cytosines contribute to the i-motif, the stability of the motif is increased. Moreover, this motif may be formed by the interaction of stretches containing different numbers of cytosines. Furthermore, a cytosine-rich stretch may contain one or two non-cytosine base(s) in between the cytosines. However, this may reduce the stability of the i-motif. The cytosine stretches which comprise the i-motif may belong to different strands of nucleic acids; however, any two of them may also be linked together covalently or non-covalently. Also, any two of them may be part of a single nucleic acid strand wherein they are separated by a stretch of specified bases.

In certain embodiments, the second single-stranded nucleic acid molecule of the nucleic acid complexes of the disclosure comprises the sequence $C_nXC_nYC_nZC_n$ (SEQ ID NO. 13), wherein C is cytosine; X, Y and Z are each one or more adenine, thymine, guanine, or combinations thereof; and n is greater than or equal to 2; and wherein at least 2 cytosine residues of the nucleic acid molecule are modified. In some embodiments, at least or exactly 2, 3, 4, 5, 6, 7, 8, 9, 10, 12, 14, 16, or 18 (or any derivable range therein) cytosine residues of the second single-stranded nucleic acid molecule are modified. In some embodiments, the number of cytosine residues of the second single-stranded nucleic acid molecule that are modified is in the range of 2 to 18, or 4 to 18, or 10 to 18, or 14 to 18, or 2 to 14, or 4 to 14, or 10 to 14, or 2 to 10, or 4 to 10, or 8 to 16.

In some embodiments, each of X, Y, and Z is independently AA or TAA. In certain embodiments, each of X, Y, and Z is independently TAA. In some embodiments, n is 3, 4, or 7. In further embodiments, n is at least, at most, or exactly 3, 4, 5, 6, 7, 8, or 9 (or any derivable range therein). In some embodiments, n is 4. In some embodiments, the modification is a methyl, fluoro, bromo, hydroxymethyl, formyl, or acetyl group. In some embodiments, the cytosine is modified with a methyl or bromo group. In some embodiments, the modification is at the 5' position of the cytosine. In some embodiments, all the cytosines in the second nucleic acid molecule are modified with the same modification. In some embodiments, all the cytosines in the second nucleic acid molecule are modified with a negatively charged modification. In some embodiments, all the cytosines in the second nucleic acid molecule are modified with a positively charged modification.

In some embodiments, the second single-stranded molecule comprises the sequence $((C_a)_nX(C_b)_nY(C_n)_nZ(C_d)_n$ (SEQ ID NO. 14) wherein $C_a$, $C_b$, $C_c$, and $C_d$ are equal to n number of consecutive cytosine residues; X, Y, and Z are one or more adenine, thymine, guanine, or combinations thereof; and n is greater than or equal to 3. In some embodiments, each of $C_a$, $C_b$, $C_c$, and $C_d$ comprise at least one modified cytosine. In some embodiments, each of $C_a$, $C_b$, $C_c$, and $C_d$ comprise at least, at most, or exactly 1, 2, 3, 4, or 5 modified cytosines (or any derivable range therein). In some embodiments, the modified cytosine is the first or last consecutive cytosine in each of $C_a$, $C_b$, $C_c$, and $C_d$. In some embodiments, n=3 and the modified cytosine is the second consecutive cytosine in each of $C_a$, $C_b$, $C_c$, and $C_d$. In some embodiments, n=4 and the modified cytosine is the second or third consecutive cytosine in each of $C_a$, $C_b$, $C_c$, and $C_d$. In some embodiments, each of $C_b$ and C, comprise at least two modified cytosines and each of $C_a$ and $C_d$ consist of unmodified cytosine. In some embodiments, $C_a$ or $C_d$ consists of modified cytosine residues. In some embodiments, $C_a$, $C_b$, $C_c$, and/or $C_d$ consist of or comprise of at least, at most, or exactly 1, 2, 3, 4, 5, 6, or 7 modified cytosine residues, or any derivable range therein.

In certain embodiments, the second single-stranded nucleic acid molecule of the nucleic acid complexes of the disclosure excludes the sequence $C_nXC_nYC_nZC_n$ (SEQ ID NO. 13) or $((C_a)_nX(C_b)_nY(C_c)_nZ(C_d)_n$ (SEQ ID NO. 14) as provided herein.

In certain embodiments, the second single-stranded nucleic acid molecule and/or the third single-stranded nucleic acid molecule of the nucleic acid complexes of the disclosure comprises the sequence $C_nXC_n$, wherein C is cytosine; X and Y are each one or more of adenine, thymine, guanine, or combinations thereof; and n is greater than or equal to 2; and wherein at least 2 cytosine residues are modified. In some embodiments, at least or exactly 2, 3, 4, 5, 6, 7, 8, 9, 10, 12, 14, 16, or 18 (or any derivable range therein) cytosine residues of the second single-stranded nucleic acid molecule are modified. In some embodiments, the number of cytosine residues of the second single-stranded nucleic acid molecule that are modified is in the range of 2 to 18, or 4 to 18, or 10 to 18, or 14 to 18, or 2 to 14, or 4 to 14, or 10 to 14, or 2 to 10, or 4 to 10, or 8 to 16.

In some embodiments, X and Y are independently AA or TAA. In certain embodiments, X and Y are independently AA. In some embodiments, n is 3, 4, or 7. In further embodiments, n is at least, at most, or exactly 3, 4, 5, 6, 7, 8, or 9 (or any derivable range therein). In some embodiments, n is 4. In some embodiments, the modification is a methyl, fluoro, bromo, hydroxymethyl, formyl, or acetyl group. In some embodiments, the cytosine is modified with a methyl or bromo group. In some embodiments, the modification is at the 5' position of the cytosine. In some embodiments, all the cytosines in the second nucleic acid molecule are modified with the same modification. In some embodiments, all the cytosines in the second nucleic acid molecule are modified with a negatively charged modification. In some embodiments, all the cytosines in the second nucleic acid molecule are modified with a positively charged modification.

The nucleic acid complexes described herein are useful as pH sensors, and have high sensitivity (as evidenced by fold change of D/A ratio) without a substantial change in cooperativity. In some embodiments, the method further comprises calculating a D/A ratio from the signal intensity values. In some embodiments, the D/A ratio is a normalized value. In some embodiments, the fold change of the D/A ratio is at least 4.1, 5, 6, 7, or 7.5. In some embodiments, the fold change of the D/A ratio is between 4.1 and 7.5, between 5 and 7.5, between 6 and 7.5, between 7 and 7.5, between 4.1 and 7, between 5 and 7, between 6 and 7, between 4.1 and 6, between 5 and 6, or between 4.1 and 5. In some embodiments, the fold change of the D/A ratio is at least or exactly 4.5, 5, 6, 7, 7.5, 8, 8.5, 9, 9.5, 10, 10.5, 11, 11.5, 12, 12.5, 13, or 14 (or any derivable range therein). In some embodiments, the cooperativity, compared to the unmodified nucleic acid complexes, is changed less than 2 fold, or less than 1.75, 1.5, 1.25. 1, 0.75. 0.5, 0.25, 0.2, 0.1, fold or any derivable range therein. In some embodiments, the cooperativity is less than 5, 10, 15, 20, 25, 30, 35, 40, 45, or 50% different than the un-modified nucleic acid complexes. In some embodiments, the fold change of the D/A ratio is at least or exactly 4.5, 5, 6, 7, 7.5, 8, 8.5, 9, 9.5, 10, 10.5, 11, 11.5, 12, 12.5, 13, or 14 (or any derivable range therein) and the cooperativity, compared to the unmodified nucleic acid complexes, is changed by less than 1.75, 1.5, 1.25. 1, 0.75. 0.5, 0.25, 0.2, or 0.1 fold or any derivable range therein. In some embodiments, the $pH_{half}$ is altered without substantially increasing the cooperativity. In some embodiments, the $pH_{half}$ is at least, at most, or exactly 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, or 9.0 (or any derivable range therein). In some embodiments, the $pH_{half}$ compared to the un-modified nucleic acid complexes, is at least, at most, or exactly 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 2.9, or 3.0 pH units different (or any range derivable therein). In some embodiments, the $pH_{half}$ compared to the un-modified nucleic acid complexes, is at least, at most, or exactly 3, 5, 6, 8, 10, 12, 14, 16, 18, 20, 22, 24, 24, 26, 28, or 30% different (or any derivable range therein). In some embodiments, the $pH_{half}$ compared to the un-modified nucleic acid complexes, is at least, at most, or exactly 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 2.9, or 3.0 pH units different or is at least, at most, or exactly 3, 5, 6, 8, 10, 12, 14, 16, 18, 20, 22, 24, 24, 26, 28, or 30% different (or any derivable range therein) and the cooperativity, compared to the unmodified nucleic acid complexes, is changed by less than 1.75, 1.5, 1.25. 1, 0.75. 0.5, 0.25, 0.2, or 0.1 fold or any derivable range therein. In some embodiments, the measured value described herein (i.e., signal intensity, $pH_{half}$ fold change, or cooperativity) is a normalized value.

In some embodiments, the first and second single-stranded nucleic acid molecules are capable of forming an i-motif under acidic conditions. In some embodiments, the first nucleic acid strand is capable of forming an intramolecular complex comprising two parallel-stranded C—HC+ base paired duplexes that are intercalated in an anti-parallel orientation at acidic conditions.

The nucleic acid molecules and complexes of the disclosure, in some embodiments, comprise a targeting moiety, such as a nucleic acid, small molecule, or polypeptide that has an affinity for a certain target or, by virtue of its chemical makeup, is targeted to a particular location in the cell. The targeting moiety can act as a handle to target the nucleic acid complexes of the disclosure to different subcellular locations. The targeting moiety may be a nucleic acid that binds to a receptor protein, and the receptor protein may be one that is intracellularly targeted or conjugated to a protein that is intracellularly targeted. The targeting moiety or receptor protein may be a targeting nucleic acid or a protein such as a plasma membrane protein that is endocytosable, any proteins that possess a natural receptor, a protein that traffics between intracellular locations via the plasma membrane, toxins, viruses and viral coat proteins, cell penetrating peptides, signal sequences, intracellular targeting sequences, small organic molecules, endocytic ligands and trafficking proteins. In some embodiments, the targeting moiety is an aptamer, a duplex domain targeted to an artificial protein receptor, a nucleic acid sequence that binds an anionic-ligand binding receptor, or an endocytic ligand. The targeting moiety may also be a G4 core sequence or ribozyme.

In some embodiments, the targeting moiety is a nucleic acid sequence. In some embodiments, the targeting moiety has a cognate artificial protein receptor. The artificial receptor may be, for example, a single chain variable fragment (scFv), transcription factor, Zn-fingered protein, leucine zipper, or DNA binding immunoglobulin, In some embodiments, the targeting moiety is encoded on the same nucleic acid strand as the first and/or second single-stranded nucleic acid molecule. In some embodiments, the targeting moiety is selected from an aptamer, a duplex domain targeted to an artificial protein receptor, a nucleic acid sequence that binds an anionic-ligand binding receptor, and an endocytic ligand. In some embodiments, the targeting moiety comprises a peptide directly or indirectly conjugated to the nucleic acid molecule. In some embodiments, the targeting moiety peptide comprises one or more of a fusogenic peptide, a membrane-permeabilizing peptide, a sub-cellular localization sequence, or a cell-receptor ligand. In some embodiments, the sub-cellular localization sequence targets the nucleic acid complex to a region of the cell where spatial localization of a targeted protein is present. In some embodiments, the sub-cellular localization sequence targets the nucleic acid complex to a region of the cell selected from the group consisting of: the cytosol, the endoplasmic reticulum, the mitochondrial matrix, the chloroplast lumen, the medial trans-Golgi cistemae, the lumen of lysosome, the lumen of an endosome, the peroxisome, the nucleus, and a specific spatial location on the plasma membrane. In some embodiments, the sub-cellular organelle is one that exchanges membrane directly or indirectly with the plasma membrane.

In some embodiments, the nucleic acid is a peptide nucleic acid (PNA). The strand is conjugated to $Ca^{2+}$ fluorophore or $Cl^-$ fluorophore. In some embodiments, the second label is $Cl^-$ or $Ca^{2+}$-sensitive fluorophore, for example, a Cr-sensitive fluorophore such as BAC conjugated to PNA. In some embodiments, the first strand comprises PNA and $Cl^-$ fluorophore. In some embodiments, the second label is insensitive fluorophore, for example, a chloride ion insensitive fluorophore such as Alexa 647, conjugated to DNA sequence that is complementary to PNA of the sensing module.

The current methods, nucleic acids, and nucleic acid complexes may be used in combination with additional nucleic acid based sensors, such as those described in International Patent Publication No, WO 2015/159122, which is herein incorporated by reference.

In the present disclosure, PNA or PNA strand or PNA sequence is used interchangeably and has the same scope or meaning. In the present disclosure, DNA or DNA strand or DNA sequence is used interchangeably and has the same scope or meaning. In the present disclosure, RNA or RNA strand or RNA sequence is used interchangeably and has the same scope or meaning.

In some embodiments, the nucleic acid complex of the present disclosure self assembles two or all three strands through Watson-Crick base pairing, which is stable under physiological conditions.

In embodiments of the present disclosure, two types of targeting moiety are used: A) DNA only and B) a combination of DNA and RNA. The targeting moiety comprising only DNA hybridizes to normalizing module to form the dsDNA domain required for intracellular targeting via an anionic ligand binding receptor (ALBR). The RNA sequence used in combination with DNA in the targeting moiety is used to achieve targeting to Transferrin pathway.

In some embodiments, a DNA strand is used as first strand and/or the second strand. In an embodiment of the present disclosure, the nucleic acid complex has a dsDNA part (minimum 15 bp sequence) resulting from the hybridization of the first strand and the second strand, or the first strand and the third strand, or the first strand with the second strand and the third strand. In certain embodiments, the nucleic acid complex comprises d(AT)4 sequence and hence is targeted to any given compartment in any cell that expresses scFv tagged protein of choice.

In an exemplary, non-limiting embodiment, the nucleic acid complex as described herein comprises the first strain has the sequence 5'-the $Ca^{2+}$ fluorophore-GAC TCA CTG TTT GTC TGT CGT TCT AGG ATA/the second label/AT ATT TTG TTA TGT GTT ATG TGT TAT-3' (SEQ ID NO:07); and the second strain has the sequence 5'-the first label-CCC CTA ACC CCT AAC CCC TAA CCC CAT ATA TAT CCT AGA ACG ACA GAC AAA CAG TGA GTC-3' (SEQ ID NO:08).

In an exemplary, non-limiting embodiment, the nucleic acid complex as described herein comprises the first strain has the sequence 5'-TTA TAG GAT CCT GCG GTC GG/the $Ca^{2+}$ fluorophore/GGC ACC AGG CGT AAA ATG TA-3' (SEQ ID NO:09); the second strain has the sequence: 5'-the first label-CCC CAA CCC CAA TAC ATT TTA CGC CTG GTG CC-3' (SEQ ID NO:10); and the third strain has the sequence: 5'-CCG ACC GCA GGA TCC TAT AAA ACC CCA ACC CC-the second label-3 (SEQ ID NO:11).

In an exemplary, non-limiting embodiment, the nucleic acid complex as described herein comprises the first strain has the sequence 5'-the $Ca^{2+}$ fluorophore-GAC TCA CTG TTT GTC TGT CGT TCT AGG ATA/the second label/AT ATT TTG TTA TGT GTT ATG TGT TAT-3' (SEQ ID NO:07); and the second strain has the sequence 5'-the first label—AT AAC ACA TAA CAC ATAACAAAA TAT ATA TCC TAG AAC GAC AGA CAA ACA GTG AGT C-3' (SEQ ID NO:12).

In an exemplary, non-limiting embodiment, the nucleic acid complex as described herein comprises the first strain has the sequence 5'-the fluorophore-ATC AAC ACT GCA-Lys-COOH (SEQ ID NO:22); the second strain has the sequence 5'-TAT TGT GTA TTG TGT ATT GTT TTA TAT AT /the first label/A TAG GAT CTT GCT GTC TGG TGT GCA GTG TTG AT-3'(SEQ ID NO:23); and the third strain has the sequence: 5'-CAC CAG ACA GCA AGA TCC TAT ATA TAT ACC CCA ATC CCC AAT CCC CAA TCC CC-the second label-3' (SEQ ID NO:24).

Detection of pH and $Ca^{2+}$ or $Cl^-$ Concentration in Samples

The methods described herein may be used to monitor the pH changes and/or $Ca^{2+}$ or $Cl^-$ concentration in real-time during cellular processes. In some embodiments, the methods are for monitoring endocytosis. While not wishing to be limited by theory, acidification plays a major role in facilitating cargo dissociation from receptors or in mediating cellular entry of toxins and viruses during endocytosis. In certain embodiments, the nucleic acid complex exhibits a pH response inside cells illustrated by the capture of spatiotemporal pH changes associated with endocytosis in living cells.

Fluorescence in the sample can be measured in a variety of ways, such as using a fluorometer or fluorescence microscopy. In general, excitation radiation, from an excitation source having a first wavelength, passes through excitation optics. The excitation optics cause the excitation radiation to excite the sample. In response, labels in the sample emit radiation which has a wavelength that is different from the excitation wavelength. The device can include a temperature controller to maintain the sample at a specific temperature while it is being scanned. If desired, a multi-axis translation stage can be used to move a microtiter plate holding a plurality of samples in order to position different wells to be exposed. The multi-axis translation stage, temperature controller, auto-focusing feature, and electronics associated with imaging and data collection can be managed by an appropriately programmed digital computer. The computer also can transform the data collected during the assay into another format for presentation.

In some embodiments, the detecting includes measuring the magnitude of the signal generated, wherein the magnitude indicates the pH of the cell or region thereof or the $Ca^{2+}$ or $Cl^-$ concentration in the cell or region thereof. In certain embodiments, the emission from the acceptor fluorophore increases as the nucleic acid complex forms a closed state, i.e., as the i-motif is formed when the pH decreases. Likewise, the emission from the acceptor fluorophore decreases as the nucleic acid complex assumes an open state, i.e., as the i-motif dissociates when the pH increases. For fluorescence quenching, the emission from the fluorophore decreases as the nucleic acid complex forms a closed state, i.e., as the i-motif is formed when the pH decreases. Likewise, the emission from the fluorophore increases as the nucleic acid complex forms an open state, i.e., as the i-motif dissociates when the pH increases. In certain embodiments, the emission from the fluorophore is independent of the conformation of the nucleic acid complex.

As used herein, an "increase" (or "decrease") in a signal from the nucleic acid complex refers to the change in a signal in the sample compared to a reference sample. The reference sample may be a control sample (e.g., an untreated population of cells where the effects of a drug or agent are being examined), or it may be the same sample at a different period of time, for instance, where the intracellular pH and/or $Ca^{2+}$ or $Cl^-$ concentration is being monitored to follow one or more cellular processes.

As used herein, the term "detectable" refers to a property of the nucleic acid complex that allows one to determine the pH and/or $Ca^{2+}$ or $Cl^-$ concentration of a biological sample by detecting activity, e.g., fluorescence activity, possessed by the nucleic acid complex under certain conditions. In some embodiments, the signal from the nucleic acid complex is normalized by plotting the donor/acceptor (D/A) signal ratio as a function of pH in a standard reference sample. pH variation on a doubly-labeled nucleic acid complex changes the ratio between its closed and open states thereby resulting in different ratios of the donor and acceptor intensities (D/A) because of FRET in the closed state due to i-motif formation.

In one embodiment, a pH calibration curve and/or $Ca^{2+}$ or $Cl^-$ concentration calibration curve may be generated to which test samples may be compared and normalized. An intracellular calibration curve may be generated according to methods described in U.S. Patent Application Publication No.: 2010/0304370, which is herein incorporated by reference. Briefly, for the pH calibration curve, cells are pulsed, washed, incubated with an ionophore in buffers at a given pH and then mildly fixed. Donor and acceptor FRET images are acquired from which D/A ratios are obtained. The mean D/A of individual cells or regions thereof at each pH are plotted as a function of pH for the intracellular pH calibration curve. The D/A ratio of the test sample can be compared to the calibration curve. Similar approach may be used to generate $Ca^{2+}$ concentration calibration curve and $Cl^-$ concentration calibration curve. Related methods are also described in the Examples of the application.

In some embodiments, intracellular pH and/or $Ca^{2+}$ or $Cl^-$ concentration may be monitored for the purposes of examining cellular phenomena and/or screening the effects of various compounds, wherein the level of the signal from a nucleic acid complex (e.g., increased or decreased signal) in a test sample at a first time point is determined and compared with the level found in a test sample obtained at a later time point. The change in signal may reflect a relative change in pH and/or $Ca^{2+}$ or $Cl^-$ concentration between the two samples. For example, where a FRET pair is used as a label, an increase in signal from one time point to another may indicate an increase in pH between the two time points. Likewise, a decrease in signal from one point to another may indicate a decrease in pH or decrease in $Ca^{2+}$ or $Cl^-$ concentration. The absolute level of signal may be compared to a reference sample of known standards or reference samples in order to determine the precise pH and/or $Ca^{2+}$ or $Cl^-$ concentration of the sample. The sample can be classified or assigned to a particular pH value based on how similar the measured levels were compared to the control levels for a given group.

As one of skill in the art will understand, there will be a certain degree of uncertainty involved in making this determination. Therefore, the standard deviations of the control group levels can be used to make a probabilistic determination and the method of this disclosure are applicable over a wide range of probability-based determinations. Thus, for example, and not by way of limitation, in one embodiment, if the measured level of signal falls within 2.5 standard deviations of the mean of any of the control groups, then that sample may be assigned to that group. In another embodiment if the measured level of signal falls within 2.0 standard deviations of the mean of any of the control groups then that sample may be assigned to that group. In still another embodiment, if the measured level of signal falls within 1.5 standard deviations of the mean of any of the control groups then that sample may be assigned to that group. In yet another embodiment, if the measured level of signal is 1.0 or less standard deviations of the mean of any of the control groups levels then that sample may be assigned to that group. Thus, this process allows determination, with various degrees of probability, in which group a specific sample should be placed.

Statistical methods can also be used to set thresholds for determining when the signal intensity in a test sample can be considered to be different than or similar to the reference level. In addition, statistics can be used to determine the validity of the difference or similarity observed between a test sample's signal intensity and the reference level. Useful statistical analysis methods are described in L. D. Fisher & G. vanBelle, Biostatistics: A Methodology for the Health Sciences (Wiley-Interscience, NY, 1993). For instance, confidence ("p") values can be calculated using an unpaired 2-tailed t test, with a difference between groups deemed significant if the p value is less than or equal to 0.05.

The nucleic acid complexes described herein are useful as pH and $Ca^{2+}$ concentration sensors and may vary in their respective pKa, and the differences in pKa can be used to select the most suitable nucleic acid complex for a particular application. In general, a sensor should be used whose pKa is close to the pH of the sample to be measured. For example, the pKa may be within 1.5 pH unit, within 1.0 pH unit, or within 0.5 pH units of the sample.

The nucleic acid complexes described herein are useful as pH and $Cl^-$ concentration sensors. In certain embodiments, the signal of the $Cl^-$ fluorophore is linearly dependent on $Cl^-$ concentration with constant Stern-Volmer quenching constant ($K_{sv}$). In certain embodiments, the signal of the $Cl^-$ fluorophore is insensitive to physiological change in pH and to cations, non-halide anions (nitrate, phosphate, bicarbonate, sulfate), and albumin.

To minimize artefactually low fluorescence measurements that occur due to cell movement or focusing, the fluorescence of the nucleic acid complex can be compared to the fluorescence of a second sensor, e.g., a second nucleic acid complex that is also present in the measured sample. The second nucleic acid complex should have an emission spectra distinct from the first nucleic acid complex so that the emission spectra of the two sensors can be distinguished. Because experimental conditions such as focusing and cell movement will affect fluorescence of the second sensor as well as the first sensor, comparing the relative fluorescence of the two sensors may allow for the normalization of fluorescence. A convenient method of comparing the samples is to compute the ratio of the fluorescence of the first fluorescent protein sensor to that of the second fluorescent protein sensor.

In some embodiments, circular dichroism spectroscopy may be used to detect changes in the secondary structure of the nucleic acid complex in response to changes in pH and/or $Ca^{2+}$ or $Cl^-$ concentration. Circular Dichroism (CD) is observed when optically active matter absorbs left and right hand circular polarized light slightly differently. It is measured with a CD spectropolarimeter. In another embodiment, change in intracellular pH may be detected by observing Raman band changes in the nucleic acid complex. In this embodiment, the nucleic acid complex contains a gold nanoparticle label and a Raman tag. The Raman band changes may be detected when the gold nanoparticle is brought close to a Raman tag.

In some embodiments, FLIM is used to measure the conformational change upon i-motif formation. In some embodiments, anisotropy imaging is used to measure the conformational change. Fluorescence-lifetime imaging microscopy (FLIM) is an imaging technique for producing an image based on the differences in the exponential decay rate of the fluorescence from a fluorescent sample. It can be used as an imaging technique in confocal microscopy, two-photon excitation microscopy, and multiphoton tomography. The lifetime of the fluorophore signal, rather than its intensity, is used to create the image in FLIM. In some embodiments, FLIM is used to gain pH information, as one of the photo physical properties of the dyes that would change when the nucleic acid complex changes conformation due to a change in the pH. In some embodiments, the dye is an Atto dye, BODIPY dye, Alexa dye, TMR/TAMRA dye, or Cy dye. Anisotropic imaging and FLIM are further described in Ekta Makhija, et al., "Probing Chromatin Structure and Dynamics Using Fluorescence Anisotropy Imaging" CRC Handbook, Imaging Biological Mechanics (2014) and Levitt et al., "Fluorescence lifetime and polarization-resolved imaging in cell biology" *Current Opinion in Biotechnology* 20(1): 28-36 (2009), which are herein incorporated by reference for all purposes.

In some embodiments, the signal intensity changes by at least twenty percent as the $Ca^{2+}$ concentration is raised. In some embodiments, the signal intensity changes by at least 10, 20, 25, 30, 35, 40, 45, 50, 55, 60, 65, 70, 75, 80, 85, or 90% or any derivable range therein when the $Ca^{2+}$ concentration is raised.

In certain embodiments, the methods of the disclosure determine the $Ca^{2+}$ concentration in a range of 10 nM to 10 mM, the range is inclusive of the recited $Ca^{2+}$ concentration. For example, a $Ca^{2+}$ concentration that is determined by the methods of the disclosure concentration is in a range of 10 nM to 1 µM, or 10 nM to 100 nM, or 10 nM to 500 nM, or 100 nM to 500 nM, or 100 nM to 1 µM, or 500 nM to 1 µM, or 500 nM to 50 µM, or 1 µM to 1 mM, or 1 µM to 10 mM, or 10 µM to 10 mM, or 100 µM to 1 mM, or 100 µM to 10 mM. In other embodiments, the recited $Ca^{2+}$ concentration is excluded.

In some embodiments, the $Ca^{2+}$ concentration is determined by comparing the measured signal to a reference value. In some embodiments, the $Ca^{2+}$ concentration is determined by comparing the measured signal to a reference value. In some embodiments, the signal value and/or reference value is normalized. In some embodiments, the method further comprises creating a standard curve. A standard curve can be created by measuring the signal intensity at different known $Ca^{2+}$ concentration values. A curve can be plotted as signal intensity vs. $Ca^{2+}$ concentration. The signal intensity of an unknown $Ca^{2+}$ concentration can then be determined by finding the corresponding reference value on the plot.

In some embodiments, the signal intensity changes by at least twenty percent as the $Cl^-$ concentration is raised. In some embodiments, the signal intensity changes by at least 10, 20, 25, 30, 35, 40, 45, 50, 55, 60, 65, 70, 75, 80, 85, or 90% or any derivable range therein when the $Cl^-$ concentration is raised.

In certain embodiments, the methods of the disclosure determine the $Cl^-$ concentration in a range of 1 mM to 100 mM, the range is inclusive of the recited $Cl^-$ concentration. For example, a $Cl^-$ concentration that is determined by the methods of the disclosure concentration is in a range of 1 mM to 50 mM, 1 mM to 25 mM, or 1 mM to 10 mM, or 5 mM to 100 mM, or 5 mM to 50 mM, 5 mM to 25 mM, or 5 mM to 10 mM, or 10 mM to 25 mM, or 10 mM to 50 mM, or 10 mM to 75 mM, or 20 mM to 80 mM, or 30 mM to 70 mM. In other embodiments, the recited $Cl^-$ concentration is excluded.

In some embodiments, the $Cl^-$ concentration is determined by comparing the measured signal to a reference value. In some embodiments, the $Cl^-$ concentration is determined by comparing the measured signal to a reference value. In some embodiments, the signal value and/or reference value is normalized. In some embodiments, the method further comprises creating a standard curve. A standard curve can be created by measuring the signal intensity at different known $Cl^-$ concentration values. A curve can be plotted as signal intensity vs. $Cl^-$ concentration. The signal intensity of an unknown $Cl^-$ concentration can then be determined by finding the corresponding reference value on the plot.

In some embodiments, the signal intensity changes by at least twenty percent as the pH is raised from at least one of pH 4 to pH 5, pH 5 to pH 6, pH 6 to pH 7, and pH 7 to pH 8. In some embodiments, the signal intensity changes by at least 10, 20, 25, 30, 35, 40, 45, 50, 55, 60, 65, 70, 75, 80, 85, or 90% or any derivable range therein when the pH is raised from at least pH 4, 5, 6, or 7 to pH 5, 6, 7, or 8 (or any range derivable therein).

In certain embodiments, when pH ranges or values are discussed herein, the range is inclusive of the recited pH. For example, a pH range from 4.0 to 5.0 or between 4.0 and 5.0 includes the pH of 4.0 and 5.0. In other embodiments, the recited pH is excluded.

In some embodiments, the pH is determined by comparing the measured signal to a reference value. In some embodiments, the pH is determined by comparing the measured signal to a reference value. In some embodiments, the signal value and/or reference value is normalized. In some embodiments, the method further comprises creating a standard curve. A standard curve can be created by measuring the signal intensity at different known pH values. A curve can be plotted as signal intensity vs. pH. The signal intensity of an unknown pH can then be determined by finding the corresponding reference value on the plot.

As provided above, one aspect of the disclosure provides methods of determining pH and $Ca^{2+}$ concentration in samples. Such methods include providing a nucleic acid complex including a $Ca^{2+}$ fluorophore and a first label capable of producing a signal; measuring the intensity of the signal; and determining the pH and $Ca^{2+}$ concentration from the measured signal. Another aspect of the disclosure provides methods of determining pH and $Cl^-$ concentration in samples. Such methods include providing a nucleic acid complex including a Cl⁻ fluorophore and a first label capable of producing a signal; measuring the intensity of the signal; and determining the pH and Cl⁻ concentration from the measured signal.

The methods of the disclosure, in certain embodiments, are suitable for measuring pH and concentration of $Ca^{2+}$ or Cl⁻ in early endosome, late endosome, plasma membrane, lysosome, autophagolysosome, recycling endosome, cis Golgi network (CGN), trans Golgi network (TGN), endoplasmic reticulum (ER), peroxisomes, or secretory vesicles. In certain embodiments, the methods of the disclosure, are suitable for measuring pH and concentration of $Ca^{2+}$ or Cl⁻ in early endosome, late endosome, plasma membrane, lysosome, autophagolysosome, recycling endosome, or TGN.

In general, any sample containing $Ca^{2+}$ or Cl⁻ can be used in the methods of the disclosure. In some embodiments, the sample is a biological sample selected from a cell, cell extract, cell lysate, tissue, tissue extract, bodily fluid, serum, blood and blood product. In some embodiments, the sample is a live cell. In some embodiments, the sample is a biological sample from a patient.

The nucleic acid complexes as described herein can be readily introduced into a host cell, e.g., a mammalian (optionally human), bacterial, parasite, yeast or insect cell by any method in the art. For example, nucleic acids can be transferred into a host cell by physical, chemical or biological means. It is readily understood that the introduction of the nucleic acid molecules yields a cell in which the intracellular pH may be monitored. Thus, the method can be used to measure intracellular pH in cells cultured in vitro. The nucleic acid complex of the disclosure can also be readily introduced into a whole organism to measure the pH in a cell or tissue in vivo. For example, nucleic acid complex of the disclosure can be transferred into an organism by physical, chemical or biological means, e.g., direct injection.

In certain embodiments, the methods for introducing nucleic acid complexes of the disclosure may be those disclosed in Chakraborty et al., "Nucleic Acid-Based Nanodevices in Biological Imaging," *Annu. Rev. Biochem.* 85:349-73 (2016), incorporated in its entirety by reference herein.

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. One colloidal system for use as a delivery vehicle in vitro and in vivo is a liposome (i.e., an artificial membrane vesicle). The preparation and use of such systems is well known in the art.

In some embodiments, the use of lipid formulations is contemplated for the introduction of the nucleic acid complex of the disclosure into host cells (in vitro, ex vivo or in vivo). In some embodiments, the nucleic acid complex of the disclosure may be associated with a lipid. The nucleic acid complex of the disclosure associated with a lipid may be encapsulated in the aqueous interior of a liposome, interspersed within the lipid bilayer of a liposome, attached to a liposome via a linking molecule that is associated with both the liposome and the oligonucleotide(s), entrapped in a liposome, complexed with a liposome, dispersed in a solution containing a lipid, mixed with a lipid, combined with a lipid, contained as a suspension in a lipid, contained or complexed with a micelle, or otherwise associated with a lipid. The lipid, lipid/nucleic acid complex compositions are not limited to any particular structure in solution. For example, they may be present in a bilayer structure, as micelles, or with a "collapsed" structure. They may also simply be interspersed in a solution, possibly forming aggregates which are not uniform in either size or shape.

In some embodiments, the one or more nucleic acid complexes of the disclosure are linked to a targeting sequence that directs the nucleic acid complex to a desired cellular compartment.

Diseases Detection and Monitoring

The methods, compositions, nucleic acid complexes, and kits of the disclosure can be used for the detection of diseases, the monitoring of diseases, and as a drug screening platform. In some embodiments of the disclosure, the disease is characterized as a lysosomal dysfunction disease. In some embodiments of the disclosure, the pathology of the disease includes lysosomal dysfunction.

Lysosomal dysfunction diseases include, for example, autosomal recessive osteopetrosis, Farber disease, Krabbe disease (infantile onset and late onset), Fabry disease (Alpha-galactosidase A), Schindler disease (Alpha-galactosidase B), Sandhoff disease (infantile, juvenile, or adult onset), Tay-Sachs, juvenile hexosaminidase A deficiency, chronic hexosaminidase A deficiency, glucocerebroside, Gaucher disease (Type I, II, and III), lysosomal acid lipase deficiency (early onset and late onset), Niemann-Pick disease (Type A and B), sulfatidosis, metachromatic leukodystrophy (MLD), saposin B deficiency, multiple sulfatase deficiency, mucopolysaccharidoses: MPS I Hurler Syndrome, MPS I S Scheie Syndrome, MPS I H-S Hurler-Scheie Syndrome, Type II (Hunter syndrome), Type III (Sanfilippo syndrome), MPS III A (Type A), MPS III B (Type B), MPS III C (Type C), MPS III D (Type D), Type IV (Morquio), MPS IVA (Type A), MPS IVB (Type B), Type VI (Maroteaux-Lamy syndrome), Type VII Sly Syndrome, Type IX (Hyaluronidase Deficiency); Mucolipidosis: Type I (Sialidosis), Type II (I-cell disease), Type III (Pseudo-Hurler Polydystrophy/Phosphotransferase Deficiency), Type IV (Mucolipidin 1 deficiency); NiemannPick disease (Type C and D), Neuronal Ceroid Lipofuscinoses: Type 1 Santavuori-Haltia disease/Infantile NCL (CLN1 PPT1), Type 2 Jansky-Bielschowsky disease/Late infantile NCL (CLN2/LINCL TPP1), Type 3 Batten-Spielmeyer-Vogt disease/Juvenile NCL (CLN3), Type 4 Kufs disease/Adult NCL (CLN4), Type 5 Finnish Variant/Late Infantile (CLN5), Type 6 Late Infantile Variant (CLN6), Type 7 CLN7, Type 8 Northern Epilepsy (CLN8), Type 8 Turkish Late Infantile (CLN8), Type 9 German/Serbian Late Infantile (Unknown), Type 10 Congenital Cathepsin D Deficiency (CTSD); Wolman disease, alpha-mannosidosis, beta-mannosidosis, aspartylglucosaminuria, fucosidosis, lysosomal transport diseases, cystinosis, pycnodysostosis, salla disease/sialic acid storage disease, infantile free sialic acid storage disease (ISSD), glycogen storage diseases, Type II Pompe Disease, Type IIIb Danon disease, and cholesteryl ester storage disease. In some embodiments, the disease is autosomal recessive osteopetrosis. In some embodiments, the disease is Niemann-Pick C disease.

Kits

The materials and components described for use in the methods may be suited for the preparation of a kit. Thus, the disclosure provides a detection kit useful for determining the pH and the presence, absence, or concentration of $Ca^{2+}$ in a sample, cell or region thereof. Specifically, the technology encompasses kits for measuring the pH and $Ca^{2+}$ of one or more cells in a sample. The disclosure also provides a detection kit useful for determining the pH and the presence, absence, or concentration of in a sample, cell or region thereof. Specifically, the technology encompasses kits for measuring the pH and Cl⁻ of one or more cells in a sample. For example, the kit can comprise a nucleic acid complex as described herein.

In some embodiments, the methods described herein may be performed by utilizing pre-packaged diagnostic kits comprising the necessary reagents to perform any of the methods of the technology. For example, such a kit would include a detection reagent for measuring the pH and $Ca^{2+}$ of a cell or region thereof, or a detection reagent for measuring the pH and Cl⁻ of a cell or region thereof. In one embodiment of such a kit, the detection reagents are the nucleic acid complexes of the disclosure. Oligonucleotides are easily synthesized and are stable in various formulations for long periods of time, particularly when lyophilized or otherwise dried to a powder form. In this form, they are easily reconstituted for use by those of skill in the art. Other reagents and consumables required for using the kit could be easily identified and procured by those of skill in the art who wish to use the kit. The kits can also include buffers useful in the methods of the technology. The kits may contain instructions for the use of the reagents and interpreting the results.

In some embodiments, the technology provides a kit comprising at least one sample (e.g., a pH standard and/or a $Ca^{2+}$ concentration standard and/or a Cl⁻ concentration standard) packaged in one or more vials for use as a control. Each component of the kit can be enclosed within an individual container and all of the various containers can be within a single package, along with instructions for performing the assay and for interpreting the results of the assays performed using the kit.

In some embodiments, the kit comprises a device for the measurement of pH and $Ca^{2+}$ in a sample. In some embodiments, the kit comprises a device for the measurement of pH and Cl⁻ in a sample. In some embodiments, the device is for measuring pH and/or analyte in cell culture or in whole, transparent organisms (e.g., C. elegans).

Definitions

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

As used herein, a "fluorescent dye" or a "fluorophore" is a chemical group that can be excited by light to emit fluorescence. Some fluorophores may be excited by light to emit phosphorescence. Dyes may include acceptor dyes that are capable of quenching a fluorescent signal from a fluorescent donor dye.

As used herein, "crosslinked" refers to a covalent connection between the nucleic acid molecule and another moiety of interest, such as the $Ca^{2+}$ fluorophore or the Cr fluorophore. In certain embodiments, the crosslink between the nucleic acid molecule and this moiety is water compatible. In certain embodiments, the crosslink between the nucleic acid molecule and this moiety is stable under physiological conditions.

As used herein, "nucleic acid," "nucleotide sequence," or "nucleic acid sequence" refer to a nucleotide, oligonucleotide, polynucleotide, or any fragment thereof and to naturally occurring or synthetic molecules. The term "peptide nucleic acid" or "PNA" as used herein generally refers to nucleic acid analogue in which the sugar phosphate backbone of natural nucleic acid has been replaced by a synthetic peptide backbone. The term "RNA equivalent" in reference to a DNA sequence, is composed of the same linear sequence of nucleotides as the reference DNA sequence with the exception that all occurrences of the nitrogenous base thymine are replaced with uracil, and the sugar backbone is composed of ribose instead of deoxyribose. It is understood to be a molecule that has a sequence of bases on a backbone comprised mainly of identical monomer units at defined intervals. The bases are arranged on the backbone in such a way that they can enter into a bond with a nucleic acid having a sequence of bases that are complementary to the bases of the oligonucleotide. The most common oligonucleotides have a backbone of sugar phosphate units. A distinction may be made between oligodeoxyribonucleotides, which do not have a hydroxyl group at the 2' position, and oligoribonucleotides, which have a hydroxyl group in this position. Oligonucleotides also may include derivatives, in which the hydrogen of the hydroxyl group is replaced with organic groups, e.g., an allyl group. An oligonucleotide is a nucleic acid that includes at least two nucleotides.

One nucleic acid sequence may be "complementary" to a second nucleic acid sequence. As used herein, the terms "complementary" or "complementarity," when used in reference to nucleic acids (i.e., a sequence of nucleotides such as an oligonucleotide or a target nucleic acid), refer to sequences that are related by base-pairing rules. For natural bases, the base pairing rules are those developed by Watson and Crick. As an example, for the sequence "T-G-A", the complementary sequence is "A-C-T." Complementarity can be "partial," in which only some of the bases of the nucleic acids are matched according to the base pairing rules. Alternatively, there can be "complete" or "total" complementarity between the nucleic acids. The degree of complementarity between the nucleic acid strands has effects on the efficiency and strength of hybridization between the nucleic acid strands.

Oligonucleotides as described herein may be capable of forming hydrogen bonds with oligonucleotides having a complementary base sequence. These bases may include the natural bases such as A, G, C, T and U, as well as artificial bases. An oligonucleotide may include nucleotide substitutions. For example, an artificial or modified base may be used in place of a natural base such that the artificial base exhibits a specific interaction that is similar to the natural base.

An oligonucleotide that is complementary to another nucleic acid will "hybridize" to the nucleic acid under suitable conditions (described below). As used herein, "hybridization" or "hybridizing" refers to the process by which an oligonucleotide single strand anneals with a complementary strand through base pairing under defined hybridization conditions. "Specific hybridization" is an indication that two nucleic acid sequences share a high degree of complementarity. Specific hybridization complexes form under permissive annealing conditions and remain hybridized after any subsequent washing steps. "Hybridizing" sequences which bind under conditions of low stringency are those which bind under non-stringent conditions (6×SSC/50% formamide at room temperature) and remain bound when washed under conditions of low stringency (2×SSC, 42° C.). Hybridizing under high stringency refers to the above conditions in which washing is performed at 2×SSC, 65° C. (where SSC is 0.15M NaCl, 0.015M sodium citrate, pH 7.2).

EXAMPLES

Certain aspects of the disclosure are illustrated further by the following examples, which are not to be construed as limiting the disclosure in scope or spirit to the specific methods and materials described in them.

Materials and Methods

Reagents. All the chemicals were purchased from Sigma (USA) and Alfa Aesar (USA). $^1$H-NMR and $^{13}$C-NMR were recorded on Bruker AVANCE II+, 500 MHz NMR spectrophotometer in $CDCl_3$ and DMSO-$d_6$ and tetramethylsilane (TMS) used as an internal stranded. Mass spectra were recorded in Agilent 6224 Accurate-Mass TOF LC/MS. All fluorescently labeled oligonucleotides were purchased from IDT (USA) and IBA-GmBh (Germany). HPLC purified oligonucleotides were dissolved in Milli-Q water to make 100 μM stock solutions and quantified using UV-spectrophotometer and stored at −20° C. Ethylene glycol-bis(β-aminoethyl ether)-N,N,N',N'-tetraacetic acid (EGTA), ampicillin, carbencillin, isopropyl β-D-1-thiogalactopyranoside (IPTG), nigericin and monensin were purchased from Sigma and ionomycin was obtained from Cayman Chemical (USA). Calcium nitrate tetrahydrate, sodium nitrate, sodium phosphate dibasic, sodium phosphate monobasic, magnesium sulfate anhydrous, glycerol, bovine serum albumin (66 kDa), nigericin, monensin, tributyltin chloride (TBT-Cl) and amitriptyline hydrochloride were obtained from Sigma, and sodium chloride was purchased from Alfa Aesar. Magnesium nitrate hexahydrate, sodium acetate anhydrous, sodium bicarbonate was purchased from Fisher Scientific (USA). 2-Hydroxypropyl-β-cyclodextrin (β-CD) and U18666A were purchased from Cayman Chemical (USA). CellLight® Reagents® BacMam 2.0, DMEM and FBS were purchased from molecular probes from Life Technologies (USA). Maleylated BSA (mBSA) was maleylated according to an established protocol (Modi et al. (2009) *Nat. Nanotechnol.* 4:325-330). Monodisperse Silica Microspheres were obtained from Cospheric (USA).

Gel electrophoresis. Native polyacrylamide gels containing 12% acrylamide [19:1 acrylamide/bisacrylamide] were used for gel electrophoresis. Gels were run in 1×TBE buffer (100 mM Tris·HCl, 89 mM boric acid, and 2 mM EDTA, pH 8.3) at 4° C. Gels were observed under Biorad Universal Hood II Gel Doc System (Bio-Rad Laboratories, Inc.) using Image Lab™ Software 6.0.0 for image acquisition for Alexa 647 and Alexa 546 channel. After measurement, gels were stained with ethidium bromide (1 μg/mL) and observed.

In vitro fluorescence measurements. Fluorescence spectra were measured on a FluoroMax-4 spectrophotometer (Horiba Scientific, Edison, NJ) using previously established protocols (Modi et al. (2009)). 200 nM of ChloropHore or ChloropHore$_{Ly}$ in UB4 buffer (20 mM HEPES, MES and sodium acetate, 150 mM $KNO_3$, 5 mM $NaNO_3$, 1 mM $Ca(NO_3)_2$ and $Mg(NO_3)_2$) of indicated pH were mixed and incubated at 37° C. for 30 min after which measurements were performed at 25° C. For in vitro pH measurements, CalipHluor$_{Ly}$ sample was diluted to 30 nM in pH clamping buffer [$CaCl_2$ (50 μM to 10 mM), HEPES (10 mM), MES (10 mM), sodium acetate (10 mM), EGTA (10 mM), KCl (140 mM), NaCl (5 mM) and $MgCl_2$ (1 mM)] of desired pH and equilibrated for 30 minutes at room temperature. All the samples were excited at 495 nm and emission spectra was collected from 505 nm to 750 nm. The ratio of donor (D) emission intensity at 520 nm to acceptor (A) emission intensity at 665 nm was plotted as a function of pH to generate the pH calibration curve. Mean of D/A from two independent experiments and their S.E.M were plotted for each pH. Fold change in D/A of CalipHluor$_{Ly}$ was calculated from the ratios of D/A at pH 4.0 and pH 6.5. $pH_{1/2}$ of CalipHluor$_{Ly}$ at different [$Ca^{2+}$] values were derived from pH calibration curve by fitting to Boltzmann sigmoid.

For in vitro [$Ca^{2+}$] measurements, CalipHluor$_{Ly}$ sample was diluted to 30 nM in $Ca^{2+}$ clamping buffer [HEPES (10 mM), MES (10 mM), sodium acetate (10 mM), EGTA (10 mM), KCl (140 mM), NaCl (5 mM) and $MgCl_2$ (1 mM)]. The amount of [$Ca^{2+}$] was varied from 0 mM to 20 mM and adjusted to different pH values (4.5-7.20). The amount of free [$Ca^{2+}$] at a given pH was calculated based on Maxchelator software (maxchelator.stanford.edu). Rhod-5F and Alexa 647 were excited at 545 nm and 630 nm respectively. Emission spectra for Rhod-5F (O) and Alexa 647 (R) were collected from 570-620 nm and 660-750 nm, respectively. Mean of O/R from two independent experiments and their S.E.M. were plotted for each [$Ca^{2+}$]. Similar experiments were performed with 50 nM CalipHluor$^{mLy}$ at pH 4.6 and pH 5.1. In vitro calcium binding affinity ($K_d$) of Rhod-5F was obtained by plotting ratios of Rhod-5F (O) emission intensity at 580 nm to Alexa 647 (R) emission intensity at 665 nm as a function of free [$Ca^{2+}$] and fitted using sigmoidal growth Hill (1) equation.

$$Y=S+(E-S)\times(X^n/K_d^2+X^n)) \tag{1}$$

X is free [$Ca^{2+}$], Y is O/R ratio at given free [$Ca^{2+}$], S is O/R ratio at low [$Ca^{2+}$], E is O/R ratio at high [$Ca^{2+}$], $K_d$ is dissociation constant and n is Hill coefficient. Fold change response in O/R of CalipHluor$_{Ly}$ was calculated from ratio of O/R at high [$Ca^{2+}$] and O/R at low [$Ca^{2+}$].

Determination of Stern-Volmer quenching constant $K_{sv}$. In vitro Cl$^-$ calibration curve of ChloropHore and ChloropHore$_{LY}$ revealing the intensity ratio A647 and BAC (R/G) against [Cl$^-$]. R/G at different chloride concentrations were normalized to the value at 5 mM chloride. R/G vs [Cl$^-$] plot is equivalent to $F_0/F$ vs [Cl$^-$] plot or the Stern-Volmer plot.

Circular Dichroism spectroscopy. CD scans were carried out on Jasco J-1500 CD Spectrometer equipped with a temperature controller. 7 μM unlabeled ChloropHore at pH 4.0 and 7.5 were prepared at 80 mM potassium phosphate buffer. Samples were then measured and reveal as an average of three scans.

*C. elegans* methods and strains. Standard methods were followed for the maintenance of *C. elegans*. Wild type strain used was the C. elegans isolate from Bristol, strain N2 (Brenner, 1974). Strains used in the study were provided by the Caenorhabditis Genetics Center (CGC), and are RRID: WB-STRAIN:RB2510 W08D2.5(ok3473) and RRID:WB-STRAIN:VC1242 [+/mT1 II; cup-5(ok1698)/mT1 [dpy-10 (e128)] III]. Transgenics used in this study, also provided by the CGC, are RRID:WB-STRAIN:NP1129 cd/s131 [pcc1::GFP::rab-5+unc-119(+)+myo-2p::GFP], a transgenic strain that express GFP-fused early endosomal marker RAB-5 inside coelomocytes, RRID:WB-STRAIN:NP871 cd/s66 [pcc1:: GFP::rab-7+unc-119(+)+myo-2p::GFP], a transgenic strain that express GFP-fused late endosomal/lysosomal marker RAB-7 inside coelomocytes RRID:WB-STRAIN:RT258 pwIs50 [Imp-1:: GFP+Cbr-unc-119(+)], a transgenic strain expressing GFP-tagged lysosomal marker LMP-1 and arIs37[myo-3p::ssGFP+dpy-20(+)]I, a transgenic strain that express ssGFP in the body muscles which secreted in pseudocoelom and endocytosed by coelomocytes and arIs37[myo-3p::ssGFP+dpy-20(+)]Icup5(ar465) a transgenic strain with enlarged GFP containing vesicles in coelomocytes due to defective degradation. Gene knocked down was performed using Ahringer library-based RNAi methods. The RNAi clones used were: L4440 empty vector control, catp-6 (W08D2.5, Ahringer Library), catp-5 (K07E3.7, Ahringer Library) and mrp-4 (F21G4.2, Ahringer Library).

CalipHluor trafficking in coelomocytes. CalipHluor trafficking in coelomocytes was done in transgenic strains expressing endosomal markers such as GFP::RAB-5 (EE), GFP::RAB-7 (LE) and LMP-1:: GFP (Ly) as described previously (Surana et al. (2011) Nat. Commun. 2:340). Briefly, worms were injected with CalipHluor$_{A647}$ (500 nM) and incubated for specific time points and transferred on to ice. Worms were anaesthetized using 40 mM of sodium azide in M9 solution. Worms were then imaged on Leica TCS SP5 II STED laser scanning confocal microscope (Leica Microsystems, Inc., Buffalo Grove, IL) using an Argon ion laser for 488 nm excitation and He-Ne laser for 633 nm excitations with a set of filters suitable for GFP and Alexa 647 respectively. Colocalization of GFP and CalipHluor$_{A647}$ was determined by counting the number CalipHluor$_{A647}$ positive puncta that colocalize with GFP-positive puncta and quantified as a percentage of total number of CalipHluor$_{A647}$ positive puncta (Surana et al. (2011) Nat. Commun. 2:340). In order to confirm lysosomal labeling in a given genetic background, the same procedure was performed on the relevant mutant or RNAi knockdown in pwIs50 [Imp-1:: GFP+Cb-unc-119(+)].

RNAi experiments in C. elegans. Bacteria from the Ahringer RNAi library expressing dsRNA against the relevant gene was fed to worms, and measurements were carried out in one-day old adults of the F1 progeny (Kamath and Ahringer, 2003). RNA knockdown was confirmed by probing mRNA levels of the candidate gene, assayed by RT-PCR. Briefly, total RNA was isolated using the Trizol-chloroform method; 2.5 µg of total RNA was converted to cDNA using oligo-dT primers. 5 µL of the RT reaction was used to set up a PCR using gene-specific primers. Actin mRNA was used as a control. PCR products were separated on a 1.5% agarose-TAE gel.

Cell culture methods and maintenance. BHK-21 cells, Human dermal fibroblasts (HDF), human fibroblast cells harboring mutations in ATP13A2 and homozygous for 15500>T (L6025), J774A.1 and T47D cells were cultured in DMEM-F12 with 10% FBS, 100 U/ml penicillin and 100 µg/mL streptomycin and maintained at 37° C. under 5% $CO_2$. Fibroblasts AG01518, GM08429, GM00112, GM16195, GM13205, GM03252, GM03393, GM11097, GM18414, GM23162 and GM17910 were purchased from Coriell Institute (Camden, NJ) and cultured with the suggested protocols from Coriell Institute.

Competition experiments. HDF cells were washed with 1×PBS buffer and then incubated with 10 µM of maleylated BSA or BSA for 15 min. Next, cells were pulsed with 1 µM ChloropHore and 10 µM of maleylated BSA or BSA in cell culture media for 1 h. Cells were washed with 1×PBS for three times and then imaged. Whole cell intensities of 20 cells per dish in the A647 channel was quantified.

Co-localization experiments in cells. Cells were transfected with LAMP1-RFP by CellLight® Reagents* BacMam 2.0 according to the manufacturer's protocol. Briefly, CellLight® Reagents were added to the cells with the final number of particles per cell ca. 20 and incubated for 10 h. Transfected cells were then pulsed with 0.25 mg/mL of 10 kDa FITC-Dextran (FITC-Dex) for 1 h, chased for 16 h and was followed by imaging. Crosstalk and bleed-through were measured and found to be negligible between the RFP channel and FITC-Dex channel. These experiments revealed that the pulse chase time point selected for FITC-Dex labelling of lysosomes showed ca. 80% colocalization with LAMP-1 RFP. Lysosomes pre-labeled with TMR-Dex w utilized to examine the trafficking time scales for ChloropHore. Pre-labeled cells were pulsed with 1 µM of ChloropHore and chased for indicated time and imaged. Cross talk and bleed-through were recorded and discover to be negligible between TMR channel and A647 channel. Pearson's correlation coefficient (PCC) measures the pixel-by-pixel covariance of two images while it range from 0-1 and 1 indicates complete colocalization. PCC are examined by the tool in ImageJ/Fiji 2.0.0-rc-54/1.51h. Upon pixel shift, PCC values decrease significantly suggesting non-random colocalization. For pH and $Ca^{2+}$ sensors, pre-labeled cells were pulsed with 500 nM of CalipHluor$_{A647Ly}$ and chased for indicated time and imaged. Cross talk and bleed-through were measured and found to be negligible between the TMR channel and Alexa 647 channel. Pearson's correlation coefficient (PCC) measures the pixel-by-pixel covariance in the signal levels of two images. Tools for quantifying PCC are provided in Fuji software. Pearson's correlation coefficient (PCC) measures the pixel-by-pixel covariance in the signal levels of two images. Tools for quantifying PCC are provided in Fuji software.

In cellulo clamping. pH and chloride clamping were carried out with ChloropHore using a previously published protocol. HDF cells were pulsed for 1 h and chased for 2 h with 2 µM of Chlorophore. After labeling, cells were fixed by 200 mL 4% paraformaldehyde for 5 min at 25° C. The fixed cells were washed with 1x PBS three times and incubated in the chloride clamping buffer of indicated pH and chloride concentration which also contained 50 µM nigericin, 50 µM monensin, and 25 µM tributyltin chloride (TBT-C1) for 1 h at 25° C. Clamping buffers with various concentration of chloride ions were prepared by adding chloride positive buffer (150 m M KCl, 5 mM NaCl, 1 mM $CaCl_2$, 1 mM $MgCl_2$, 10 mM HEPES, MES, sodium acetate) to a chloride negative buffer (150 mM $KNO_3$, 20 mM $NaNO_3$, 1 mM $Ca(NO_3)_2$, 1 mM $Mg(NO_3)_2$, 10 mM HEPES, MES, sodium acetate) at the same indicated pH in different ratios. The cells were then imaged in clamping buffer. pH and calcium clamping were carried out using CallpHluor$^{mLy}$. Fibroblast cells were pulsed for 1 hour and chased for 2 hours with 500 nM CallpHluor$^{mLy}$. Cells are then fixed with 200 mL 4% paraformaldehyde (PFA) for 15 minutes at room temperature, washed three times and retained in 1×PBS. To obtain the intracellular pH and calcium calibration profile, endosomal calcium concentrations were equalized by incubating the previously fixed cells in the appropriate calcium clamping buffer [HEPES (10 mM), MES (10 mM), sodium acetate (10 mM), EGTA (10 mM), KCl (140 mM), NaCl (5 mM) and $MgCl_2$ (1 mM)] by varying amount of free [$Ca^{2+}$] from 1 µM to 10 mM and adjusted to different pH values. The buffer also contained nigericin (50 µM), monensin (50 µM) and ionomycin (20 µM) and the cells were incubated for 2 hours at room temperature. For real-time pH and calcium measurements, fibroblast cells are pulsed with 500 nM of CallpHluor$^{mLy}$ for 1 hour, chased for 9 hours (8 hours for L0625 cells) and then washed with 1×PBS and imaged in Hank's Balanced Salt Solution (HBSS). Imaging was carried out on IX83 research inverted microscope (Olympus Corporation of the Americas, Center Valley, PA) using a 100×, 1.42 NA, DIC oil immersion objective (PLAPON, Olympus Corporation of the Americas, Center Valley, PA) and Evolve Delta 512 EMCCD camera (Photometrics, USA).

Single lysosome clamping. After the first round of cell clamping and imaging, the clamping buffer was replaced with the second which contained with 50 µM nigericin, 50 µM monensin, and 25 µM TBT-Cl, either a pH or [Cl−] difference. The cells were incubated in the second clamping buffer for 1 h at room temperature post which the same cells were imaged.

DNA stability assay. DNA stability assay was performed as described previously. Cells are pulsed with 1 mg/mL TMR-Dex for 1 h and chased for 16 h. The TMR-Dex labeled cells are pulsed with 2 µM of ChloropHore for 1 h, chased for indicated time points for imaging.

Lysosomal pH and chloride measurements. Fibroblast cells are pulsed with 2 µM of $I^{mLy}$, ChloropHore or ChloropHore$_{Ly}$ for 1 h, chased for 9 h (30 min pulse and 1 h chase for J774. A1, BHK-21 and T47D cells) and then washed with 1×PBS and subjected for imaging.

2-IM upon addition of lysosomal proton pump and ion channel blocker. Upon lysosome labeling, final concentration of 500 nM bafilomycinA1 and 300 µM of 5-nitro-2-(3-phenylpropyl-amino) benzoic acid (NPPB) were added to cells and incubated for 45 min. Cells was then washed with PBS and imaged in Hank's Balanced Salt Solution (HBSS) containing the respective blocker compounds.

Preparation of pharmacologically induced cell culture model for Niemann Pick type A/B (NP-A/B) and type C (NP-C). Niemann Pick type A/B and C models were prepared according to the previous reported method. Cells were incubated with 65 µM of the acid sphingomyelinase (ASM) inhibitor amitriptyline (AH) and 20 µM of the NPC1 inhibitor U18666A for 24 h to create a NP-A/B and NP-C models respectively. The cells are pulsed with 2 µM of ChloropHoreLY and either 65 µM AH or 20 µM U18666A for 1 h, chased with either 65 µM AH or 20 µM U18666A for 9 h and then washed with 1×PBS and imaged.

Lysosomal population rescue using ASM and β-CD. Recombinant human acid sphingomyelinase was incubated with NP-A/B patient cells according to the previous method. Primary human fibroblasts derived from NP-A/B patients were maintained in DMEM medium with 1% FBS for 24 h. The medium was then changed to DMEM with 1% FBS containing 0.2% BSA and 5 µg of rhASM. After 24 h, the cells are pulsed with 2 µM of ChloropHore$_{Ly}$ for 1 h, chased for 9 h and then washed with 1×PBS and imaged. Primary human fibroblasts from NP-C patient were incubated with 50 µM of o-Hydroxypropyl-β-cyclodextrin (β-CD) for 24 h. The cells are pulsed with 2 µM of ChloropHore$_{Ly}$ and 50 µM of β-CD for 1 h, chased with 50 µM of β-CD for 9 h and then washed with 1×PBS and imaged.

Image acquisition. Image acquisition was carried out on wide field IX83 inverted microscope (Olympus Corporation of the Americas, Center Valley, PA) using a 60×, 1.42 NA, phase contrast oil immersion objective (PLAPON, Olympus Corporation of the Americas, Center Valley, PA) and Evolve Delta 512 EMCCD camera (Photometrics). Filter wheel, shutter and CCD camera were controlled using Metamorph Premier Ver 7.8.12.0 (Molecular Devices, LLC), suitable for the fluorophores used. Images on the same day were acquired under the same acquisition settings. Alexa 488 channel images (D) were obtained using 480/20 band pass excitation filter, 520/40 band pass emission filter and 89016-ET-FITC/Cy3/Cy5 dichroic filter. Alexa 647 channel images (A) were obtained using 640/30 band pass excitation filter, 705/72 band pass emission filter and 89016-ET-FITC/Cy3/Cy5 dichroic filter. FRET channel images were obtained using the 480/20 band pass excitation filter, 705/72 band pass emission filter and 89016-ET-FITC/Cy3/Cy5 dichroic filter. Rhod-5F channel images (O) were obtained using 545/25 band pass excitation filter, 595/50 band pass emission filter and a 89016-ET-FITC/Cy3/Cy5 dichroic filter. Confocal images were acquired on a Leica TCS SP5 II STED laser scanning confocal microscope (Leica Microsystems, Inc., Buffalo Grove, IL) equipped with 63×, 1.4 NA, oil immersion objective. Alexa 488 was excited using an Argon ion laser for 488 nm excitation, Alexa 647 using He—Ne laser for 633 excitation and Rhod-5F using DPSS laser for 561 nm excitation with a set of dichroics, excitation, and emission filters suitable for each fluorophore.

Image analysis for pH and sensors. Images were analyzed with ImageJ/Fiji 2.0.0-rc-54/1.51h. pH and chloride measurements are performed as described previously. To generate a density plot to represent lysosomal populations, the individual D/A (Y-axis) versus the corresponding R/G (X-axis) values was first plotted for each lysosome that was obtained for a given fibroblast sample comprising ~60 cells and ~600 lysosomes. Density plots were generated using 2D Kernel Density plot on Origin 2018 SR1 b9.5.1.195 (OriginLab, USA). This converted the individual scatter points into a population matrix as a probability density function. The density plot is then pseudo colored to represent high density in red (values close to 1) and low density in blue (values closer to 0). Those points with <10% probability on the plot were discarded. For normalization between days, the point of highest density (value =1) of normal HDF cells was designated as the center of the plot with x,y coordinates (1,1). To normalize between experiments done on different days, the lysosomal pH and Cl− of a sample of normal HDF cells was always measured as well, the density plot of which served as the reference. All density plots acquired on the same day with the same settings were thus normalized to the HDF cell density plots to enable comparison of data across different days.

Figure 23:
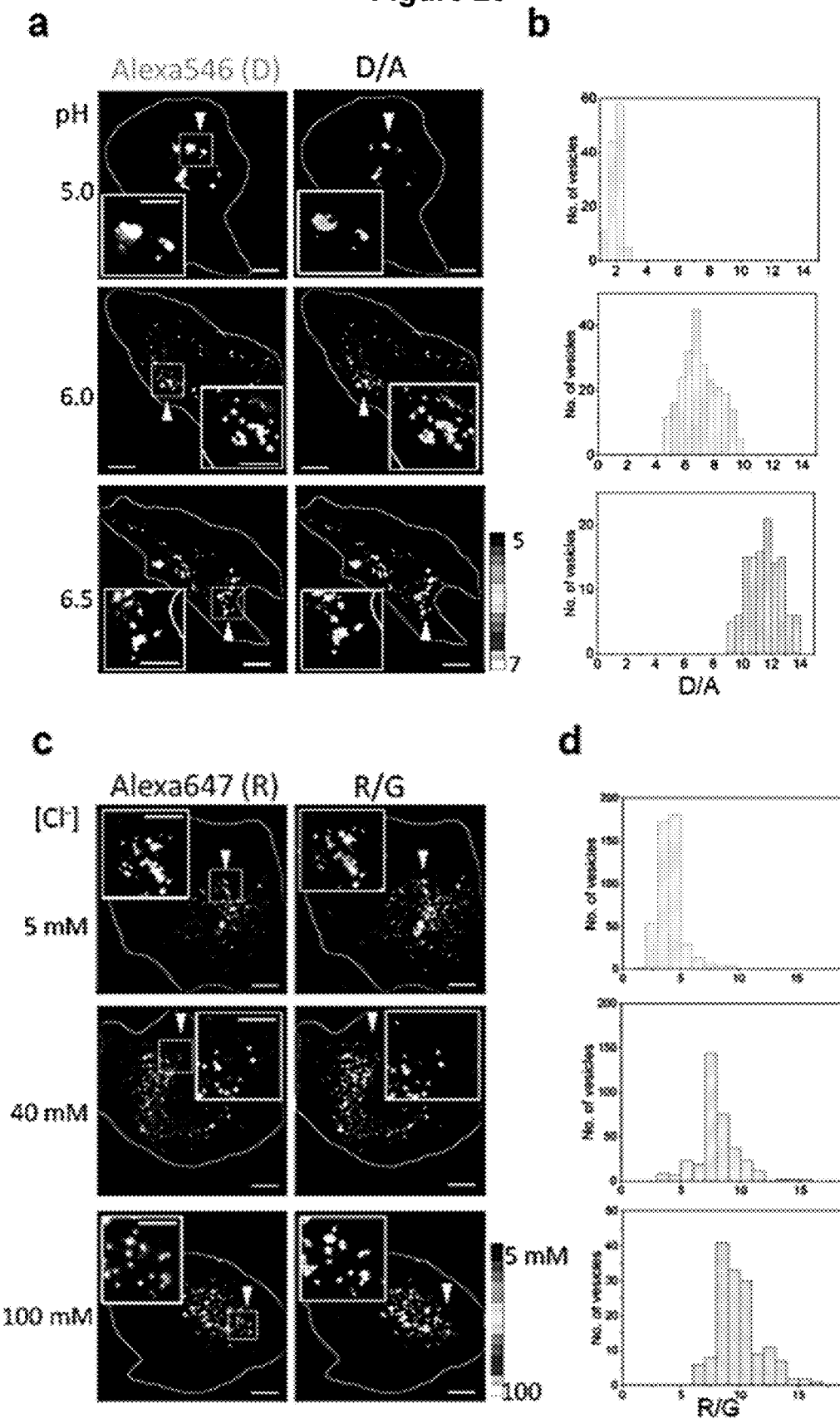
FIG. 23 illustrates intracellular calibration profile of ChloropHore. (a) Fluorescence images of primary human skin fibroblasts labeled with ChloropHore and clamped at the indicated pH and [Cl$^-$]=100 mM, imaged in the donor channel and the corresponding pseudocolour pH map (b) Histograms of D/A ratios of endosomes at each pH (c) Fluorescence images of ChloropHore labeled fibroblasts clamped at the indicated [Cl$^-$], pH 5 shown in the Alexa 647 channel and respective pseudocolour [Cl$^-$] map. Scale bar=10 μm and inset scale bar=5 μm (d) Histograms of R/G ratios of endosomes at each [Cl$^-$]. Experiments were performed in triplicate (n=15 cells, 150 endosomes).

Data was normalized as follows: The maximum and minimum values of D/A and R/G of the reference HDF cell density plot were considered as reference points to X and Y align the lysosome profile of a given sample. These maxima and minima were considered as 25% and 75% of the density plot respectively. The maxima and minima of D/A and R/G of newly obtained HDF cell data set was adjusted to this accordingly such that they overlaid. The center of the density profile (the point displaying highest density) was then adjusted to x=1, y=1 coordinates. The density plot from other samples in the same set of experiments was aligned using the identical parameters used to align the HDF cell dataset with the reference HDF cell data set. The density plot of HDF cells obtained from independent experiments performed on different days were normalized and are shown in FIG. 23 to demonstrate the reproducibility of this method.

Image analysis for pH and $Ca^{2+}$ sensors. Image analysis for quantification of pH and calcium in single endosomes was done using custom MATLAB code. For each cell the most focused plane was manually selected in the Alexa 647 channel. This image and corresponding images from the same z-position in other channels were input into the program. Images from the different channels were then aligned using Enhanced Cross Correlation Optimization. To determine the location of the endosome first a low threshold was used to select the entire cell. Only the area within the cell was subsequently considered for endosome selection. Regions of interest corresponding to individual endosomes were selected in the Alexa 647 channel by adaptive thresholding using Sauvola's method. The initial selection was further refined by watershed segmentation and size filtering. After segmentation regions of interest were inspected in each image and selection errors were corrected manually. Using the cell boundary annular region 10 pixels wide around the cell was selected and used to calculate a background intensity in each image. Then, the mean fluorescence intensity was measured in each endosome in donor (D), acceptor (A), Rhod-5F (O) and Alexa 647 (R) channels and the background intensity corresponding to that cell and channel was subtracted. The two ratios of intensities (D/A and O/R) were then computed for each endosome. Mean D/A of each distribution was plotted as a function of pH and obtained the in vivo pH calibration curve. Mean O/R of each distribution was plotted as a function of free [$Ca^{2+}$] to generate the in vivo $Ca^{2+}$ calibration curve. Pseudo color pH and $Ca^{2+}$ images were obtained by measuring the D/A and O/R ratio per pixel, respectively.

In vivo measurements of pH and [$Ca^{2+}$]. In vivo pH calibration experiments of CalipHluor$_{Ly}$ were carried out using protocols previously established (Modi et al., 2009; Surana et al., 2011). Briefly, CalipHluor$_{Ly}$ (500 nM) was microinjected in pseudocoelom of young adult worms on the opposite side of the vulva. After microinjections, worms were incubated at 22° C. for 2 hours for maximum labelling of coelomocyte lysosomes. Then, worms were immersed in clamping buffer [$CaCl_2$ (50 µM to 10 mM), HEPES (10 mM), MES (10 mM), sodium acetate (10 mM), EGTA (10 mM), KCl (140 mM), NaCl (5 mM) and $MgCl_2$ (1 mM)] of desired pH solutions containing the ionophores nigericin (50 µM), monensin (50 µM) and ionomycin (20 µM). Worm cuticle was perforated to facilitate the entry of buffer in to the body. After 75 min of incubations in clamping buffer, coelomocytes were imaged using wide-field microscopy. Three independent measurements, each with 10 worms, were made for each pH value.

$Ca^{2+}$ clamping measurements were carried out using CalipHluor$_{Ly}$. Worms were injected with CalipHluor$_{Ly}$ (500 nM) and incubated at 22° C. for 2 hours. After 2 hours, worms were immersed in $Ca^{2+}$ clamping buffer [HEPES (10 mM), MES (10 mM), sodium acetate (10 mM), EGTA (10 mM), KCl (140 mM), NaCl (5 mM) and $MgCl_2$ (1 mM)] by varying amount of free [$Ca^{2+}$] from 1 µM to 10 mM and adjusted to different pH values (5.3-6.5). Three independent measurements, each with 10 worms, were made for $Ca^{2+}$ value.

Early endosome and late endosome pH and free [$Ca^{2+}$] measurements were carried out using CalipHluor, and lysosomal pH and free [$Ca^{2+}$] measurements were carried out using CalipHluor$_{Ly}$. For real time pH and [$Ca^{2+}$] measurements, 10 hermaphrodites were injected with 500 nM of CalipHluor and CalipHluor$_{Ly}$ for EE, LE and Ly respectively and incubated for the indicated time points (5 min EE, 17 min LE, and 60 min Ly). Worms were anaesthetized using 40 mM of sodium azide in M9 solution and imaged on wide field microscopy. Image analysis was carried out using custom MATLAB code as described in image analysis.

Calculating pH corrected [$Ca^{2+}$] in EE, LE and Ly. The D/A and O/R ratios in Ly, LE and EE were measured using CalipHluor$_{Ly}$ and CalipHluor as mentioned above at single endosome resolution. Over 100 endosomes were analyzed in each measurement in worms to generate a Gaussian spread of D/A. Around 5%, endosomes which fell outside the range of Mean±2 S.D (S.D=standard deviation) which was set as a threshold for the measurements in EE, LE and Ly. To get pH corrected [$Ca^{2+}$] values, the pH value in each individual endosome was measured with single endosome resolution from their D/A ratios. pH values in endosomes were calculated using equation (2) which was derived from the in vivo pH calibration curve, $$pH = pH_{1/2} + \left[0.3\ln\left(\left(\frac{K_1 - K_2}{Y - K_2}\right) - 1\right)\right] \quad (2)$$

$K_1$, $K_2$ and $pH_{1/2}$ represent parameters derived from a Boltzmann fit of the in vivo pH calibration curve, and Y represents the D/A ratio in a given endosome.

Next, the $K_d$ of CalipHluor$_{Ly}$ and fold change response in O/R ratios of CalipHluor$_{Ly}$ from low [$Ca^{2+}$] O/R to high [$Ca^{2+}$] were obtained as functions of pH. The in vitro and in vivo $K_d$ were measured at different pH points ranging from 4.5 to 7.2 by fitting $Ca^{2+}$ calibration curves by fitting to the Hill equation (1). From in vitro and in vivo [$Ca^{2+}$] calibration curves, the $K_d$ of CalipHluor$_{Ly}$ was plotted as a function of pH using following equation (3), $$K_d = 1.03 + 5.14 \times 10^{12} \times e^{\left(-\frac{pH}{0.189}\right)} + 3.108 \times 10^6 \times e^{\left(-\frac{pH}{0.412}\right)} \quad (3)$$

By using equation (3), the $K_d$ of CalipHluor$_{Ly}$ can be deduced at any given pH in EE, LE and Ly. O/R, (i.e., O/R ratio at high [$Ca^{2+}$]), was obtained by clamping the worms at 10 mM of free [$Ca^{2+}$] at different pH points. In vitro and in vivo [$Ca^{2+}$] calibration curves showed that CalipHluor$_{Ly}$ retained its fold-change response of O/R from 1 µM to 10 mM at different pH points. O/R$_{min}$ (i.e., O/R ratio at low [$Ca^{2+}$]) values were calculated (4) from fold change response as function of pH and normalized to O/R$_{max}$.

$$O/R_{min} = \frac{1}{4.24 + 0.12 \times \exp(0.5 \times pH)} \quad (4)$$

As mentioned above, the pH in EE, LE and Ly was measured from D/A by using equation (2) at single endosome resolution. pH and O/R, were used to calculate $K_d$ and O/R$_{min}$ from equation (3) and (4). Finally, $K_d$, O/R$_{min}$, O/R and O/R$_{max}$ were substituted in the following equation to get pH corrected free [$Ca^{2+}$] values in endosome by endosome level.

$$\text{Free } [Ca^{2+}] = K_d \times \left[\frac{O/R - O/R_{min}}{O/R_{max} - O/R}\right] \quad (5)$$

Three independent measurements, each with 10 worms, were made for pH and [$Ca^{2+}$] values in EE, LE and Ly.

Image analysis pH corrected [$Ca^{2+}$] images. High resolution images were acquired using confocal microscopy as mentioned in methods section. Images were acquired in four channels (Alexa 488, FRET, Rhod-5F and Alexa 647 channels) to quantify pH and [$Ca^{2+}$] at single endosome resolution. To compensate for the pH component in $Ca^{2+}$ measurements, the $K_d$ of CalipHluor$_{Ly}$ at single endo-lysosomal compartments was calculated based on the $K_d$ calibration plot discussed above. The pH of endo-lysosomes was quantified by measuring the donor/acceptor values calibrated across physiological pH (4.0-6.5). Donor (D) and acceptor (A) images were background subtracted by drawing an ROI outside the worms. Donor (D) image was duplicated and a threshold was set to create a binary mask. Background subtracted donor and acceptor images were then multiplied with the binary mask to get processed donor and acceptor images. This processed donor (D) image was divided by the processed acceptor (A) image to get a pseudocolor D/A image, using Image calculator module of ImageJ. The pH value was calculated by using the equation (2) formulated from in vivo and in vitro pH calibration plot.

The pseudo colored pH image was processed to get a $K_d$ image as shown in FIG. 3. $K_d$ of CalipHluor$_{Ly}$ is a function of pH and this relation is formulated by the $K_d$ calibration plot in vivo and in vitro using equation (3). For image processing of pH image to $K_d$ image, background was set to a non-zero value. The $K_d$ image represents the affinity of CalipHluor$_{Ly}$ for calcium and thus compensating the calcium image (O/R) with $K_d$ would precisely represent the calcium levels at single endo-lysosomes. The pH dependent $K_d$ compensation is performed according to equation (5), where $O/R_{max}$ and $O/R_{min}$ are calculated by incubating CalipHluor coated beads at 10 mM and 1 µM respectively. Image calculation were done using image calculator module in ImageJ. This image is multiplied with binary image to bring the background value to zero. The pH corrected $K_d$ image were obtained for various mutants for accurate comparison of calcium levels in lysosomes.

Survival assay. +/mT1 II; cup-5(ok1698)/mT1 [dpy-10 (e128)] III nematode strain was used for this assay. Homozygous lethal deletion of cup-5 gene is balanced by dpy-10-marked translocation. Heterozygotes are superficially wildtype [cup5+/−], Dpys (mT1 homozygotes) are sterile, and cup-5(ok1698) homozygotes are lethal. cup5+/−L4 worms were placed on plates containing RNAi bacterial strains for L4440 empty vector (positive control), mrp-4, catp-6, catp-5 and clh-6. These worms were allowed to grow for 24 hours and lay eggs after which the adult worms were removed from the plates. The eggs were allowed to hatch and grow to adult for 3 days. The worm plates were then imaged under Olympus SZX-Zb12 Research Stereomicroscope (Olympus Corporation of the Americas, Center Valley, PA) with a Zeiss Axiocam color CCD camera (Carl Zeiss Microscopy, Thornwood, NY). The images were analyzed using ImageJ software to count the number of adult worms per plate. Three independent plates were used for each RNAi background.

Lysosomal size recovery assay. arls37 [myo-3p::ssGFP+ dpy-20(+)] I. cup-5(ar465) is transgenic nematode strain which secretes GFP from the body muscle cells and this is endocytosed by coelomocytes which show enlarged GFP labelled vesicles as a result of defective degradation caused by cup 5 mutation. Similar to the previous assay, arls37; cup-5(ar465) L4 worms were placed on plates containing RNAi bacterial strains for empty vector (control), catp-6, catp-5 and mrp-4 (positive control). The worms lay eggs for 24 hours after which they are removed from the plates. The eggs thus hatch and grow to adulthood after which they were imaged to check for lysosomal size differences. Worms were imaged on a Leica TCS SP5 II STED laser scanning confocal microscope (Leica Microsystems, Inc., Buffalo Grove, IL) equipped with 63×, 1.4 NA, oil immersion objective upon excitation with Argon laser in the Alexa 488 channel. Lysosomal areas were measured using ImageJ. Out 100 lysosomes in arls37 worms, 7 lysosomes had an area in range of 7.0-9.5 µm². Enlarged lysosomes are defined as those lysosomes whose diameter is ≥33% of the diameter of the largest lysosome observed in normal N2 worms. The lysosomal area in arls37; cup-5(ar465) worms were measured in various RNAi bacteria containing plates. Lysosomal size recovery data was plotted as percentage of area occupied by large lysosomes to the total lysosomal area (n=15 cells, >100 lysosomes).

Bead calibration of CallpHluor$^{mLy}$. Bead calibration was performed using CallpHluor$^{mLy}$ coated 0.6 µm Monodisperse Silica Microspheres (Cospheric, USA). Briefly, silica microspheres were incubated in a solution of 5 µM CalipHluor$^{mLy}$ in 20 mM Sodium Acetate buffer (pH=5.1) and 500 mM NaCl for 1 h. This binding solution was spun down and the beads were reconstituted in clamping buffer [HEPES (10 mM), MES (10 mM), sodium acetate (10 mM), EGTA (10 mM), KCl (140 mM), NaCl (500 mM) and MgCl$_2$ (1 mM)]. The amount of [Ca$^{2+}$] was varied from about 0mM to 10 mM and adjusted the pH to either pH 4.6 or pH 5.1. The beads were incubated in clamping buffer for 30 mins after which there were imaged on a slide on the IX83 inverted microscope in the G, O and R channels to obtain G/R (pH) and O/R (Ca$^{2+}$) images.

Competition experiments in cells. HDF cells were washed with 1×PBS buffer pH 7.4 prior to labeling. Cells were incubated with 10 µM of maleylated BSA (mBSA) or BSA for 15 minutes and pulsed with media containing 500 nM CallpHluor$^{mLy}$ and 10 µM of mBSA or BSA for 1 hour to allow internalization by receptor mediated endocytosis, washed 3 times with 1×PBS and then imaged under a wide-field microscope. Whole cell intensities in the Alexa 647 channel was quantified for >30 cells per dish. The mean intensity from three different experiments were normalized with respect to the autofluorescence and presented as the fraction internalized.

Example 1

Preparation of Ca$^{2+}$ Fluorophore

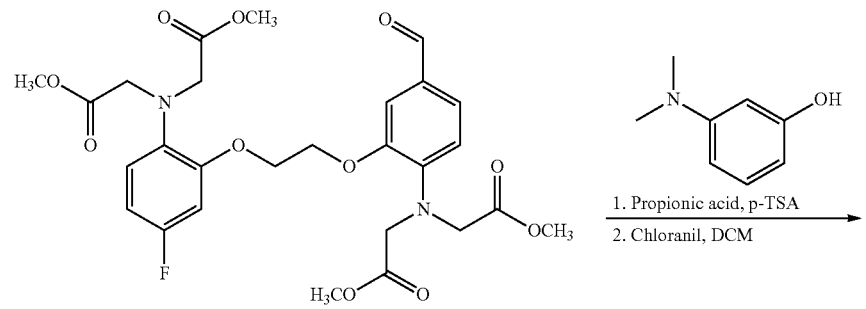

-continued

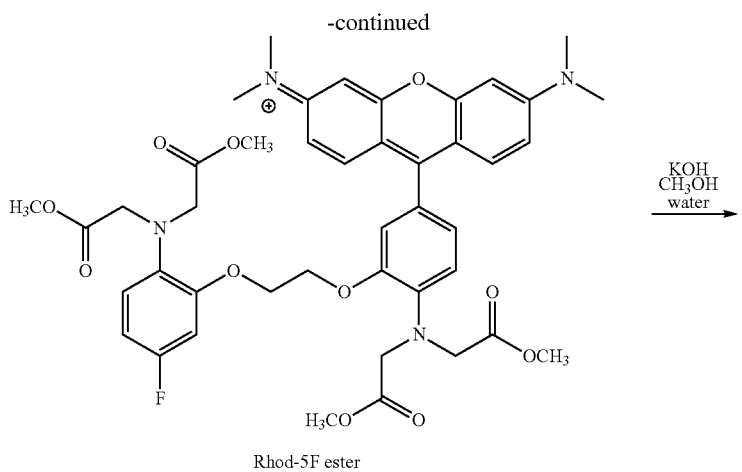

Rhod-5F ester

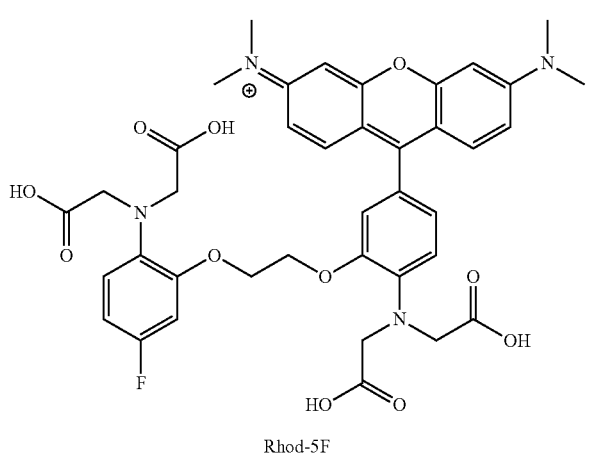

Rhod-5F

BAPTA-5F aldehyde (1) was synthesized according to previous reported procedure (Grynkiewicz et al. (1985) *J. Biol. Chem.* 260:3440-3450; Collot et al. (2015) eLife 4: e05808). $POCl_3$ (1.12 g, 7.3 mmol) was added to DMF (5 mL) at 0° C. and allowed to stir for 10 minutes. After 10 minutes, BAPTA-5F (1.6 g, 2.9 mmol) in DMF (3 mL) was added to above solution and heated to 65° C. After completion of the reaction, reaction mixture was poured in water and pH adjusted to 6.0 by adding aqueous. NaOH (1M) solution. Product was extracted with ethylacetate (3×50 mL) and solvent was evaporated. Crude product was purified by column chromatography on silica gel using hexane/EtOAc (70/30 to 60/40) as an eluent to obtain BAPTA-5F aldehyde (1) in 65% yield. $^1$H-NMR (500 MHz, $CDCl_3$) $\delta_{ppm}$ 9.80 (s, 1H), 7.30-7.45 (m, 2H), 6.83 (t, 1H, J=7 Hz), 6.76 (d, 1H, J=8 Hz), 6.59 (t, 2H, J=8 Hz), 4.40 (t, 2H, J=7.0 Hz), 4.35 (t, 2H, J=7.5 Hz), 4.33 (s, 4H), 4.22 (s, 4H), 3.59 (s, 6H), 3.57 (s, 6H). $^{13}$C-NMR (125 MHz, $CDCl_3$) $\delta_{ppm}$ 190.5, 171.8, 171.2, 159.4, 157.5, 151.4, 151.3, 149.6, 145.1, 135.6, 135.5, 130.0, 126.9, 120.3, 120.2, 116.6, 110.8, 107.3, 107.1, 101.3, 101.1, 67.1, 67.0, 53.5, 53.4, 51.9, 51.7. HRMS (ESI) m/z: $[M]^+$ calcd for $C_{27}H_{31}FN_2O_{11}{}^+$ 578.1912, found: 578.1927.

To a solution of BAPTA-5F aldehyde (1) (50 mg, 0.086 mmol) in propionic acid (4 mL), 3-(dimethylamino) phenol (26 mg, 0.19 mmol) and p-Toluenesulfonic acid (p-TSA) (1.5 mg, 0.009 mmol) were added and allowed to stir at room temperature for 12 hours. After 12 hours, Chloranil (21 mg, 0.086 mmol) in dichloromethane (3 mL) was added to above reaction mixture and allowed to stir at room temperature overnight. After completion of the reaction, the crude product was extracted with dichloromethane (3×30 mL). The crude product was then purified by column chromatography on silica gel using dichloromethane/methanol (95/5 to 90/10%) as an eluent to obtain Rhod-5F ester as a dark red solid in 35% yield. LCMS (ESI) m/z: $[M]^+$ calculated for $C_{43}H_{48}FN_4O_{11}{}^+$ 815.3298, found: 815.5. Rhod-5F ester (5 mg, 0.006 mmol) was dissolved in methanol and water mixture (1:0.5 mL), to which KOH (3.5 mg, 0.063 mmol) was added and allowed to stir for 8 hours at room temperature. After completion of the reaction, solution pH was adjusted to 6.0 and crude Rhod-5F was extracted with dichloromethane (3×5 mL). Product was purified by HPLC (50:50 acetonitrile/water, 0.1% TFA) to obtained Rhod-5F. LCMS (ESI) m/z: $[M]^+$ calculated for $C_{39}H_{40}FN_4O_{11}{}^+$ 759.2672, found: 759.4.

Example 2

Preparation of Crosslinking-Ready Ca²⁺ Fluorophore

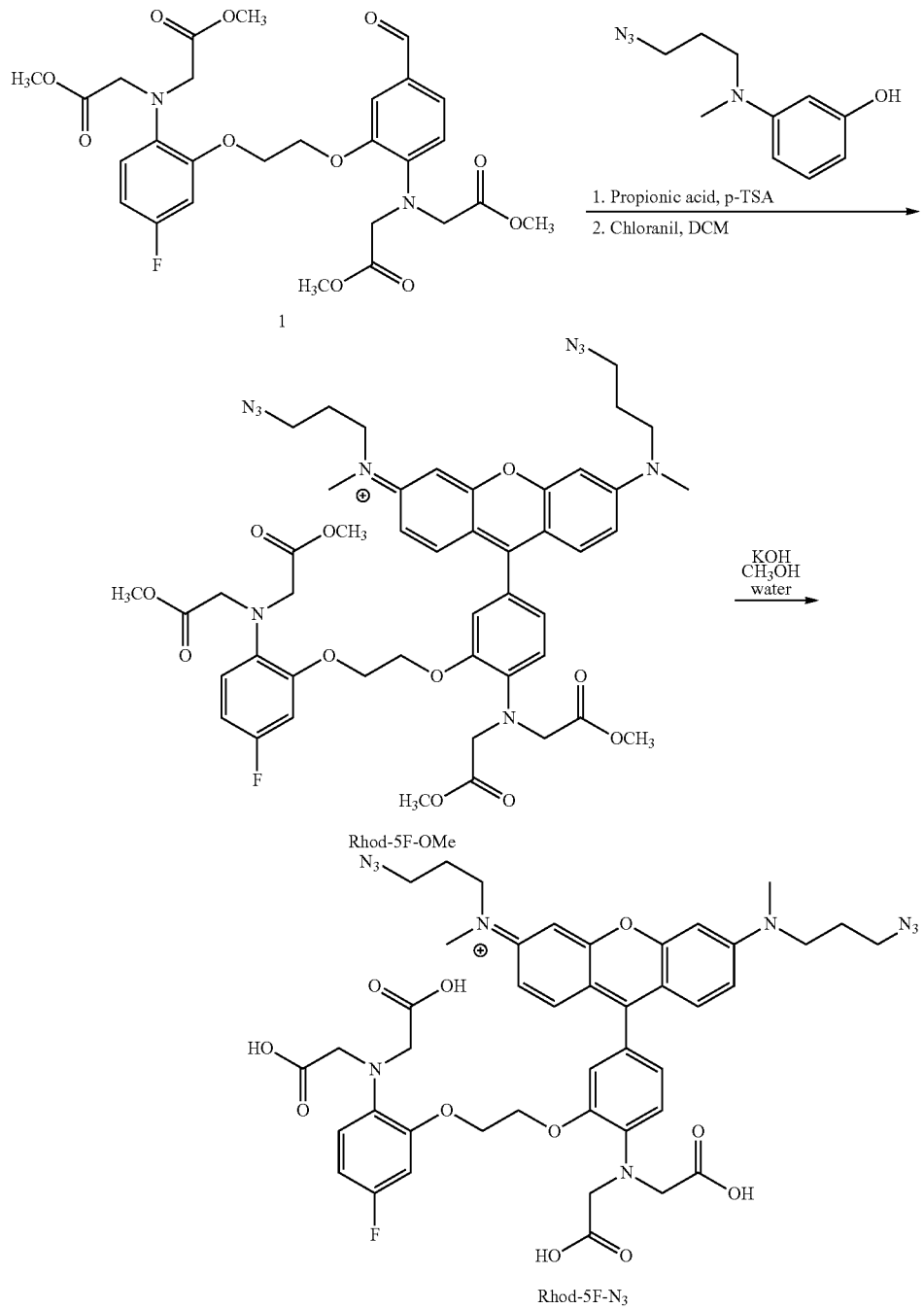

To a solution of 1-bromo-3-chloropropane (1 g, 6.4 mmol) in DMSO (8 mL), sodium azide (0.5 g, 7.7 mmol) was added and allowed to stir at room temperature for 12 hours. After completion of the reaction, the mixture was diluted with water and the product was extracted with hexane to obtain 1-azido-3-chloropropane. Sodium iodide (1.5 g, 10 mmol) was then added to a solution of 1-azido-3-chloropropane (1 g, 8.4 mmol) in acetone (25 mL) and allowed to stir at room temperature for 8 hours. After completion of the reaction, the solvent was evaporated under vacuum. The crude product was diluted with a saturated solution of $Na_2S_2O_3$ to quench the unreacted iodine followed by extraction of the compound with ethyl acetate (3×50 mL). This was dried over $Na_2SO_4$ and the product 1-azido-3-iodopropane was used for further reactions without purification.

To a solution of 3-aminophenol (1 g, 9.2 mmol) in acetone (30 mL), potassium carbonate (2.5 g, 18.4 mmol) was added and allowed to stir at room temperature for 20 min. After 20 minutes, iodomethane (1.3 g, 9.2 mmol) was added and the mixture was further stirred for 8 hours at room temperature. After completion of reaction, the solvent was evaporated and the crude product was extracted with dichloromethane (3×30 mL). This was followed by purification of the crude product by column chromatography on silica gel using hexane/ethyl acetate (80/20%) as an eluent to obtained 3-(methylamino) phenol in 45% yield.

To a solution of 3-(methylamino) phenol (1 g, 8.1 mmol) in DMF (8 mL), N,N-diisopropylethylamine (1.26 g, 9.7 mmol) was added and stirred for 20 minutes at room temperature. After 20 minutes, 1-azido-3-iodopropane (1.7 g, 8.1 mmol) was added to above reaction mixture and heated at 65° C. for 8 hours. After completion of the reaction, the solvent was evaporated and the crude product was extracted with diethylether (3×40 mL). Then, the crude product was purified by column chromatography on silica gel using hexane/ethyl acetate (90/10%) as an eluent to obtained 3-((3-azidopropyl)(methyl)amino)phenol liquid in 72% yield. $^1$H-NMR (500 MHz, CDCl$_3$) $\delta_{ppm}$ 7.09-7.13 (m, 1H), 6.3 (d, 1H, J=7.5 Hz), 6.21 (dd, 2H, J=2 Hz, 8.5 Hz), 3.42 (t, 2H, J=6.5 Hz), 3.38 (t, 2H, J=7 Hz), 2.94 (s, 3H), 1.87 (t, 2H, J=6.5 Hz). $^{13}$C-NMR (125 MHz, CDCl$_3$) $\delta_{ppm}$ 156.7, 150.7, 130.2, 105.1, 103.5, 99.3, 49.8, 49.2, 38.6, 26.3. HRMS (ESI) m/z: [M]$^+$ calculated for $C_{10}H_{14}N_4O^+$ 206.1168, found:206.1177.

To a solution of BAPTA-5F aldehyde (1) (50 mg, 0.086 mmol) in propionic acid (4 mL), 3-((3-azidopropyl)(methyl) amino)phenol (40 mg, 0.19 mmol) and p-Toluenesulfonic acid (p-TSA) (1.5 mg, 0.009 mmol) were added and allowed to stir at room temperature for 12 hours. After 12 hours, Chloranil (21 mg, 0.086 mmol) in dichloromethane (3 mL) was added to above reaction mixture and allowed to stir at room temperature overnight. After completion of the reaction, the solvent was evaporated and the crude product was extracted with dichloromethane (3×20 mL). The crude product was then purified by column chromatography on silica gel using dichloromethane/methanol (95/5 to 90/10%) as an eluent to obtain Rhod-5F-OMe as a dark red solid in 30% yield. $^1$H-NMR (500 MHz, DMSO-d$_6$) $\delta_{ppm}$ 7.55 (d, 2H, J=8 Hz), 7.15-7.16 (m, 3H), 7.00-7.04 (m, 3H), 6.88 (dd, 2H, J=3 Hz, 9 Hz), 6.75 (dd, 1H, J=6 Hz, 9 Hz), 6.65 (td, 1H, J=3 Hz, 6 Hz), 4.20-4.30 (m, 8H), 4.02 (s, 4H), 3.71 (t, 4H, J=7 Hz), 3.53 (s, 6H), 3.47 (s, 10H), 3.25 (s, 6H), 1.88 (q, 4H, J=7 Hz). $^{13}$C-NMR (125 MHz, DMSO-d$_6$) $\delta_{pp}$ 171.2, 171.1, 158.3, 157.3, 156.4, 156.1, 140.7, 135.2, 135.1, 131.9, 123.6, 123.1, 119.1, 116.8, 114.9, 114.4, 106.4, 106.2, 101.2, 101.0, 96.4, 67.3, 67.2, 54.9, 53.2, 53.0, 51.5, 51.2, 49.7, 48.6, 48.1, 26.0, 22.1. HRMS (ESI) m/z: [M]$^+$ calculated for $C_{47}H_{54}FN_{10}O_{11}^+$ 953.3952, found: 953.3967.

Rhod-5F-OMe (5 mg, 0.005 mmol) was dissolved in methanol and water mixture (1:0.5 mL) and KOH (3.5 mg, 0.063 mmol) was added and allowed to stir for 8 hours at room temperature. After completion of the reaction, pH was adjusted to 6.0 and crude Rhod-5F-N$_3$ was extracted with dichloromethane (3×5 mL). Product was purified by HPLC (1:1 acetonitrile: water, 0.1% TFA). LCMS (ESI) m/z: [M]$^+$ calculated for $C_{43}H_{46}FN_{10}O_{11}^+$ 897.33, found: 897.5.

Example 3

Preparation of Ca$^{2+}$ Fluorophore Conjugate

Rhod-5F-N$_3$ (25 µM) was added to 5 µM of dibenzocyclooctyne (DBCO) labelled single-stranded nucleic acid molecule in 100 µL of sodium phosphate (10 mM) buffer containing KCl (100 mM) at pH 7.0 and allowed to stir overnight at room temperature. After completion of the reaction, 10 µL of 3 M sodium acetate (pH 5.5) and 250 µL of ethanol were added to reaction mixture and kept overnight at −20° C. for DNA precipitation. Then, the reaction mixture was centrifuged at 14000 rpm at 4° C. for 20 minutes to remove the unreacted Rhod-5F-N$_3$ and the precipitate was re-suspended in ethanol and centrifuged. This procedure was repeated 3 times for complete removal of unreacted Rhod-5F-N$_3$. Rhod-5F conjugation was confirmed by gel electrophoresis by running a native polyacrylamide gel containing 15% (19:1 acrylamide:bis-acrylaimde) in 1×TBE buffer (Tris HCl (100 mM), boric acid (89 mM), EDTA (2 mM), pH 8.3).

Example 4

Preparation of Nucleic Acid Complexes of the Disclosure

Sequences used to form CalipHluor, CalipHluor$_{Ly}$ and CallpHluor$^{mLy}$ are provided in Table 1. D1 and D2 were used to form CalipHluor$_{Ly}$; OG-D1 and D2 were used to form CallpHluor$^{mLy}$. Bromo cytosines in D1 are bold and underlined. O1-A488, O2-A647 and O3 strands were used to form CalipHluor.

Rhod-5F was first conjugated to D2 strand or O3-DBCO strand as provided in Example 3. To prepare a CalipHluor$_{Ly}$ and CallpHluor$^{mLy}$ sample, 5 µM of D1 or OG-D1 and 5 µM of Rhod-5F conjugated D2 strands were mixed in equimolar ratios in 10 mM sodium phosphate buffer (pH 7.2) containing 100 mM of KCl. The solution was heated to 90° C. for 15 minutes, cooled to room temperature at 5° C. per 15 minutes and kept at 4° C. for overnight (Modi et al. (2009) *Nat. Nanotechnol.* 4:325-330). For CalipHluor, 5 µM of O1-A488, 5 µM of O2-A647 and 5 µM of Rhod-5F conjugated O3 strands were mixed in equimolar ratios in 10 mM sodium phosphate buffer at pH 5.5 containing 100 mM of KCl. Solution was heated to 90° C. for 15 minutes, then cooled to room temperature at 3° C. per 15 minutes and kept at 4 C for overnight.

TABLE 1

| Strand | Sequence information (SEQ ID NO.) |
|---|---|
| D1 | 5'-Alexa 488-CCC CTA ACC CCT AAC CCC TAA CCC CAT ATA TAT CCT AGA ACG ACA GAC AAA CAG TGA GTC-3' (SEQ ID NO: 01) |
| D2 | 5'-DBCO-GAC TCA CTG TTT GTC TGT CGT TCT AGG ATA/iAlexa 647N/AT ATT TTG TTA TGT GTT ATG TGT TAT-3' (SEQ ID NO: 02) |
| O1-A488 | 5'-Alexa-488-CCCCAACCCC AATACATTTTACGCCTGGTGC C-3' (SEQ ID NO: 03) |
| O2-A647 | 5'-CCGACCGCAGGATCCTATAA AACCCCAACCCC-Alexa 647-3' (SEQ ID NO: 04) |

TABLE 1-continued

| Strand | Sequence information (SEQ ID NO.) |
|---|---|
| O3-DBCO | 5'-TTA TAG GAT CCT GCG GTC GG/iDBCON/ GGC ACC AGG CGT AAA ATG TA-3' (SEQ ID NO: 05) |
| OG-D1 | 5'-Oregon Green-AT AAC ACA TAA CAC ATAACAAAA TAT ATA TCC TAG AAC GAC AGA CAA ACA GTG AGT C-3' (SEQ ID NO: 06) |

The formation of CalipHluor$_{Ly}$ and CalipHluor were validated by electrophoretic mobility assay, using Native and Denaturing polyacrylamide gel electrophoresis (PAGE). Copper free click reaction of Rhod-5F-N3 to DBCO labeled strand (D2 strand for CalipHluor$_{Ly}$ and O3-DBCO strand for CalipHluor) was validated by 15% denaturing PAGE run in 1×TBE, at 120 V for 3 h. The slower mobility of Rhod-5F conjugated strand, due to addition of 1 KDa (Rhod-5F) to 10 KDa (DBCO-strand). Rhod-5F conjugation was further confirmed by recording the gel in TMR channel, where the lower mobility band shows strong fluorescence. Rhod-5F labeled strand was purified and hybridized with normalizing and pH sensing module as described in methods section. 12% Native PAGE was run to characterize the formation of complete sensor. 12% Acrylamide:bisacrylamide resolves duplex DNA from ssDNA. Slower mobility of CalipHluor$_{Ly}$ and CalipHluor owing to higher molecular weight validates the formation, at very high yield (>99%). This further confirmed with slower mobility band, shows fluorescence at Alexa 488, TMR (Rhod-5F) and Alexa647 channel.

Example 5

In Vitro Characterization of Nucleic Acid Complexes of the Disclosure

Figure 6A:
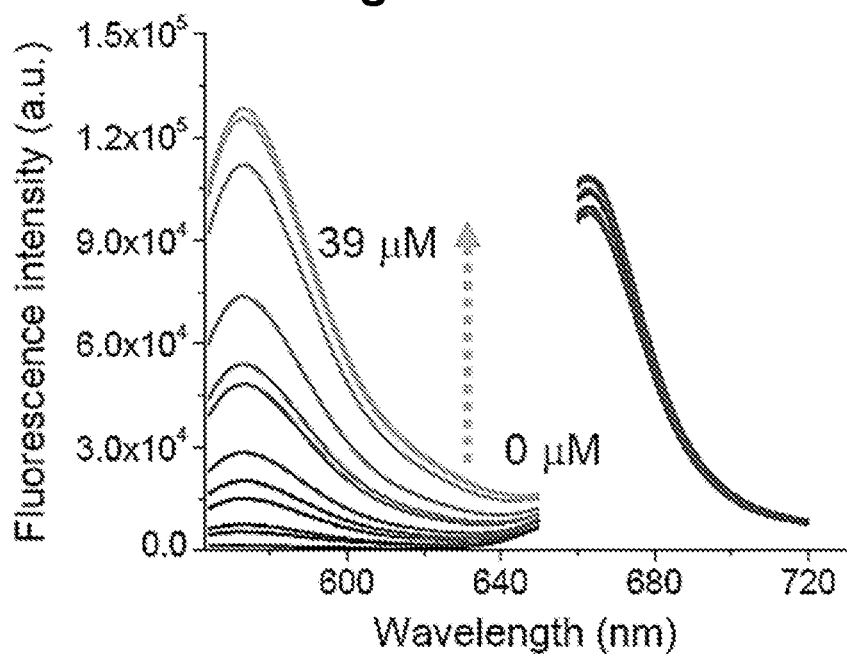
FIG. 6A illustrates fluorescence emission spectra of Rhod-5F (left) and Alexa 647 (right) with increasing [Ca$^{2+}$] upon exciting Rhod-5F and Alexa647 at 560 nm and 650 nm respectively.
Figure 6B:
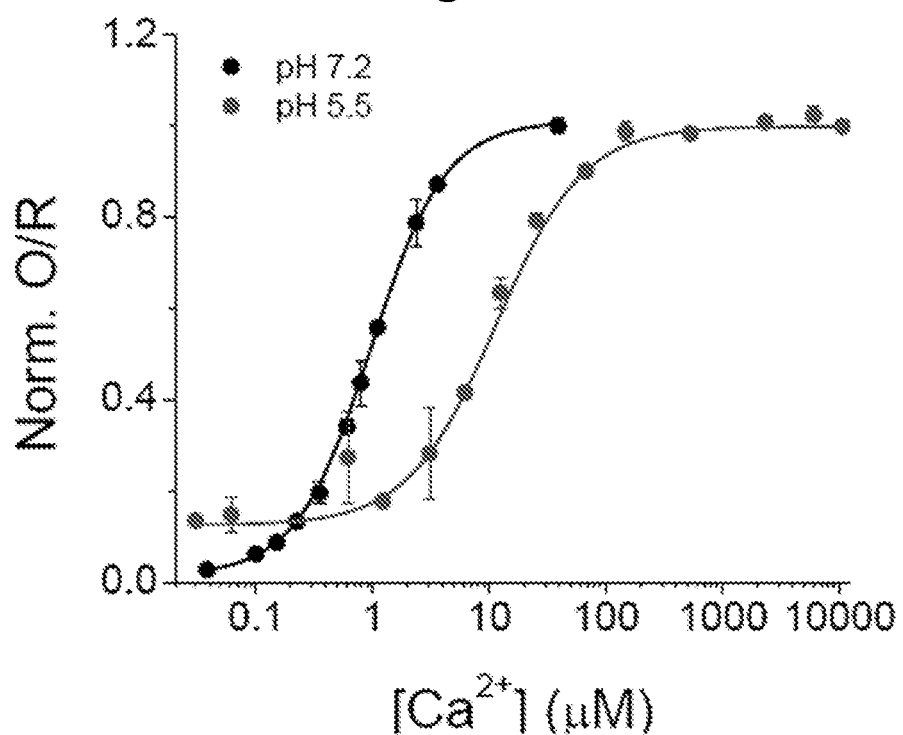
FIG. 6B illustrates normalized O/R ratio of Rhod-5F/Alexa 647 with increasing [Ca$^+$] at pH 7.2 and 5.5. Error bar represents±S.E.M of three independent experiments.

CalipHluor$_{Ly}$ is a 57-base pair DNA duplex comprising two strands D1 and D2 and bears three distinct domains (FIG. 1A, Table 1). The first domain in CalipHluor$_{Ly}$ is a $Ca^{2+}$-reporter domain that uses a novel small molecule that functions as a $Ca^{2+}$ indicator denoted Rhod-5F. Rhod-5F consists of a BAPTA core, a rhodamine fluorophore ($\lambda_{ex}$=560 nm; $\lambda_{em}$=580 nm) and an azide linker. In the absence of $Ca^{2+}$, the rhodamine fluorophore in Rhod-5F is quenched by photoinduced electron transfer (PeT) from the BAPTA core. Upon $Ca^{2+}$ chelation quenching is relieved resulting in high fluorescence. Note that protonation of the amines in BAPTA also relieves PeT. Thus, the percentage change in signal as well as the dissociation constant ($K_d$) in Rhod-5F will be affected as a function of pH. The $K_d$ of Rhod-5F for $Ca^{2+}$ binding is pH dependent and shown in FIG. 6.

Figure 1B:
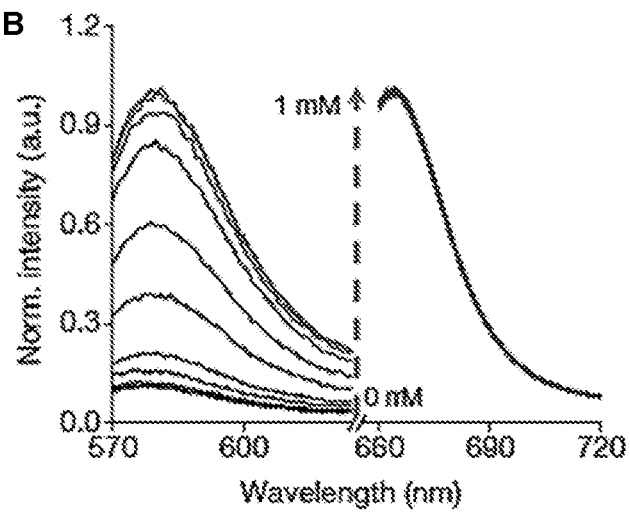
Figure 7A:
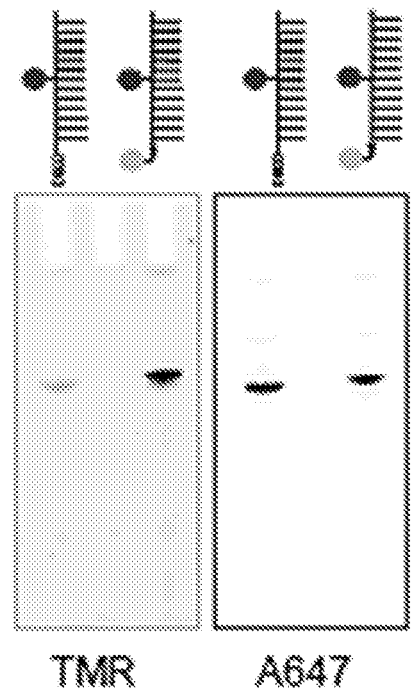
FIGS. 7A-7G illustrate characterization of nucleic acid complexes according to certain embodiments of the disclosure, CalipHluorLy and CalipHluor.
Figure 7B:
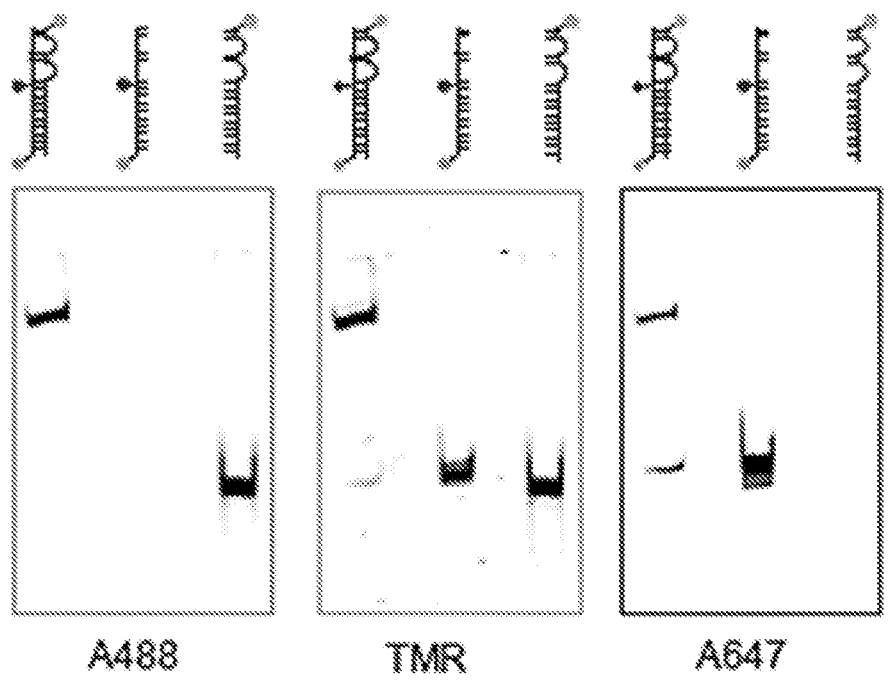

Rhod-5F is attached to the D2 strand bearing a dibenzocyclooctyne (DBCO) group using click chemistry. Conjugation to D2 did not change the $K_d$ of Rhod-5F in CalipHluor$_{Ly}$ (FIG. 1B). In CalipHluor$_{Ly}$ Rhod-5F (O, orange diamond) shows a $K_d$ of 1.1 µM at pH 7.2 which increases as acidity increases (FIG. 1B). CalipHluor$_{Ly}$ was characterized by gel electrophoresis (FIG. 7A-7B).

For ratiometric quantification of $Ca^{2+}$ Alexa 647 was incorporated as a reference dye ($\lambda_{ex}$=630 nm; $\lambda_{em}$=665 nm) on CalipHluor$_{Ly}$ positioned so that it does not FRET with Rhod-5F. Alexa 647 was chosen for its negligible spectral overlap with Rhod-5F and insensitivity to pH, $Ca^{2+}$ and other ions (sphere, FIG. 1A). The fixed stoichiometry of Alexa 647 efficiently corrects for Rhod-5F intensity changes due to inhomogeneous probe distribution in cells, thus making the ratio of Rhod-5F (O) and Alexa 647 (R) intensities in CalipHluor probes proportional to pH and $Ca^{2+}$. The second domain (gray line) constitutes a DNA based pH-reporter domain as previously described, called the I-switch (FIG. 1A). This I-switch has been used to map pH in diverse endocytic organelles in living cells.

Figure 7C:
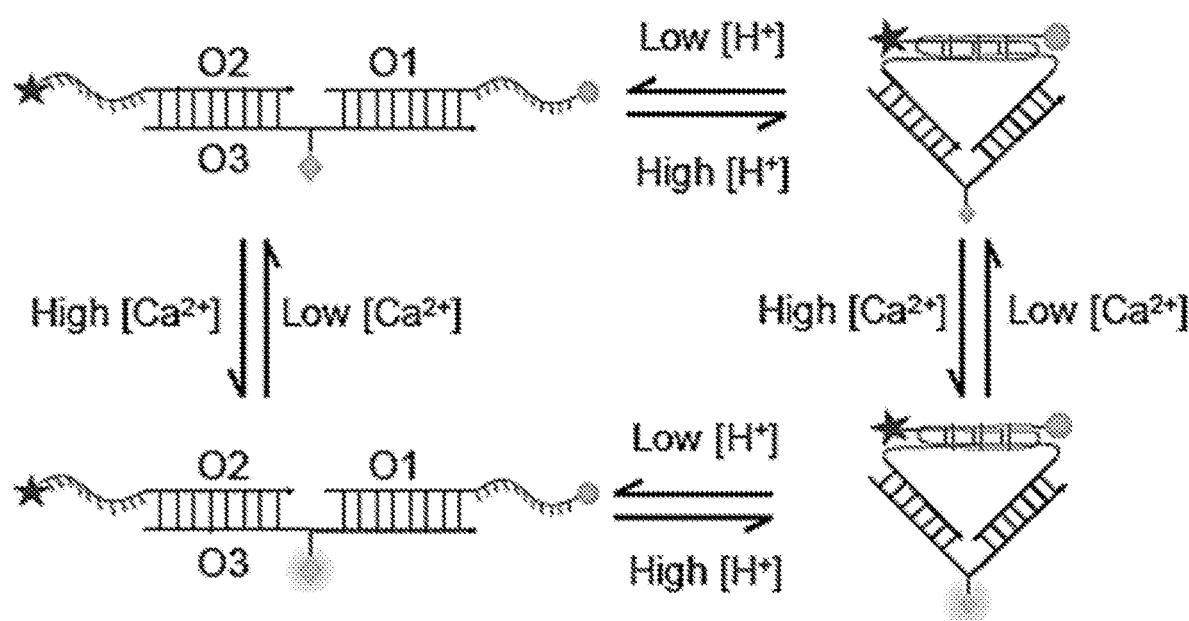
Figure 7D:
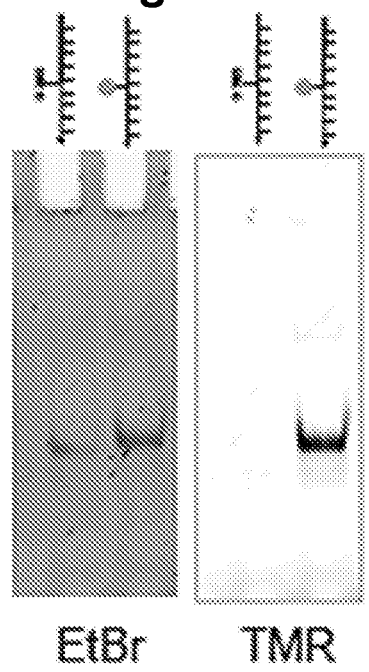
Figure 7E:
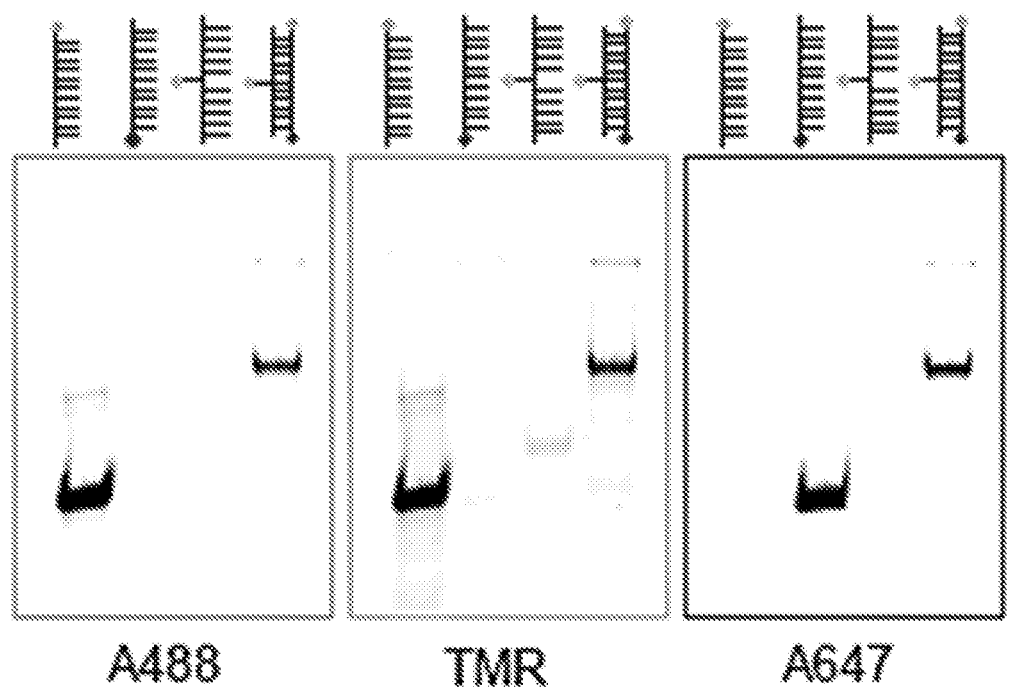
Figure 7F:
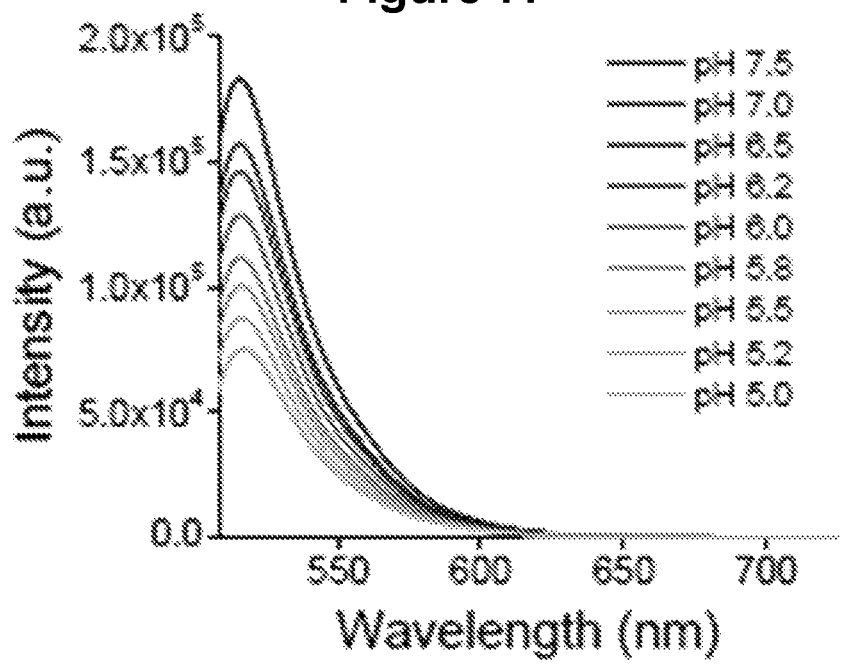
Figure 7G:
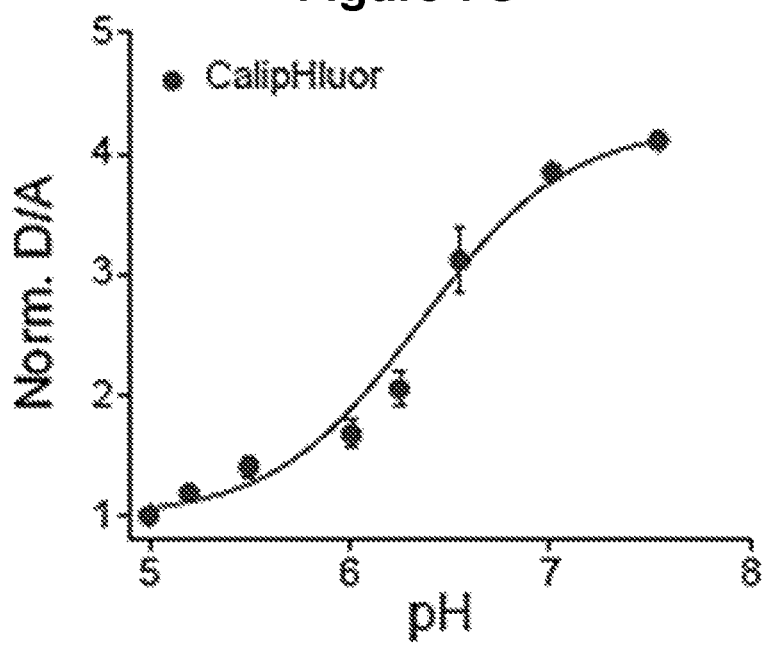

To map pH in early and late endosomes CalipHluor, a variant suited to the lower acidities in these organelles, is used. CalipHluor is comprises three strands O1, O2, and O3 (FIG. 7C; Table 1). CalipHluor were characterized by gel electrophoresis (FIG. 7D-7E). The third 'integration' domain comprises a 30-mer duplex that integrates the pH and the $Ca^{2+}$ reporter domains into a single DNA assembly. One end is fused to the I-switch and the other is fused to the $Ca^{2+}$ sensor. This domain also helps in targeting, because its anionic nature aids recognition and trafficking by scavenger receptors in a DNA sequence independent manner (Surana et al. (2011) Nat. Commun. 2:340).

Figure 1C:
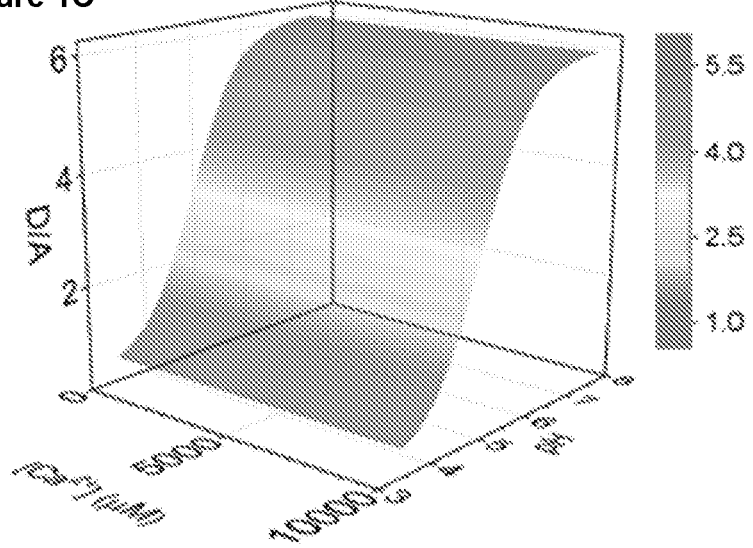

The response characteristics of CalipHluor and CalipHluor$_{Ly}$ were investigated as a function of pH as well as $Ca^{2+}$ and their pH and $Ca^{2+}$ sensitive regimes were determined (FIG. 1C-1D and FIG. 7F-7G). A 3D surface plot of D/A as a function of pH and different values of free [$Ca^{2+}$] is shown in FIG. 1C. These revealed that the pH reporting capabilities of CalipHluor and CalipHluor$_{Ly}$ are between pH 5.0-7.0 and pH 4.0-6.5 with fold changes in D/A ratios of 4.0 and 5.5, respectively (FIG. 1C). The fold changes in D/A ratios were invariant over a range of free $Ca^{2+}$ concentrations from 20 nM-10 mM showing that pH sensing by these probes is unaffected by $Ca^{2+}$ levels (FIG. 1C).

Figure 1D:
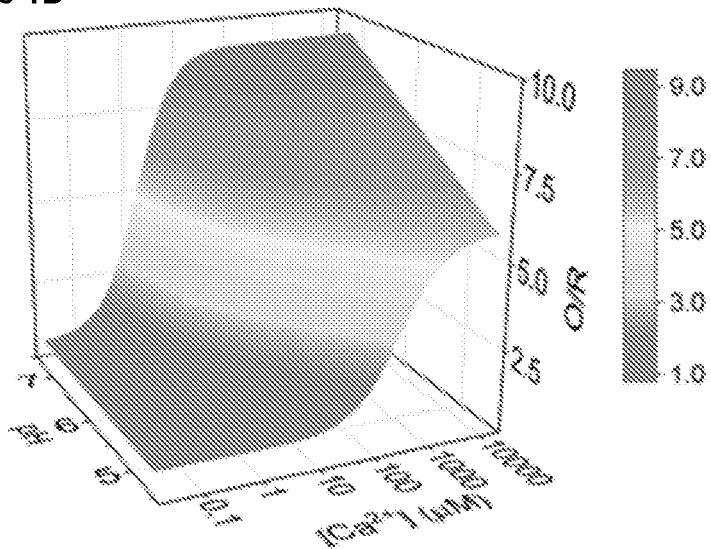

In parallel, the intensities of Rhod-5F (O) and Alexa647 (R) in CalipHluor$_{Ly}$ obtained from direct excitation yielded O/R values. An analogous 3D surface plot of O/R values as a function of [$Ca^{2+}$] and pH showed a sigmoidal increase as a function of $Ca^{2+}$ with a about 9 fold change in O/R at pH 7.2 (FIG. 1D). At lysosomal pH in C. elegans, i.e., pH 5.5, CalipHluor$_{Ly}$ showed a $K_d$ of 7.2 µM. As expected, the percentage signal change upon chelating $Ca^{2+}$ also decreases as acidity increases (FIG. 1D).

Example 6

In Vivo Performance of Nucleic Acid Complexes of the Disclosure

Figure 2A:
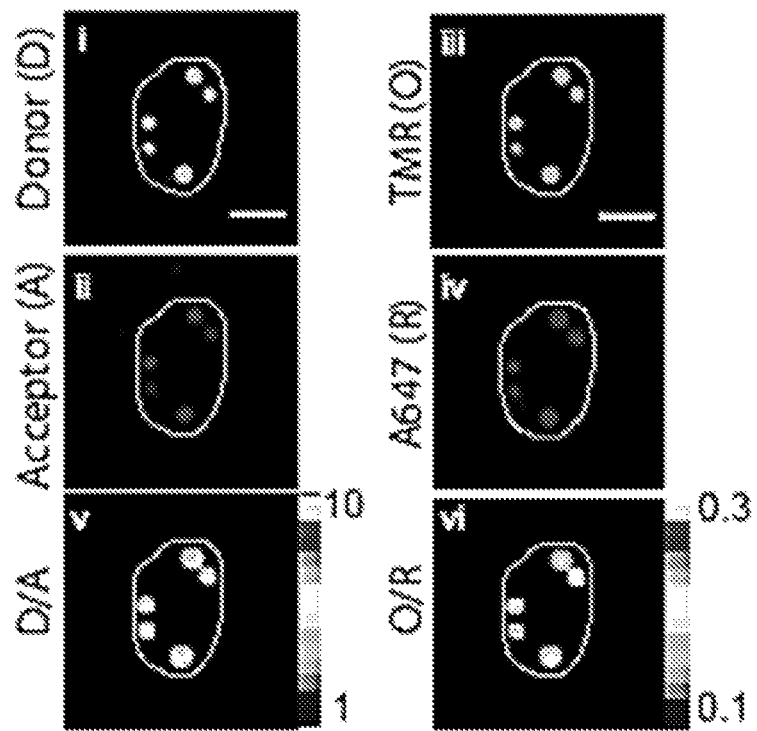
FIGS. 2A-2J illustrate in vivo sensing characteristics of a nucleic acid complex according to one embodiment of the disclosure, CalipHluor$_{Ly}$.

The in vivo reporter characteristics of CalipHluor$_{Ly}$ were investigated as a function of lumenal pH and [$Ca^{2+}$]. When DNA-based reporters are injected into the pseudocoelom in C. elegans they are specifically uptaken by coelomocytes through the scavenger receptors mediated endocytosis and thereby label organelles on the endolysosomal pathway. After labeling endocytic organelles with CalipHluor$_{Ly}$ thus, lumenal pH and [$Ca^{2+}$] of coelomocytes were clamped. This was achieved by incubating worms in clamping buffers of fixed pH and [$Ca^{2+}$] containing nigericin, monensin, ionomycin and EGTA at high [$K^+$] which clamped the endosomal ionic milieu to that of the surrounding buffer. Post-clamping, the worms were then imaged in four channels; (i) the donor channel (D or Alexa 488) (ii) the FRET acceptor channel (A), which corresponds to the intensity image of A647 fluorescence upon exciting A488, (iii) the orange channel (O or Rhod-5F), and (iv) the red channel (R) which corresponds to the intensity image of A647 fluorescence upon directly exciting Alexa 647. FIG. 2A (i-iv) shows representative images of a CalipHluor$_{Ly}$ labeled coelomocyte imaged in the four channels.

Figure 2B:
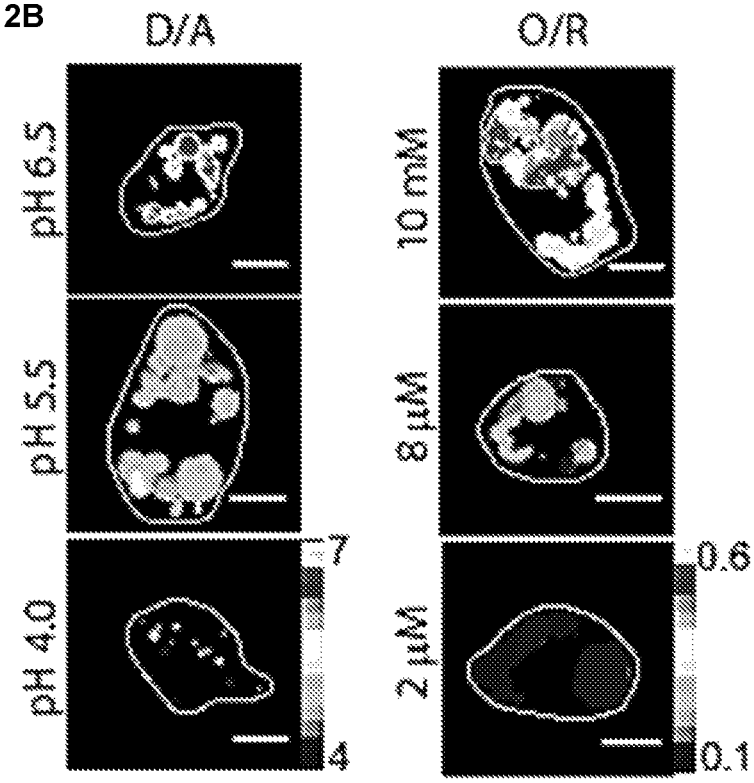
Figure 2C:
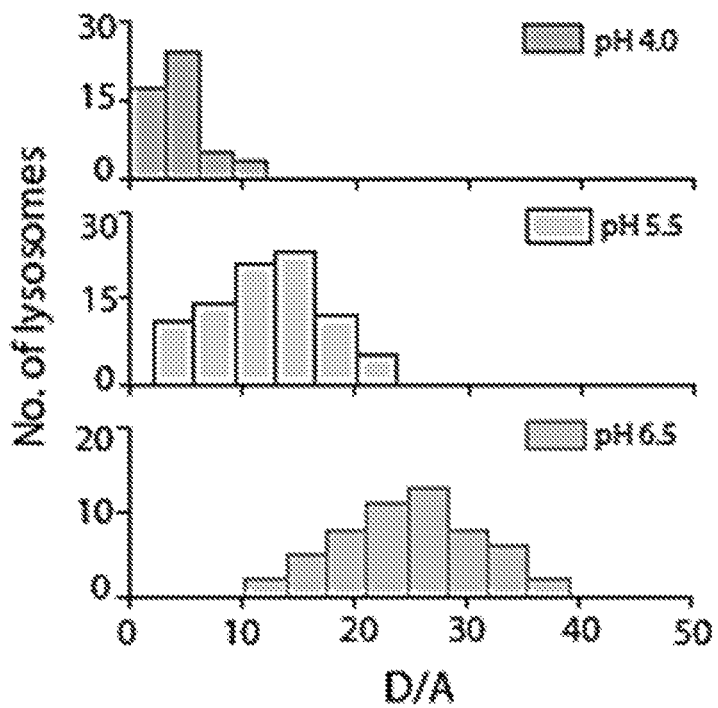
Figure 2D:
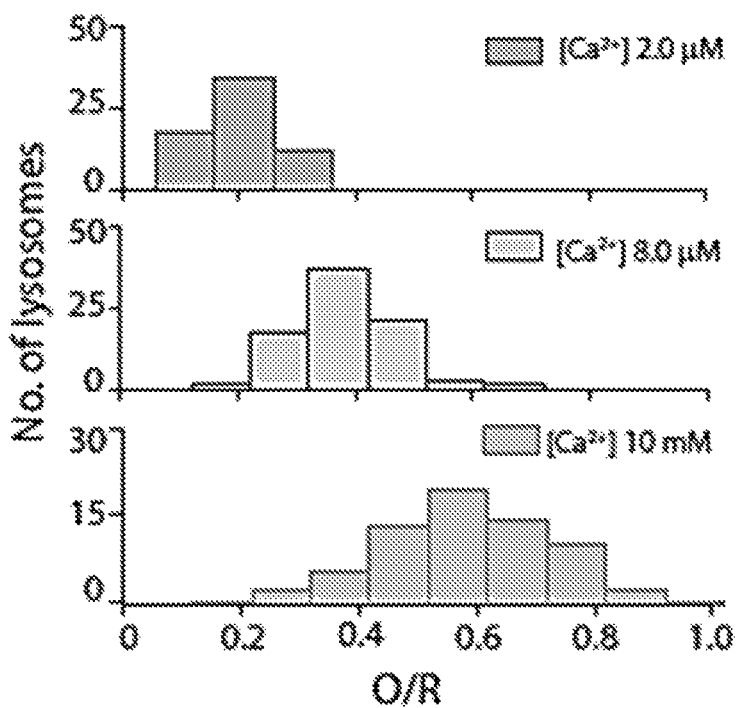
Figure 2E:
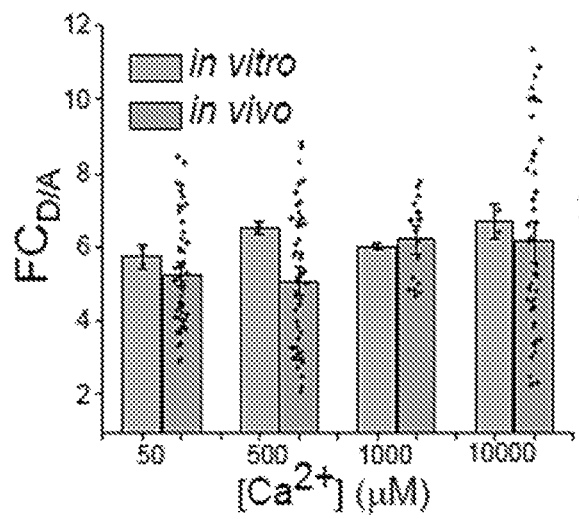
Figure 2F:
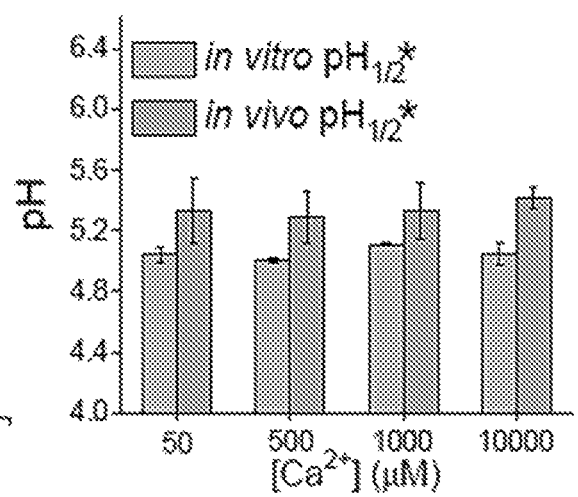
Figure 2G:
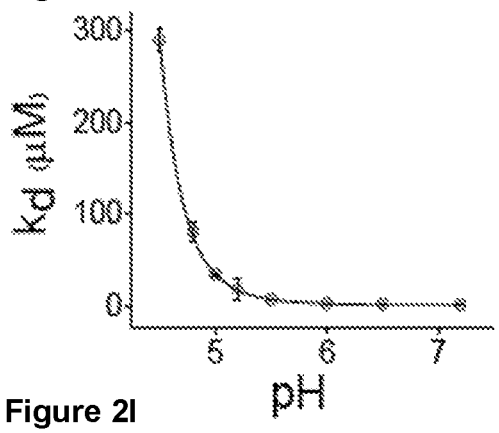
Figure 2H:
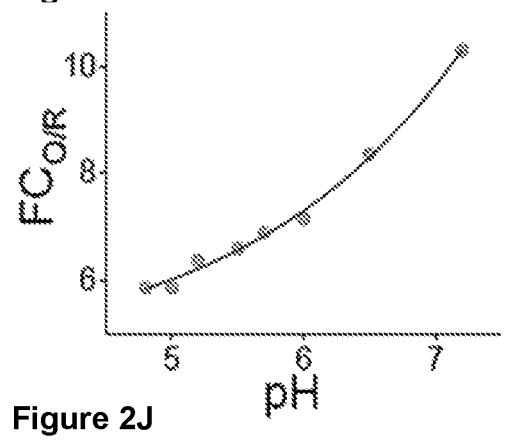
Figure 2I:
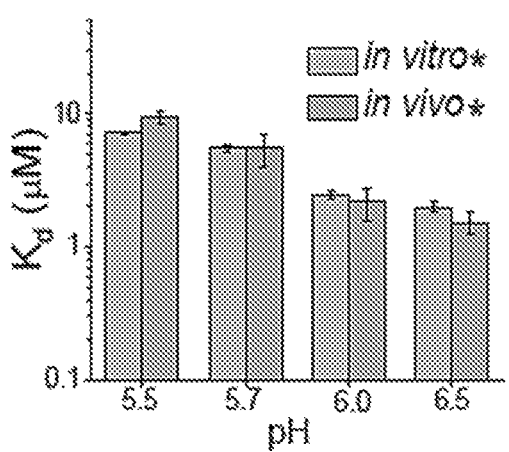
Figure 8A:
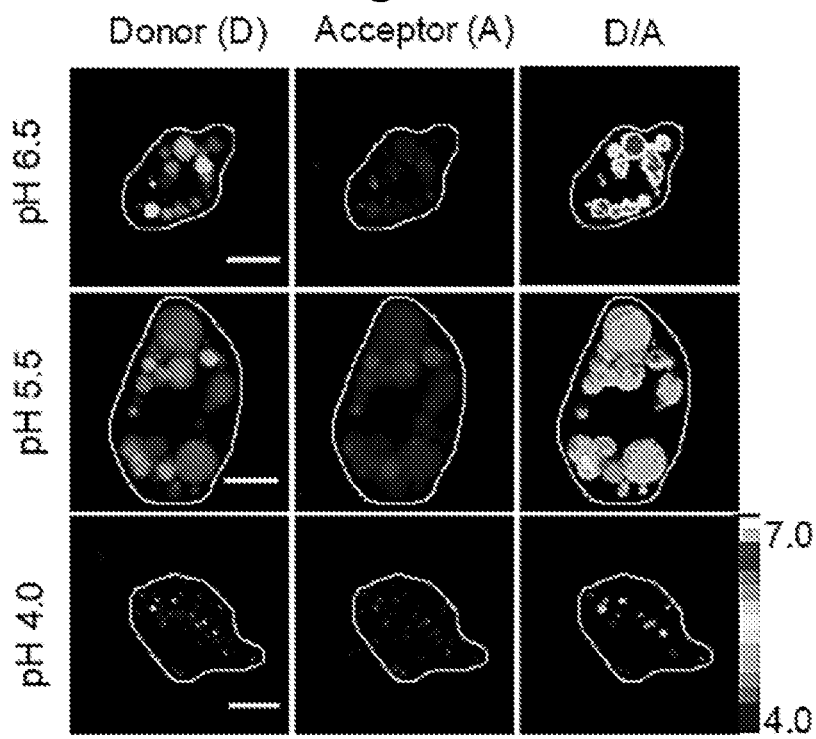
FIGS. 8A-8B illustrate in vivo performance of a nucleic acid complex according to one embodiments of the disclosure, CalipHluor$_{Ly}$.
Figure 8B:
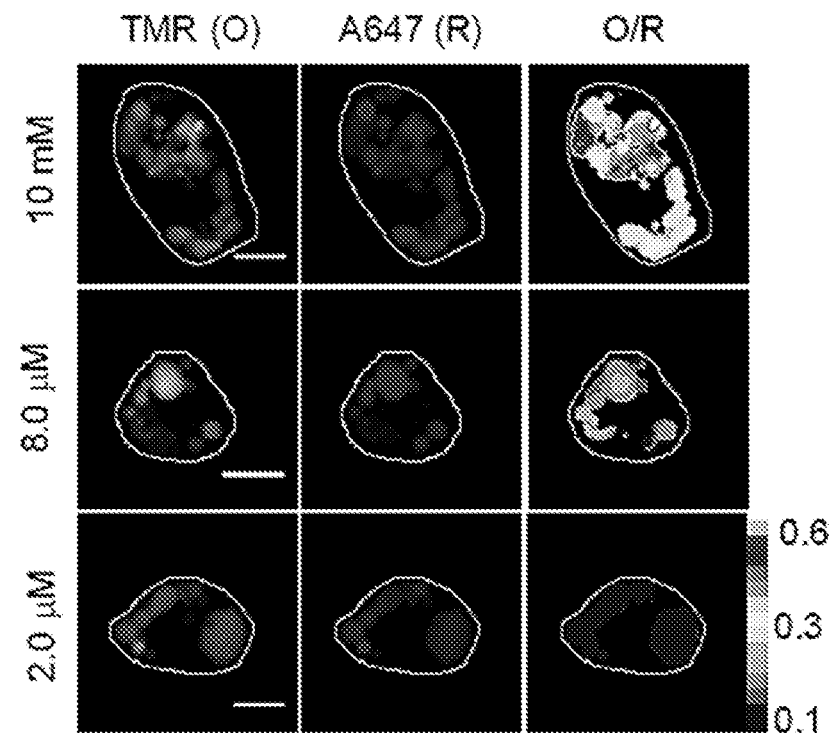
Figure 9A:
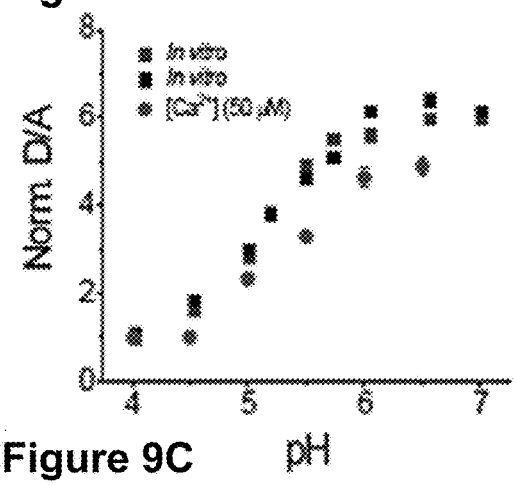
FIGS. 9A-9H illustrate comparison of in vitro and in vivo pH and Ca$^{2+}$ calibration profile of a nucleic acid complex according to one embodiments of the disclosure, CalipHluor$_{Ly}$.
Figure 9B:
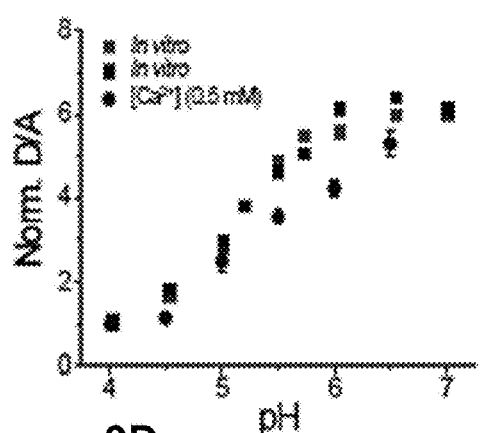
Figure 9C:
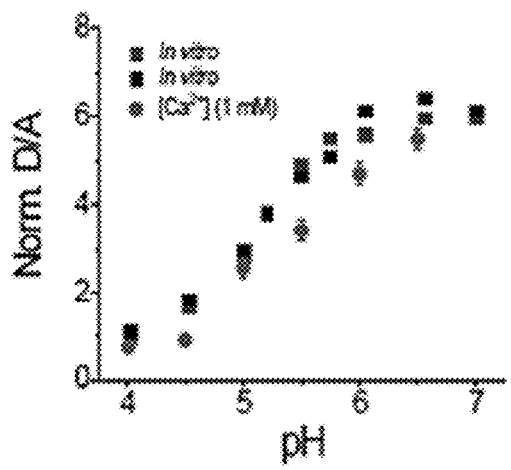
Figure 9D:
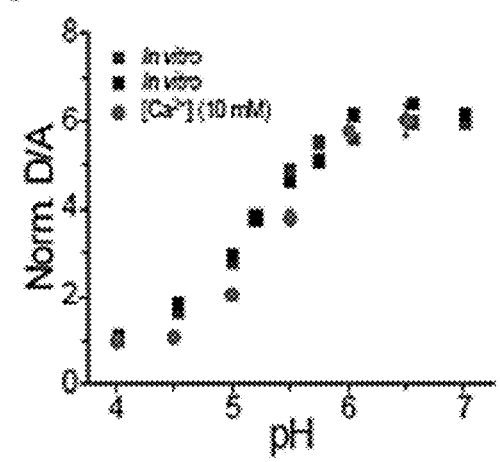
Figure 9E:
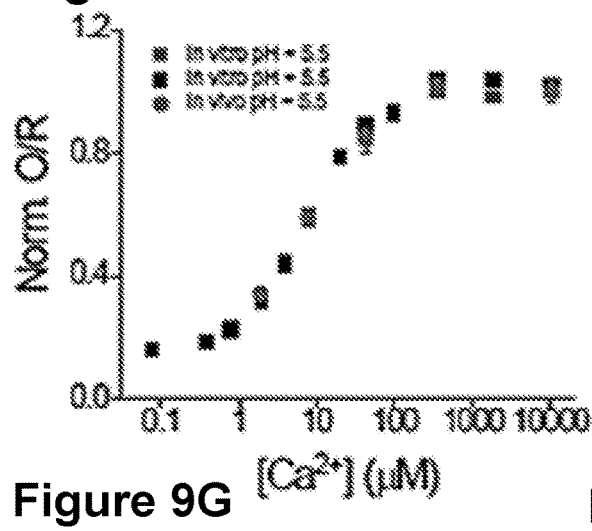
Figure 9F:
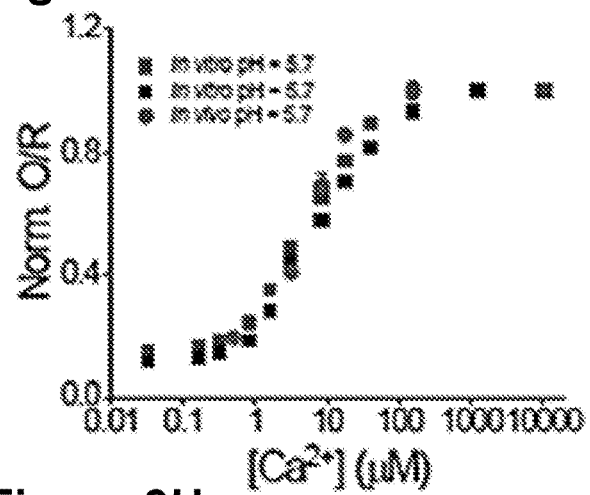
Figure 9G:
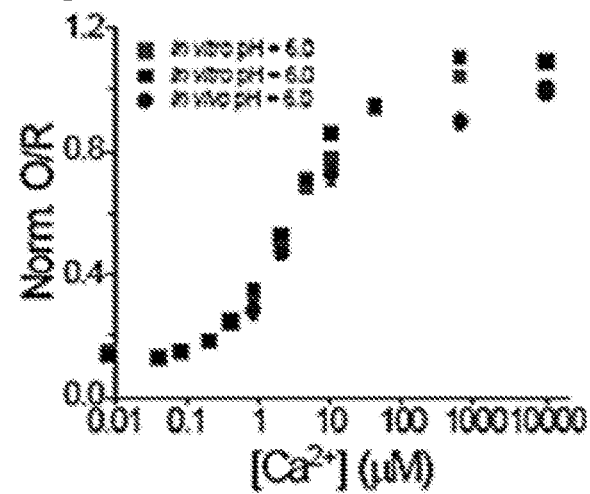
Figure 9H:
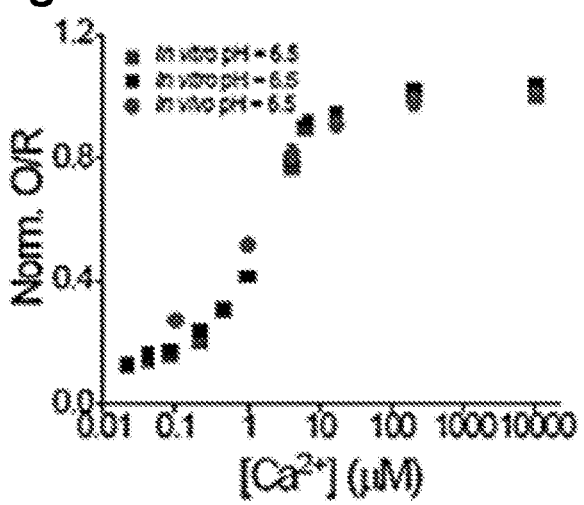

In a given clamping buffer of specified pH and Ca$^{2+}$ concentration, the ratio of the donor channel (D) image to the acceptor channel (A) image yields a D/A image which corresponds to the clamping buffer pH (FIG. 2A, v). Similarly, the O/R image corresponds to the Ca$^{2+}$ concentration at that pH (FIG. 2A, vi). Representative D/A and O/R images of coelomocytes clamped at the indicated pH and [Ca$^{2+}$] are shown in FIG. 2B and FIG. 8. The distribution of D/A and O/R values of lysosomes clamped at different indicated pH and [Ca$^{2+}$] values are shown in FIGS. 2C-2D. To compare the in vivo and in vitro sensing performances of both ion-sensing modules across a wide range of pH and Ca$^{2+}$ two parameters were plotted for each module in CalipHluor$_{Ly}$. For the pH sensing module these were the fold change in D/A (FC$_{D/A}$), as well as the transition pH (pH$_{1/2}$) (FIGS. 2E-2F, FIGS. 9A-9D). For the Ca$^{2+}$ sensing module, these were the fold change in O/R (FC$_{O/R}$) as well as the K$_d$ for Ca$^{2+}$ (FIGS. 2G-2H). The values of FC$_{D/A}$, FC$_{O/R}$, pH$_{1/2}$ and K$_d$ in vivo and in vitro were consistent revealing that the in vitro performance characteristics of CalipHluor$_{Ly}$ was quantitatively recapitulated in vivo (FIGS. 2E-2F and FIGS. 2I-2K).

Figure 2J:
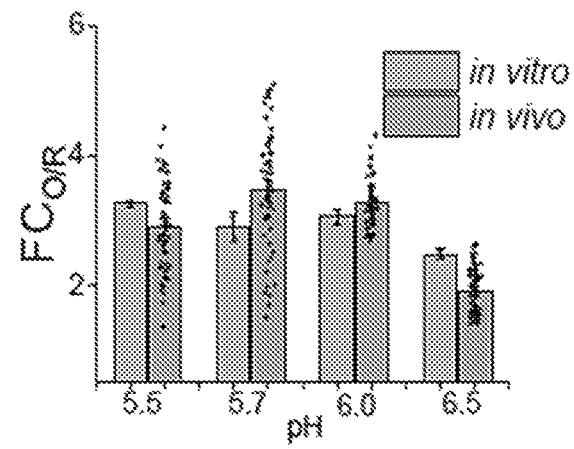

The calibrated D/A and O/R ratios were calculated by measuring the intensity values at single lysosome resolution in all four channels, as described in methods. Plotting D/A against pH values, at different Ca$^{2+}$ concentration shows the insensitivity of pH sensing module towards Ca$^{2+}$ levels. FIGS. 9A-9D show the comparison of D/A vs pH plots at different Ca$^{2+}$ levels between in vitro and in vivo. Non-significant change in fold change and pH$_{1/2}$, shows the robustness of the nucleic acid complexes of the disclosure in biological systems. In vivo Ca$^{2+}$ clamping of coelomocytes was performed in Ca$^{2+}$ clamping buffer [HEPES (10 mM), MES (10 mM), sodium acetate (10 mM), EGTA (10 mM), KCl (140 mM), NaCl (5 mM) and MgCl2 (1 mM)] by varying amount of free [Ca$^{2+}$] from 1 µM to 10 mM and adjusting pH (5.5-6.5) in presence of nigericin (50 µM), monensin (50 µM) and ionomycin (20 µM). Because of difficulty clamping coelomocytes below 1 µM of free [Ca$^{2+}$], clamping points <1 µM were extrapolated from the in vivo calibration to get the Kd of CalipHluor$_{Ly}$ at pH 6.5 and 5.7. As shown in FIGS. 9E-9H, in vivo [Ca$^{2+}$] calibration profiles of CalipHluor$_{Ly}$ correspond well with in vitro calibration profiles from pH 5.5 to 6.5 and from 1 µM to 10 mM of free [Ca$^{2+}$]. Further, in vivo Kd values of CalipHluor$_{Ly}$ as function of pH were consistent with in vitro Kd values (FIG. 2J). These results confirm that pH and [Ca$^{2+}$] sensing properties of CalipHluor$_{Ly}$ were preserved in coelomocytes.

In receptor mediated endocytosis, endocytosed cargo traffics through the early endosomes (EE) and late endosomes (LE) to reach lysosomes (Ly) for degradation and recycling. To find out estimated time points of CalipHluor$_{A647}$ to reach EE, LE and Ly, time dependent colocalization experiments were performed in worms expressing GFP tagged endosomal markers GFP::RAB-5 (EE), GFP::RAB-7 (LE) and LMP-1:: GFP (Ly). These results indicate that CalipHluor$_{A647}$ is present in EE, LE, and Ly at 5 minutes, 17 minutes, and 60 minutes, respectively. These time points were used to measure the pH and [Ca$^{2+}$] in EE, LE and Ly in wild-type worms.

Example 7

Measuring [Ca$^{2+}$] in Organelles of the Endo-Lysosomal Pathway

Figure 3A:
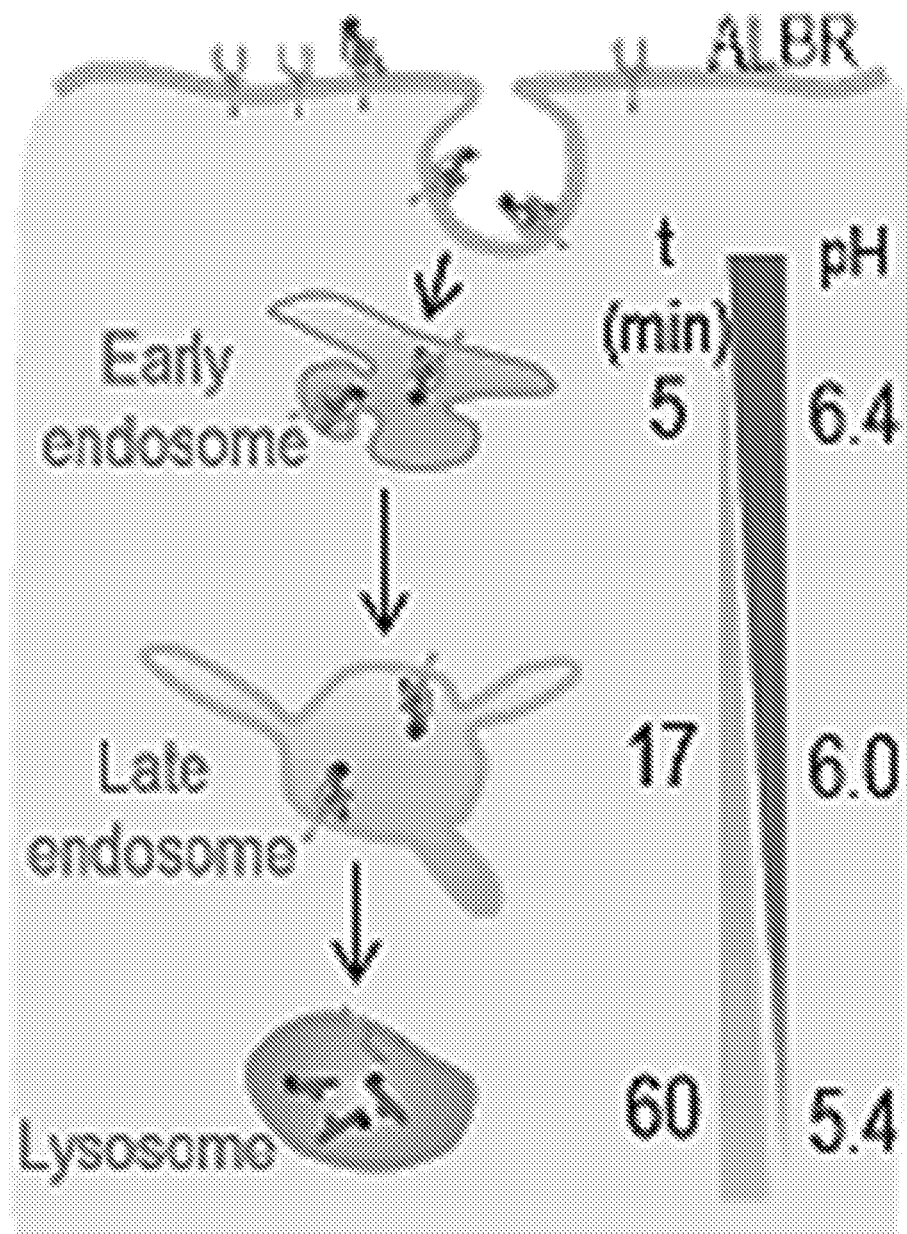
FIGS. 3A-3M illustrate the pH and [$Ca^{2+}$] maps accompanying endosomal maturation of a nucleic acid complex according to one embodiment of the disclosure, CalipHluor.
Figure 3B:
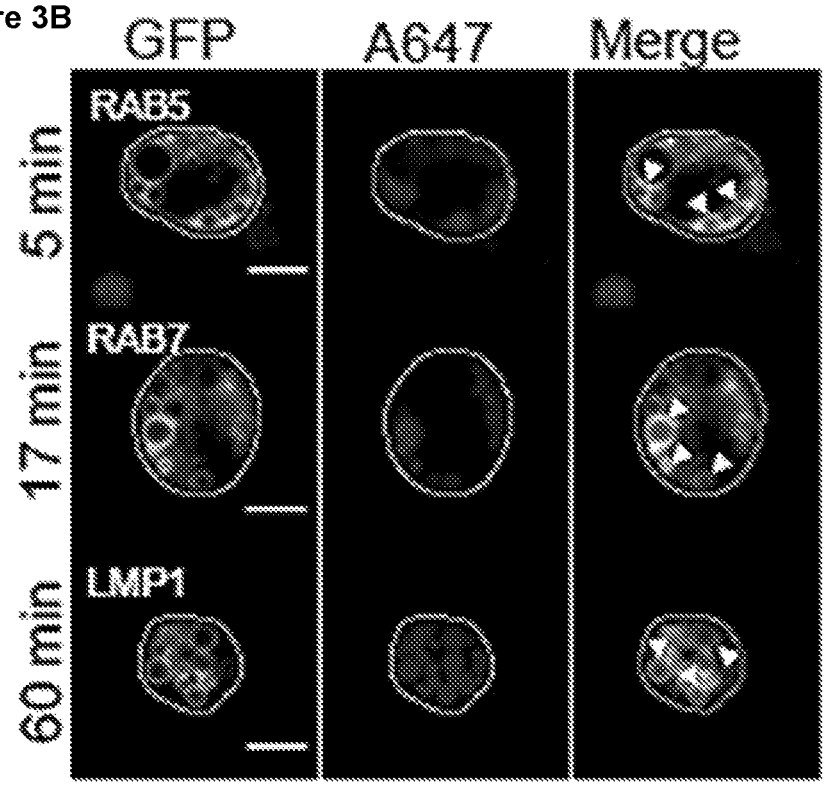
Figure 3C:
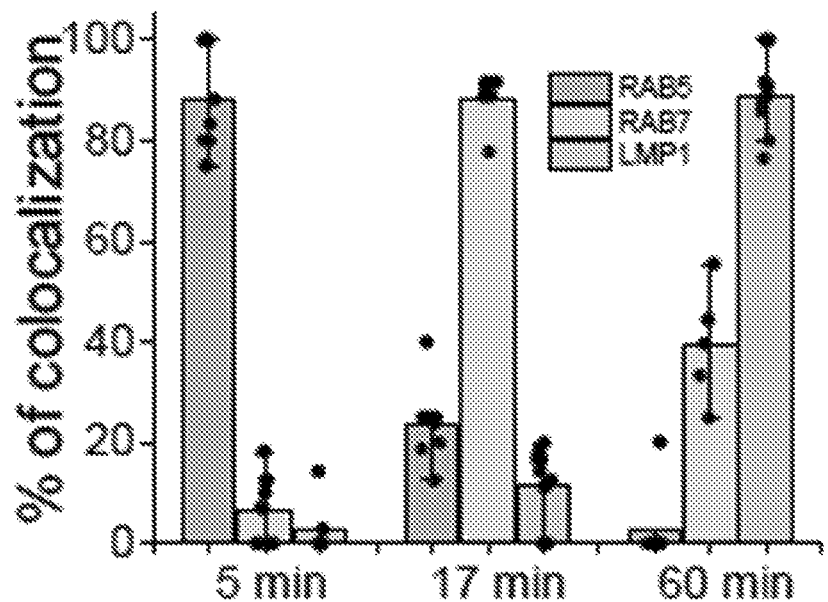
Figure 10A:
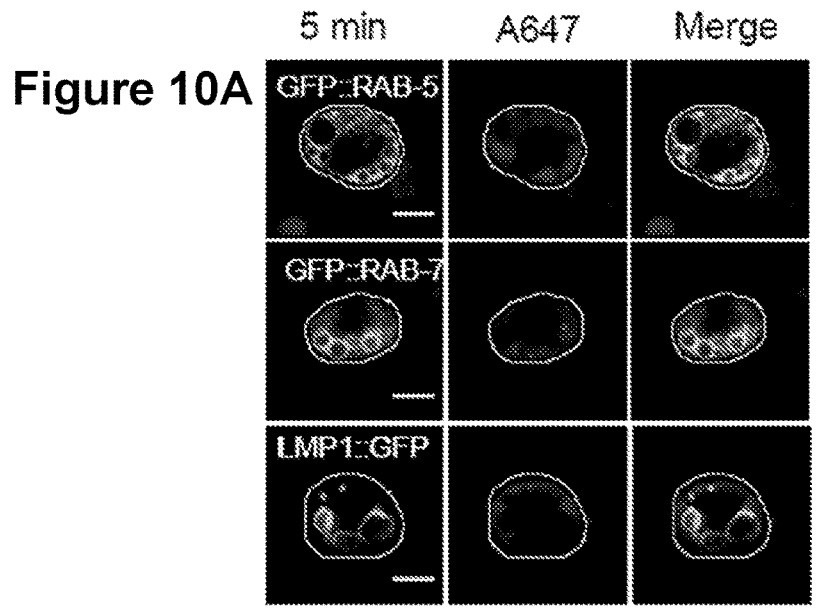
FIGS. 10A-10C illustrate endocytic trafficking of a nucleic acid complex according to one embodiments of the disclosure, CalipHluor$_{A647}$ in coelomocytes. Representative confocal images taken 5 min, 17 min, and 60 min following injection of CalipHluor$_{A647}$ in worms expressing GFP::RAB-5, GFP::RAB-7 and LMP-1:: GFP. Scale bar 5 μm. Experiment was performed once in n=10 worms.
Figure 10B:
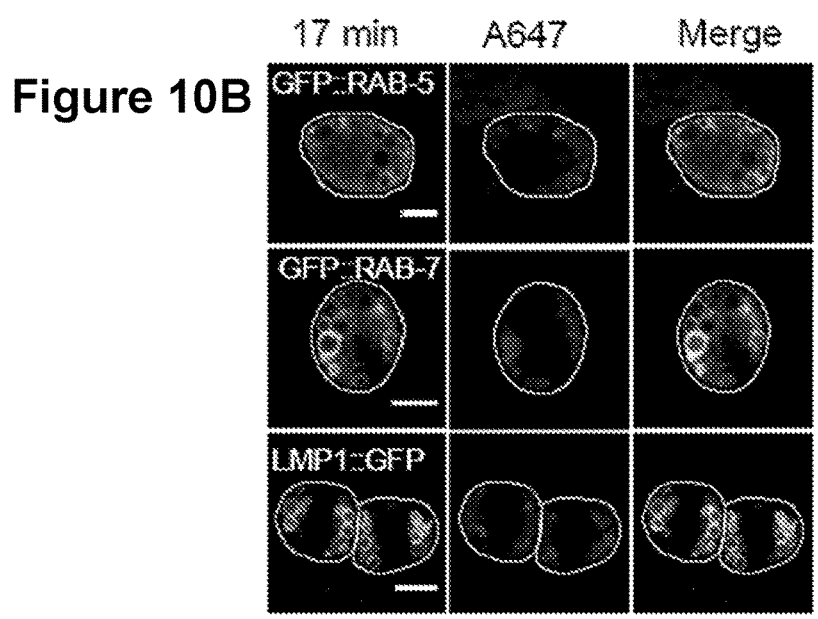
Figure 10C:
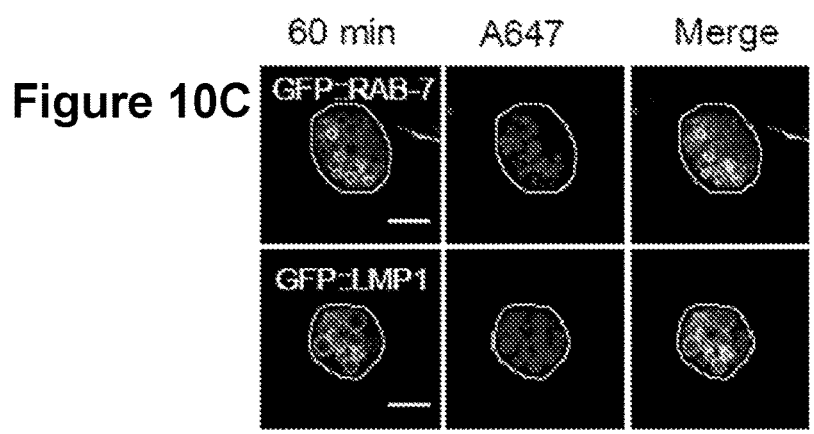
Figure 11A:
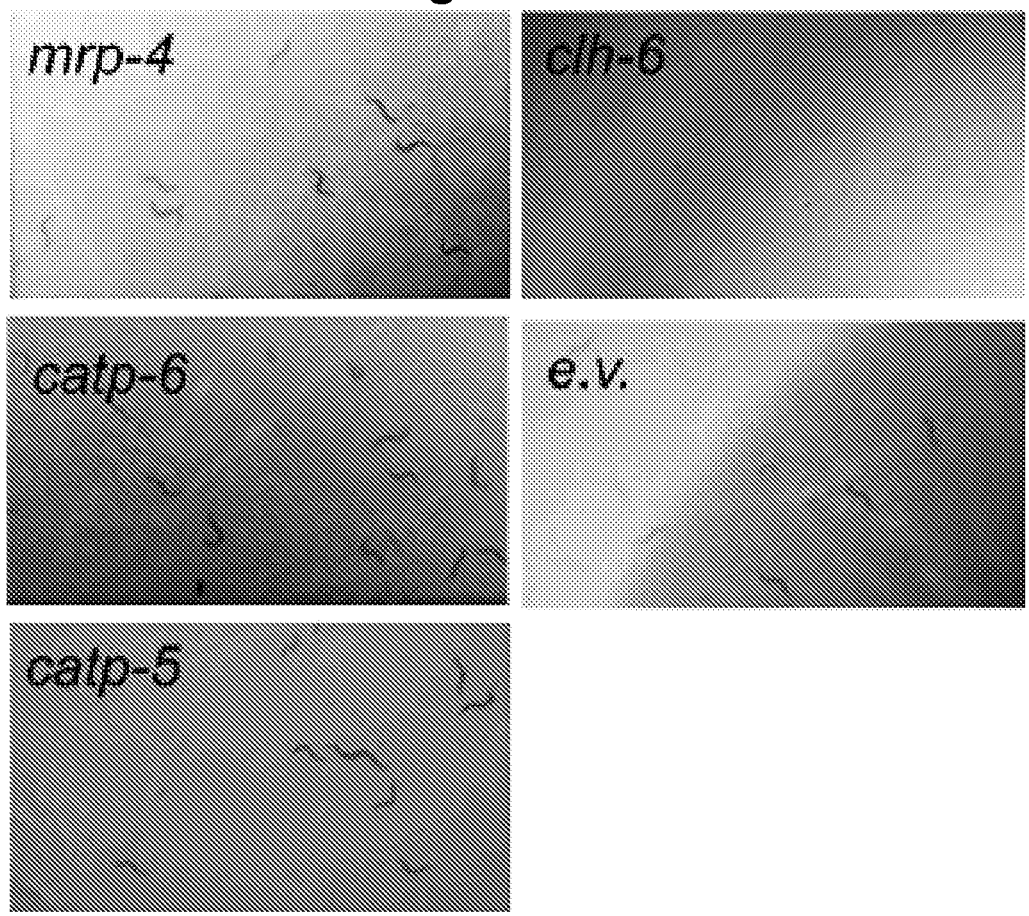
FIG. 11A illustrates catp-6 rescues the lethality of cup-5+/−. Representative images showing the number of progeny of cup-5+/− worms in plates containing RNAi bacteria of mrp-4 (positive control), clh-6, catp-6, catp-5 and a v. (control). Experiments were repeated twice independently with similar results.
Figure 11B:
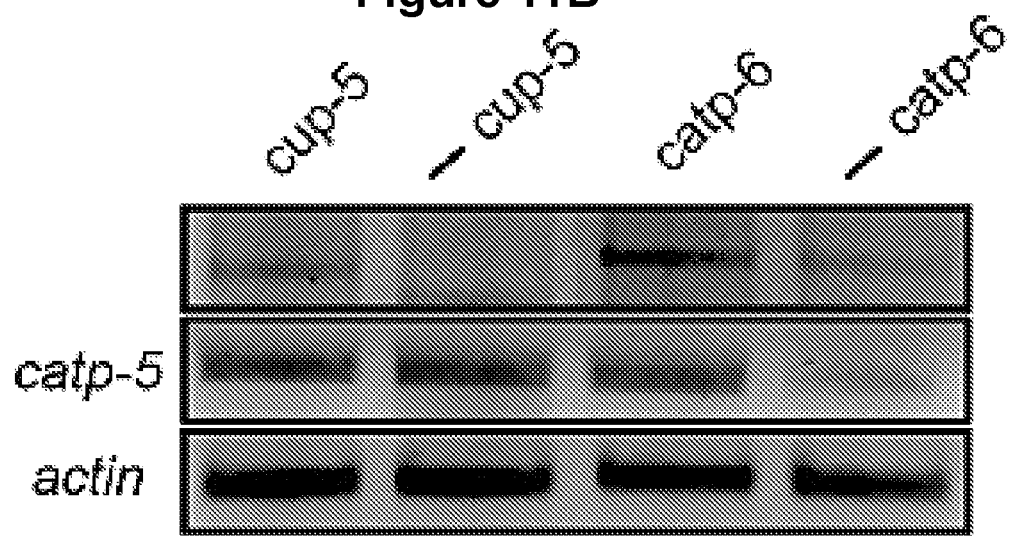
FIG. 11B illustrates RT-PCR analysis of total RNA isolated from C. elegans pre- and post-RNAi. Lanes correspond to PCR-amplified cDNA of the indicated gene product isolated from wild type without RNAi treatment (denoted by gene name) and the corresponding dsRNA-fed worms (denoted as. '—gene name)
Figure 11C:
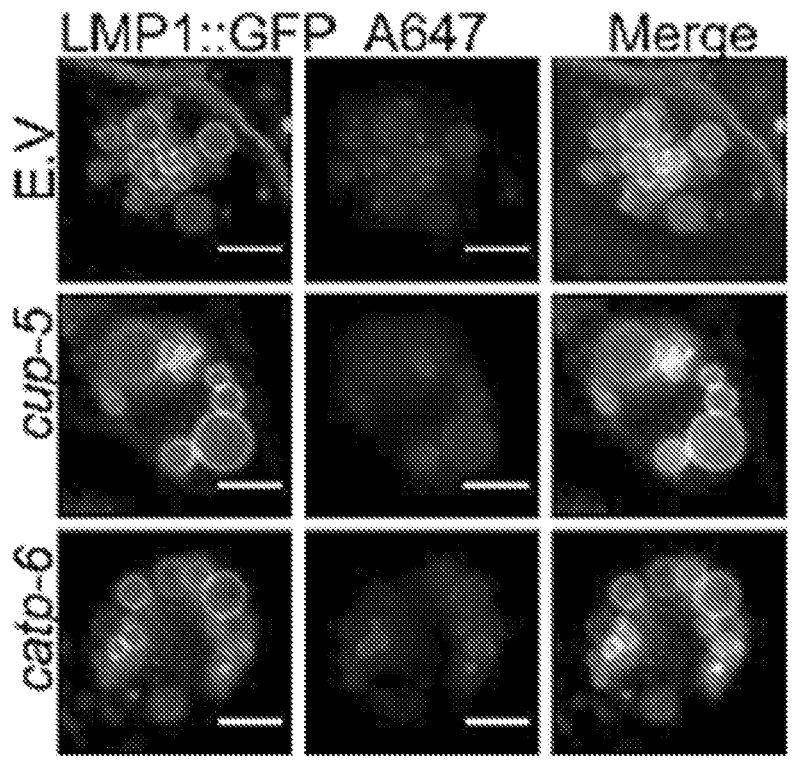
FIG. 11C shows representative images of worms expressing LMP-1::GFP (the left panels) in the background of various indicated RNAi, which were injected with CalipHluor$_{Ly,A647}$ (the middle panels) and imaged 60 mins post-injection. Scale bar: 5 μm.
Figure 11D:
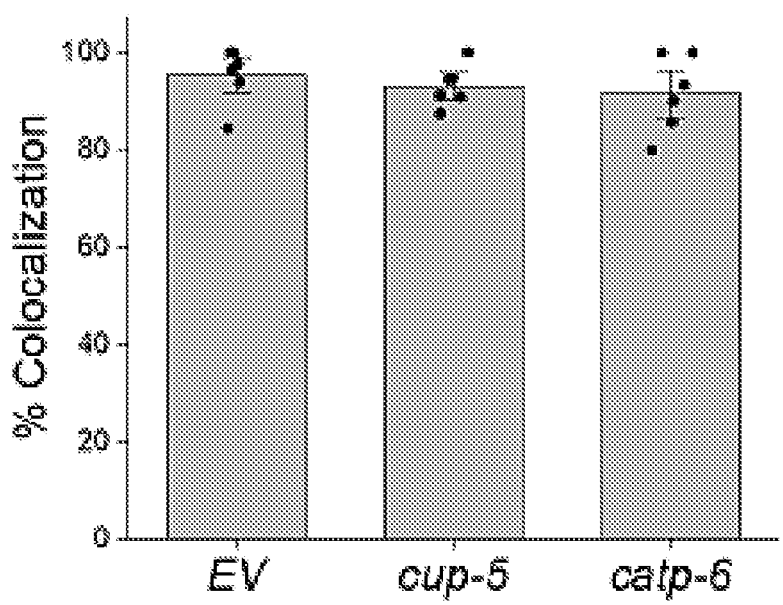
FIG. 11D illustrates quantification of colocalization between the CaliphHluor$_{Ly,A647}$ and GFP in LMP-1:: GFP worms. n=10 cells; error bars represent mean±S.E.M.

Endosomal maturation, critical to both organelle function and cargo trafficking, is accompanied by progressive acidification of the organelle lumen (FIG. 3A). Unlike pH, little is known about lumenal Ca$^{2+}$ changes as a function of endosomal maturation. The applicability of the probe was demonstrated across a range of acidic organelles by mapping lumenal Ca$^{2+}$ as a function of endosomal maturation. The time points at which CalipHluor$_{Ly}$ localized in the early endosome, the late endosome and the lysosome were determined in coelomocytes as described previously (Surana et al. (2011) Nat. Commun. 2:340) (FIGS. 3B-3C). Post injection, CalipHluor$_{Ly}$ was found to localize in early endosomes (EE), late endosomes (LE) and lysosomes (LY) at 5, 17 and 60 minutes, respectively (FIGS. 3B-3C, FIG. 10).

Figure 3D:
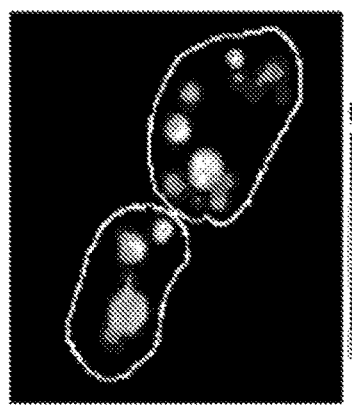
Figure 3E:
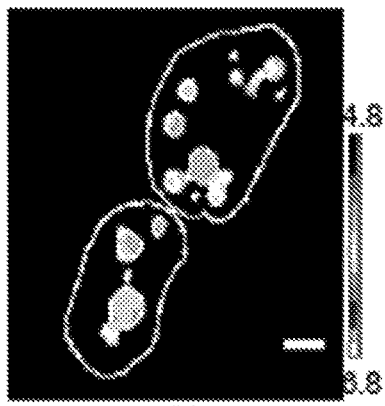

The pH and apparent Ca$^{2+}$ were measured at each stage in wild type N2 nematodes with single endosome addressability using the probes. A K$_d$ correction factor was then incorporated for each endosome according to its measured pH, and then computed the true value of Ca$^{2+}$ in every endosome. FIG. 3D shows a representative set of coelomocytes for which this method of analysis was performed. Early and late endosomes were labeled with CalipHluor whereas lysosomes were labeled with the CalipHluor$_{Ly}$ variant and then generated the D/A and O/R maps of coelomocytes (FIG. 3D, i and iv). The D/A map was directly converted into a pH map using the calibrated D/A values obtained from the in vivo pH clamping experiments (FIG. 3D, ii, Table 2). The in vivo and in vitro Ca$^{2+}$ response characteristics at every pH (FIG. 2H), provides the K$_d$ for Ca$^{2+}$ at every pH value for both CalipHluor and CalipHluor$_{Ly}$.

TABLE 2

Free [Ca$^{2+}$] in clamping buffer at pH 5.5 calculated using Maxchelator software.

| Added calcium (µM) | Amount calcium added (µL) | Concentration of calcium added | Free [Ca$^{2+}$] (µM) in 50 µL |
|---|---|---|---|
| 0 | 0 | 0 | 0 |
| 1 | 1 | 50 µM | 3.89E−2 |
| 2 | 2 | 50 µM | 7.80E−2 |
| 10 | 1 | 0.5 mM | 3.89E−1 |
| 20 | 2 | 0.5 mM | 7.80E−1 |
| 50 | 1 | 2.5 mM | 1.9 |
| 100 | 2 | 2.5 mM | 3.9 |
| 200 | 1 | 10 mM | 7.9 |
| 500 | 1 | 25 mM | 20.4 |
| 1E3 | 1 | 50 mM | 43.1 |

TABLE 2-continued

Free [$Ca^{2+}$] in clamping buffer at pH 5.5 calculated using Maxchelator software.

| Added calcium (µM) | Amount calcium added (µL) | Concentration of calcium added | Free [$Ca^{2+}$] (µM) in 50 µL |
|---|---|---|---|
| 2E3 | 2 | 50 mM | 96.3 |
| 5E3 | 1 | 250 mM | 360.3 |
| 10E3 | 2 | 250 mM | 1.86E3 |
| 20E3 | 2 | 500 mM | 10.4E03 |

Figure 3F:
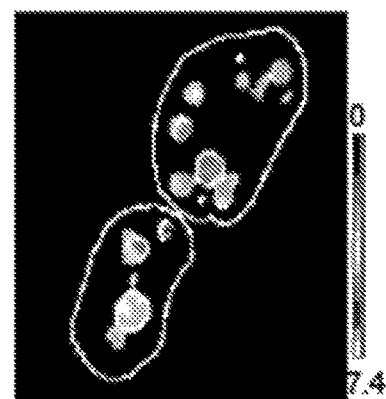
Figure 3G:
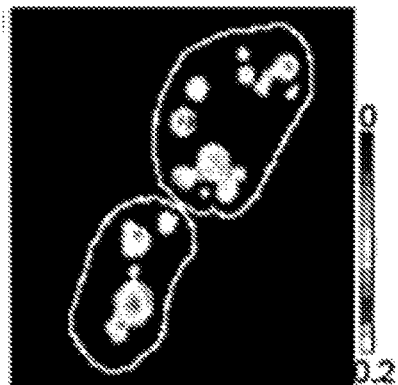
Figure 3H:
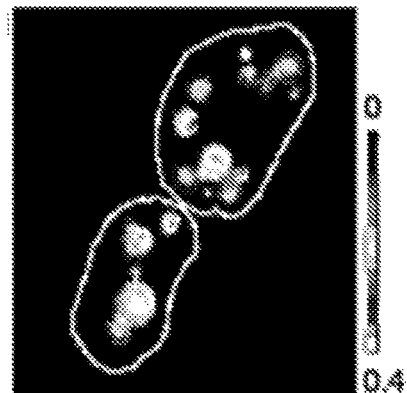
Figure 3I:
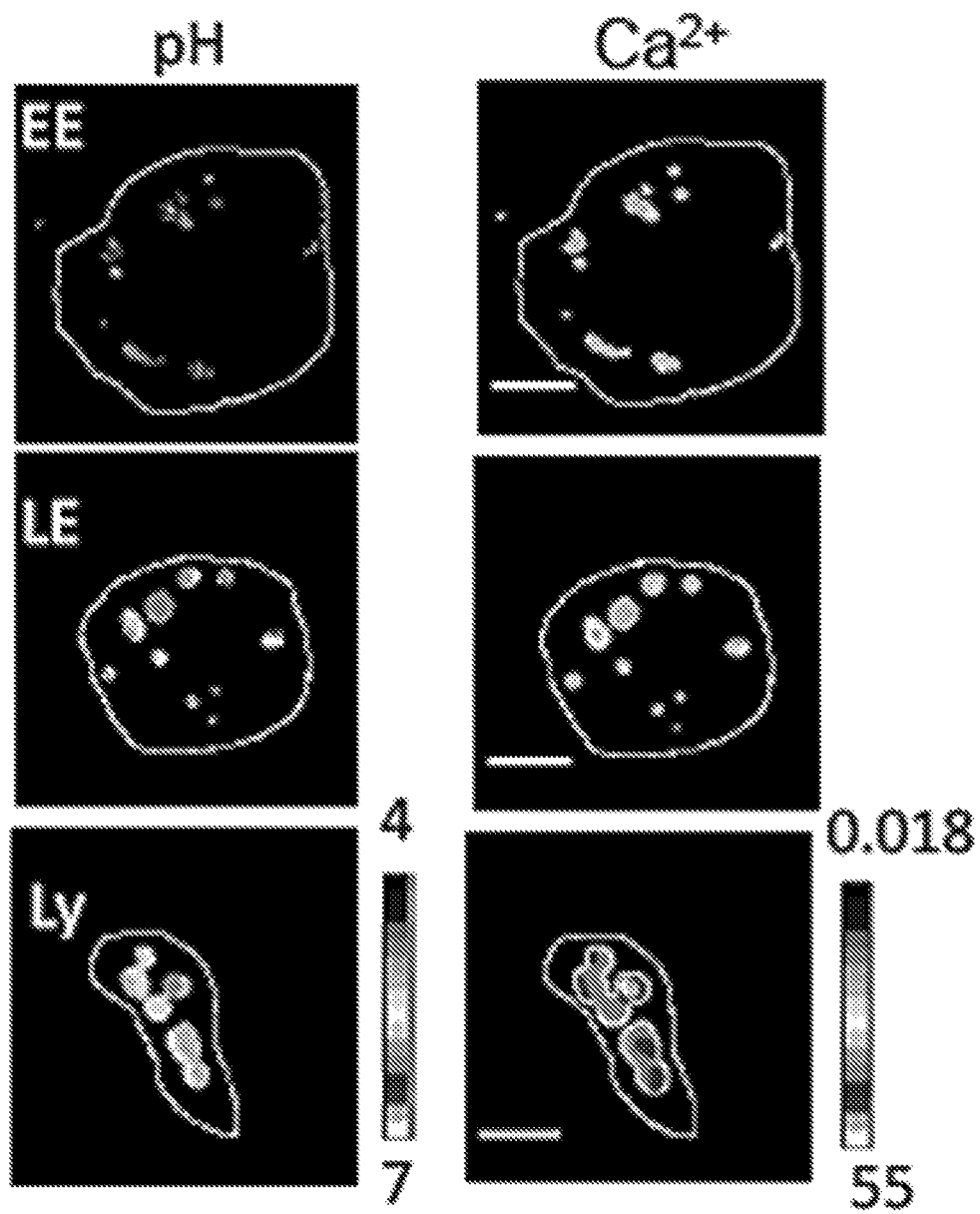
Figure 3J:
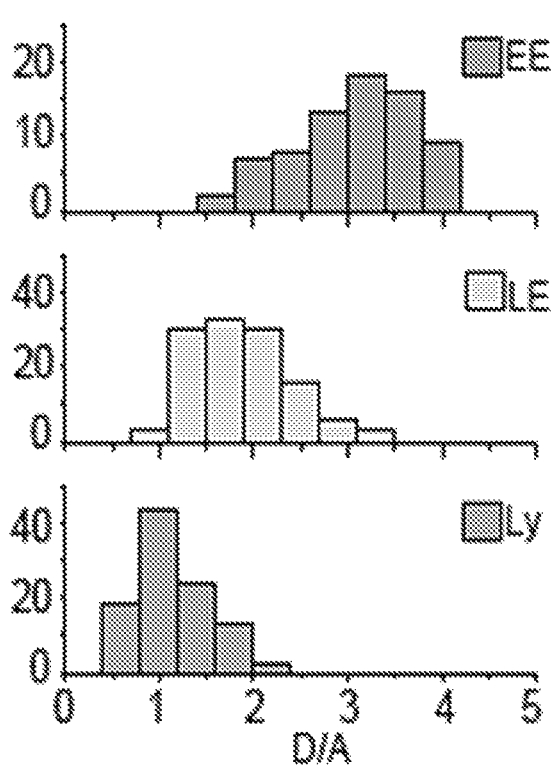
Figure 3K:
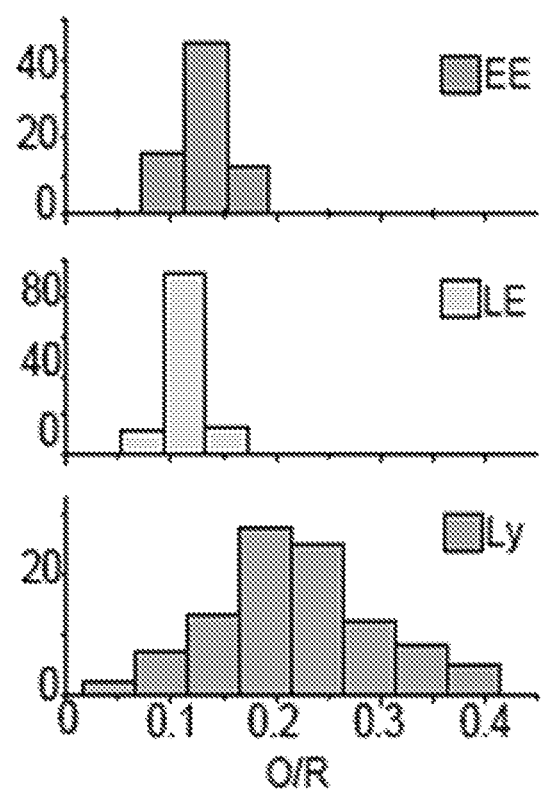
Figure 3L:
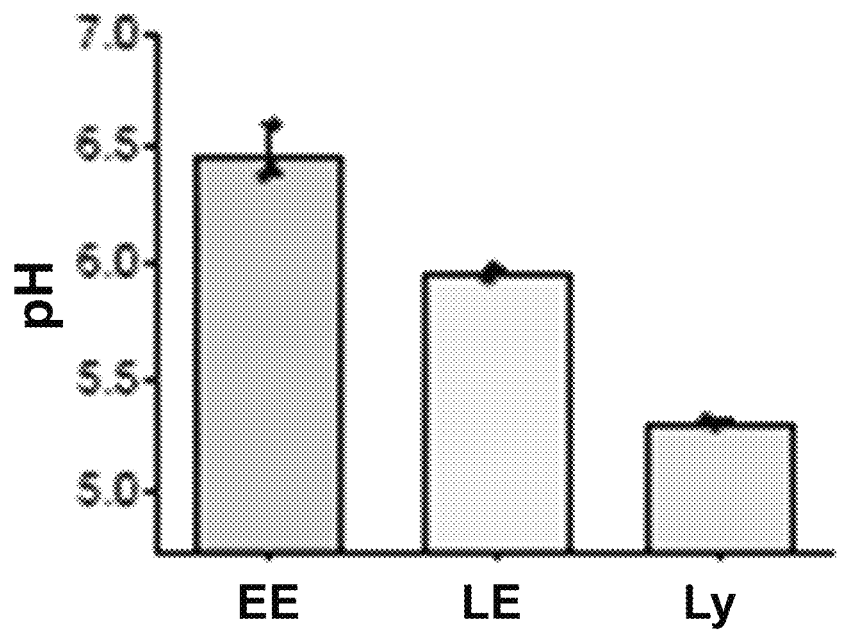
Figure 3M:
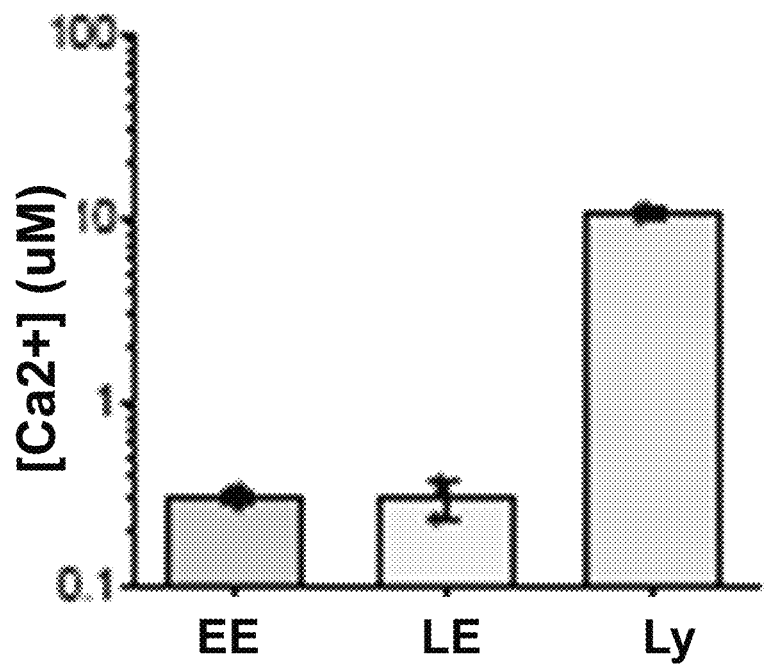

Using the pH map in FIG. 3D, ii, a "$K_d$ map" was constructed which corresponds to the $K_d$ for $Ca^{2+}$ at each pixel in the pH map (FIG. 3D, iii). Multiplying the value of $K_d$ at each pixel in the $K_d$ map with the equation $(O/R - O/R_{min})/(O/R_{max} - O/R)$ the true $Ca^{2+}$ map was obtained (FIG. 3D, v). In this equation, O/R corresponds to the observed O/R value at a given pixel in the O/R map, $O/R_{min}$ and $O/R_{max}$ correspond to O/R values at 1 µM and 10 mM $Ca^{2+}$ at the corresponding pH value at that particular pixel. Thus, the pH and $Ca^{2+}$ maps of early endosomes, late endosomes and lysosomes were obtained in N2 worms (FIG. 3E) and the corresponding distributions of D/A and pH-corrected O/R are shown in FIGS. 3F-3G. The mean values of pH and $Ca^{2+}$ in each endosomal stage is shown in FIGS. 3H-3I.

Table 3 provides mean pH and free [$Ca^{2+}$] in EE, LE and Ly of wild type (N2) worms, lysosomes of catp-6, cup-5+/− and catp-6 RNAi in cup-5+/− worms using CalipHluor$_{Ly}$. pH decreases progressively with endosomal maturation, with lumenal acidity showing a about 3-fold decrease at each endocytic stage. In contrast, $Ca^{2+}$ in the early endosome and the late endosome were comparable and fairly low i.e., 0.3 µM. Interestingly, from the late endosome to the lysosome, lumenal $Ca^{2+}$ increases sharply by about 35 fold, indicating a stage-specific enrichment of $Ca^{2+}$ and consistent with the lysosome being an acidic $Ca^{2+}$ store (Table 3). The 100-fold difference between lysosomal and cytosolic $Ca^{2+}$ is consistent with the stringent regulation of lysosomal $Ca^{2+}$ channels to release lumenal $Ca^{2+}$ and control lysosome function.

TABLE 3

| Worm | pH | Free [$Ca^{2+}$] (µM) |
|---|---|---|
| EE of N2 | 6.46 ± 0.07 | 0.3 ± 0.1 |
| LE of N2 | 5.95 ± 0.02 | 0.3 ± 0.1 |
| Ly of N2 | 5.30 ± 0.02 | 11 ± 0.8 |
| Ly of catp-6 | 5.47 ± 0.03 | 1.6 ± 0.4 |
| Ly of cup-5+/− | 5.15 ± 0.01 | 40 ± 1.5 |
| Ly of CATP-6 RNAi in cup-5+/− | 5.50 ± 0.10 | 16 ± 4.9 |

Early endosome (EE), Late endosome (LE) and Lysosomes (Ly)
For all experiments n = 15 cells, 50 endosomes; data represent the mean ± S.E.M.
Experiments were repeated thrice independently with similar results.

Example 8

Catp-6 is Identified as a Potential Lysosomal $Ca^{2+}$ Importer

This surge in lumenal $Ca^{2+}$ specifically in the lysosome stage, implicates the existence of factors that aid lysosomal import of $Ca^{2+}$. However, players that mediate lysosomal $Ca^{2+}$ accumulation are still unknown in higher eukaryotes. Inspiration was taken from the well-known $Ca^{2+}$ importer i.e., SERCA, a P-Type ATPase which is present on the endoplasmic reticulum (ER). Other $Ca^{2+}$ importers like plasma membrane $Ca^{2+}$ ATPase (PMCA) and the secretory pathway $Ca^{2+}$ ATPase (SPCA1) are also P-type-ATPases. Potential P-type ATPases in the human lysosomal proteome were manually identified. It was found that the P5-ATPase ATP13A2 was described to transport cations like $Mn^{2+}$, $Zn^{2+}$, $Mg^{2+}$, and $Cd^{2+}$ but not $Ca^{2+}$ based on toxicity assays. As $Ca^{2+}$ homeostasis is critical to all major signaling pathways, compensatory mechanisms in cells can counter excess $Ca^{2+}$ and thereby omit the identification of $Ca^{2+}$ transport by ATP13A2.

Figure 4A:
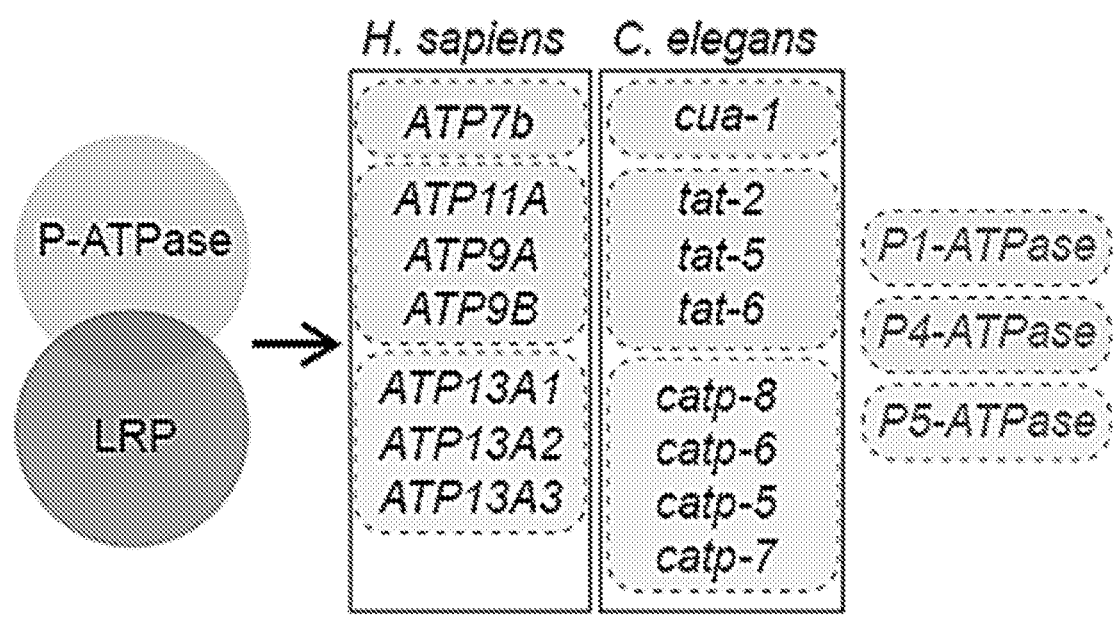
FIGS. 4A-4H illustrate Catp-6 facilitates lysosomal Ca$^{2+}$ accumulation.
Figure 4B:
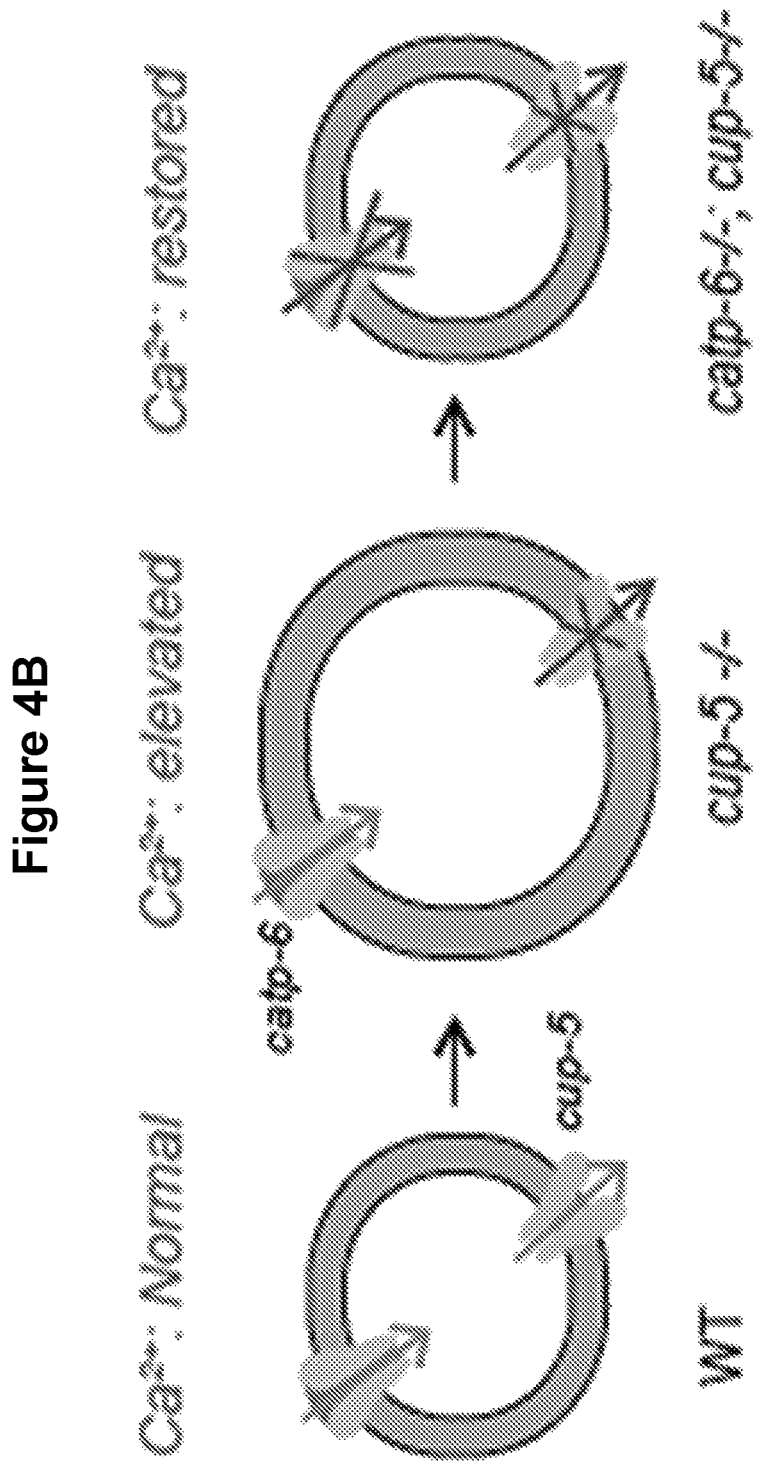
Figure 4C:
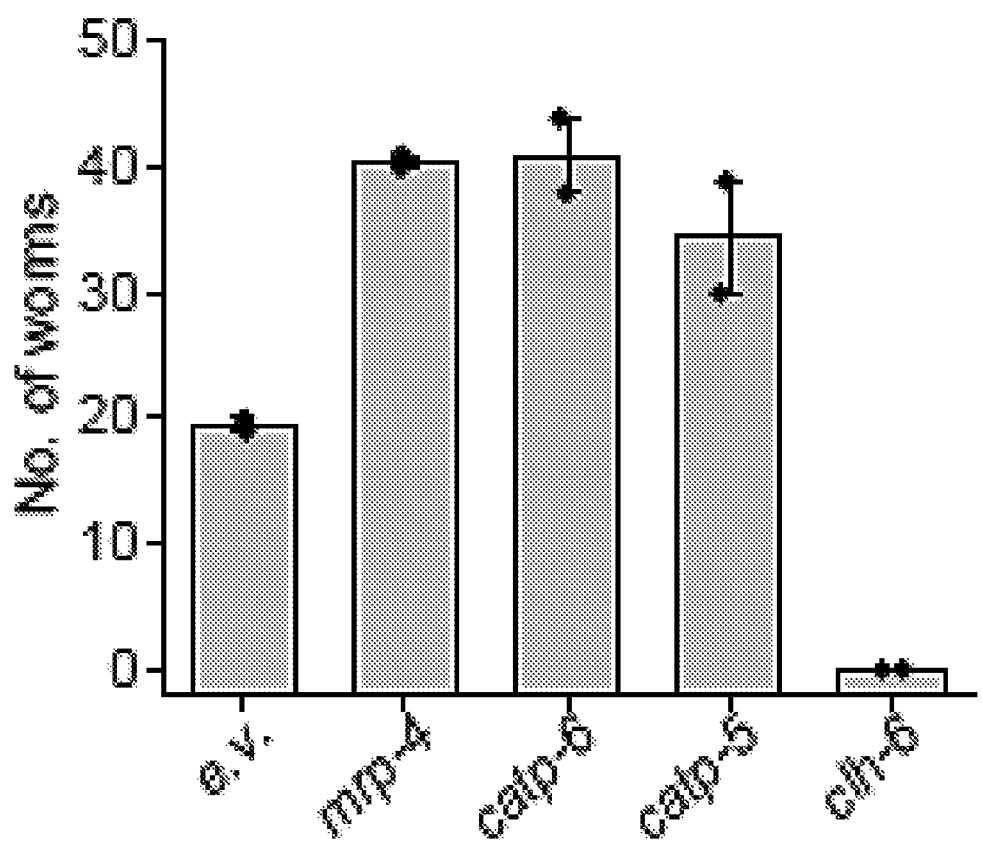

C. elegans has two homologs of ATP13A2 i.e., catp-5 and catp-6 (FIG. 4A). To test whether catp-6 mediated lysosomal $Ca^{2+}$ accumulation, it was investigated whether its knockdown would rescue a phenotype arising due to high lumenal $Ca^{2+}$ (FIG. 4B). TRPML1 is a well-known lysosomal $Ca^{2+}$ release channel whose knockdown would be expected to elevate lysosomal $Ca^{2+}$. Mutations in TRPML1 result in lysosomal dysfunction that leads to the lysosomal storage disease Mucopolysaccharidoses Type IV (MPS IV). In C. elegans, loss of cup-5, the C. elegans homolog of TRPML1, results in lysosomal storage and embryonic lethality. Therefore it was also tested whether catp-6 knockdown a cup-5+/− genetic background could reverse cup-5−/− lethality. In this strain, the homozygous lethal deletion of cup-5 is balanced by dpy-10 marked translocation. A survival assay was performed by knocking down specific genes in cup-5+/− worms and scoring for lethality (FIG. 4C and FIG. 11).

Multidrug resistance protein-4 (MRP-4) is a versatile efflux transporter for drugs, toxins, peptides and lipids and is known to rescue cup-5−/− lethality. It is hypothesized that in the absence of cup-5, mrp-4 mis-localizes in endocytic compartments causing toxicity that is then alleviated upon its knockdown. RNAi knockdown of either catp-6 or catp-5 rescued cup-5−/− lethality favorably compared to mrp-4 knockdown (FIG. 11). Knocking down clh-6, another lysosome-resident channel that regulates lumenal chloride, showed no such rescue.

Example 9

Catp-6 Facilitates Lysosomal $Ca^{2+}$ Accumulation

Given that the rescue of lethality might occur without restoring lysosomal function, it was tested whether any of the candidate genes reversed lysosomal phenotypes. Cup-5 knockdowns show abnormally large lysosomes due to lysosomal storage. Therefore the hypomorph ar645 was used with a G401E mutation in cup-5 leading to dysfunction that is insufficient for lethality, yet leads to engorged lysosomes. In the arls37; cup-5(ar465) strain, soluble GFP that is secreted from the muscle cells into the pseudocoelom is internalized by the coelomocytes and trafficked for degradation to dysfunctional lysosomes. Thus, in these worms, the lysosomes in coelomocytes are abnormally enlarged and labeled with GFP (FIG. 4D).

Figure 4D:
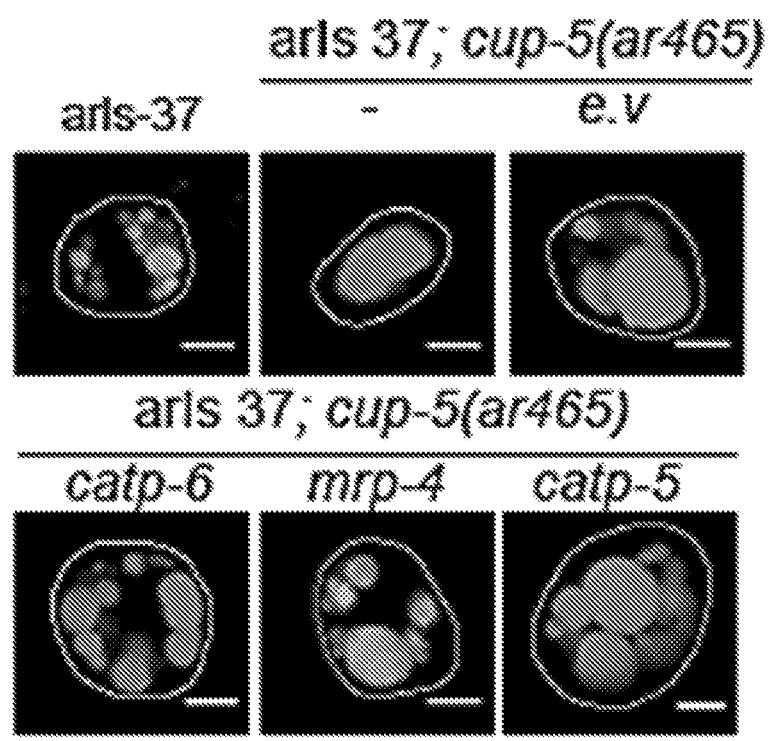
Figure 4E:
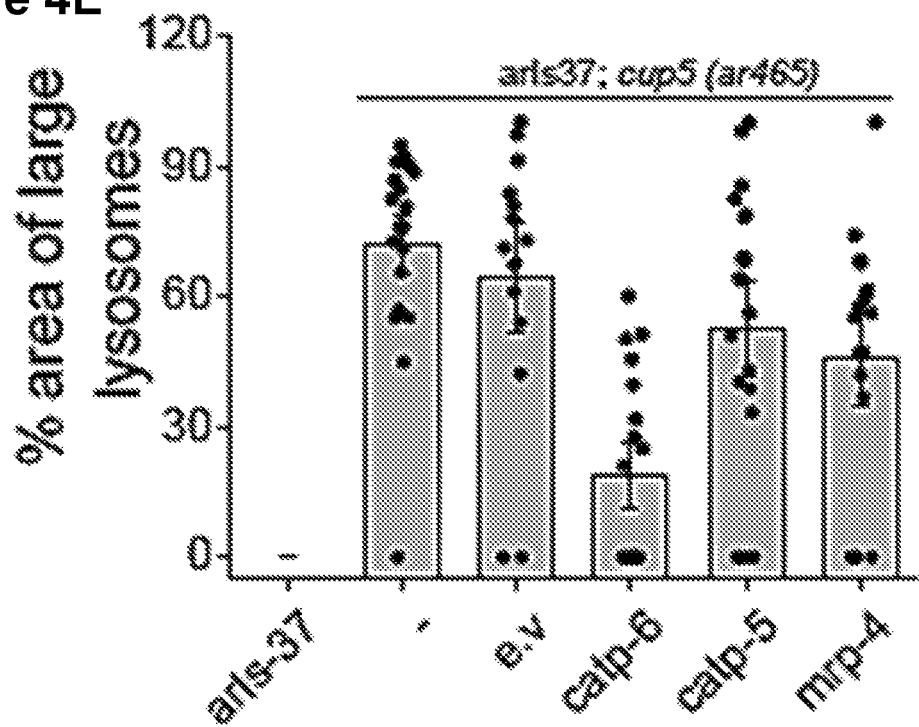

RNAi knockdowns of catp-6 in these nematodes rescued lysosomal morphology (FIGS. 4D-4E). Knocking down either catp-5 or mrp-4 showed only a marginal recovery of phenotype. Given that mrp-4 is not a lysosome resident protein and its inability rescue the lysosomal phenotype suggests that mechanistically, its rescue of cup-5−/− lethality is likely to be extra lysosomal, consistent with previous hypotheses.

Figure 4F:
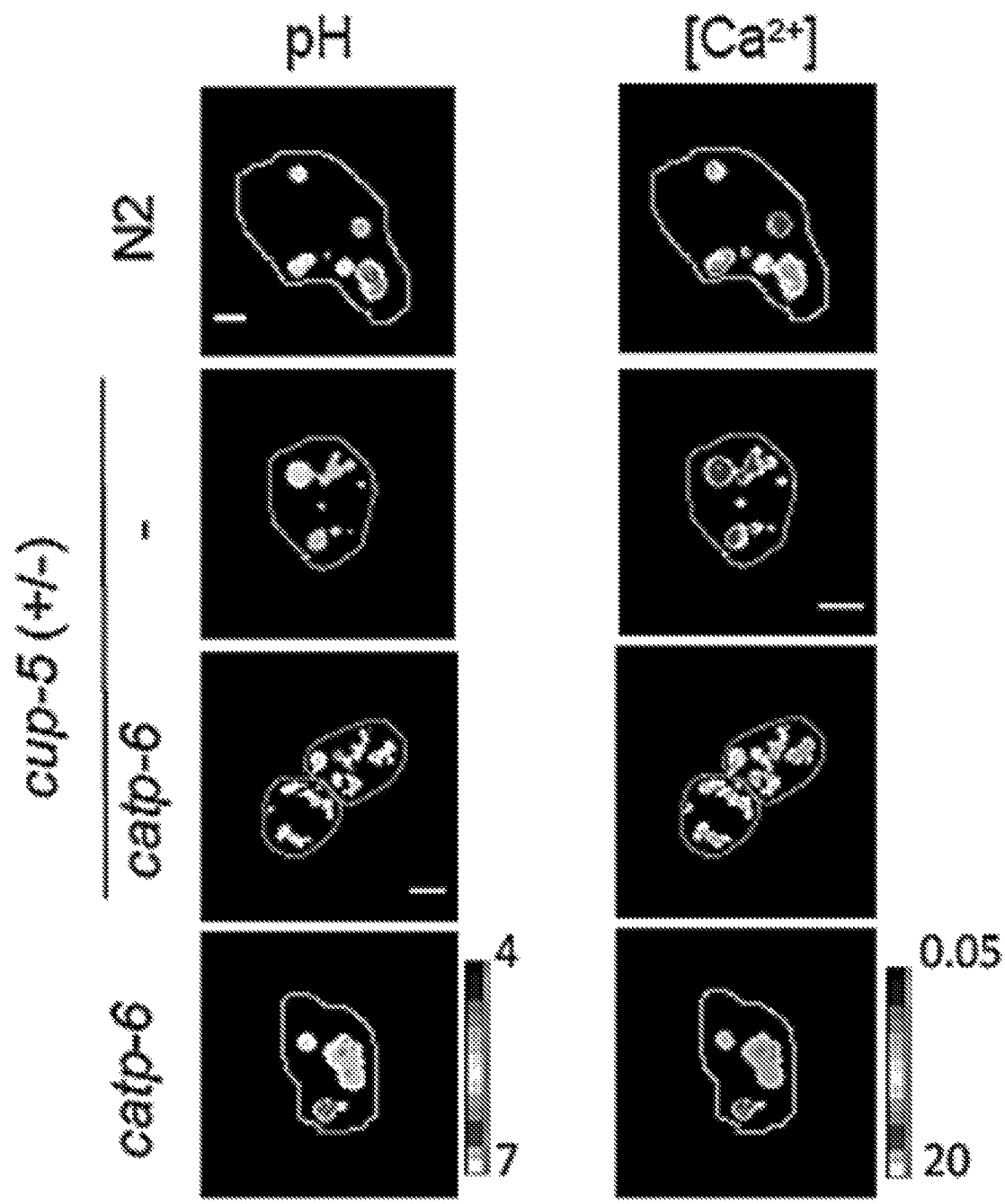
Figure 4G:
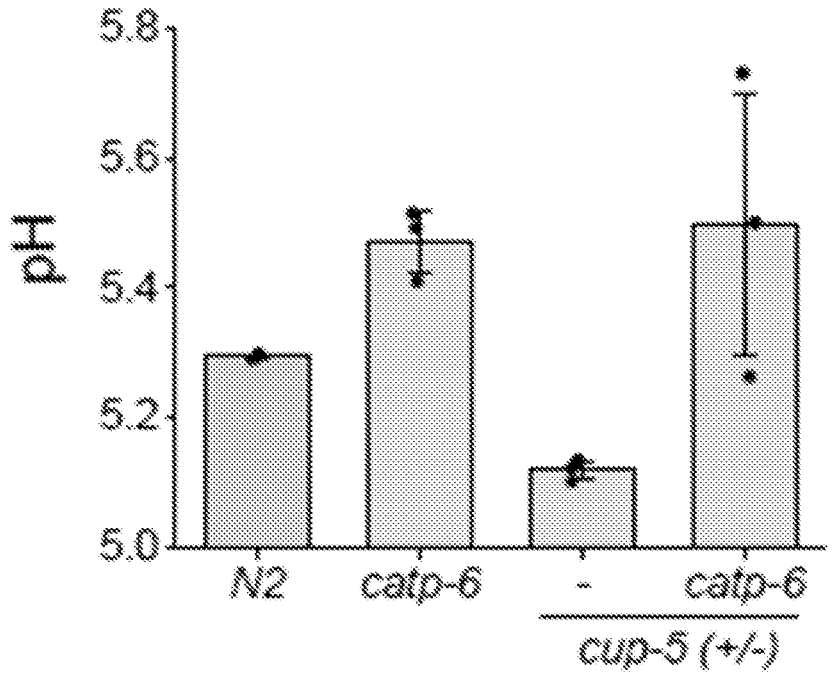
Figure 4H:
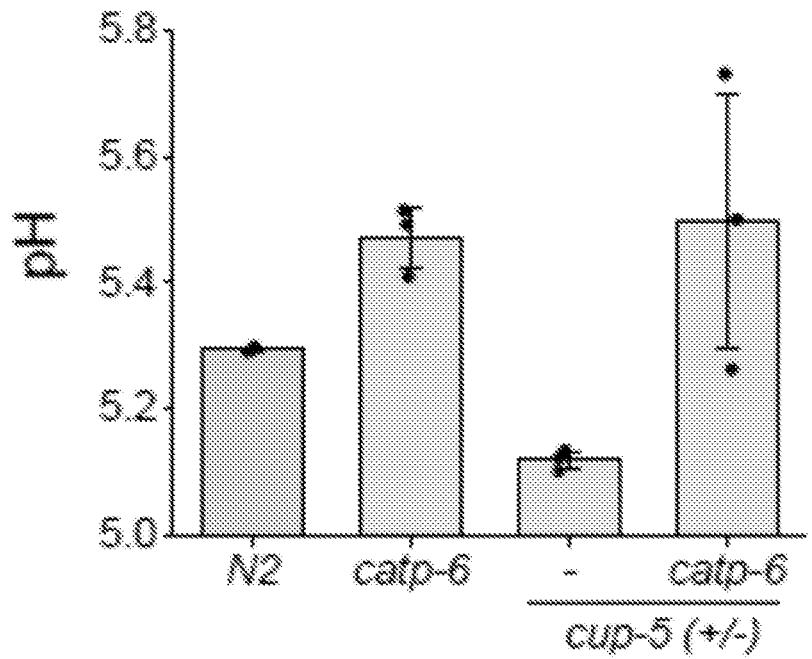

Next, it was checked whether catp-6-mediated rescue of a physical phenotype i.e., lysosome morphology, also led to a restoration of a chemical phenotype, i.e., its lumenal $Ca^{2+}$. Lysosomal $Ca^{2+}$ measurements using CalipHluor$_{Ly}$ in cup-5 +/−nematodes and in catp-6 knockdowns. Wild type nematodes showed lysosomal $Ca^{2+}$ levels of 11±0.8 µM (FIGS. 4F-4H). In cup-5 +/−nematodes lysosomal $Ca^{2+}$ was elevated to 40±1.5 µM, consistent with cup-5 being a $Ca^{2+}$ release channel (FIGS. 4F-4H). Interestingly, catp-6 knockdown restored lysosomal $Ca^{2+}$ to wild-type levels. Thus catp-6 function directly opposes that of cup-5 as it rescues cup-5 deficient phenotypes at three levels—the whole organism in terms of lethality, at the sub-cellular level in terms of lysosome phenotype, at sub-organelle level in terms of its lumenal chemical composition. Cumulatively, these indicate that catp-6 facilitates lysosomal $Ca^{2+}$ import. Accordingly, catp-6 deletion led to lysosomal $Ca^{2+}$ dropping to 1.6±0.4 µM, consistent with it facilitating $Ca^{2+}$ import.

Example 10

ATP13A2 Facilitates Lysosomal $Ca^{2+}$ Accumulation

Mutations in ATP13A2, the human homolog of catp-6, belong to the PARK9 Parkinson's disease (PD) susceptibility locus. These mutations lead to the Kufor-Rakeb syndrome, a severe, early onset, autosomal recessive form of PD with dementia. PD is strongly connected to $Ca^{2+}$ dysregulation as excessive cytosolic $Ca^{2+}$ causes excitotoxicity of dopaminergic neurons. Overexpressing ATP13A2 suppresses toxicity and reduces cytosolic $Ca^{2+}$. Further, loss of ATP13A2 function leads to neuronal ceroid lipofuscinosis, a lysosomal storage disorder, implicating the lysosome as its potential site of action.

Figure 12A:
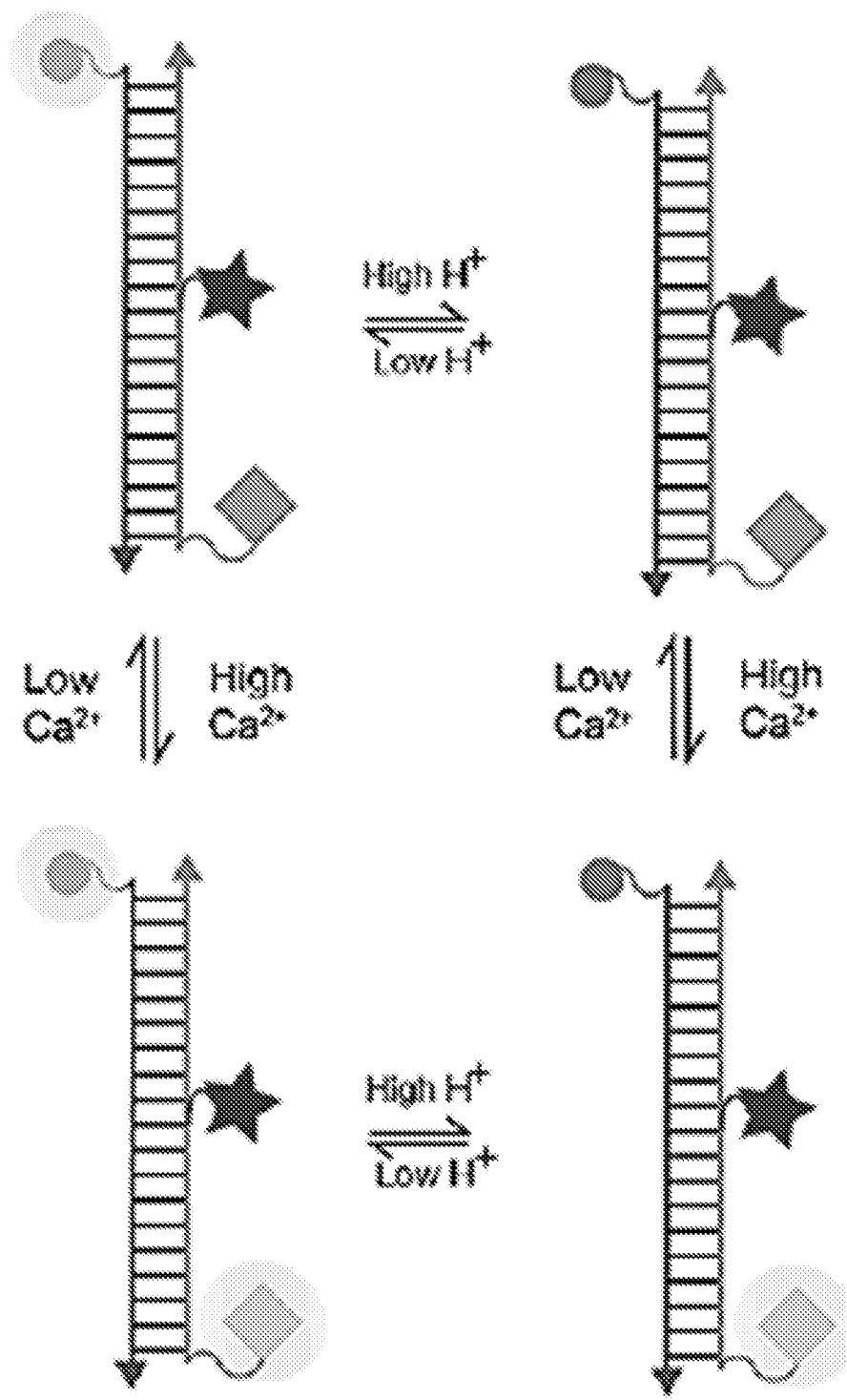
FIGS. 12A-12H illustrate design and characterization of a nucleic acid complex according to one embodiment of the disclosure, CalipHluor$^{mLy}$.
Figure 12B:
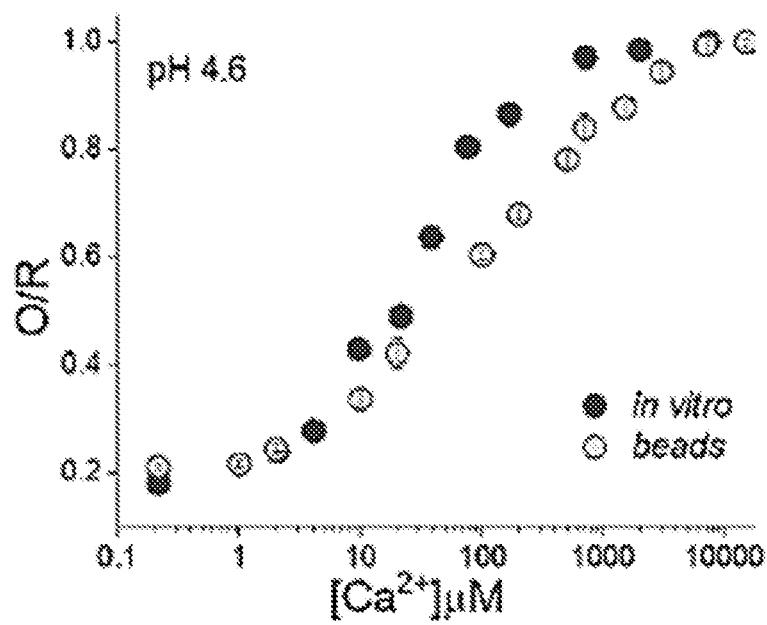
Figure 12C:
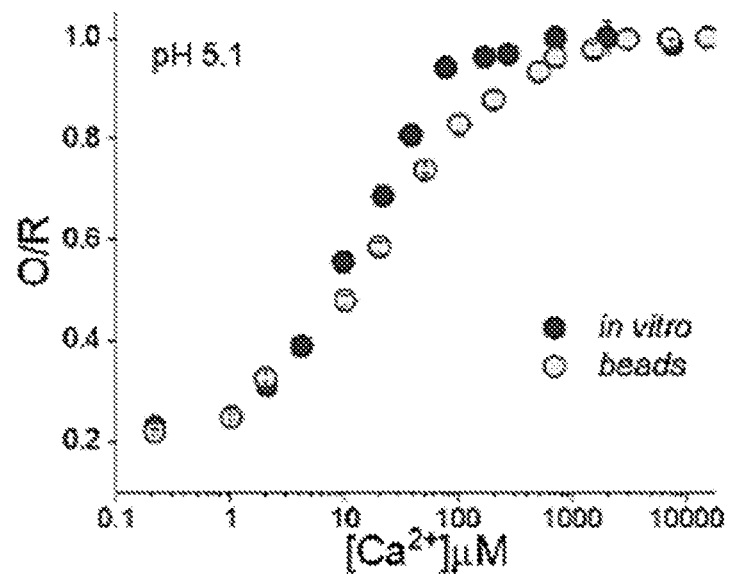
Figure 12D:
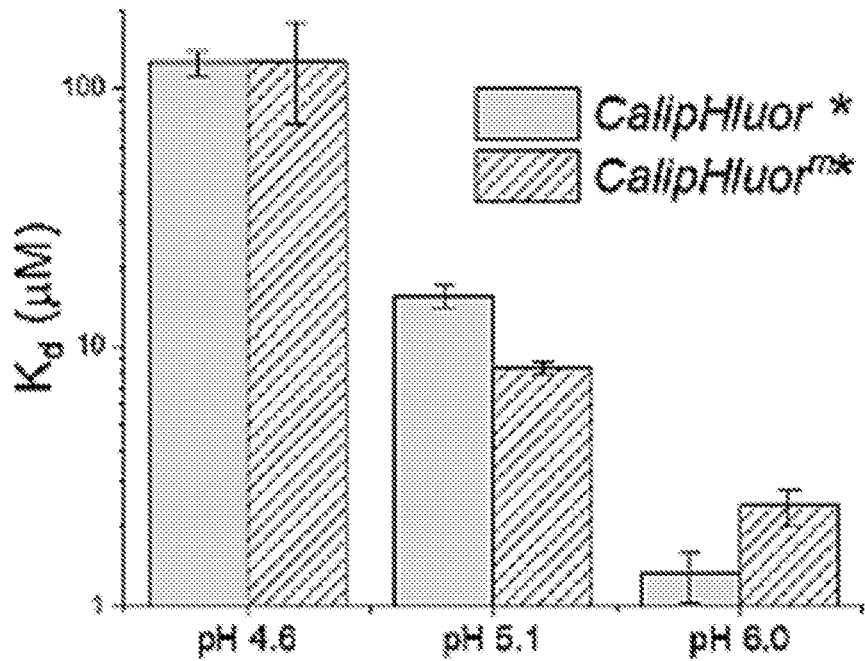
Figure 12E:
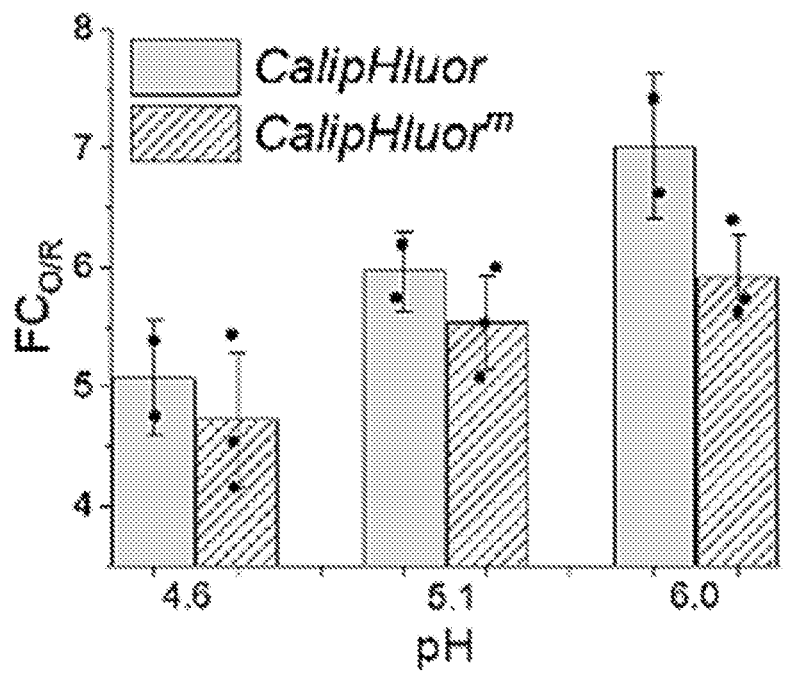
Figure 12F:
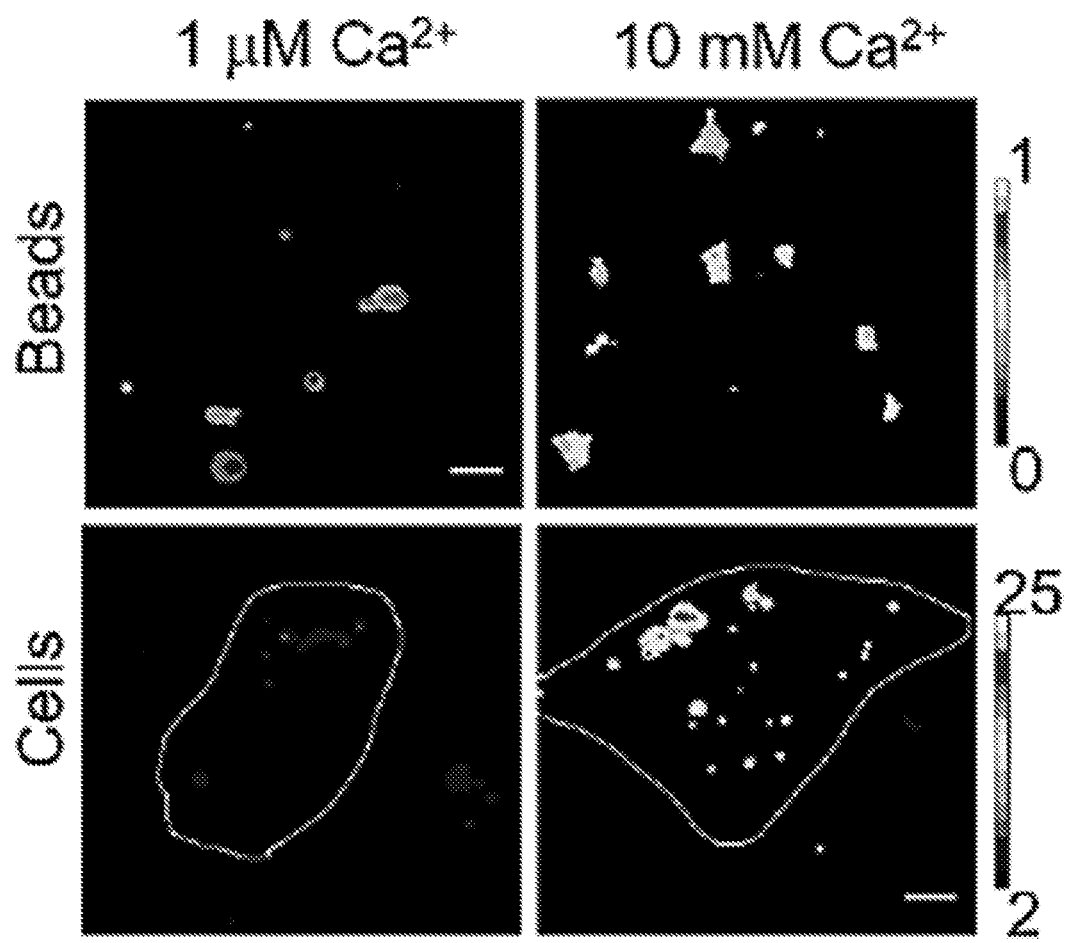
Figure 12G:
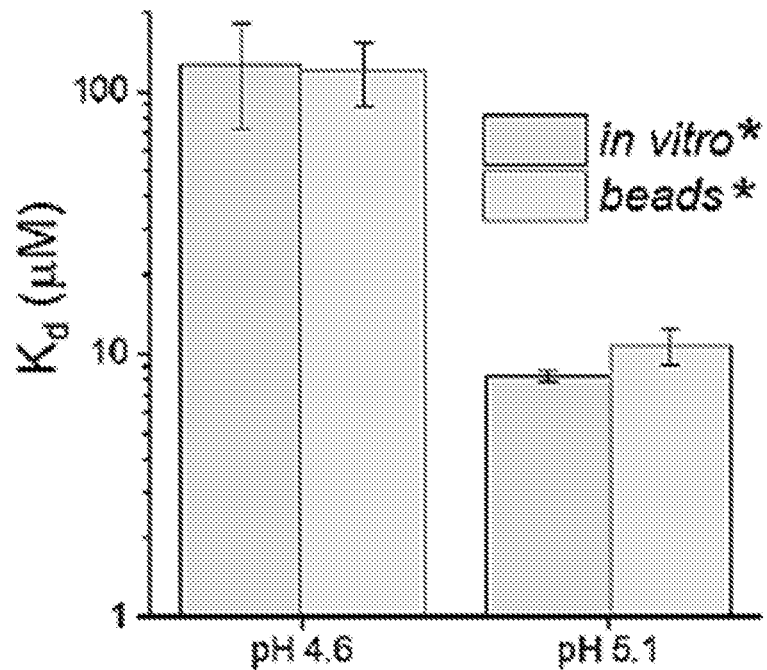
Figure 12H:
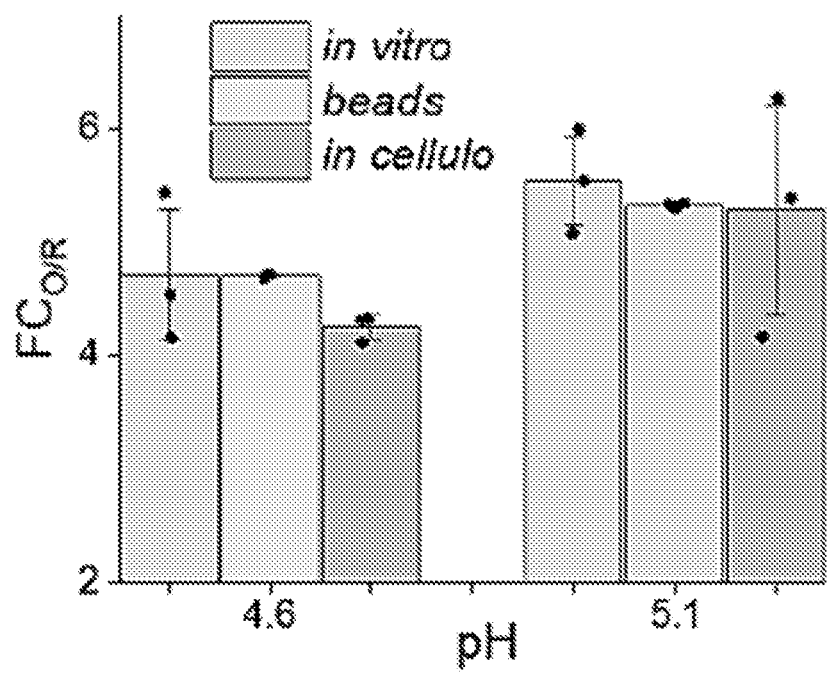

To confirm whether ATP13A2 also facilitated lysosomal $Ca^{2+}$ import, lysosomal $Ca^{2+}$ in human fibroblasts was mapped. A variant called CallpHluor$^{mLy}$ suited to measure the high acidity of mammalian lysosomes was created (FIG. 12A). CallpHluor$^{mLy}$ showed similar pH and $Ca^{2+}$ response characteristics in vitro, on beads and in cellulo and its $Ca^{2+}$ sensing characteristics are unaffected by the new pH sensing module (FIGS. 12B-12E)

Figure 5A:
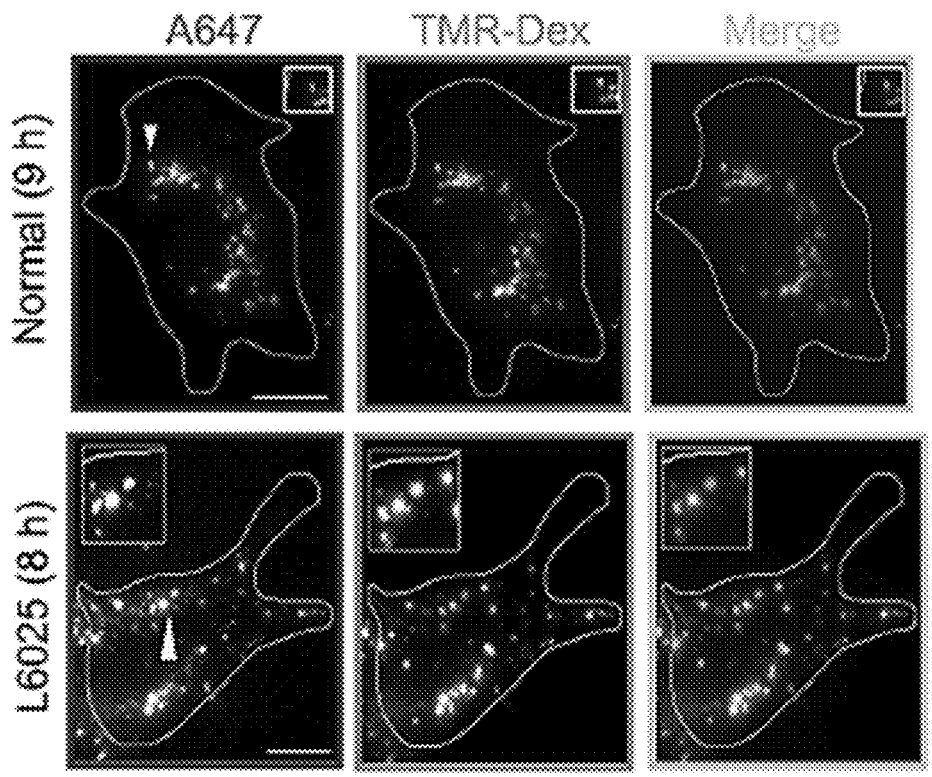
FIGS. 5A-5D illustrate lysosomal Ca$^{2+}$ of a nucleic acid complex according to one embodiment of the disclosure, CallpHluor$^{mLy}$, in human cells.
Figure 5B:
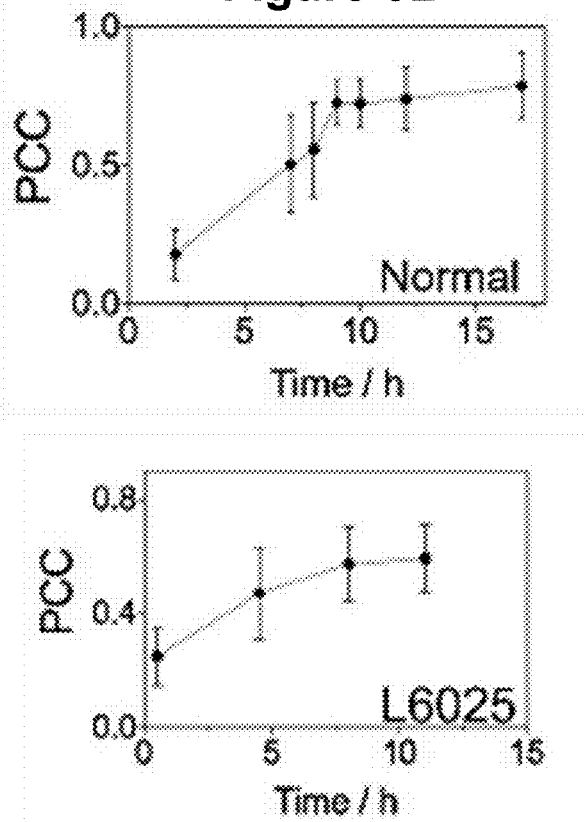
Figure 13A:
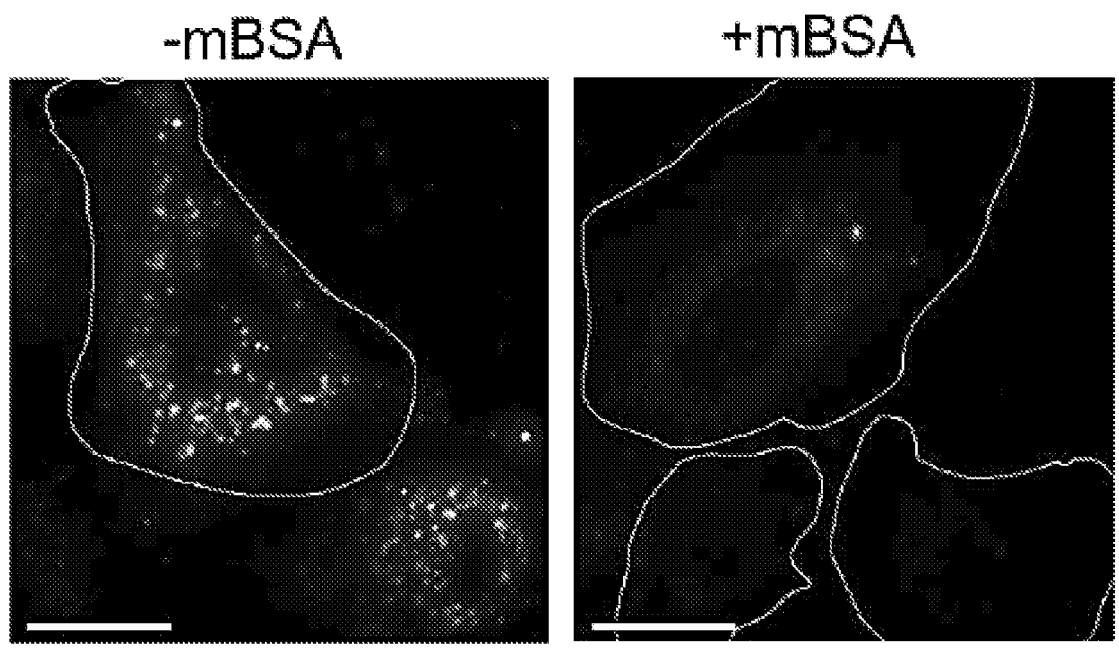
FIG. 13A provides images and FIG. 13B graphs CalipHluor$^{mLy}$ internalization by primary human skin fibroblasts is competed out by excess maleylated BSA (mBSA, 10 µM), revealing uptake is by scavenger receptors. Cells are imaged in Alexa647 channel. AF: autofluorescence. Scale bar: 10 µm. Experiments were performed in triplicate. Error bars indicate the mean of three independent experiments±S.E.M. (n=25 cells)
Figure 13B:
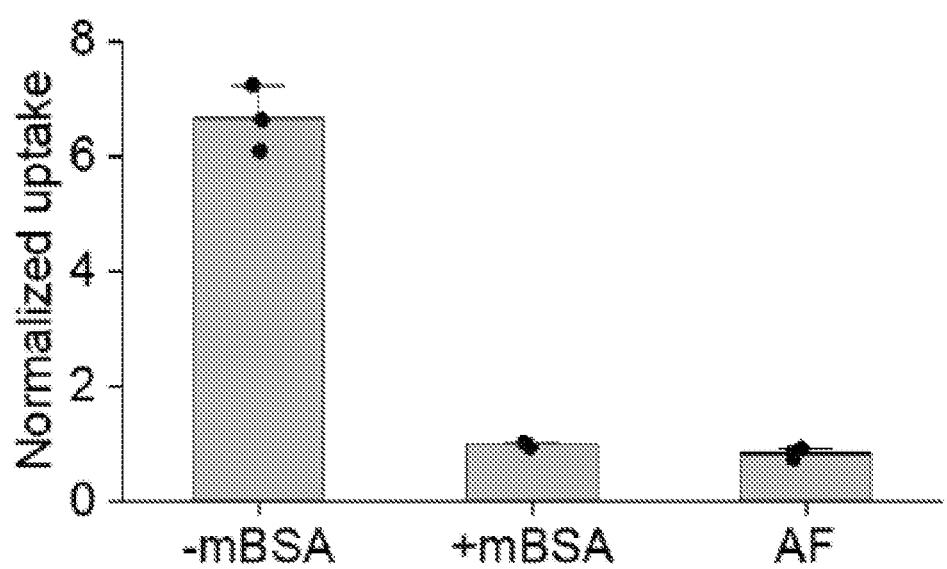

CallpHluor$^{mLy}$ was localized in lysosomes of primary human dermal fibroblasts (HDF cells) obtained from punch-skin biopsies. CallpHluor$^{mLy}$ labels lysosomes in HDF cells by scavenger receptor mediated endocytosis (FIGS. 5A-5B; FIG. 13). Briefly, a 1 hour pulse of 500 nM CallpHluor$^{mLy}$ followed by a 9 hour chase efficiently labels lysosomes in this cell type (FIGS. 5A-5B).

Figure 5C:
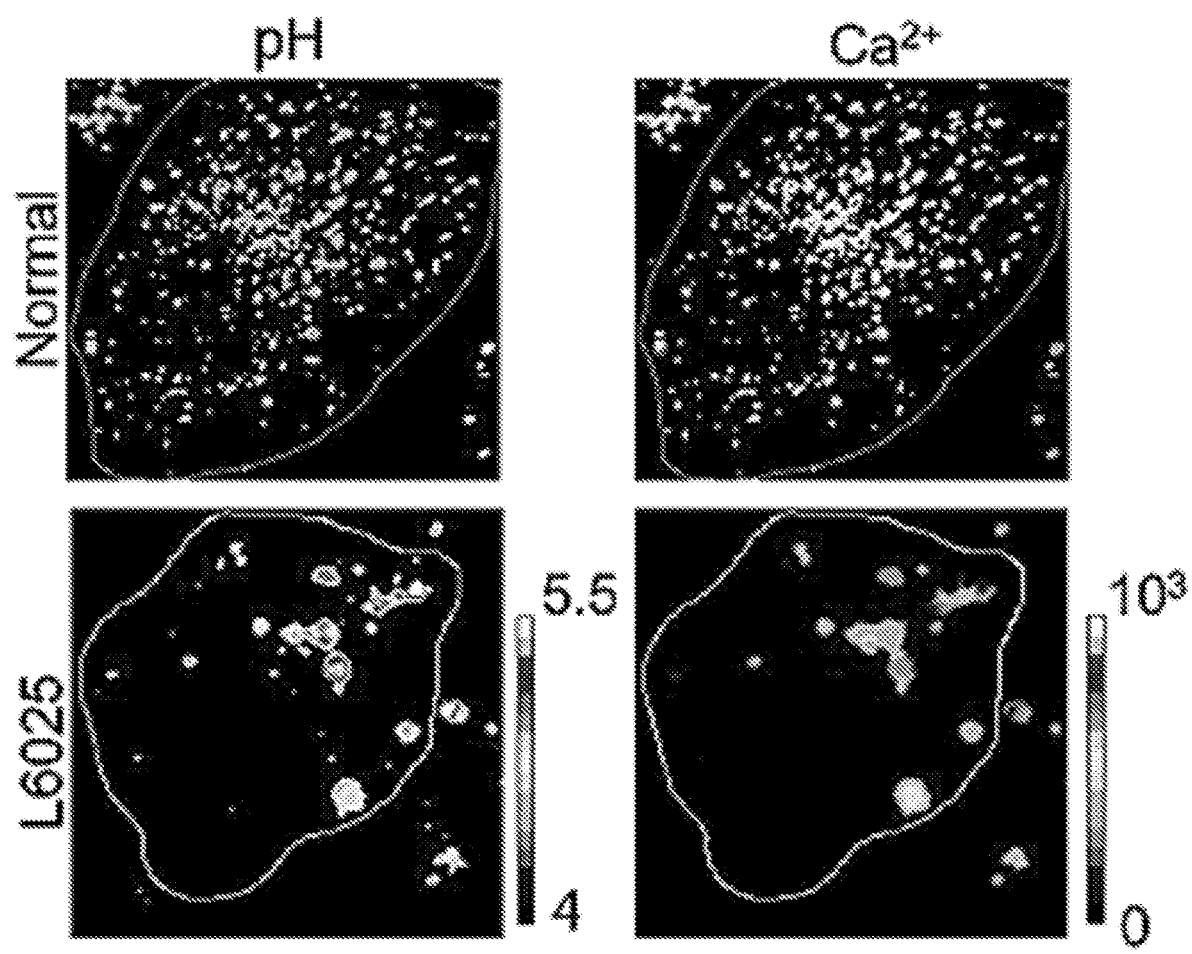
Figure 5D:
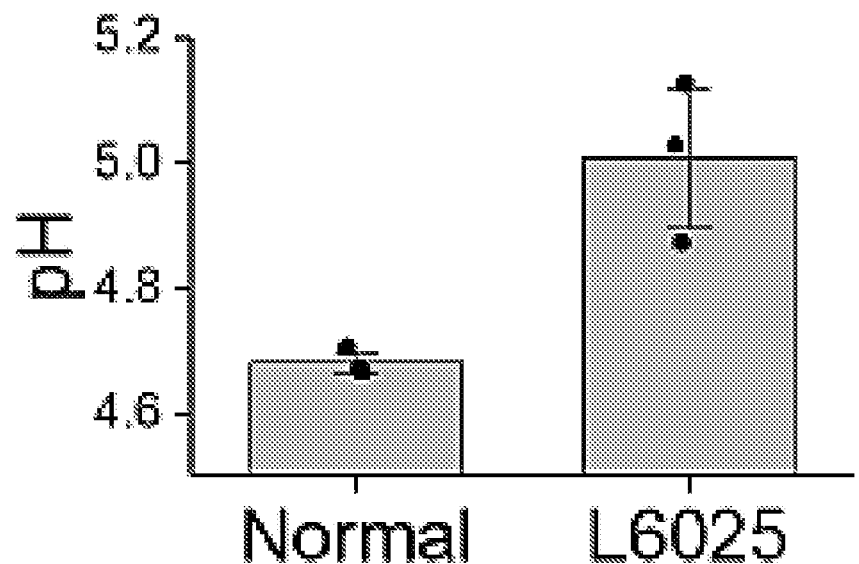
Figure 5E:
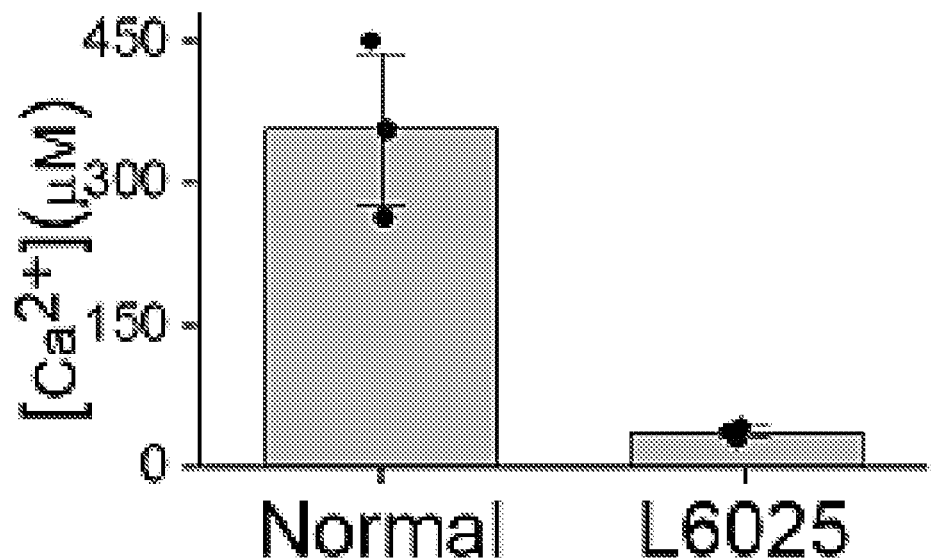
FIG. 5E illustrates mean lysosomal [Ca$^{2+}$] in normal and L6025 fibroblasts. (n=5 cells; 50 endosomes) Scale bar: 10 μm. Data represent mean±S.E.M. Experiments were repeated thrice independently with similar results.

Lysosomal $Ca^{2+}$ was measured in fibroblasts from normal individuals and L6025 primary fibroblasts isolated from male patients with Kufor Rakeb syndrome, that are homozygous for a C>T mutation in 1550 of ATP13A2. This mutation results in ATP13A2 being unable to exit the ER and the lysosomes are devoid of ATP13A2. After confirming its lysosomal localization in L6025 cells, using CallpHluor$^{mLy}$ lysosomal pH and $Ca^{2+}$ were measured (FIGS. 5B-5D). Lysosomes in KRS patients showed 14-fold lower $Ca^{2+}$ and about 2-fold lower [$H^+$] than normal (FIGS. 5C-5E) confirming that ATP13A2 mediates lysosomal $Ca^{2+}$ accumulation.

Example 11

Design and In Vitro Characterization of ChloropHore

Figure 14A:
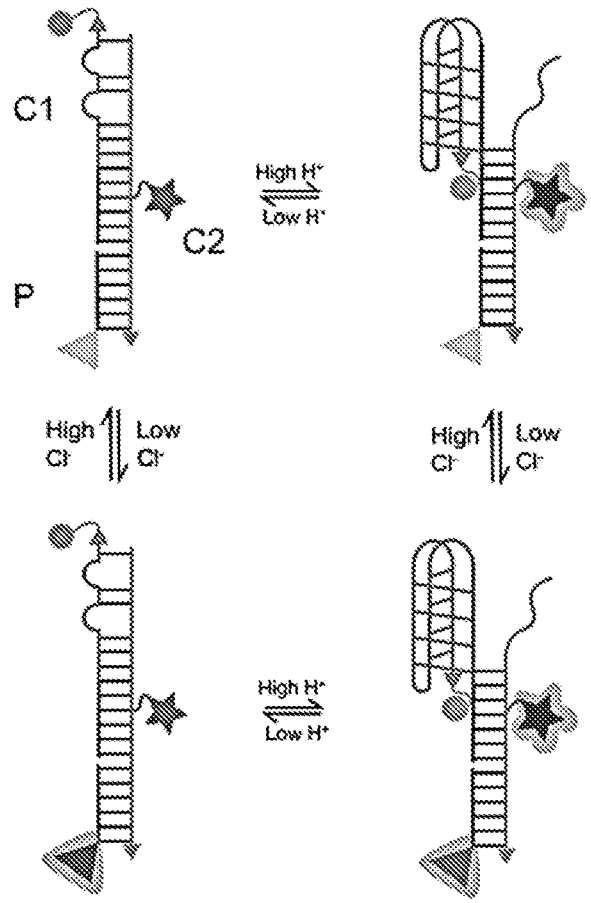
FIGS. 14A-14E illustrate design and characterization of ChloropHore.
Figure 14B:
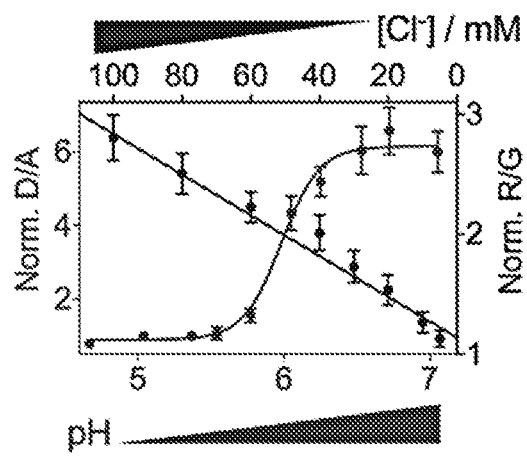

ChloropHore is a 61-base pair DNA duplex comprising three strands C1, C2 and P (Table 4) and bears three distinct domains (FIG. 14A). Two of these are fluorescent, ratiometric reporter domains that are previously reported, namely a $Cl^-$ reporter domain, Clensor and a pH-reporter domain called the I-switch. Each reporter domain is fused to either end of an "integration domain", which comprises a 27-mer duplex, that serves to integrate the pH and the $Cl^-$ reporter domains into a single DNA assembly. This 27-mer duplex also helps in targeting, because its anionic nature aids recognition and trafficking by scavenger receptors in a DNA sequence independent manner. To match the pH sensing regime of ChloropHore to the low pH regimes encountered in mammalian lysosomes ChloropHore$_{Ly}$, a variant that used modified 5'-bromocytosines in the C-rich region, was also made (Table 4). Sequences used for ChloropHore$_{Ly}$ assembly are oligo P, oligo C1-Br and oligo C2.

Figure 18:
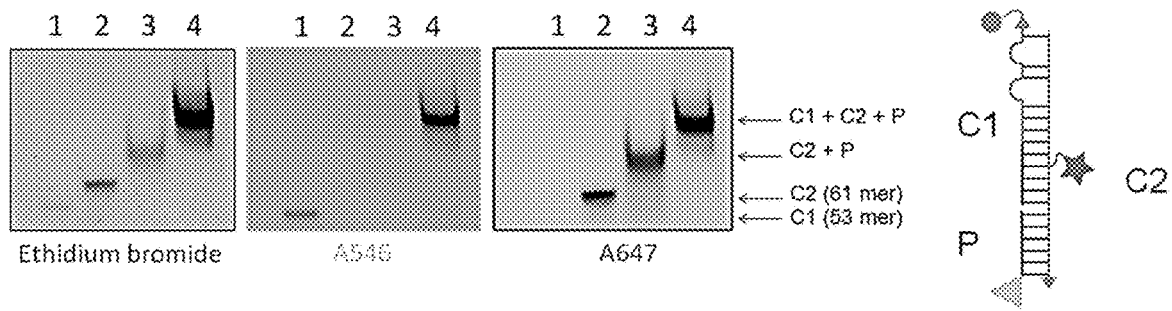
FIG. 18 illustrates formation of ChloropHore. Gel mobility shift assay showing the formation of ChloropHore. 12% Native PAGE run in 1×TBE buffer (pH 8.3) at 4° C. Lane 1: C1 2: C2, 3: C2+P 4: C1+C2+P (ChloropHore), in ethidium bromide, Alexa 546 and Alexa 647 channel. Experiments were performed in triplicate.

Specifically, formation of ChloropHore was validated by electrophoretic mobility shift assay utilizing native polyacrylamide gel electrophoresis (PAGE) (FIG. 18). The hybridization of C2 and P1 was revealed by the lower mobility of sample (C2+P) compared with sample C2 in ethidium bromide (EB) and Alexa 647 channel. Meanwhile, the lowest electrophoretic mobility of sample (C1+C2+P1) in EB, Alexa 546 and Alexa 647 channel indicates the formation of ChloropHore which constructed by C1, C2 and P1 in excellent yield.

To validate the conformational change of ChloropHore upon acidification, circular dichroism (CD) spectrometer was employed to validate the structural change in vitro. ChloropHore shows a positive peak at 272 nm and a negative peak at 248 nm in pH 7.5 characteristic of duplex DNA. However, at pH 4.0, a positive peak at 285 nm and a negative peak at 248 nm was observed. The difference spectra of ChloropHore at pH 4.0 and pH 7.5 showed a positive peak at 292 nm and a negative peak at 263 nm which consistent with the CD signature of an i-motif. This was also how i-motif formation was proved in the parent I-switch.

Figure 20:
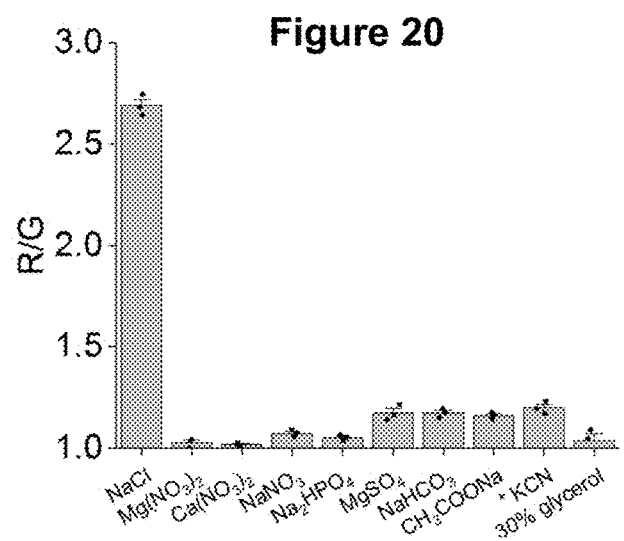
FIG. 20 illustrates response of ChloropHore (200 nM) given by the fold change in R/G from ~0 mM to 100 mM of all indicated ions and 30% glycerol. *2 mM. Error bars indicate the mean±s.e.m. of three independent measurements.

In FIG. 14, the sensing characteristics of the $H^+$ sensing module were demonstrated to be unaffected by integration to the $Cl^-$ sensing module and vice versa thus enabling potential detection of these two ions in parallel. The response of ChloropHore to various ions such as $Mg(NO_3)_2$, $Ca(NO_3)_2$, $NaNO_3$, $Na_2HPO_4$, $MgSO_4$, $NaHCO_3$ and $CH_3COONa$ and 30% glycerol was also investigated (FIG. 20). This reveals that the sensitivity of ChloropHore to diverse biologically abundant ions including $Na^+$, $Ca^{2+}$, $Mg^{2+}$, $NO_3^-$ and $PO_4^{3-}$ is negligible. BAC is also quenched by halides such as bromide and iodide ($Br^-$ and $I^-$). However, the combined concentrations of all these ions including $CN^-$ and $SCN^-$ in biological cells are <0.1% the value of chloride. At this low bioavailability, their contribution to the changes in BAC fluorescence in biological systems is negligible hence BAC acts as a chloride sensor in biological systems.

Figure 19:
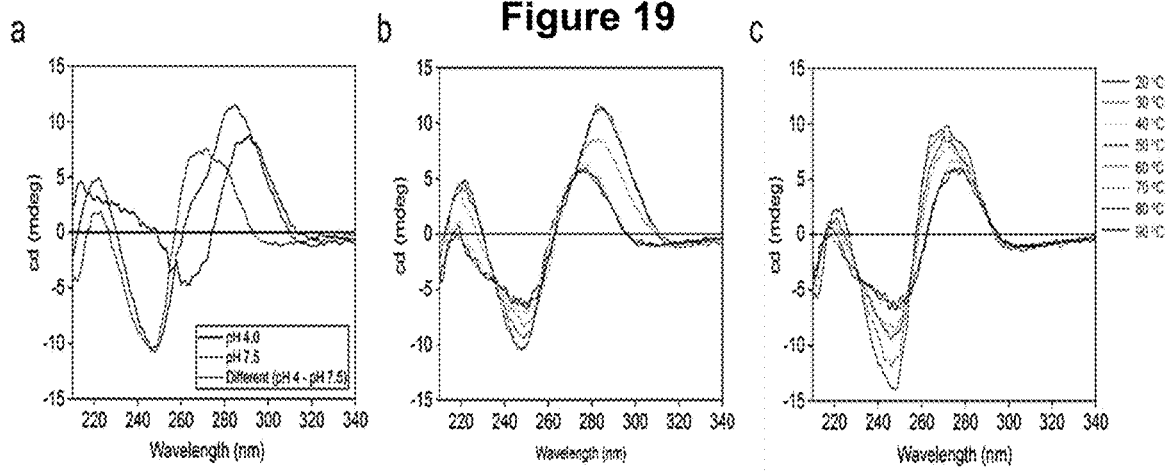
FIG. 19 illustrates characterization of ChloropHore by CD spectroscopy. (a) CD spectra of ChloropHore at pH 7.5 (light gray), pH 4.0 (dark gray) and difference spectra (pH 4.0-pH 7.5) is shown in black. Thermal denaturation is carried out on ChloropHore at (b) pH 4.0 as well as at (c) pH 7.5 to demonstrate i-motif formation. Experiments were performed in triplicate.

The formation and specificity of ChloropHore and ChloropHore$_{Ly}$ were confirmed by a gel shift assay, circular dichroism spectroscopy and UV melting studies (FIGS. 18-20).

TABLE 4

| Strand | Sequence information (SEQ ID NO.) |
|---|---|
| P | 5'-BAC-NH2-Lys-ATC AAC ACT GCA-Lys-COOH (SEQ ID NO: 15) |
| C2 | 5'-TAT TGT GTA TTG TGT ATT GTT TTA TAT AT/iAlexa 647/A TAG GAT CTT GCT GTC TGG TGT GCA GTG TTG AT-3' (SEQ ID NO: 16) |
| C1 | 5'-CAC CAG ACA GCA AGA TCC TAT ATA TAT ACC CCA ATC CCC AAT CCC CAA TCC CC-Alexa 546-3' (SEQ ID NO: 17) |
| C1-Br | 5'-CAC CAG ACA GCA AGA TCC TAT ATA TAT ACC CCA ATC CCC AAT CCC CAA TCC CC-3' (SEQ ID NO: 18) (Underlined C are 5'-Bromocytosines) |
| C2 unlabelled | 5'-TAT TGT GTA TTG TGT ATT GTT TTA TAT A T/iAlexa 647/ A TAG GAT CTT GCT GTC TGG TGT GCA GTG TTG AT-3' (SEQ ID NO: 19) |
| C1 unlabelled | 5'-CAC CAG ACA GCA AGA TCC TAT ATA TAT ACC CCA ATC CCC AAT CCC CAA TCC CC-3' (SEQ ID NO: 20) |
| I$^{mLY}_{OG}$ | 5'-ATCAACACTGCACACCAGACAGCA AGATCCTATATATA-3' (SEQ ID NO: 21) |

Figure 14C:
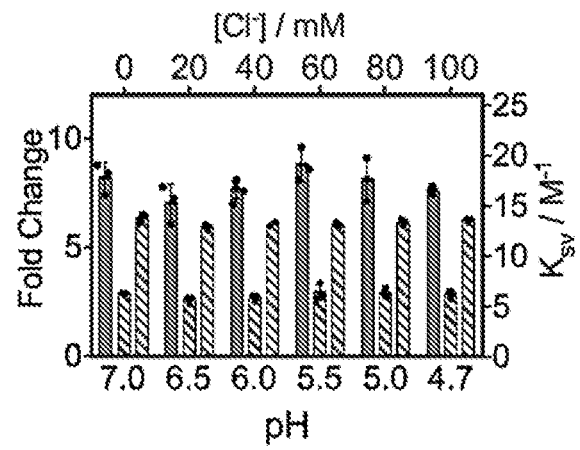
Figure 14D:
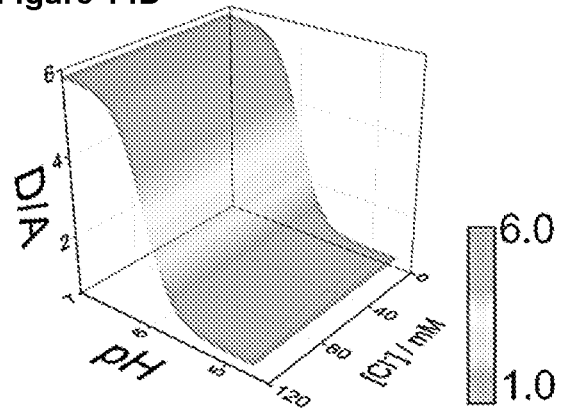
Figure 21A:
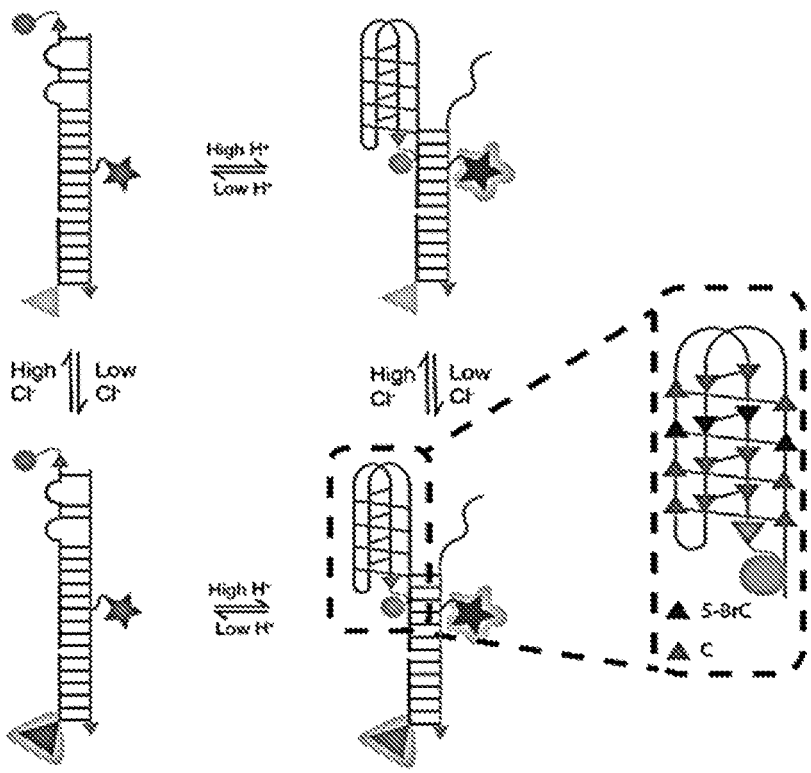
FIGS. 21A-21E illustrates design and characterization of ChloropHore$_{Ly}$.
Figure 21B:
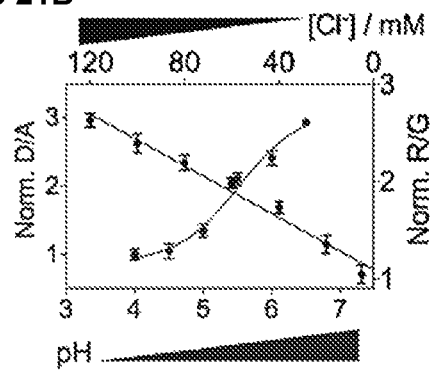
Figure 21C:
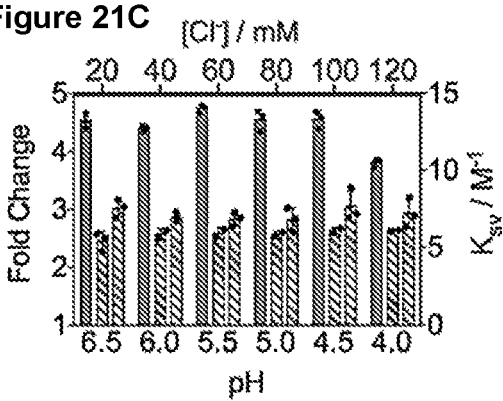
Figure 21D:
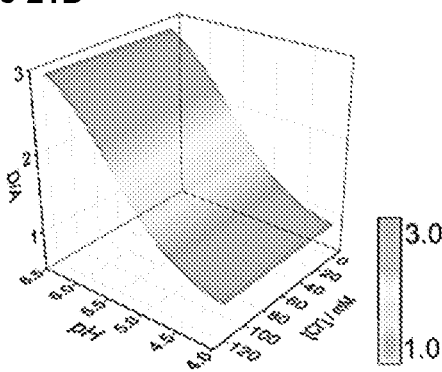

The fluorescence response characteristics of ChloropHore and ChloropHore$_{Ly}$ were investigated as function of pH and [Cl$^-$] in order to determine their pH and [Cl$^-$] sensitive regimes. The gradual increase of D/A ratio of ChloropHore and ChloropHore$_{Ly}$ revealed their pH reporting capabilities between pH 5.5 and 6.5 (FIG. 14B) and pH 4.5 and 6.5 respectively (FIG. 21B), the latter being well suited to measure the pH of highly acidic human lysosomes. Both ChloropHore and ChloropHore$_{Ly}$ show a sigmoidal increase in D/A as a function of pH in the sensitive regime, and fold changes in D/A ratios of 5.5 and 3 respectively. Notably, the fold change in D/A ratio remained invariant for both ChloropHore and ChloropHore$_{Ly}$ over [Cl$^-$] ranging from 5 mM to 120 mM (FIG. 14C and FIG. 21C). Thus, the pH sensing characteristics of ChloropHore and ChloropHore$_{Ly}$ are insensitive to changes in physiological [Cl$^-$]. This is illustrated by a 3D surface plot of D/A as a function of pH performed at different fixed values of [Cl$^-$] is shown in FIG. 14D (FIG. 21D).

Figure 14E:
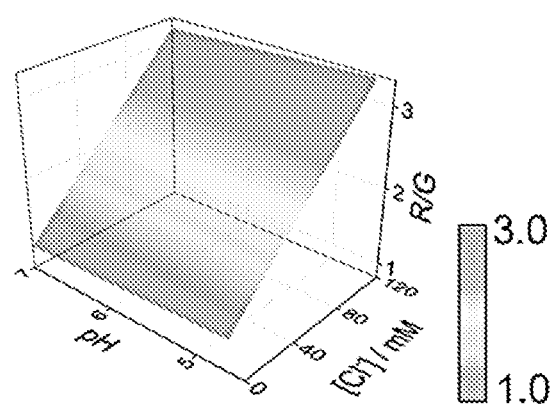
Figure 21E:
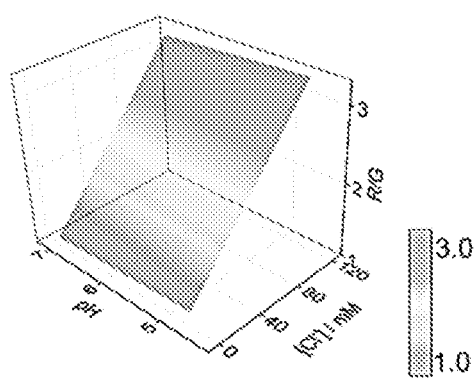

In parallel, the R/G ratio shows a linear dependence with increasing [Cl$^-$], showing about 2.5 fold change upon increasing [Cl$^-$] from 5 mM to 120 mM (FIGS. 14B-14C and FIGS. 21B, 21C). Again, for both ChloropHore and ChloropHore$_{Ly}$ the Stern Volmer constant ($K_{sv}$) and the fold change in R/G stayed constant as a function of pH from pH 4.5-7.0 (FIG. 14C and FIG. 21C). This is illustrated by a 3D surface plot of R/G as a function of Cl$^-$ performed at different fixed values of pH as shown in FIG. 14E (FIG. 21E). Thus, the [Cl$^-$] sensing characteristics of ChloropHore and ChloropHore$_{Ly}$ are insensitive to changes in physiological pH. This indicates that in ChloropHore and ChloropHore$_{Ly}$, the sensing characteristics of the H$^+$ sensing module is unaffected by integration to the Cl$^-$ sensing module and vice versa thus enabling potential detection of these two ions in parallel.

Example 12

Two Ion Measurement with Single Endosome Addressability

Figure 15A:
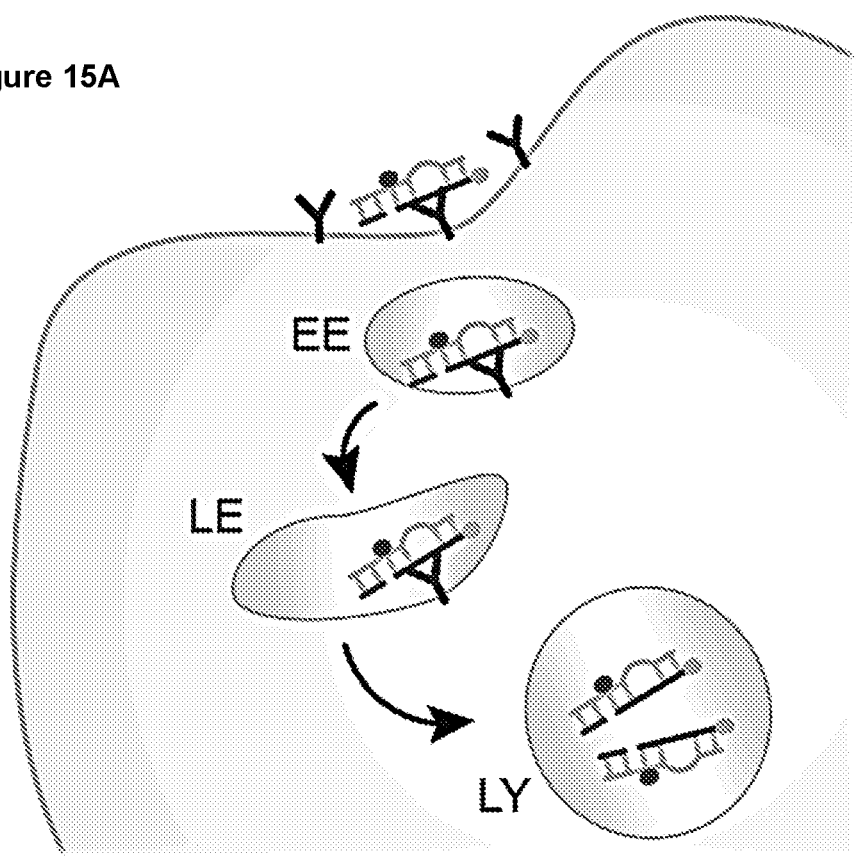
FIGS. 15A-15G illustrate trafficking pathway of ChloropHore in human dermal fibroblasts.
Figure 15B:
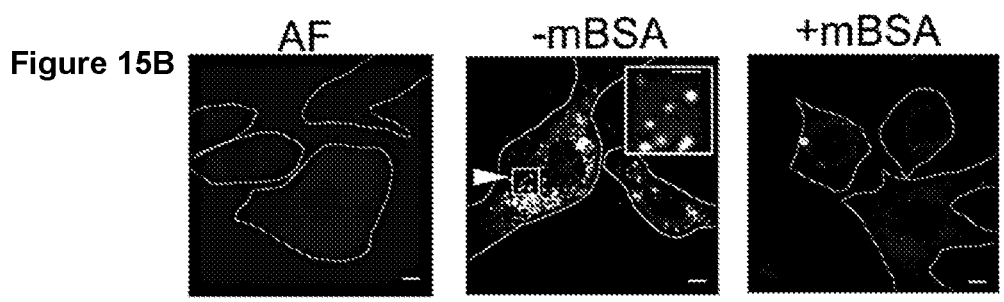
Figure 15D:
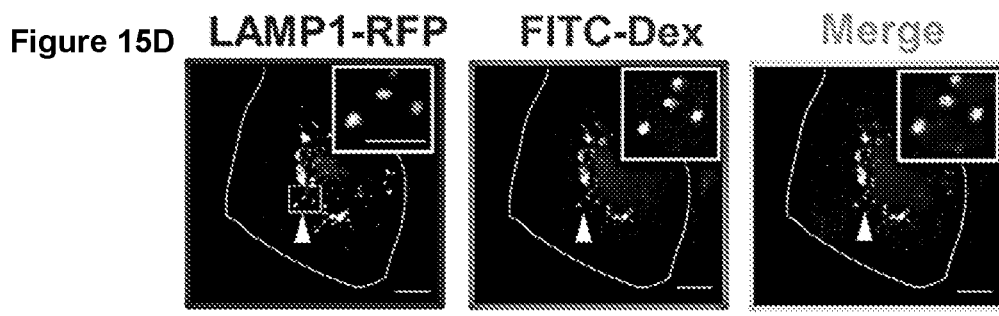
Figure 15F:
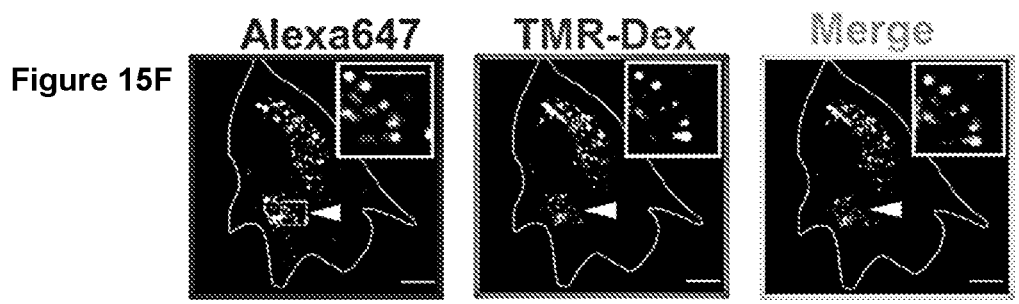
Figure 15C:
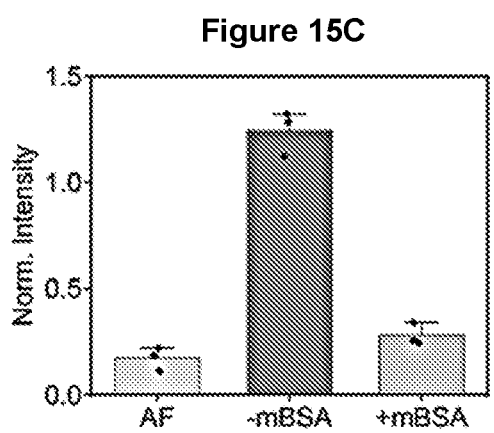

To simultaneously measure lysosomal pH and [Cl$^-$] in live cells, ChloropHore to the lysosomes of human dermal fibroblasts (HDF) was targeted. Human dermal fibroblasts (HDF) express scavenger receptors (SR) that uptake anionic ligands. Therefore DNA nanodevices can be trafficked to organelles on the endolysosomal pathway in diverse living systems (FIG. 15A). Upon incubating ChloropHore with HDF cells for 1 h (referred to as 1 h "pulse"), uptake into punctate endosomes was excellent (FIGS. 15B, 15D, 15F). The uptake was effectively competed out by 10 equivalents of maleylated BSA revealing that in HDF cells, ChloropHore is internalized via the SR pathway (FIGS. 15B-15C).

Figure 15E:
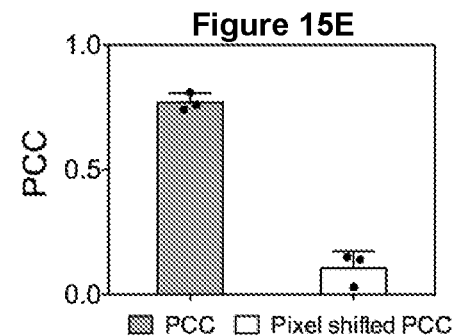
Figure 15G:
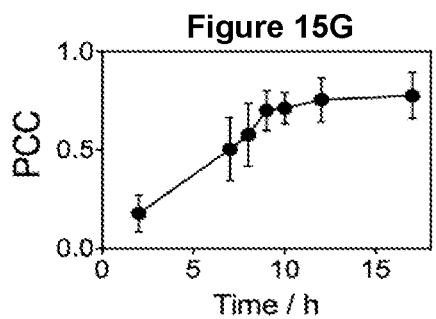
Figure 22:
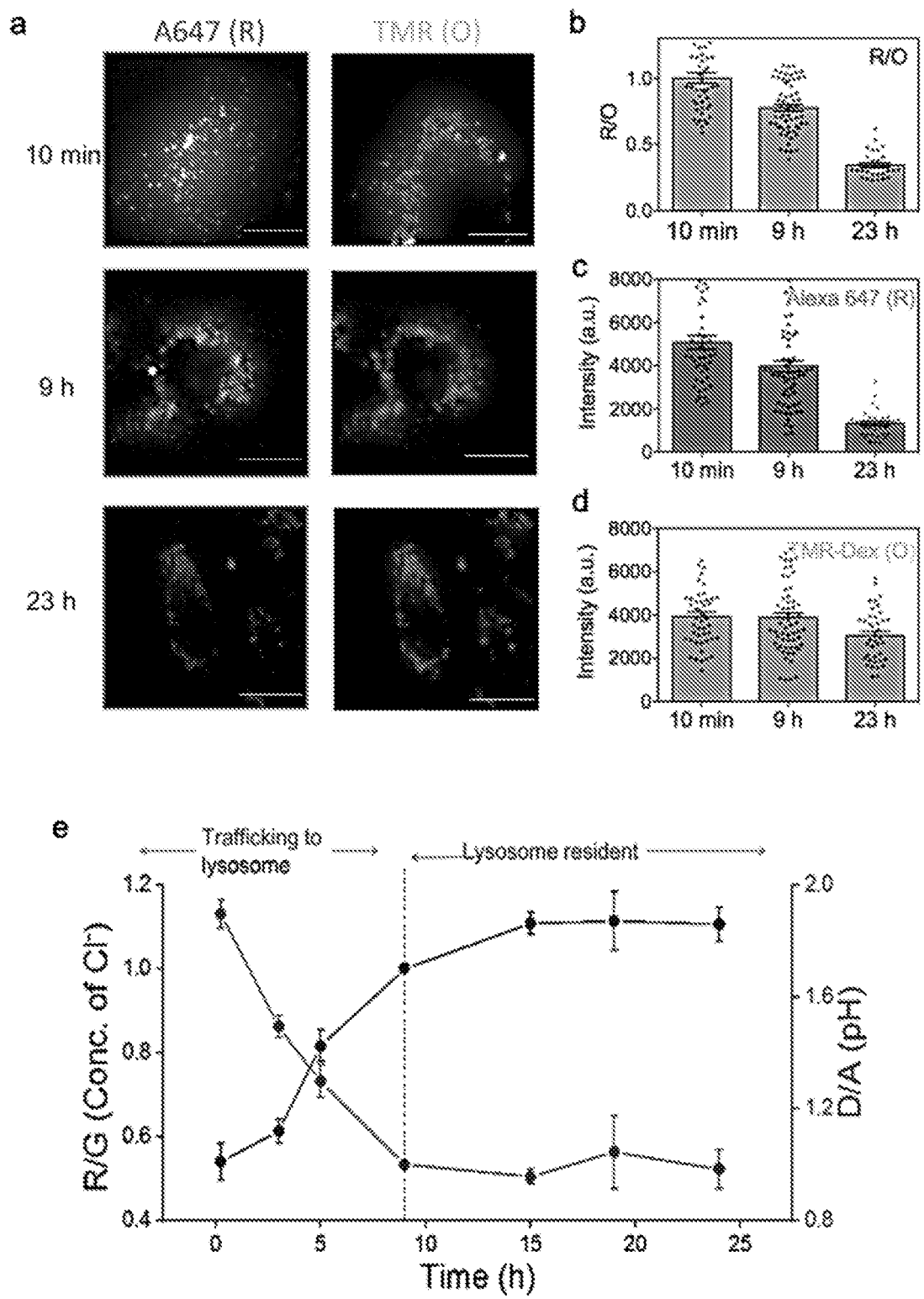
FIG. 22 illustrates stability of ChloropHore in HDF cells. (a) Representative images of HDF cells at indicated time points. Plots showing the (b) mean R/O ratio, (c) Alexa 647 labelled ChloropHore in the (R) channel and (d) TMR-Dex (O) channel whole cell intensity. Experiments were performed in triplicate. Error bars indicate the mean of cell intensity±s.e.m. (n=60 cells). Scale bar=10 μm (e) Plot showing R/G ratios indicating increase of lumenal [Cl$^-$] (dark gray trace) and D/A ratios indicating increase of lumenal acidity (light gray trace) as a function of chase time. Error bars indicate the mean of three independent experiments±s.e.m. (n=25 cells, 250 endosomes)

The time required for lysosomal localization of ChloropHore was then estimated by its time-dependent colocalization with a lysosomal marker. Pulsing HDF cells with 10 KDa fluorescent dextrans (0.25 mg/mL) for 1 h followed by a 16 h chase effectively marked lysosomes, as revealed by colocalization with LAMP1-RFP (FIGS. 15D-15E). Next, ChloropHore was pulsed in HDF cells where lysosomes were pre-labeled with TMR-Dextran as above, washed and imaged the cells at various chase times. ChloropHore and TMR-Dextran showed maximal co-localization at 9 h (FIGS. 15F-15G, FIG. 22). Stability measurements revealed that ChloropHore and ChloropHore$_{Ly}$ had a half-life of 20 hours and were stable for at least 10 h in HDF lysosomes (FIG. 22).

Figure 16:
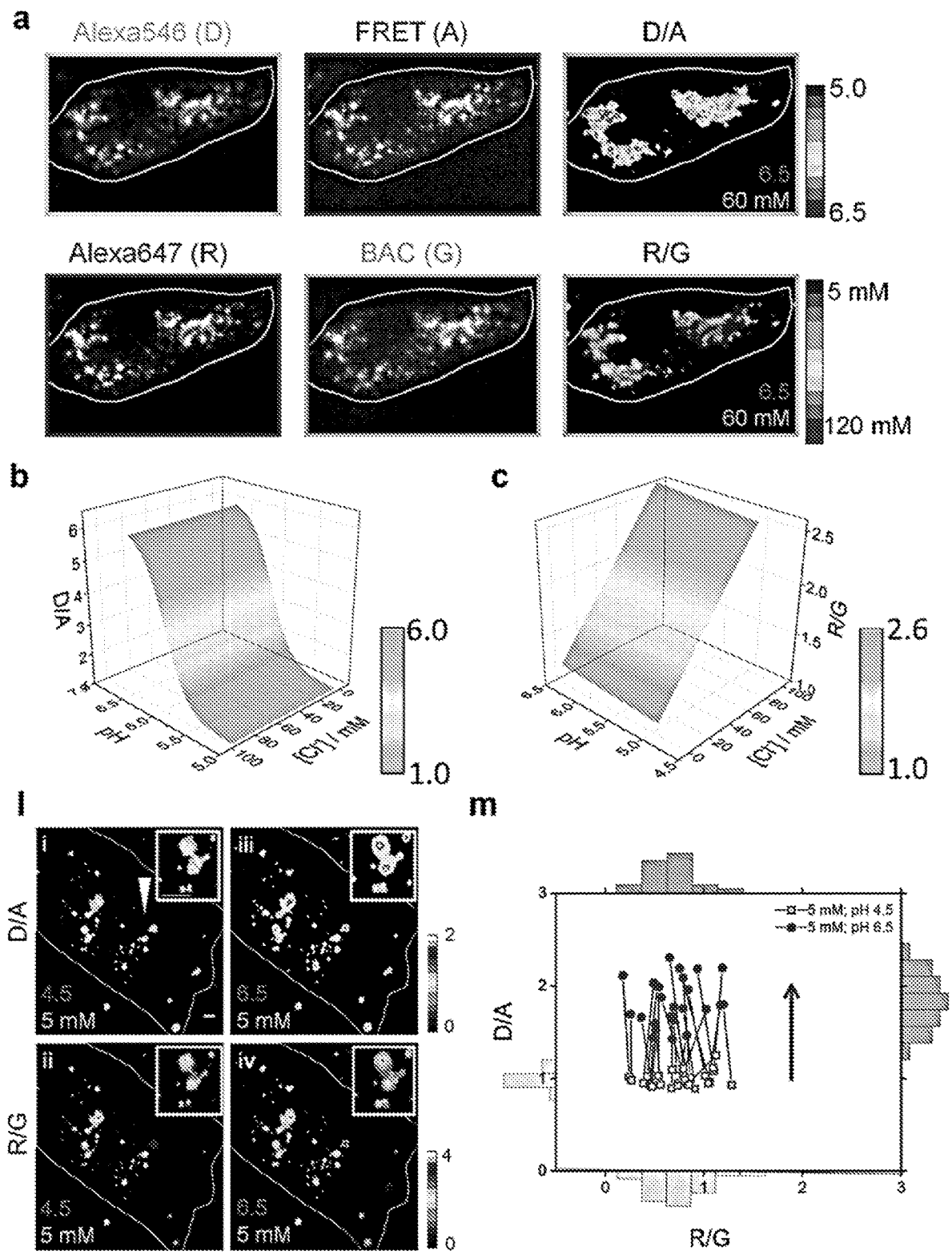
Figure 16:
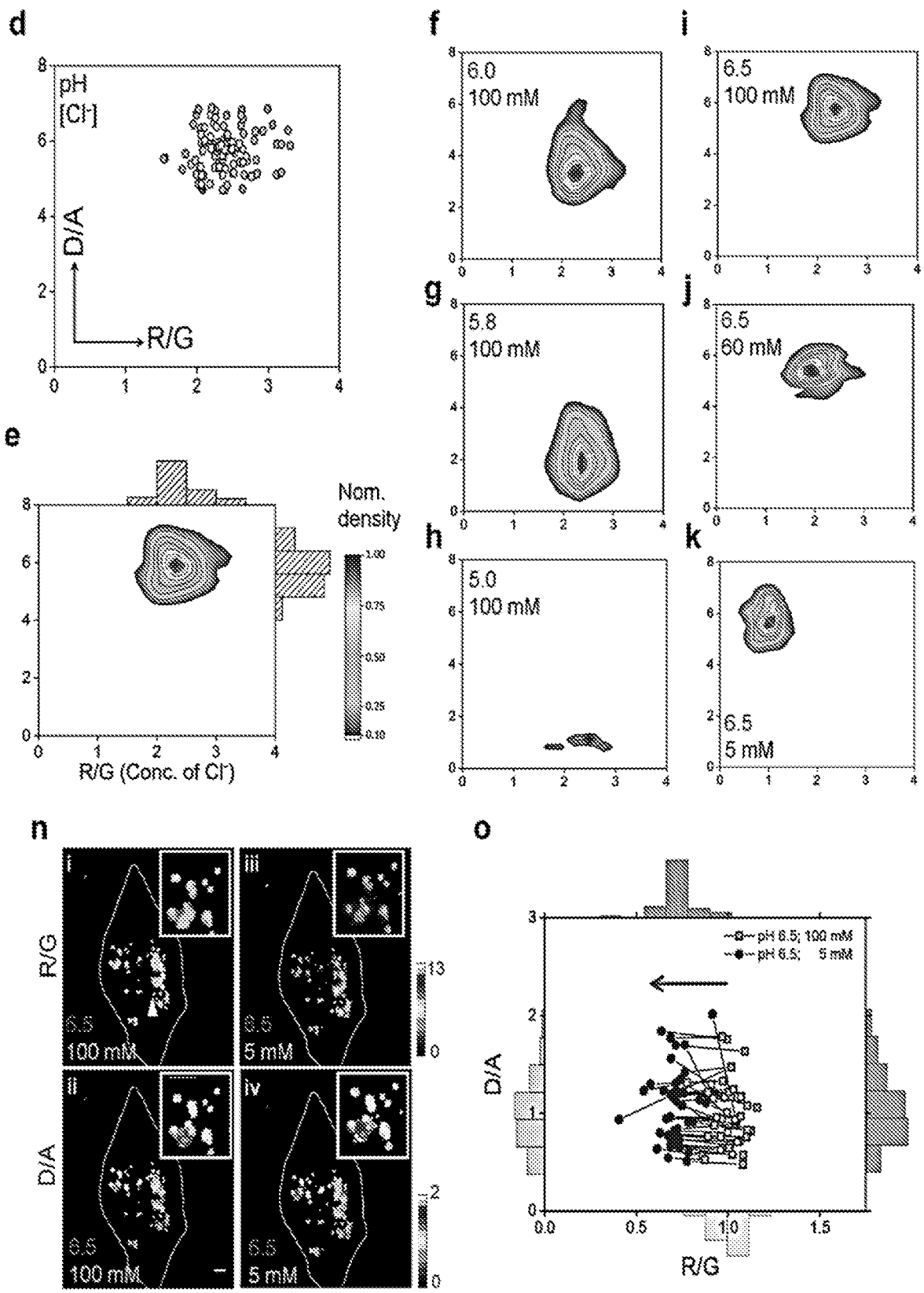
Figure 24:
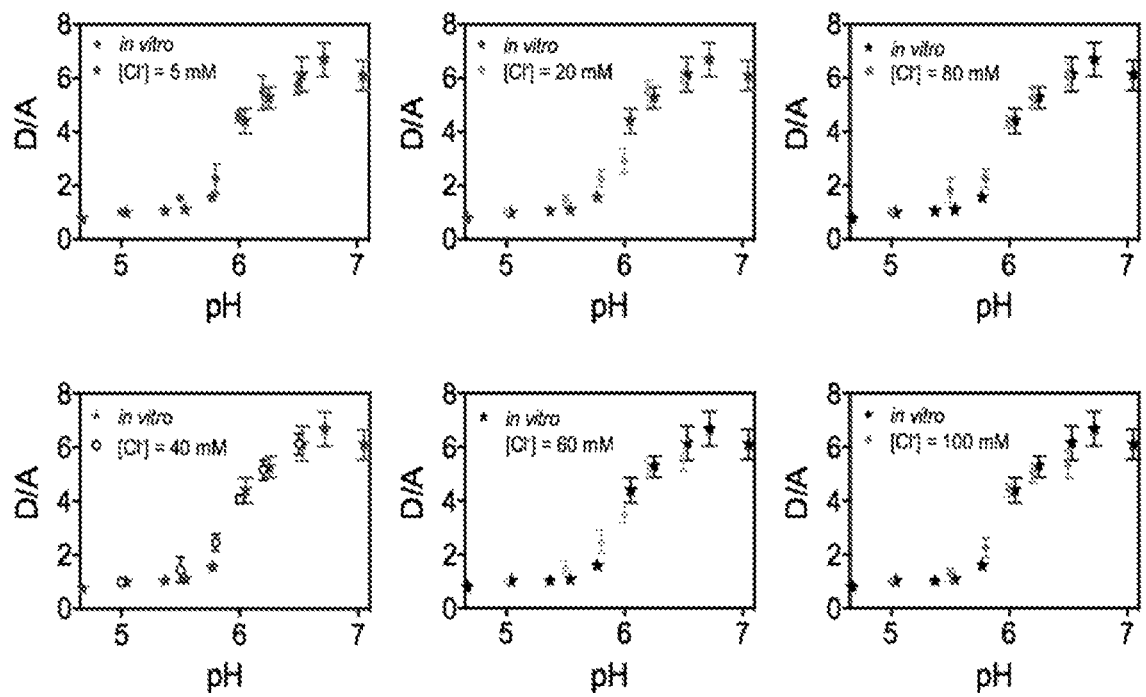
FIG. 24 illustrates intracellular calibration profile of ChloropHore. (a) D/A and (b) R/G ratio of ChloropHore as a function of pH and Cl$^-$ in endosomes of human dermal fibroblasts each showing the intracellular calibration profile in the specified pH/Cl$^-$ clamped condition (color dots). Error bars indicate the mean of three independent experiments±s.e.m. (n=15 cells, 150 endosomes).
Figure 24:
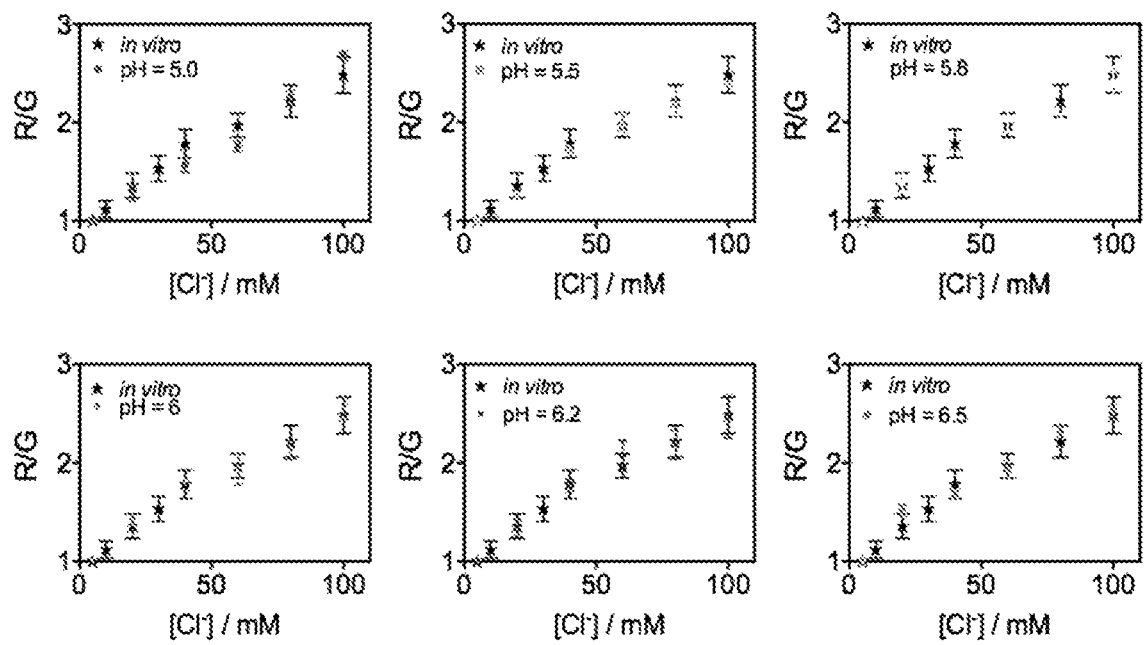

Next, the in-cell pH and [Cl$^-$] sensing characteristics of ChloropHore were investigated. Lumenal pH and [Cl$^-$] in ChloropHore-labeled HDF cells was clamped by incubation in clamping buffers of fixed pH and [Cl$^-$] containing nigericin, monensin and tributyltin chloride at high [K$^+$]. FIG. 16A shows representative fluorescence images of a cell clamped at the indicated pH and [Cl$^-$] imaged in the D, A, R and G channels along with the corresponding D/A and R/G maps. Histograms of D/A and R/G values of 150 endosomes clamped at different pH and [Cl$^-$] are shown in FIG. 23. ChloropHore showed a ~5.5 fold-change in D/A value from pH 4.0 to pH 7.0 across all tested values of [Cl$^-$], with the in vitro 3D surface plot being quantitatively recapitulated in cells (FIG. 16B, FIG. 24). Similarly, ChloropHore response in terms of R/G as a function of [Cl$^-$] was performed at different fixed values of physiological pH (FIG. 16C). Both the $K_{sv}$ and fold-change in R/G from 5 mM to 120 mM [Cl$^-$] was constant from pH 4.0-7.0, with the in vitro 3D surface plot of R/G being quantitatively recapitulated in cells (FIG. 16C, FIG. 24). This revealed that ChloropHore and ChloropHore$_{Ly}$ can simultaneously report pH and [Cl$^-$] with performance characteristics in cells that closely match their in vitro pH and [Cl$^-$] sensing properties.

Next, both ions in endosomes were simultaneously mapped while retaining this information with single endosome addressability in live cells. Therefore, the D/A value— reflecting lumenal pH—in a given endosome is plotted against the R/G value in the same endosome—reflecting lumenal [Cl$^-$]—for 150 endosomes, which is represented as a scatter plot with each data point corresponding to a single endosome (FIG. 16D). For clearer visualization, this data is represented as a density plot color coded according to their frequencies of occurrence (FIG. 16E). This is a method of simultaneous quantitative imaging of two ions in a single endosome, while retaining concentration information with single endosome addressability as two-ion measurement (2-IM) and the corresponding density plot as a 2-IM profile. FIGS. 16F-16H shows the 2-IM profile of 150 endosomes clamped at the same [Cl$^-$] (100 mM) but different pH, while FIGS. 16I-16K shows the 2-IM profile of 150 endosomes clamped at the same pH (pH 6.5), but different [Cl$^-$].

Figure 25:
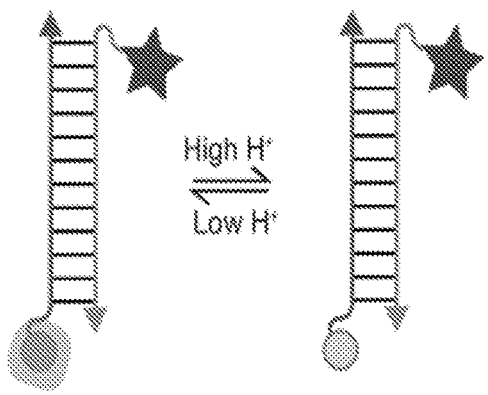
FIG. 25 illustrates performance of I$^{mLy}$ in fibroblast. (a) Schematic of the working principle of I$^{mLy}$ at low and high pH. pH indicator—Oregon green (OG) was conjugated to DNA and hybridize with its Alexa 647 labeled complementary strand. (b) In vitro (dark gray) and in cellulo (light gray) calibration curve of I$^{mLY}$. Histograms showing spread of G/R ratios of lysosomes of cells from a normal individual (c) without or (d) 500 nM bafilomycin A1. (e) Bar graphs showing the mean lysosomal pH (G/R) ratios obtained from lysosomes of normal individual cells treated with or without 500 nM bafilomycin. Experiments were performed in triplicate. Error bars indicate the mean of three independent experiments±s.e.m. (n=15 cells, 150 lysosomes)
Figure 25:
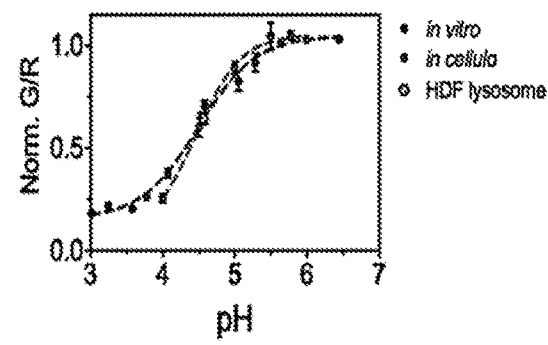
Figure 25:
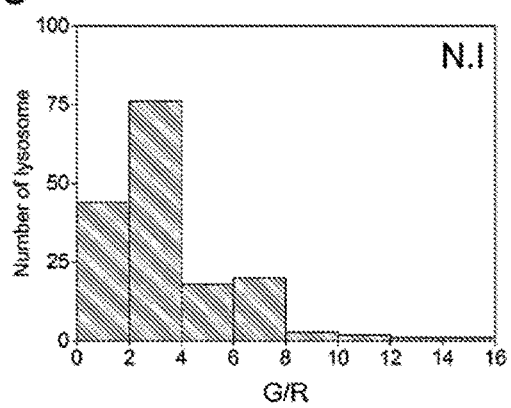
Figure 25:
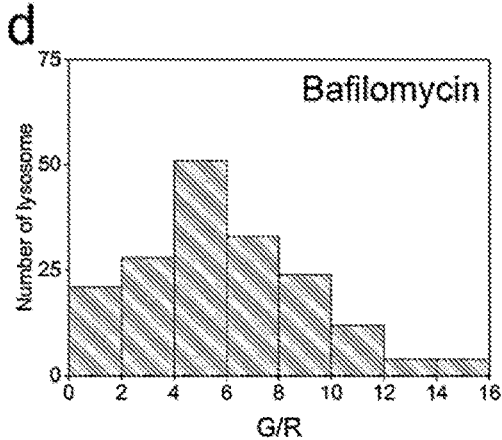
Figure 25:
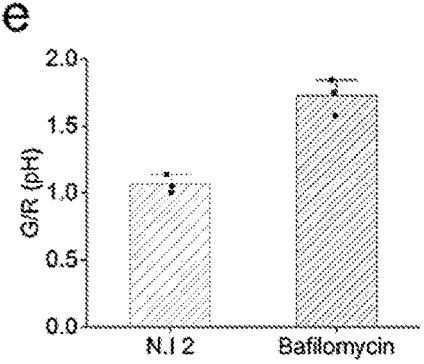
Figure 26:
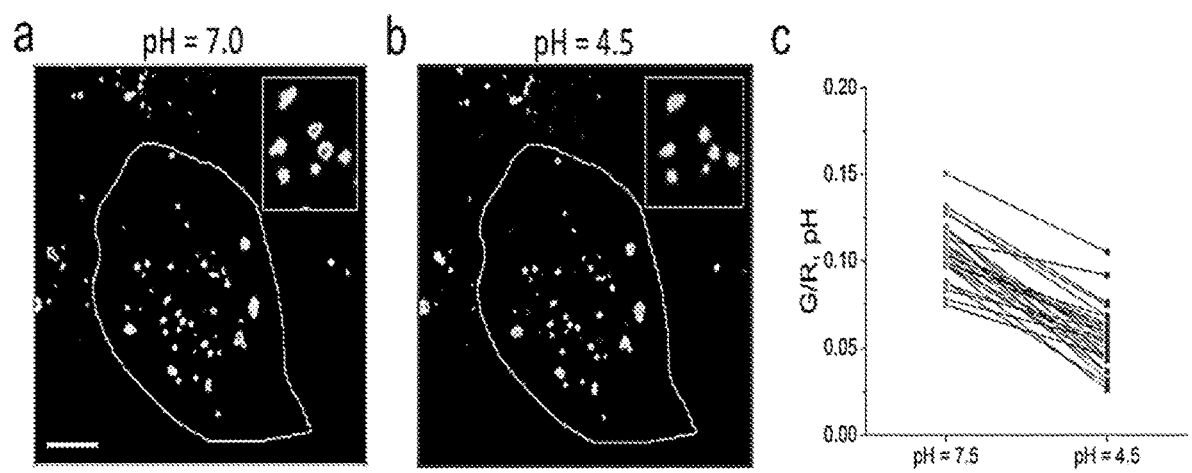
FIG. 26 illustrates quantitative performance of I$^{mLY}$ within single lysosome. (a) Respective pseudocolour G/R map of normal individual skin fibroblast labeled with I$^{mLY}$ and clamped at the indicated pH and [Cl$^-$]=100 mM. Scale bar=10 μm. (b) G/R change of lysosomes of cells that clamped with pH 7.5 and pH 4.5. Experiments were performed in triplicate (n=15 lysosomes).

To illustrate the capability of 2-IM to address single endosomes, ChloropHore$_{Ly}$-labeled HDF were subjected cells to different clamped states of pH and [Cl$^-$] in series due to its optimal pH responsivity in lysosomes (FIG. 25). ChloropHore$_{Ly}$ labeled endosomes were clamped at the indicated pH and Cl$^-$ and imaged in D, A, R and G channels (FIGS. 16I, 16N). FIG. 16L(i-ii) shows the D/A and corresponding R/G maps of cells clamped at pH 4.5 and 5 mM Cl$^-$. The D/A and corresponding R/G maps of these same cells subsequently clamped at the same value of [Cl$^-$], but at pH 6.5 are shown in FIG. 16L(iii-iv) (FIG. 26). FIG. 16M shows a plot of individual endosomes in each clamped state, with black lines connecting the same endosome in either clamped state. It is clear that when [Cl$^-$] was constant and pH changed, all the endosomes show increased D/A and negligible variation of R/G, moving parallel to the Y-axis. Similarly, FIG. 16N(i-iv) shows the D/A and R/G maps of cells clamped at 100 mM Cl$^-$ and pH 6.5 that have subsequently been clamped at the same value of pH, but at 5 mM [Cl$^-$]. Again, when pH was constant and [Cl$^-$] was changed, individual endosomes moved from right to left, parallel to the X-axis (FIG. 16O). Thus, in addition to population measurements, 2-IM provides information with single endosome resolution.

Example 13

Two Ion Measurement Chemically Resolves Lysosome Populations

Figure 17:
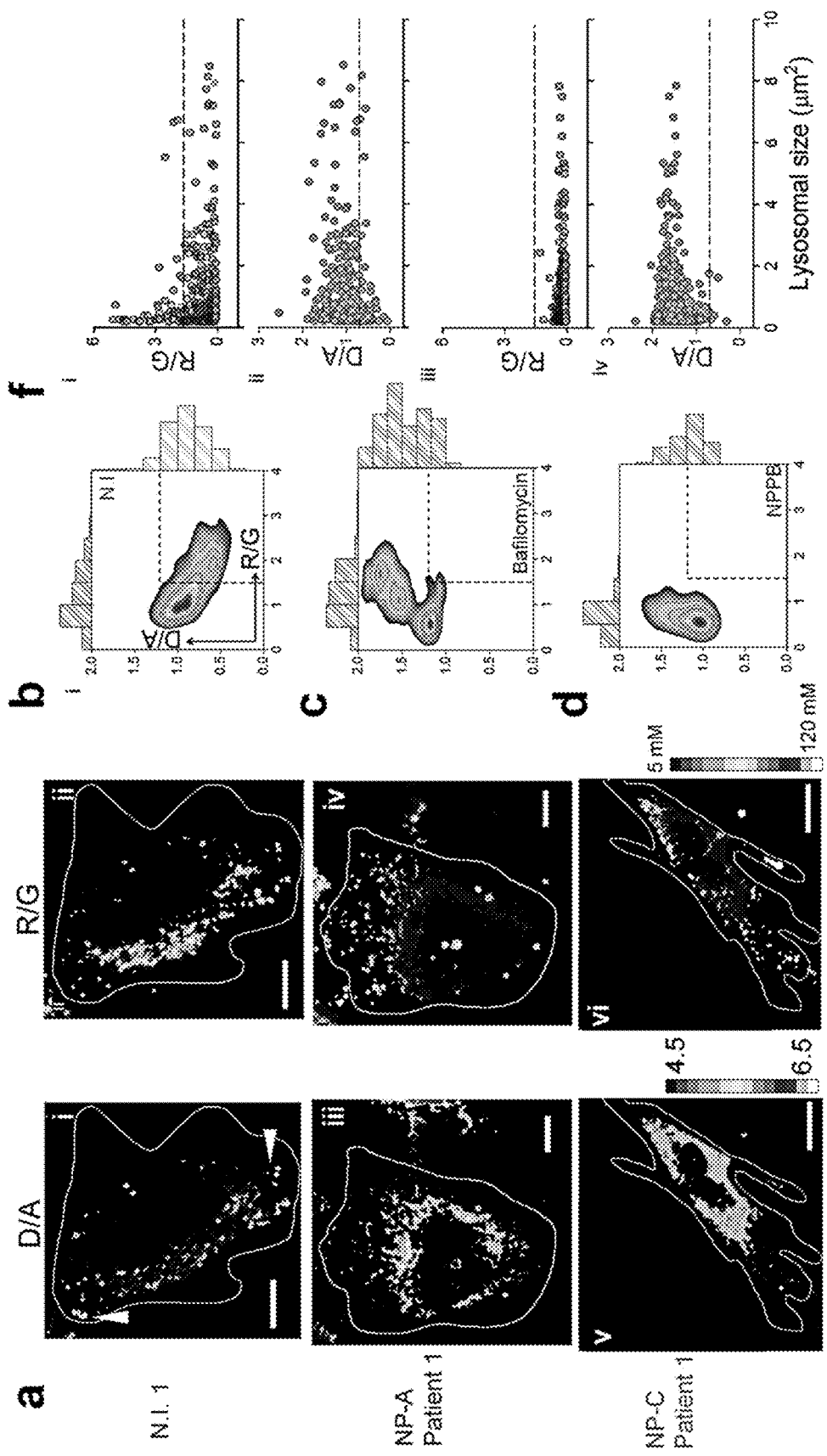
FIGS. 17A-17H illustrate that 2-IM chemically resolves lysosome populations.
Figure 17:
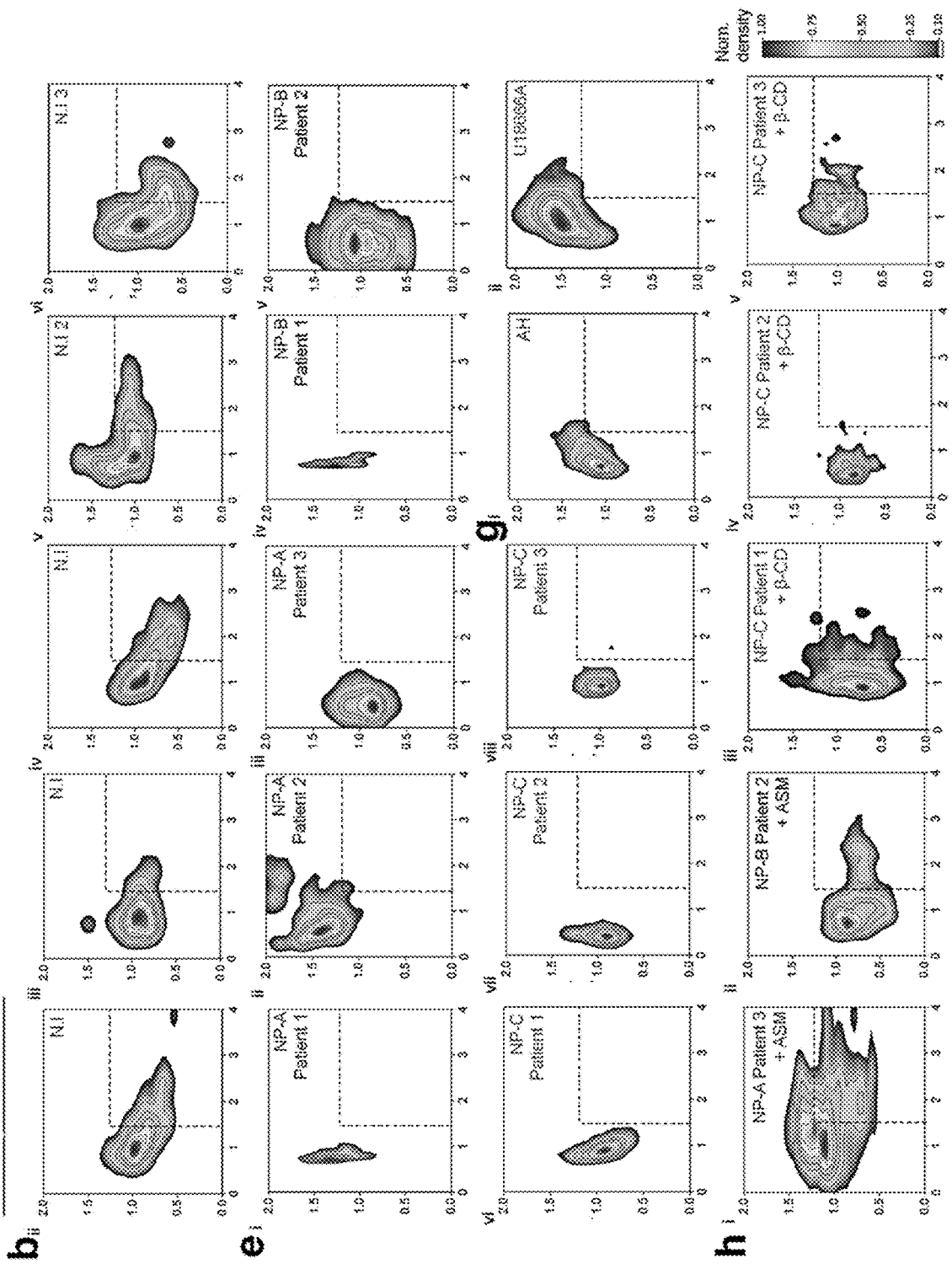
Figure 27:
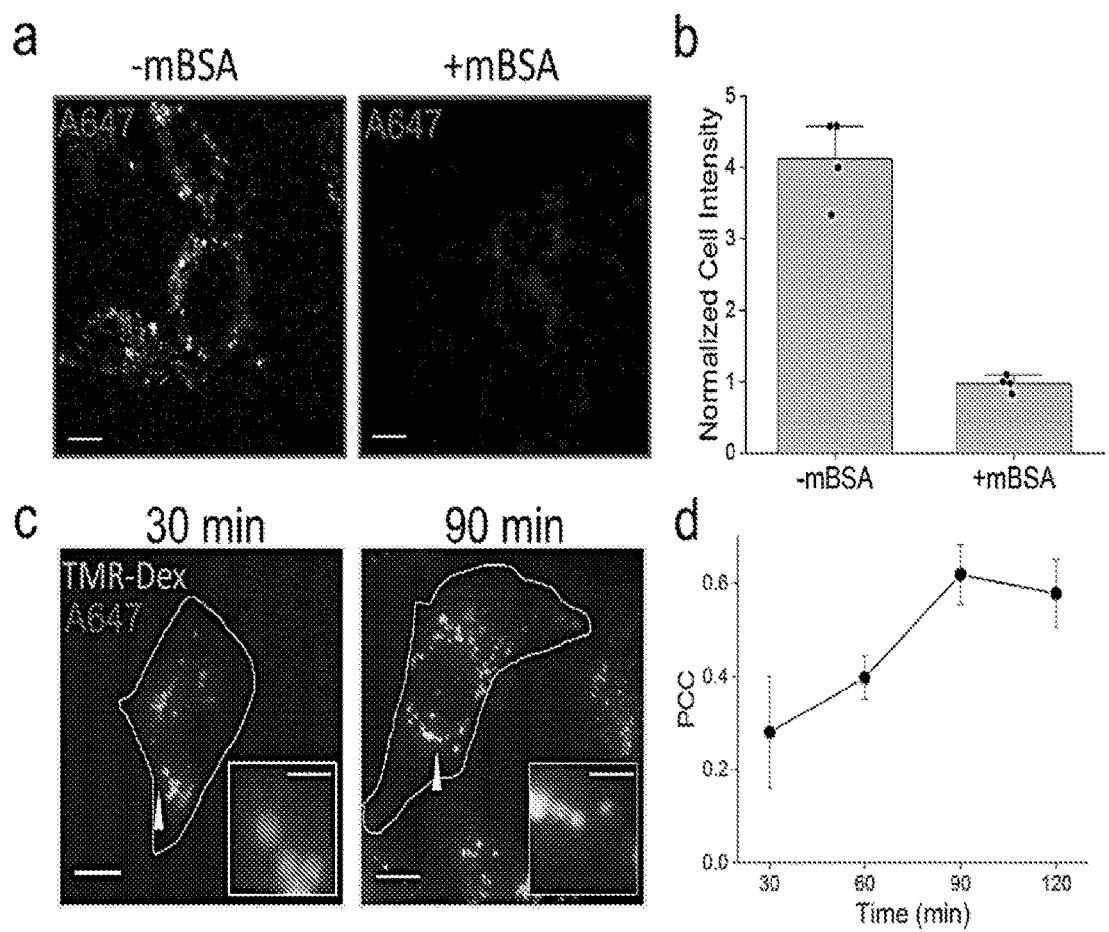
FIG. 27 illustrates labeling lysosomes of BHK-21 cells (ab) ChloropHore internalization by BHK-21 cells is competed out by excess maleylated BSA (mBSA, 10 μM), revealing uptake is by scavenger receptors. Cells are imaged in Alexa647 channel. (c) Representative images of lysosomes of HDF cells labelled with TMR dextran (TMR; G) by fluid phased endocytosis and by scavenger receptor mediated endocytosis of ChloropHore (Alexa647). (d) Pearson's correlation coefficient of colocalization between ChloropHore and lysosomes as a function of ChloropHore labeling chase times. Scale bar=10 μm. Experiments were performed in triplicate. Error bars indicate the mean of four independent experiments±s.e.m. (n=20 cells).
Figure 28:
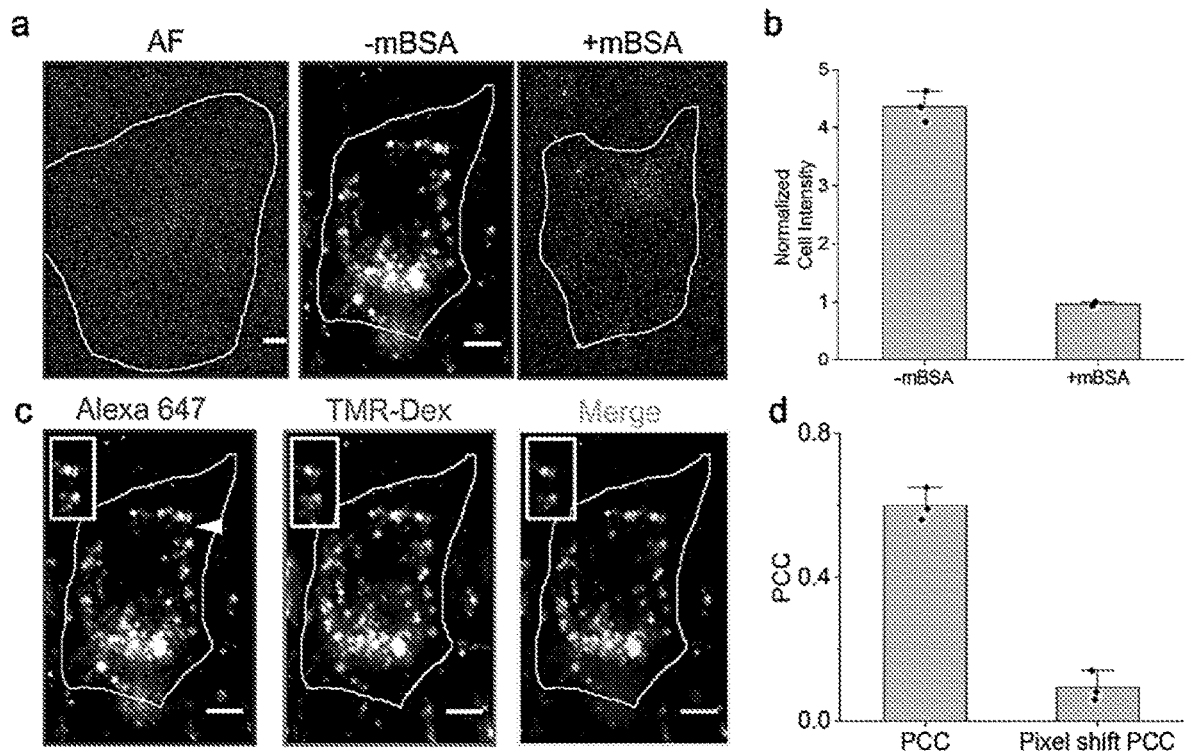
FIG. 28 illustrates labeling lysosome of T47D cells (ab) ChloropHore internalization by T47D cells is competed out by excess maleylated BSA (mBSA, 10 μM), revealing uptake is by scavenger receptors. Cells are imaged in Alexa647 channel. (c) Representative images of lysosomes of T47D cells labelled with TMR dextran (TMR; G) by fluid phased endocytosis and by scavenger receptor mediated endocytosis of ChloropHore (Alexa647) and the corresponding Pearson's correlation coefficient for the colocalization is shown in (d). Scale bar=10 μm. Experiments were performed in triplicate. Error bars indicate the mean of three independent experiments±s.e.m. (n=20 cells).
Figure 29:
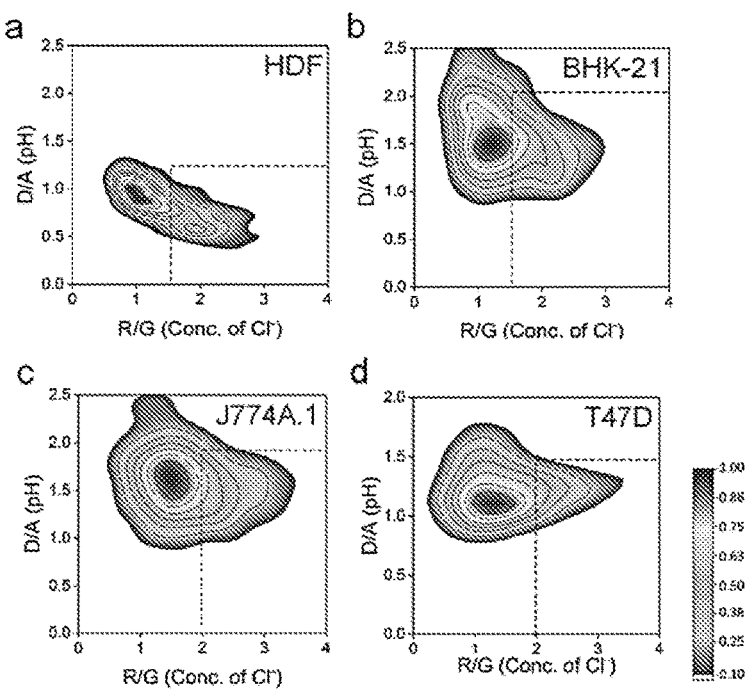
FIG. 29 illustrates 2-IM profiles of lysosomes in various cell types. 2-IM profiles of lysosomes in (a) human skin fibroblasts, (b) Baby hamster kidney fibroblasts, BHK-21, (c) murine macrophages J774A.1 and (d) T47D human breast cancer cell lines. Experiments were performed in duplicate (n=55 cells, =550 lysosomes)

The 2-IM profile of lysosomes in fibroblasts of healthy individuals reveals populations with two distinct chemotypes. ChloropHore$_{Ly}$ labeled lysosomes in HDF cells were imaged to obtain D/A and R/G maps (FIG. 17A(i)-(ii)). The corresponding 2-IM profile revealed a major population of ~68% lysosomes that contained relatively low chloride, with R/G<1.3 (FIG. 17B(i)). However, there is a minor population (~23%) with R/G>1.5 and D/A<1.25 with higher lumenal Cl$^-$ and proton content (FIG. 17B(i)). This was consistent over experimental replicates on samples derived from the same individual as well as across multiple normal individuals (FIG. 17B(i)-(vi)). 2-IM in lysosomes of diverse cell types such as BHK-21 cells, murine macrophages and T-47D cells also showed lysosomes chemotypes with these characteristics (FIGS. 27-29). The high Cl$^-$, high acidity population was lost upon pharmacologically inhibiting either V-ATPase or chloride channels with bafilomycin A1 or 5-nitro-2-(3-phenylpropylamino) benzoic acid, that selectively block lysosomal proton or Cl$^-$ accumulation respectively (FIGS. 17C-17D).

In order to understand how these lysosomal populations are affected upon pathological lysosomal storage, fibroblasts of patients with lysosomal storage disorders were subjected to 2-IM profiling. Lysosomal storage disorders arise due to genetic defects in proteins that affect the lysosomal degradation of specific biomolecules. Further, dysfunctional lysosomes in a range of lysosomal storage disorders show reduced lumenal Cl$^-$ and/or H$^+$ as a result of flawed lysosomal integrity. 2-IM was applied to study three related lysosomal storage disorders, i.e., the Niemann Pick disease variants, due to their similarity of presentation, the fact that mutations lie in only one of three identified genes, all three gene products are lysosome-resident, and importantly, therapeutics are available for these diseases.

Niemann Pick A (NP-A) and Niemann Pick B (NP-B) diseases arise due to defects in the enzyme acid sphingomyelinase (ASM), for which enzyme replacement therapy is available. Niemann Pick C (NP-C) arises due to defective cholesterol transport due to mutations in any one of two key proteins, NPC1 or NPC2, and for which clinical trials using cyclodextrin derivatives are under way. Three patient samples corresponding to NP-A and NP-C disease and two for NP-B were studied based on sample availability, common mutations and characterization by enzyme activity (Table 5).

TABLE 5

| Sample | Sample number | Gene | Gene Mutation | Age (at sampling) |
|---|---|---|---|---|
| Normal individual 2 | GM08429 | N/A | N/A | M (1 DA) |
| Normal individual 3 | AG01518 | N/A | N/A | M (3 DA) |
| NP-A patient 1 | GM00112 | SMPD1 | L302P | M (10 Mo) |
| NP-A patient 2 | GM13205 | SMPD1 | P330fsX382 | F (2 Yr) |
| NP-A patient 3 | GM16195 | SMPD1 | L302P | M (no data) |
| NP-B patient 1 | GM03252 | SMPD1 | L302P | F (2 Fw) |
| NP-B patient 2 | GM11097 | SMPD1 | negative for the three most common mutations in SMPD1 (R496L, L302P and P330fsX382) | M (1 Yr) |
| NP-C patient 1 | GM18414 | NPC1 | T1036M | F (no data) |
| NP-C patient 2 | GM23162 | NPC1 | D948N | F (1 Yr) |
| NP-C patient 3 | GM17910 | NPC2 | C93F | M (no data) |

DA = day,
Mo = month,
Yr = year,
Fw = fetal week

After verifying that ChloropHore$_{Ly}$ could label the lysosomes in every patient sample (FIG. 30, g-l) were each subjected to 2-IM (FIG. 17E). Typical D/A and R/G maps of ChloropHore$_{Ly}$ labeled lysosomes in fibroblasts derived from NP-A and NP-C patients are shown in FIG. 17A(iii)-(vi). The 2-IM profiles of fibroblasts derived from skin biopsies of all the patient samples showed that the high chloride, high acidity lysosome population was absent (FIG. 17E(i)-(viii)). Particularly, the 2-IM profile of NP-C patient samples showed a high degree of monodispersity compared to healthy samples (FIG. 17E(vi)(viii)).

Although lysosomal pH correlates with spatial position in certain cell types, no such dependence is available yet for lysosomal Cl$^-$. Peripheral lysosomes show lower acidity in C2C12 murine myoblasts, human adipose microvascular endothelial cells and HeLa cells, but not primary human dendritic cells or CHO cells. Interestingly, 2-IM profiles in primary HDF cells showed that peripheral lysosomes had higher pH than perinuclear lysosomes (FIG. 17A(i), arrowhead). Further, in NP-A and NP-C cells the spatial heterogeneity in lysosomal pH is lost, with lysosomes becoming uniformly hypoacidic (FIG. 17A(iii)&(v)). In contrast to pH, no such spatial correlation could be observed for lumenal Cl$^-$ in HDF cells from normal individuals (FIG. 17A(ii)). However, in NP-A and NP-C patient samples, the lumenal Cl$^-$ of the perinuclear lysosomes was more affected and lower than those of peripheral lysosomes (FIG. 17A(iv)&(vi)). Taken together, this suggests that the milieu of the perinuclear lysosomes is more compromised than the rest, and that the high chloride high acidity population could correspond to these lysosomes. The correlation between lumenal ions and lysosome size is provided in FIG. 17F(i)(iv). These studies revealed that the high chloride lysosomes were smaller in size, and their numbers were depleted in patient cells. No such clear correlation emerged for lysosomal pH.

Example 14

ChloropHore$_{Ly}$ Enables Evaluation of Therapeutic Efficacy

Figure 30:
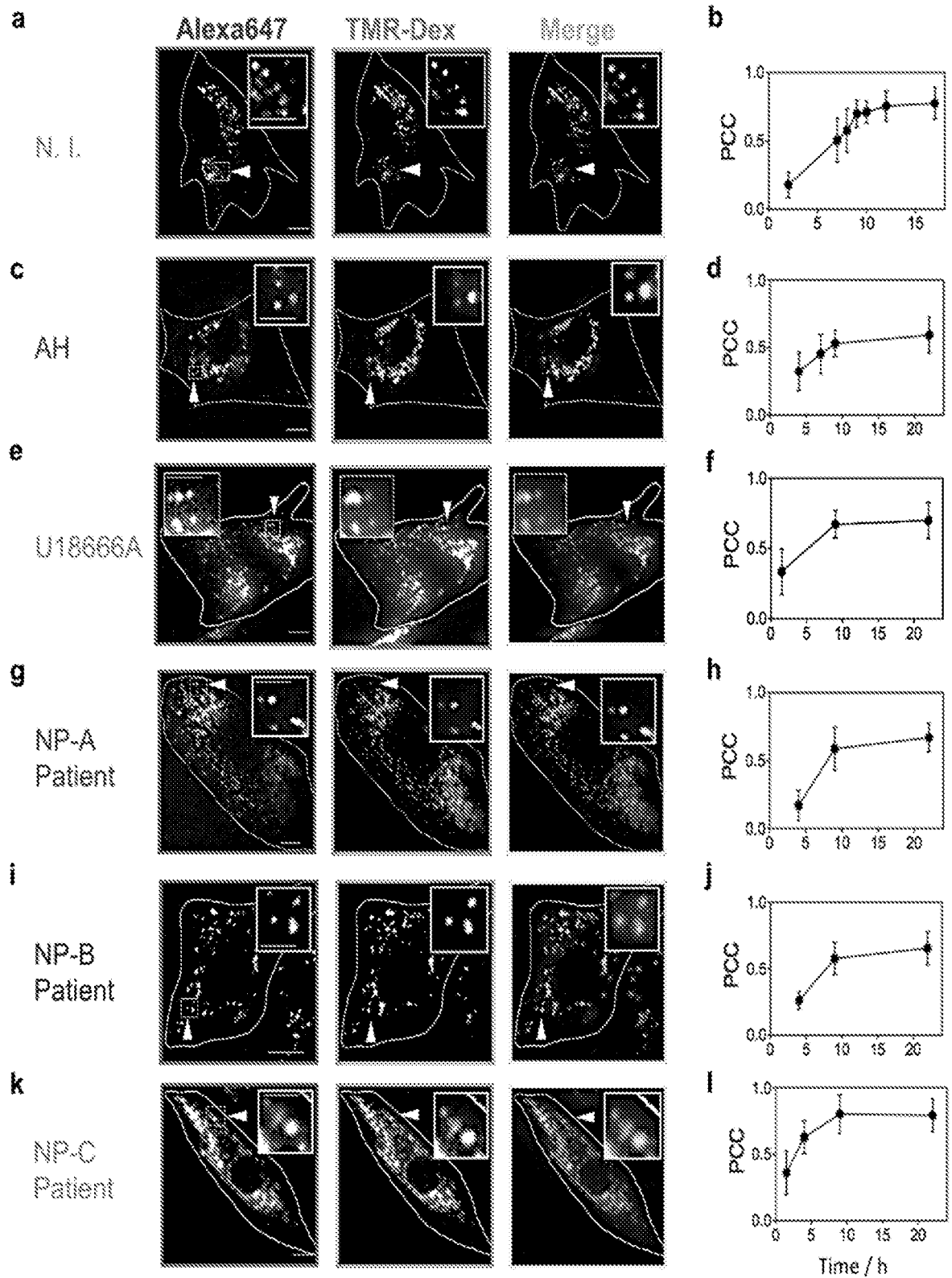
FIG. 30 illustrates lysosome labeling of endocytosed ChloropHore in fibroblasts. Representative images of lysosomes of (a) normal individual skin fibroblasts, (c) amitriptyline (AH) induced NP-A/B model, (e) U18666A induced NP-C model, (g) NP-A patient derived skin fibroblasts, (i) NP-B patient derived skin fibroblasts and (k) NP-C patient derived skin fibroblasts labelled with TMR dextran (TMR-Dex) and ChloropHore (Alexa647) upon 1 h pulse and 9 h chase of ChloropHore. Pearson's correlation coefficient (PCC) for the colocalization between ChloropHore and lysosome marker TMR Dextran in (b) normal individual skin fibroblasts, (d) amitriptyline (AH) induced NP-A/B model, (f) U18666A induced NP-C model, (h) NP-A patient derived skin fibroblasts, (j) NP-B patient derived skin fibroblasts and (I) NP-C patient derived skin fibroblasts at indicated chasing times. Scale bar=10 μm and inset scale bar=5 μm. Experiments were performed in triplicate. Error bars indicate the mean of three independent experiments±s.e.m. (n=25 cells).

In order to understand how the high chloride high acidity population was affected upon inducing pathological lysosomal storage, cell culture models of NP-A/B and NP-C diseases were created. In order to mimic the sphingomyelin and cholesterol accumulation characterizing these disorders, HDF cells from a healthy individual were treated with amitriptyline hydrochloride (AH) and U18666A that inhibit ASM and NPC1 respectively. 2-IM was performed after verifying that ChloropHore$_{Ly}$ effectively labels lysosomes in these cells (FIG. 30, c-f). The 2-IM profiles showed a monodisperse lysosome population in both cell culture models, and a depletion of the high chloride, high acidity lysosome population (FIG. 17G(i)&(ii)).

Next, it was investigated whether this high chloride, high acidity lysosome population could be recovered upon complementing patient cells with the corresponding therapeutic. Recombinant human acid sphingomyelinase (rhASM) is used to treat NP-A/B patients by enzyme replacement therapy. Fibroblasts from NP-A and NP-B patient samples were incubated with rhASM as outlined in literature. These cells are expected to internalize rhASM from the extracellular milieu, and traffic it to lysosomes, where it degrades sphingomyelin and mitigates storage. The 2-IM profile of patient cells treated with rhASM showed the reemergence of the high chloride high acidity lysosome population (FIG. 17H(i)&(ii)).

NP-C does not arise from the deficiency of a degradative enzyme, but rather due to a transport defect, for which there is still no FDA approved therapeutic. However, o-2-hydroxypropyl-β-cyclodextrin (RCD) treatment for 24 h has been shown to improve cholesterol transport from the lysosome to the endoplasmic reticulum thereby delivering cholesterol to the ER for esterification and reducing storage in the lysosome. Interestingly, treating NP-C patient samples mutated either in NPC1 (FIG. 17H(iii)&(iv)) or NPC2 (FIG. 17H(v)) with RCD showed a loss of monodispersity in the 2-IM profile and the appearance of lysosomes with higher lumenal Cl$^-$ and H$^+$ content.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Various exemplary embodiments of the disclosure include, but are not limited to the enumerated embodiments listed below, which can be combined in any number and in any combination that is not technically or logically inconsistent.

Embodiment 1 provides a method for simultaneously determining 1) pH, and 2) Ca$^{2+}$ concentration or Cl$^-$ concentration in a sample comprising: providing a nucleic acid complex comprising
    a first single-stranded nucleic acid molecule comprising a Ca$^{2+}$ fluorophore or a Cl$^-$ fluorophore crosslinked to the first strand; and
    a second single-stranded nucleic acid molecule that is partially or fully complementary to the first single-stranded molecule,
        wherein the nucleic acid complex further comprises a first label conjugated to the first single-stranded nucleic acid molecule or the second single-stranded nucleic acid molecule and the first label is capable of producing a signal, wherein the intensity of the signal is dependent on change in pH;
  measuring the intensity of the signal; and
  determining the pH, and Ca$^{2+}$ or Cl$^-$ concentration from the measured signal.

Embodiment 2 provides the method of embodiment 1, wherein the sample is a biological sample selected from a cell, cell extract, cell lysate, tissue, tissue extract, bodily fluid, serum, blood, and blood product.

Embodiment 3 provides the method of embodiment 1, wherein the sample is a live cell.

Embodiment 4 provides the method of any of embodiments 1-3, wherein determining is in early endosome, late endosome, plasma membrane, lysosome, autophagolysosome, recycling endosome, cis Golgi network, trans Golgi network, endoplasmic reticulum, peroxisomes, or secretory vesicles.

Embodiment 5 provides the method of any of embodiments 1-4, wherein the nucleic acid complex comprises the Cl⁻ fluorophore crosslinked to the first strand.

Embodiment 6 provides the method of embodiment 5, wherein the Cl⁻ fluorophore comprises 10,10'-bis[3-carboxypropyl]-9,9'-biacridinium dinitrate.

Embodiment 7 provides the method of any of embodiments 1-4, wherein the nucleic acid complex comprises the $Ca^{2+}$ fluorophore crosslinked to the first strand.

Embodiment 8 provides the method of embodiment 7, wherein the $Ca^{2+}$ fluorophore is a single wavelength indicator.

Embodiment 9 provides the method of any of embodiment 7, wherein the $Ca^{2+}$ fluorophore comprises Rhod-5F, XRhod-5F, Rhod-FF, XRhod-FF, Oregon Green 488 BAPTA-6F, Fluo 5F, Fluo 4FF, Oregon Green BAPTA-5N, Fluo-5 N, or Mag-Fluo-4 indicator.

Embodiment 10 provides the method of any of embodiments 7-9, wherein the $Ca^{2+}$ fluorophore comprises Rhod-5F, XRhod-5F, or Rhod-FF indicator.

Embodiment 11 provides the method of any of embodiments 7-9, wherein the $Ca^{2+}$ fluorophore comprises Rhod-5F indicator.

Embodiment 12 provides the method of any of embodiments 7-11, wherein the $Ca^{2+}$ fluorophore is crosslinked to the first strand through a triazole, thioether, or alkenyl sulfide group.

Embodiment 13 provides the method embodiment 12, wherein the $Ca^{2+}$ fluorophore further comprises a linker moiety configured to form the triazole, thioether, or alkenyl sulfide group through a reaction of an azide or thiol moiety on the $Ca^{2+}$ fluorophore and a alkyne or alkene moiety on the first strand.

Embodiment 14 provides the method of any of embodiments 7-13, wherein the crosslinked $Ca^{2+}$ fluorophore is:

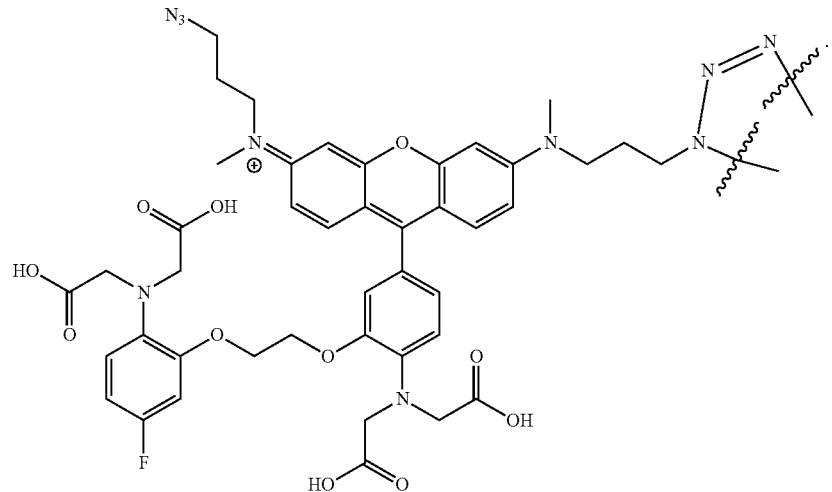

Embodiment 15 provides the method of any of embodiments 7-14, wherein the first single-stranded nucleic acid molecule comprising a $Ca^{2+}$ fluorophore is of formula:

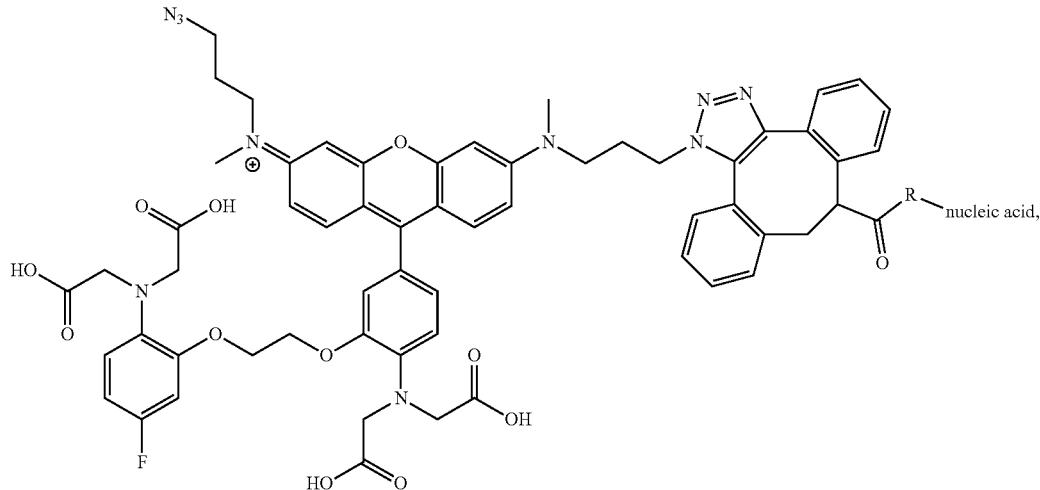

wherein R is a linker.

Embodiment 16 provides the method of any of embodiments 7-11, wherein the $Ca^{2+}$ fluorophore is crosslinked to the first strand through a linker moiety stable under physiological conditions.

Embodiment 17 provides the nucleic acid complex of any of embodiments 1-16, wherein the first label comprises Oregon green, FITC, or pHrhodo label.

Embodiment 18 provides the method of any of embodiments 1-16, wherein the intensity of the signal dependent on change in pH varies as a function of the conformation of the nucleic acid complex.

Embodiment 19 provides the method of embodiment 18, wherein the second single-stranded nucleic acid molecule comprising the sequence $C_nXC_nYC_nZC_n$, (SEQ ID NO:13), wherein C is cytosine; X, Y, and Z are each one or more of adenine, thymine, guanine, or combinations thereof; and n is greater than or equal to 2; and wherein at least 2 cytosine residues are modified.

Embodiment 20 provides the method of embodiment 19, wherein each of X, Y, and Z is independently AA or TAA.

Embodiment 21 provides the method of embodiment 18, wherein the second single-stranded nucleic acid molecule comprising the sequence $C_nXC_n$, wherein C is cytosine; X and Y are each one or more of adenine, thymine, guanine, or combinations thereof; and n is greater than or equal to 2; and wherein at least 2 cytosine residues are modified.

Embodiment 22 provides the method of embodiment 21, wherein each of X and Y is independently AA or TAA.

Embodiment 23 provides the method of any of embodiments 19-22, wherein each n is independently 3, 4, or 7.

Embodiment 24 provides the method of any of embodiments 19-23, wherein the modification is selected from one or more of a methyl, fluoro, bromo, hydroxymethyl, formyl, or acetyl group.

Embodiment 25 provides the method of any of embodiments 19-23, wherein the modification is a methyl or bromo group.

Embodiment 26 provides the method of any of embodiments 19-23, wherein the modification is at the 5' position of the cytosine.

Embodiment 27 provides the method of any of embodiments 1-26, wherein the nucleic acid further comprises a second label conjugated to the first single-stranded nucleic acid or the second single-stranded nucleic acid.

Embodiment 28 provides the method of embodiment 27, wherein the intensity of the signal varies as a function of at least one of the distance between the first label and second label and the relative orientation of the first label and second label.

Embodiment 29 provides the method of embodiment 27, wherein the first label and second label comprise a donor and acceptor pair.

Embodiment 30 provides the method of any of embodiments 1-29, wherein the signal is measured using a FRET technique.

Embodiment 31 provides the method of any of embodiments 1-30, wherein the signal is measured at 2 different wavelengths.

Embodiment 32 provides the method of any of embodiments 27-30, wherein the signal is measured at 4 different wavelengths.

Embodiment 33 provides the method of any of embodiments 27-32, wherein the $Ca^{2+}$ concentration is determined from the measured signal from the $Ca^{2+}$ fluorophore with the measured signal from the second label.

Embodiment 34 provides the method of any of embodiments 27-32, wherein the $Cl^-$ concentration is determined from the measured signal from the $Cl^-$ fluorophore with the measured signal from the first label or the second label.

Embodiment 35 provides the method of any of embodiments 1-34, wherein the first single-stranded nucleic acid molecule and second single-stranded nucleic acid form an i-motif under acidic conditions.

Embodiment 36 provides the method of any of embodiments 1-34, wherein the second single-stranded nucleic acid is capable of forming an intramolecular complex comprising two parallel-stranded C—HC+ base paired duplexes that are intercalated in an anti-parallel orientation at acidic conditions.

Embodiment 37 provides the method of any of embodiments 1-36, wherein the nucleic acid complex further comprises a third single-stranded nucleic acid molecule that is partially complementary to the first single-stranded molecule.

Embodiment 38 provides the method of embodiment 37, wherein the second single-stranded nucleic acid molecule comprising the sequence $C_nXC_nYC_nZC_n$, (SEQ ID NO:13), wherein C is cytosine; X, Y, and Z are each one or more of adenine, thymine, guanine, or combinations thereof; and n is greater than or equal to 2; and wherein at least 2 cytosine residues are modified.

Embodiment 39 provides the method of embodiment 38, wherein each of X, Y, and Z is independently AA or TAA.

Embodiment 40 provides the method of embodiment 37, wherein the third single-stranded nucleic acid molecule comprising the sequence $C_nXC_n$, wherein C is cytosine; X and Y are each one or more of adenine, thymine, guanine, or combinations thereof; and n is greater than or equal to 2; and wherein at least 2 cytosine residues are modified.

Embodiment 41 provides the method of embodiment 37, wherein each of X and Y are independently AA.

Embodiment 42 provides the method of embodiment 37 or 04, wherein each n is independently 3, 4, or 7.

Embodiment 43 provides the method of any of embodiments 37-42, wherein the modification is selected from one or more of a methyl, fluoro, bromo, hydroxymethyl, formyl, or acetyl group.

Embodiment 44 provides the method of any of embodiments 37-42, wherein the modification is a methyl or bromo group.

Embodiment 45 provides the method of any of embodiments 37-44, wherein the modification is at the 5' position of the cytosine.

Embodiment 46 provides the method of any of embodiments 37-45, wherein the first label is on the second single-stranded nucleic acid.

Embodiment 47 provides the method of any of embodiments 37-46, wherein the nucleic acid complex further comprises the second label conjugated to the third single-stranded nucleic acid.

Embodiment 48 provides the method of any of embodiments 37-47, wherein the second single-stranded nucleic acid and third single-stranded nucleic acid form an i-motif under acidic conditions.

Embodiment 49 provides the method of any of embodiments 37-47, wherein the second single-stranded nucleic acid or the third single-stranded nucleic acid is capable of forming an intramolecular complex comprising two parallel-stranded C—HC+ base paired duplexes that are intercalated in an anti-parallel orientation at acidic conditions.

Embodiment 50 provides the method of any of embodiments 27-49, wherein the first label and the second label are independently selected from the group consisting of an Atto dye, an Alexa Flour® dye, a Cy® dye, and a BODIPY dye.

Embodiment 51 provides the method of any of embodiments 27-50, wherein the first label and the second label comprise a donor fluorophore and an acceptor quencher.

Embodiment 52 provides the method of embodiment 51, wherein the donor fluorophore and an acceptor quencher pair are: FITC and TRITC, or Cy3 and Cy5, or Alexa-488 and Alexa-647.

Embodiment 53 provides the method of any of embodiments 1-52, wherein the nucleic acid complex further comprises a targeting moiety.

Embodiment 54 provides the method of embodiment 53, wherein the targeting moiety is a nucleic acid sequence.

Embodiment 55 provides the method of embodiment 53, wherein the targeting moiety has a cognate artificial protein receptor.

Embodiment 56 provides the method of any of embodiments 53-55, wherein the targeting moiety is encoded on the same nucleic acid strand as the first single-stranded nucleic acid molecule, the second single-stranded nucleic acid molecule, the third single-stranded nucleic acid molecule, or any combination thereof.

Embodiment 57 provides the method of any of embodiments 53-55, wherein the targeting moiety is selected from an aptamer, a duplex domain targeted to an artificial protein receptor, a nucleic acid sequence that binds an anionic-ligand binding receptor, and an endocytic ligand.

Embodiment 58 provides the method of any of embodiments 53-55, wherein the targeting moiety comprises a peptide directly or indirectly conjugated to the nucleic acid molecule.

Embodiment 59 provides the method of any of embodiments 53-55, wherein the targeting moiety comprises one or more of a fusogenic peptide, a membrane-permeabilizing peptide, a sub-cellular localization sequence, or a cell-receptor ligand.

Embodiment 60 provides the method of embodiment 59, wherein the sub-cellular localization sequence targets the nucleic acid complex to a region of a cell where spatial localization of a targeted protein is present.

Embodiment 61 provides the method of embodiment 60, wherein the sub-cellular localization sequence targets the nucleic acid complex to a region of the cell selected from the group consisting of: the cytosol, the endoplasmic reticulum, the mitochondrial matrix, the chloroplast lumen, the medial trans-Golgi cistemae, the lumen of lysosome, the lumen of an endosome, the peroxisome, the nucleus, and a specific spatial location on the plasma membrane.

Embodiment 62 provides the method of any of embodiments 1-61, wherein the first and/or second single-stranded nucleic acid molecule is less than 200 nucleotides; or less than 100 nucleotides; or less than 50 nucleotides.

Embodiment 63 provides the method of any of embodiments 1-62, wherein the determined $Ca^{2+}$ concentration is in a range of 10 nM to 10 mM.

Embodiment 64 provides the method of any of embodiments 1-62, wherein the determined $Ca^{2+}$ concentration is in a range of 10 nM to 1 µM.

Embodiment 65 provides the method of any of embodiments 1-62, wherein the determined $Ca^{2+}$ concentration is in a range of 1 µM to 10 mM.

Embodiment 66 provides the method of any of embodiments 1-62, wherein the determined $Cl^-$ concentration is in a range of 10 nM to 10 mM.

Embodiment 67 provides the method of any of embodiments 1-62, wherein the determined $Cl^-$ concentration is in a range of 10 nM to 1 µM.

Embodiment 68 provides the method of any of embodiments 1-62, wherein the determined $Cl^-$ concentration is in a range of 1 µM to 10 mM.

Embodiment 69 provides the method of any of embodiments 1-68, wherein the determined pH is less than pH 5.5.

Embodiment 70 provides the method of any of embodiments 1-68, wherein the determined pH is more than pH 7.0.

Embodiment 71 provides a nucleic acid complex comprising:
  a first single-stranded nucleic acid molecule comprising a $Ca^{2+}$ fluorophore or a $Cl^-$ fluorophore crosslinked to the first strand; and
  a second single-stranded nucleic acid molecule that is partially or fully complementary to the first single-stranded molecule,
    wherein the nucleic acid complex further comprises a first label conjugated to the first single-stranded nucleic acid molecule or the second single-stranded nucleic acid molecule and the first label is capable of producing a signal.

Embodiment 72 provides the method of embodiment 71, wherein the nucleic acid complex comprises the $Cl^-$ fluorophore crosslinked to the first strand.

Embodiment 73 provides the method of embodiment 72, wherein the $Cl^-$ fluorophore comprises 10,10'-bis[3-carboxypropyl]-9,9'-biacridinium dinitrate.

Embodiment 74 provides the method of embodiment 71, wherein the nucleic acid complex comprises the $Ca^{2+}$ fluorophore crosslinked to the first strand.

Embodiment 75 provides the nucleic acid complex of embodiment 74, wherein the $Ca^{2+}$ fluorophore is a single wavelength indicator.

Embodiment 76 provides the nucleic acid complex of embodiment 74, wherein the $Ca^{2+}$ fluorophore comprises Rhod-5F, XRhod-5F, Rhod-FF, XRhod-FF, Oregon Green 488 BAPTA-6F, Fluo 5F, Fluo 4FF, Oregon Green BAPTA-5N, Fluo-5 N, or Mag-Fluo-4 indicator.

Embodiment 77 provides the nucleic acid complex of embodiment 74, wherein the $Ca^{2+}$ fluorophore comprises Rhod-5F, XRhod-5F, or Rhod-FF indicator.

Embodiment 78 provides the nucleic acid complex of embodiment 74, wherein the $Ca^{2+}$ fluorophore comprises Rhod-5F indicator.

Embodiment 79 provides the nucleic acid complex of any of embodiments 74-78, wherein the $Ca^{2+}$ fluorophore further comprises a linker moiety configured to form the triazole, thioether, or alkenyl sulfide group through a reaction of an azide or thiol moiety on the $Ca^{2+}$ fluorophore and a alkyne or alkene moiety on the first strand.

Embodiment 80 provides the nucleic acid complex of any of embodiments 74-79, wherein the crosslinked $Ca^{2+}$ fluorophore is:

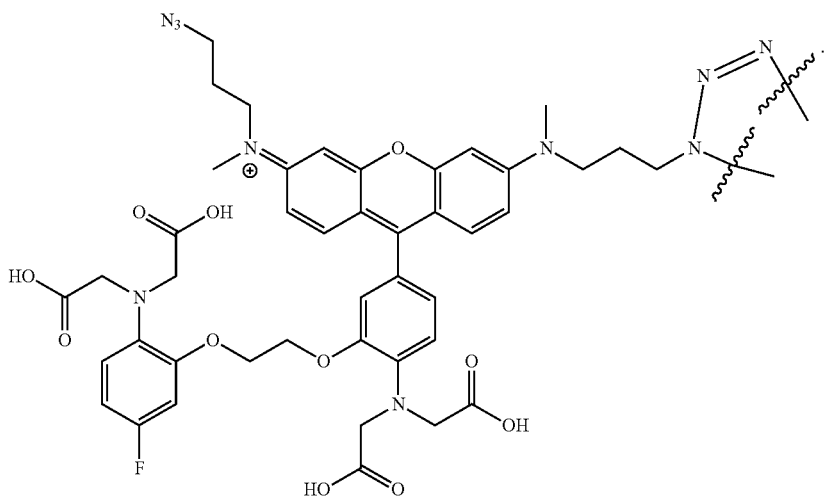 [SMILES: */N=N\N(*)CCCN(C)c1ccc2c(-c3ccc(N(CC(=O)O)CC(=O)O)c(OCCOc4cc(F)ccc4N(CC(=O)O)CC(=O)O)c3)c3cc/c(=[N+](\C)CCCN=[N+]=[N-])cc-3oc2c1]

Embodiment 81 provides the nucleic acid complex of any of embodiments 74-80, wherein the first single-stranded nucleic acid molecule comprising a $Ca^{2+}$ fluorophore is of formula:

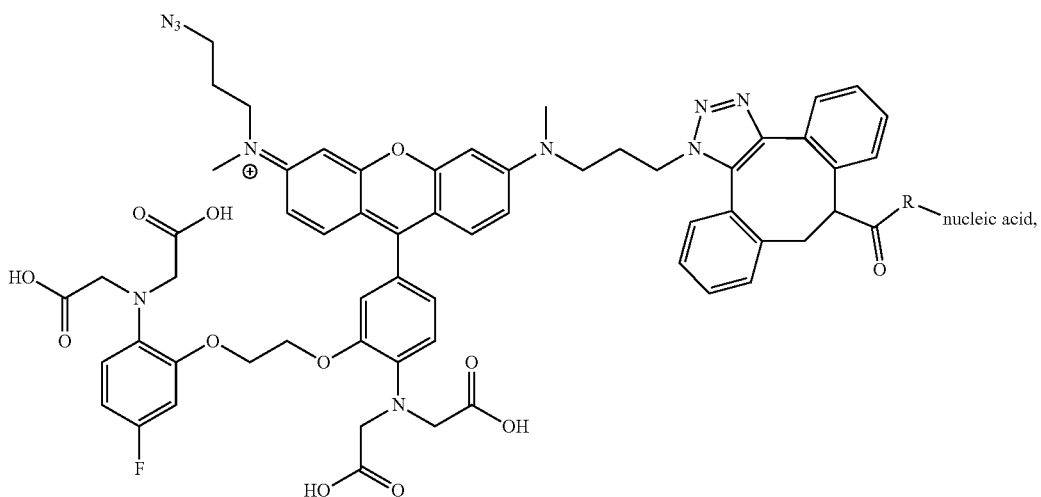

wherein R is a linker.

Embodiment 82 provides the nucleic acid complex of any of embodiments 71-81, wherein the first label comprises Oregon green, FITC, or pHrhodo label.

Embodiment 83 provides the nucleic acid complex of any of embodiments 71-81, wherein the second single-stranded nucleic acid molecule comprising the sequence $C_nXC_n$, wherein C is cytosine; X and Y are each one or more of adenine, thymine, guanine, or combinations thereof; and n is greater than or equal to 2; and wherein at least 2 cytosine residues are modified.

Embodiment 84 provides the nucleic acid complex of embodiment 83, wherein each of X and Y are independently AA or TAA.

Embodiment 85 provides the nucleic acid complex of any of embodiments 71-81, wherein the second single-stranded nucleic acid molecule comprising the sequence $C_nXC_nYC_nZC_n$, (SEQ ID NO:13), wherein C is cytosine; X, Y, and Z are each one or more of adenine, thymine, guanine, or combinations thereof; and n is greater than or equal to 2; and wherein at least 2 cytosine residues are modified.

Embodiment 86 provides the nucleic acid complex of embodiment 85, wherein each of X, Y, and Z are independently AA or TAA.

Embodiment 87 provides the nucleic acid complex of any of embodiments 83-86, wherein each n is independently 3, 4, or 7.

Embodiment 88 provides the nucleic acid complex of any of embodiments 83-87, wherein the modification is selected from one or more of a methyl, fluoro, bromo, hydroxymethyl, formyl, or acetyl group.

Embodiment 89 provides the nucleic acid complex of any of embodiments 83-87, wherein the modification is a methyl or bromo group.

Embodiment 90 provides the nucleic acid complex of any of embodiments 83-89, wherein the modification is at the 5' position of the cytosine.

Embodiment 91 provides the nucleic acid complex of any of embodiments 83-90, further comprising a second label capable of producing a signal conjugated to the first single-stranded nucleic acid or the second single-stranded nucleic acid.

Embodiment 92 provides the nucleic acid complex of embodiment 91, wherein the first label and second label comprise a donor and acceptor pair.

Embodiment 93 provides the nucleic acid complex of any of embodiments 83-92, wherein the first single-stranded nucleic acid molecule and second single-stranded nucleic acid are configured to form an i-motif under acidic conditions.

Embodiment 94 provides the nucleic acid complex of any of embodiments 83-92, wherein the second single-stranded nucleic acid is configured to form an intramolecular complex comprising two parallel-stranded C—HC+ base paired duplexes that are intercalated in an anti-parallel orientation at acidic conditions.

Embodiment 95 provides the nucleic acid complex of any of embodiments 83-94 further comprising a third single-stranded nucleic acid molecule that is partially complementary to the first single-stranded molecule.

Embodiment 96 provides the nucleic acid complex of embodiment 95, wherein the third single-stranded nucleic acid molecule comprises the sequence $C_nXC_nYC_nZC_n$, (SEQ ID NO:13), wherein C is cytosine; X, Y, and Z are each one or more of adenine, thymine, guanine, or combinations thereof; and n is greater than or equal to 2; and wherein at least 2 cytosine residues are modified.

Embodiment 97 provides the nucleic acid complex of embodiment 96, wherein each of X, Y, and Z are independently AA or TAA.

Embodiment 98 provides the nucleic acid complex of embodiment 95, wherein the third single-stranded nucleic acid molecule comprises the sequence $C_nXC_n$, wherein C is cytosine; X and Y are each one or more of adenine, thymine, guanine, or combinations thereof; and n is greater than or equal to 2; and wherein at least 2 cytosine residues are modified.

Embodiment 99 provides the nucleic acid complex of embodiment 98, wherein each of X and Y are independently AA.

Embodiment 100 provides the nucleic acid complex of embodiment 96-99, wherein each n is independently 3, 4, or 7.

Embodiment 101 provides the nucleic acid complex of any of embodiments 96-100, wherein the modification is selected from one or more of a methyl, fluoro, bromo, hydroxymethyl, formyl, or acetyl group.

Embodiment 102 provides the nucleic acid complex of any of embodiments 96-100, wherein the modification is a methyl or bromo group.

Embodiment 103 provides the nucleic acid complex of any of embodiments 96-102, wherein the modification is at the 5' position of the cytosine.

Embodiment 104 provides the nucleic acid complex of any of embodiments 96-103, wherein the first label is on the second single-stranded nucleic acid.

Embodiment 105 provides the nucleic acid complex of any of embodiments 96-104, wherein the nucleic acid complex further comprises the second label conjugated to the third single-stranded nucleic acid.

Embodiment 106 provides the nucleic acid complex of any of embodiments 96-105, wherein the second single-stranded nucleic acid and third single-stranded nucleic acid are configured to form an i-motif under acidic conditions.

Embodiment 107 provides the nucleic acid complex of any of embodiments 96-105, wherein the second single-stranded nucleic acid or the third single-stranded nucleic acid is configured to form an intramolecular complex comprising two parallel-stranded C—HC+ base paired duplexes that are intercalated in an anti-parallel orientation at acidic conditions.

Embodiment 108 provides the nucleic acid complex of any of embodiments 71-107, wherein the first label and the second label are independently selected from the group consisting of an Atto dye, an Alexa Flour® dye, a Cy® dye, and a BODIPY dye.

Embodiment 109 provides the nucleic acid complex of any of embodiments 91-108, wherein the first label and the second label comprise a donor fluorophore and an acceptor quencher.

Embodiment 110 provides the nucleic acid complex of embodiment 109, wherein the donor fluorophore and an acceptor quencher pair are: FITC and TRITC, or Cy3 and Cy5, or Alexa-488 and Alexa-647.

Embodiment 111 provides the nucleic acid complex of any of embodiments 71-107, wherein the nucleic acid complex further comprises a targeting moiety.

Embodiment 112 provides the nucleic acid complex of embodiment 111, wherein the targeting moiety is a nucleic acid sequence.

Embodiment 113 provides the nucleic acid complex of embodiment 111, wherein the targeting moiety has a cognate artificial protein receptor.

Embodiment 114 provides the nucleic acid complex of any of embodiments 111-113, wherein the targeting moiety is encoded on the same nucleic acid strand as the first single-stranded nucleic acid molecule, the second single-stranded nucleic acid molecule, the third single-stranded nucleic acid molecule, or any combination thereof.

Embodiment 115 provides the nucleic acid complex of any of embodiments 111-113, wherein the targeting moiety is selected from an aptamer, a duplex domain targeted to an artificial protein receptor, a nucleic acid sequence that binds an anionic-ligand binding receptor, and an endocytic ligand.

Embodiment 116 provides the nucleic acid complex of embodiment 115, wherein the targeting moiety comprises a peptide directly or indirectly conjugated to the nucleic acid molecule.

Embodiment 117 provides the nucleic acid complex of embodiment 115, wherein the targeting moiety comprises one or more of a fusogenic peptide, a membrane-permeabilizing peptide, a sub-cellular localization sequence, or a cell-receptor ligand.

Embodiment 118 provides the nucleic acid complex of embodiment 117, wherein the sub-cellular localization sequence targets the nucleic acid complex to a region of a cell where spatial localization of a targeted protein is present.

Embodiment 119 provides the nucleic acid complex of embodiment 118, wherein the sub-cellular localization sequence targets the nucleic acid complex to a region of the cell selected from the group consisting of: the cytosol, the endoplasmic reticulum, the mitochondrial matrix, the chloroplast lumen, the medial trans-Golgi cistemae, the lumen of lysosome, the lumen of an endosome, the peroxisome, the nucleus, and a specific spatial location on the plasma membrane.

Embodiment 120 provides the nucleic acid complex of embodiment 71, wherein
the first strain has the sequence 5'-the $Ca^{2+}$ fluorophore-GAC TCA CTG TTT GTC TGT CGT TCT AGG ATA/the second label /AT ATT TTG TTA TGT GTT ATG TGT TAT-3' (SEQ ID NO:07); and the second strain has the sequence 5'-the first label-CCC CTA ACC CCT AAC CCC TAA CCC CAT ATA TAT CCT AGA ACG ACA GAC AAA CAG TGA GTC-3' (SEQ ID NO:08).

Embodiment 121 provides the nucleic acid complex of embodiment 71, wherein
the first strain has the sequence 5'-TTA TAG GAT CCT GCG GTC GG/the $Ca^{2+}$ fluorophore/GGC ACC AGG CGT AAA ATG TA-3'(SEQ ID NO:09);
the second strain has the sequence: 5'-the first label-CCC CAA CCC CAA TAC ATT TTA CGC CTG GTG CC-3' (SEQ ID NO:10); and
the third strain has the sequence: 5'-CCG ACC GCA GGA TCC TAT AAA ACC CCA ACC CC-the second label-3 (SEQ ID NO:11).

Embodiment 122 provides the nucleic acid complex of embodiment 71, wherein
the first strain has the sequence 5'-the $Ca^{2+}$ fluorophore-GAC TCA CTG TTT GTC TGT CGT TCT AGG ATA /the second label /AT ATT TTG TTA TGT GTT ATG TGT TAT-3' (SEQ ID NO:07); and
the second strain has the sequence 5'-the first label-AT AAC ACA TAA CAC ATAACAAAA TAT ATA TCC TAG AAC GAC AGA CAA ACA GTG AGT C-3' (SEQ ID NO:12).

Embodiment 123 provides the nucleic acid complex of embodiment 71, wherein
the first strain has the sequence 5'-the fluorophore-ATC AAC ACT GCA-Lys-COOH (SEQ ID NO:22);
the second strain has the sequence 5'-TAT TGT GTA TTG TGT ATT GTT TTA TAT AT/the first label/A TAG GAT CTT GCT GTC TGG TGT GCA GTG TTG AT-3'(SEQ ID NO:23); and
the third strain has the sequence: 5'-CAC CAG ACA GCA AGA TCC TAT ATA TAT ACC CCA ATC CCC AAT CCC CAA TCC CC-the second label-3' (SEQ ID NO:24).

Embodiment 124 provides the method of embodiment 1, wherein
the first strain has the sequence 5'-the $Ca^{2+}$ fluorophore-GAC TCA CTG TTT GTC TGT CGT TCT AGG ATA /the second label /AT ATT TTG TTA TGT GTT ATG TGT TAT-3' (SEQ ID NO:07); and
the second strain has the sequence 5'-the first label-CCC CTA ACC CCT AAC CCC TAA CCC CAT ATA TAT CCT AGA ACG ACA GAC AAA CAG TGA GTC-3' (SEQ ID NO:08).

Embodiment 125 provides the method of embodiment 1, wherein
the first strain has the sequence 5'-TTA TAG GAT CCT GCG GTC GG/the $Ca^{2+}$ fluorophore/GGC ACC AGG CGT AAA ATG TA-3'(SEQ ID NO:09);
the second strain has the sequence: 5'-the first label-CCC CAA CCC CAA TAC ATT TTA CGC CTG GTG CC-3' (SEQ ID NO:10); and
the third strain has the sequence: 5'-CCG ACC GCA GGA TCC TAT AAA ACC CCA ACC CC-the second label-3 (SEQ ID NO:11).

Embodiment 126 provides the method of embodiment 1, wherein
the first strain has the sequence 5'-the $Ca^{2+}$ fluorophore-GAC TCA CTG TTT GTC TGT CGT TCT AGG ATA /the second label /AT ATT TTG TTA TGT GTT ATG TGT TAT-3' (SEQ ID NO:07); and
the second strain has the sequence 5'-the first label-AT AAC ACA TAA CAC ATAACAAAA TAT ATA TCC TAG AAC GAC AGA CAA ACA GTG AGT C-3' (SEQ ID NO:12).

Embodiment 127 provides the method of embodiment 1, wherein
the first strain has the sequence 5'-the fluorophore-ATC AAC ACT GCA-Lys-COOH (SEQ ID NO:22);
the second strain has the sequence 5'-TAT TGT GTA TTG TGT ATT GTT TTA TAT AT /the first label/A TAG GAT CTT GCT GTC TGG TGT GCA GTG TTG AT-3'(SEQ ID NO:23); and
the third strain has the sequence: 5'-CAC CAG ACA GCA AGA TCC TAT ATA TAT ACC CCA ATC CCC AAT CCC CAA TCC CC-the second label-3' (SEQ ID NO:24).

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A method for simultaneously determining 1) pH, and 2) $Ca^{2+}$ concentration or $Cl^-$ concentration in a sample comprising:

providing a nucleic acid complex comprising a first single-stranded nucleic acid molecule comprising a $Ca^{2+}$ fluorophore or a $Cl^-$ fluorophore crosslinked to the first strand; and a second single-stranded nucleic acid molecule that is partially or fully complementary to the first single-stranded molecule, wherein the nucleic acid complex further comprises a first label conjugated to the first single-stranded nucleic acid molecule or the second single-stranded nucleic acid molecule and the first label is capable of producing a signal, wherein the intensity of the signal is dependent on change in pH;

measuring the intensity of the signal; and determining the pH, and $Ca^{2+}$ or $Cl^-$ concentration from the measured signal by comparing to a reference value.

2. The method of claim 1, wherein determining is in early endosome, late endosome, plasma membrane, lysosome, autophagolysosome, recycling endosome, cis Golgi network, trans Golgi network, endoplasmic reticulum, peroxisomes, or secretory vesicles.

3. The method of claim 1, wherein the nucleic acid complex comprises the $Cl^-$ fluorophore crosslinked to the first strand.

4. The method of claim 3, wherein the $Cl^-$ fluorophore comprises 10,10'-bis [3-carboxypropyl]-9,9'-biacridinium dinitrate.

5. The method of claim 1, wherein the nucleic acid complex comprises the $Ca^{2+}$ fluorophore crosslinked to the first strand.

6. The method of claim 5, wherein the $Ca^{2+}$ fluorophore is a single wavelength indicator.

7. The method of claim 5, wherein the crosslinked $Ca^{2+}$ fluorophore is:

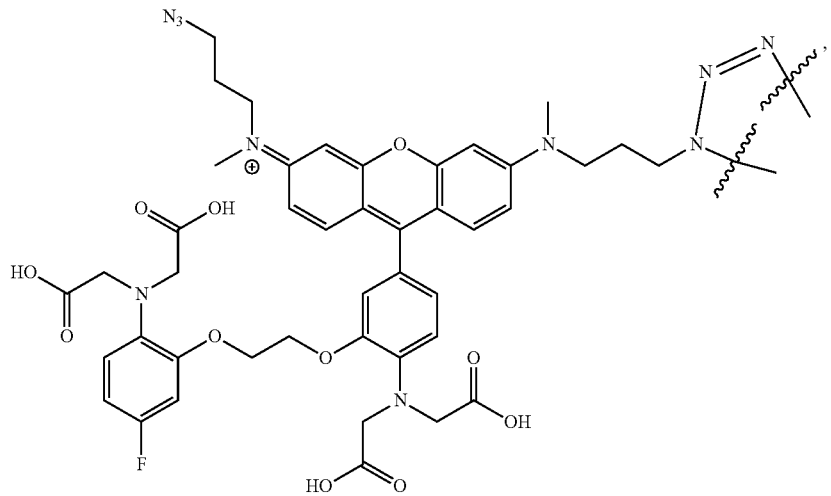 [SMILES: */N=N\N(*)CCCN(C)c1ccc2c(-c3ccc(N(CC(=O)O)CC(=O)O)c(OCCOc4cc(F)ccc4N(CC(=O)O)CC(=O)O)c3)c3cc/c(=[N+](\C)CCCN=[N+]=[N-])cc-3oc2c1]

or
wherein the first single-stranded nucleic acid molecule comprising a $Ca^{2+}$ fluorophore is of formula:

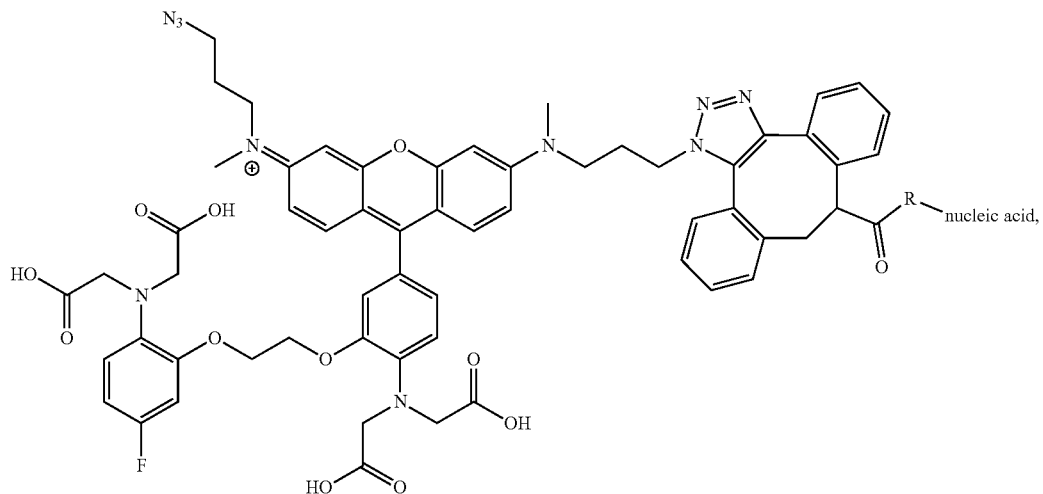

wherein R is a linker.

8. The method of claim 1, wherein the intensity of the signal dependent on change in pH varies as a function of the conformation of the nucleic acid complex.

9. The method of claim 1, wherein the nucleic acid further comprises a second label conjugated to the first single-stranded nucleic acid or the second single-stranded nucleic acid.

10. The method of claim 9, wherein the intensity of the signal varies as a function of at least one of the distance between the first label and second label and the relative orientation of the first label and second label.

11. The method of claim 1, wherein the first single-stranded nucleic acid molecule and second single-stranded nucleic acid form an i-motif under acidic conditions.

12. The method of claim 1, wherein the second single-stranded nucleic acid is capable of forming an intramolecular complex comprising two parallel-stranded C—HC+ base paired duplexes that are intercalated in an anti-parallel orientation at acidic conditions.

13. The method of claim 1, wherein the nucleic acid complex further comprises a third single-stranded nucleic acid molecule that is partially complementary to the first single-stranded molecule.

14. The method of claim 1, wherein the nucleic acid complex further comprises a targeting moiety.

15. The method of claim 1, wherein the first and/or second single-stranded nucleic acid molecule is less than 200 nucleotides; or less than 100 nucleotides; or less than 50 nucleotides.

16. The method of claim 1, wherein the determined $Ca^{2+}$ concentration is in a range of 10 nM to 10 mM; or in a range of 10 nM to 1 µM; or in a range of 1 µM to 10 mM; or wherein the determined Cl⁻ concentration is in a range of 10 nM to 10 mM; or in a range of 10 nM to 1 µM; or in a range of 1 µM to 10 mM.

17. The method of claim 1, wherein the determined pH is less than pH 5.5; or wherein the determined pH is more than pH 7.0.

18. The method of claim 1, wherein
(a) the first strain has the sequence 5'-the Ca$^{2+}$ fluorophore-GAC TCA CTG TTT GTC TGT CGT TCT AGG ATA/the second label/AT ATT TTG TTA TGT GTT ATG TGT TAT-3' (SEQ ID NO: 07); and
the second strain has the sequence 5'-the first label-CCC CTA ACC CCT AAC CCC TAA CCC CAT ATA TAT CCT AGA ACG ACA GAC AAA CAG TGA GTC-3' (SEQ ID NO:08);
(b) the first strain has the sequence 5'-TTA TAG GAT CCT GCG GTC GG/the Ca2+fluorophore/GGC ACC AGG CGT AAA ATG TA-3' (SEQ ID NO:09);
the second strain has the sequence: 5'-the first label-CCC CAA CCC CAA TAC ATT TTA CGC CTG GTG CC-3' (SEQ ID NO: 10); and
the third strain has the sequence: 5'-CCG ACC GCA GGA TCC TAT AAA ACC CCA ACC CC-the second label-3 (SEQ ID NO:11);
(c) the first strain has the sequence 5'-the Ca2+fluorophore-GAC TCA CTG TTT GTC TGT CGT TCT AGG ATA/the second label/AT ATT TTG TTA TGT GTT ATG TGT TAT-3' (SEQ ID NO: 07); and
the second strain has the sequence 5'-the first label-AT AAC ACA TAA CAC ATA ACA AAA TAT ATA TCC TAG AAC GAC AGA CAA ACA GTG AGT C-3' (SEQ ID NO:12); or
(d) the first strain has the sequence 5'-the Cl⁻ fluorophore-ATC AAC ACT GCA-Lys-COOH (SEQ ID NO:22);
the second strain has the sequence 5'-TAT TGT GTA TTG TGT ATT GTT TTA TAT AT/the first label/A TAG GAT CTT GCT GTC TGG TGT GCA GTG TTG AT-3' (SEQ ID NO:23); and
the third strain has the sequence: 5'-CAC CAG ACA GCA AGA TCC TAT ATA TAT ACC CCA ATC CCC AAT CCC CAA TCC CC-the second label-3' (SEQ ID NO:24).

* * * * *